(12) United States Patent
Metcalf et al.

(10) Patent No.: US 10,387,332 B1
(45) Date of Patent: Aug. 20, 2019

(54) COMPUTING IN PARALLEL PROCESSING ENVIRONMENTS

(71) Applicant: Mellanox Technologies Ltd., Yokneam (IL)

(72) Inventors: Christopher D. Metcalf, Wellesley, MA (US); Bruce Edwards, Belmont, MA (US); Anant Agarwal, Weston, MA (US); Chyi-Chang Miao, Sharon, MA (US); Patrick Robert Griffin, Brookline, MA (US)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 15/484,283

(22) Filed: Apr. 11, 2017

Related U.S. Application Data

(63) Continuation of application No. 14/286,000, filed on May 23, 2014, now Pat. No. 10,095,543, which is a continuation of application No. 13/280,927, filed on Oct. 25, 2011, now Pat. No. 8,738,860.

(60) Provisional application No. 61/509,768, filed on Jul. 20, 2011, provisional application No. 61/424,314, filed on Dec. 17, 2010, provisional application No. 61/406,467, filed on Oct. 25, 2010.

(51) Int. Cl.
| | |
|---|---|
| *G06F 12/128* | (2016.01) |
| *G06F 12/0862* | (2016.01) |
| *G06F 12/0808* | (2016.01) |
| *G06F 12/14* | (2006.01) |

(52) U.S. Cl.
CPC ........ *G06F 12/128* (2013.01); *G06F 12/0808* (2013.01); *G06F 12/0862* (2013.01); *G06F 12/1475* (2013.01); *G06F 2212/1052* (2013.01); *G06F 2212/602* (2013.01); *G06F 2212/621* (2013.01); *G06F 2212/69* (2013.01)

(58) Field of Classification Search
None
See application file for complete search history.

(56) References Cited

U.S. PATENT DOCUMENTS

| | | | |
|---|---|---|---|
| 5,852,736 A | 12/1998 | Shipman | |
| 5,900,018 A | 5/1999 | Lynch | |
| 6,269,427 B1 * | 7/2001 | Kuttanna | ............ G06F 9/30043 711/118 |
| 6,272,603 B1 | 8/2001 | Arimilli et al. | |
| 6,321,303 B1 * | 11/2001 | Hoy | ..................... G06F 12/0831 711/123 |
| 6,496,909 B1 | 12/2002 | Schimmel | |
| 7,461,210 B1 * | 12/2008 | Wentzlaff | .............. G06F 12/126 711/120 |

(Continued)

OTHER PUBLICATIONS

Compare and Swap, Wikipedia, 2011.*

(Continued)

*Primary Examiner* — Tuan V Thai
(74) *Attorney, Agent, or Firm* — Fish & Richardson P.C.

(57) ABSTRACT

A computing system comprises one or more cores. Each core comprises a processor. In some implementations, each processor is coupled to a communication network among the cores. In some implementations, a switch in each core includes switching circuitry to forward data received over data paths from other cores to the processor and to switches of other cores, and to forward data received from the processor to switches of other cores.

33 Claims, 90 Drawing Sheets

(56) References Cited

U.S. PATENT DOCUMENTS

| | | |
|---|---|---|
| 8,539,499 B1 | 9/2013 | Tovpeko |
| 8,738,860 B1 | 5/2014 | Griffin et al. |
| 2002/0087925 A1* | 7/2002 | Hayden ............... G06F 13/1663 714/718 |
| 2002/0199045 A1* | 12/2002 | Browning ............... G06F 9/524 710/100 |
| 2003/0033487 A1 | 2/2003 | Pfister |
| 2005/0021699 A1 | 1/2005 | Kota |
| 2005/0114609 A1* | 5/2005 | Shorb ..................... G06F 9/526 711/152 |
| 2006/0195620 A1 | 8/2006 | Arndt |
| 2007/0239915 A1* | 10/2007 | Saha ....................... G06F 9/526 710/200 |
| 2009/0083493 A1 | 3/2009 | Kinter |
| 2010/0325391 A1 | 12/2010 | Talla |
| 2011/0131352 A1 | 6/2011 | Allen |
| 2011/0154111 A1 | 6/2011 | Beilmann |

OTHER PUBLICATIONS

Load Link / Store conditional, Wikipedia, 2011.*
Linearizability, Wikipedia, 2011.*
Machine Code by Wikipedia, 2011.*
Fetch and add by Wikipedia, 2011.*
Pending U.S. Continuation U.S. Appl. No. 15/484,316, filed Apr. 11, 2017, entitled "Computing in Parallel Processing Environments".
Pending U.S. Continuation U.S. Appl. No. 15/484,317, filed Apr. 11, 2017, entitled "Computing in Parallel Processing Environments".
Pending U.S. Continuation U.S. Appl. No. 15/484,409, filed Apr. 11, 2017, entitled "Computing in Parallel Processing Environments".
Pending U.S. Continuation U.S. Appl. No. 15/484,539, filed Apr. 11, 2017, entitled "Computing in Parallel Processing Environments".

* cited by examiner

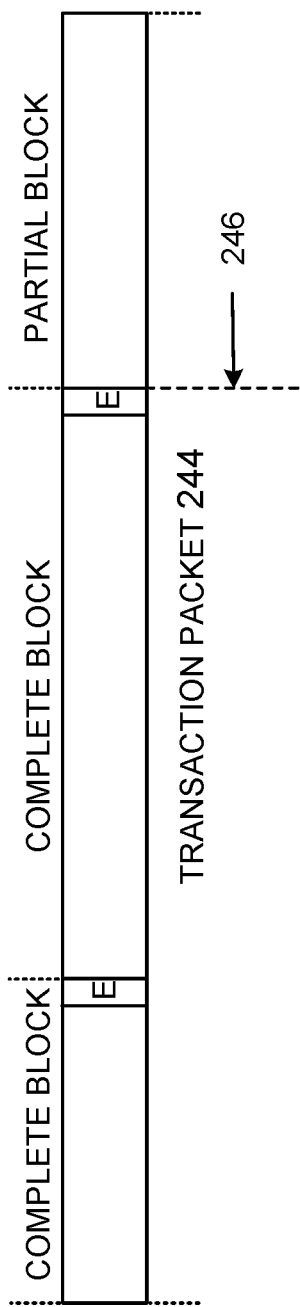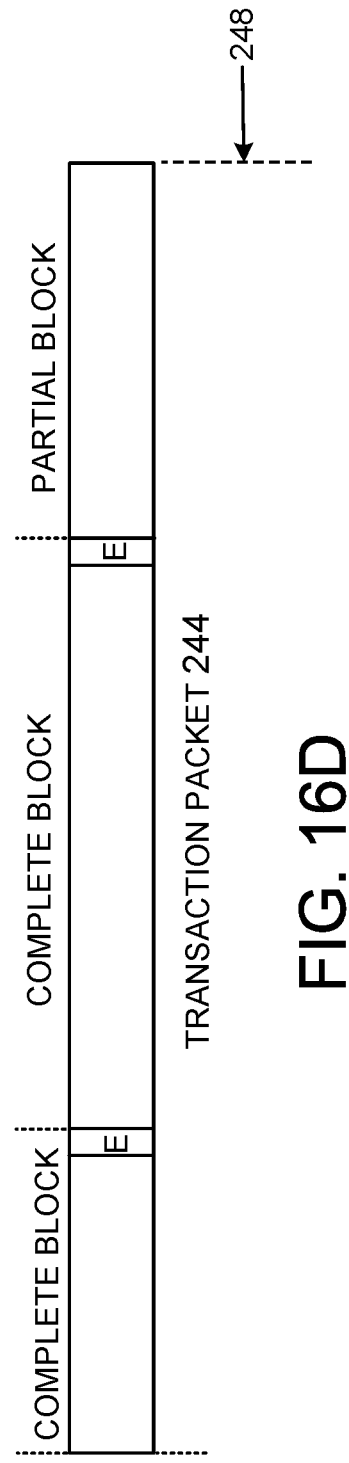

| Compression Mode: 2x2 | |
|---|---|
| Entry | Valid Core |
| Entry 1 | nw, ne, sw, se |
| Entry 2 | |
| Entry 3 | nw, ne |
| Entry 4 | nw, ne, sw, se |
| Entry 5 | nw, ne, sw |
| Entry 6 | nw, ne |
| Entry 7 | nw, sw |
| Entry 8 | nw, sw |
| Entry 9 | nw, |

FIG. 18D

| | | | | |
|---|---|---|---|---|
| 1 (nw) | 1 (ne) | 4 | 4 | 7 (nw) |
| 1 (sw) | 1 (se) | 4 | 4 | 7 (sw) |
| 2 | 2 | 5 | 5 | 8 |
| 2 | 2 | 5 | not valid | 8 |
| 3 (nw) | 3 (ne) | 6 | 6 | 9 (nw) |

FIG. 18E

Request Control List 431    Additional properties

| Entry n | | | |
|---|---|---|---|
| | | | |
| | | | |
| | | | |
| | | | |
| | | | |
| Entry 1 | | | |
| Entry 0 | A rule | track | priority |

For example, Entry

432 | Core/IO | network | type | flags |

Flags: | istream | dstream |

| Prefetch | not |

Types: | Read | write | cmp-xchg | ...

Networks: | network0 | network1 | ...

I/O IDs: | IO0 | IO1 | IO2 | ...

Core IDs: | C0 | C1 | C2 | ...

FIG. 22B

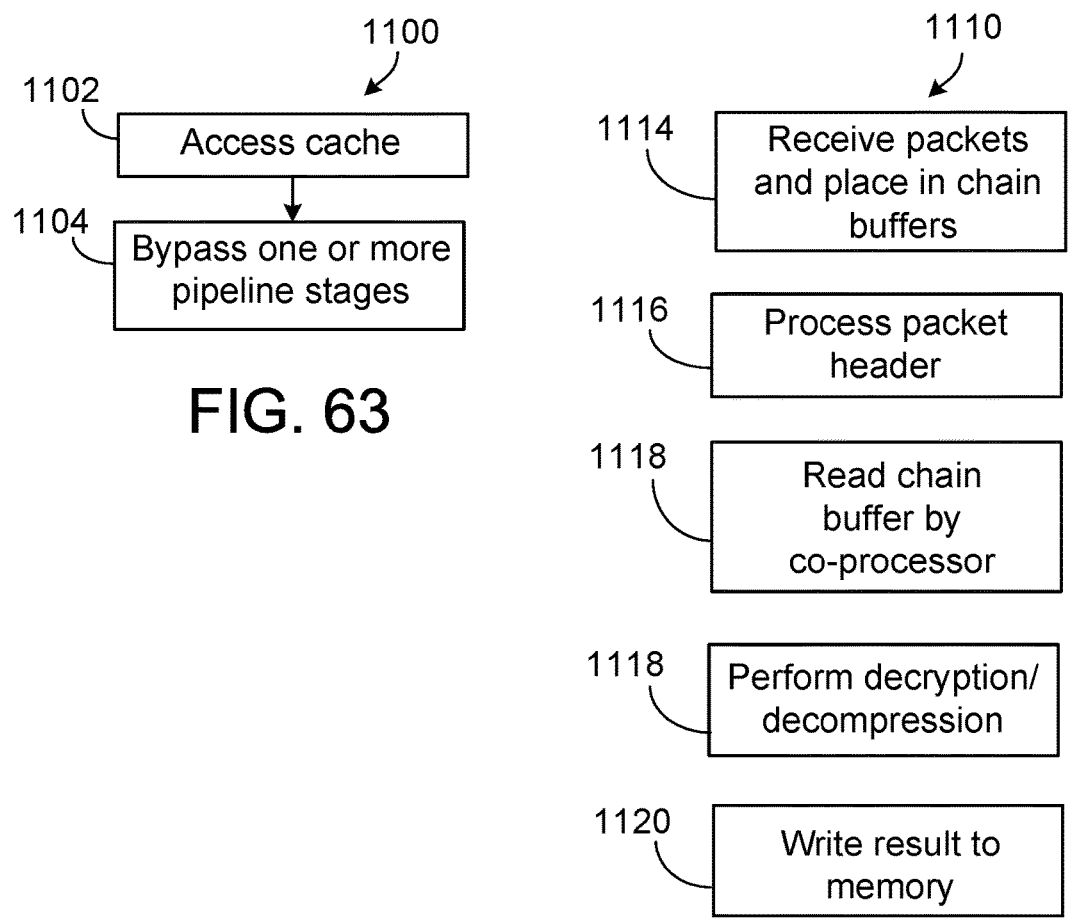

COMPUTING IN PARALLEL PROCESSING ENVIRONMENTS

PRIORITY CLAIM

This application is a continuation application of and claims priority under 35 U.S.C. 120 from U.S. application Ser. No. 14/286,000, filed May 23, 2014, which claims the benefit of and is a continuation application of U.S. application Ser. No. 13/280,927, filed Oct. 25, 2010, which claims the benefit of U.S. Provisional Application No. 61/406,467, filed Oct. 25, 2010, U.S. Provisional Application No. 61/424,314, filed Dec. 17, 2010, and U.S. Provisional Application No. 61/509,768, 5 filed Jul. 20, 2011, each of which is incorporated herein by reference.

BACKGROUND

This description relates to computing in parallel processing environments.

FPGAs (Field Programmable Gate Arrays) and ASICs (Application Specific Integrated Circuits) are two exemplary approaches for implementing customized logic circuits. The cost of building an ASIC includes the cost of verification, the cost of physical design and timing closure, and the NRE (non-recurring costs) of creating mask sets and fabricating the ICs. Due to the increasing costs of building an ASIC, FPGAs became increasingly popular. Unlike an ASIC, an FPGA is reprogrammable in that it can be reconfigured for each application. Similarly, as protocols change, an FPGA design can be changed even after the design has been shipped to customers, much like software can be updated. However, FPGAs are typically more expensive, often costing 10 to 100 times more than an ASIC. FPGAs typically consume more power for performing comparable functions as an ASIC and their performance can be 10 to 20 times worse than that of an ASIC.

Multicore systems (e.g., tiled processors) use parallel processing to achieve some features of both ASICs and FPGAs. For example, some multicore systems are power efficient like an ASIC because they use custom logic for some functions, and reconfigurable like FPGAs because they are programmable in software.

SUMMARY

In one aspect, in general, a method for performing atomic operations in a computing system includes: receiving an instruction to perform an operation associated with a memory address of a location in a memory of the computing system; and performing the operation in circuitry coupled to the memory of the computing system, including reading a value stored in the location in memory and performing one or more additional actions atomically with reading the value, with at least one of the additional actions conditionally performed based at least in part on the value read from the location in memory.

The method may further include determining whether to send a message invalidating cached copies of the value based on whether the at least one conditionally performed actions writes to the memory address.

In another aspect, in general, a method for providing shared access to a resource for multiple processes executing on a computing system includes: storing, in a translation lookaside buffer that translates virtual addresses to physical memory addresses of locations in a memory of the computing system, a translation mapping between at least a portion of a virtual address and a physical address of one of multiple registers coupled to the resource; and fulfilling requests to access the resource based on messages stored in respective ones of the multiple registers, with different respective processes requesting access to the resource by writing a message at a virtual address allocated to that respective process that includes at least a portion mapped to a physical address of a respective one of the multiple registers.

In another aspect, in general, a computing system includes a plurality of cores. Multiple ones of the plurality of cores each comprises: a processor, first switching circuitry configured to couple the processor to a first network among the cores for communicating between cores, and second switching circuitry configured to couple the processor to a second network among the cores for transferring memory access requests and responses between cores and memory coupled to the multicore computing system. The system also includes circuitry coupled to the second network configured to: receive interrupt requests over the second network from respective cores, determine from a particular interrupt request a targeted one of the plurality of cores, and send a message to the targeted one of the plurality of cores that includes information that causes an interrupt at the targeted one of the plurality of cores.

In another aspect, in general, a computing system includes a plurality of cores. Multiple ones of the plurality of cores each comprises: a processor, and switching circuitry configured to couple the processor to a network among the cores. The system includes: a plurality of registers coupled to the network, and configured to store data from respective processes executing on the cores that target the data to addresses mapped to the registers; a plurality of function-specific engines each configured to perform a particular function on received data; and a scheduler coupled to the plurality of registers and the plurality of function-specific engines, and configured to schedule data stored in the registers to be sent to the function-specific engines and to return a result of performing a particular function on data from a particular register to the process that targeted the data to the address mapped to the particular register.

In another aspect, in general, a computing system includes: a plurality of cores; a memory interface to couple at least one core to a memory; and a cache control unit to control a cache memory, for caching data from the memory. The cache control unit is configured to: receive a request from a first of the cores to access a block of the memory; retrieve the block from the memory; send the block to the first core; and store information indicating that the block is exclusively cached in the first core.

The cache control unit may be included in a second of the cores. In some embodiments, after the block is displaced from the first core, the block is sent to the cache control unit and the cache control unit allocates the block into the cache memory and removes the information indicating that the block is exclusively cached in the first core. In some embodiments, multiple of the plurality of cores each include a respective cache control unit to control a corresponding cache memory.

In another aspect, in general, a computing system includes: a plurality of cores; a memory interface to couple at least one core to a memory; and a cache control unit to control a first level cache memory and a second level cache memory, the cache control unit included in at least one of the cores for caching data from the memory. The cache control unit is configured to: receive a request to access a block of the memory; determine whether the requested block satisfies a predetermined condition; store the requested block in the first level cache memory and not the second level cache memory in response to the condition being met; and store the requested block in both the first level cache memory and the second level cache memory in response to the condition not being met.

In some embodiments, the condition being met comprises: the request to access the block being an initial request, or a working set of blocks associated with the requested block fitting in the first level cache memory; and the condition not being met comprises: the request to access the block being a non-initial request, and a working set of blocks associated with the requested block not fitting in the first level cache memory.

In some embodiments, multiple of the plurality of cores each include a respective cache control unit to control a corresponding cache memory.

In another aspect, in general, a computing system includes: a plurality of cores, with multiple ones of the plurality of cores each including a respective cache memory; a memory interface to couple at least one core to a memory; and a cache control unit in at least a first core to control the respective cache memory in the first core, for caching data from the memory. The cache control unit is configured to: process access requests that originate at the first core access a first portion of cached data that is assigned a home cache location in a second core; maintain a first count of a number of access requests processed by the first core to access the first portion of cached data; maintain a second count of a number of the access requests that result in a cache miss at the cache memory in the first core; and re-assign a home cache location of the first portion of cached data from the second core to the first core in response to a predetermined condition on a function of the second count to the first count.

In another aspect, in general, a computing system includes: a plurality of cores, with multiple ones of the plurality of cores each comprising: a processor, switching circuitry configured to couple the processor to a network among the cores; a plurality of registers coupled to the network, and configured to store data from respective processes executing on the cores that request one of multiple tasks based on information stored in the registers; a plurality of function-specific engines each configured to perform a requested one of the multiple tasks, including at least one memory transfer task; and a scheduler coupled to the plurality of registers and the plurality of function-specific engines, and configured to schedule a requested task to be performed by a function-specific engine based on information stored in a particular register, including configuring, in response to a requested memory transfer task, a channel from a source to the function-specific engine and a channel from the function-specific engine to a destination based on the information stored in the particular register.

In another aspect, in general, a method for configuring a computing system for executing instructions includes: configuring a plurality of single-step engines, at least two single-step engines being associated with different respective protection levels, with a first single-step engine associated with a first protection level being configured to single-step instructions at the first protection level or lower and not at higher protection levels; and in response to an instruction associated with the first single-step engine being prepared for execution, triggering a corresponding single-step interrupt.

In another aspect, in general, a method for processing packets in a multicore computing system that includes a plurality of cores includes: configuring a first set of one or more of the plurality of cores to execute a program associated with data being communicated to or from the computing system in packets; configuring a second set of multiple of the plurality of cores to process packets, with different packets distributed to different cores in the second set for processing based on characteristics of the packets including at least one of source, destination, and protocol, and redistributing packets for processing from a first core, selected based at least in part on a quantity of packets being processed by the first core, to a second core, at a time that is determined pseudo-randomly.

In another aspect, in general, a computing system includes: a plurality of cores, with multiple ones of the plurality of cores each including at least one power supply interface configured to receive a power supply voltage, with a first power supply voltage level enabling at least a first domain of the core when the first power supply voltage is applied to the power supply interface, and a second power supply voltage level disabling the first domain when the second power supply voltage is applied to the power supply interface; and a plurality of signal isolation transistors, each coupled to a signal conductor path that crosses between domains of respective first and second cores, the signal isolation transistors configured to switch on, to ground the signal path, in response to the first domain being disabled by a corresponding power supply interface, and configured to switch off in response to the first domain being enabled by the corresponding power supply interface.

In another aspect, in general, a method for configuring a multicore computing system that includes a plurality of cores interconnected by an interconnection network includes: receiving subsets of instructions corresponding to different portions of a program, each subset of instructions assigned to a respective subset of computation units, at least a first of the subsets of computation units including a plurality of computation units; allocating registers in each computation unit in the first subset of computation units for sending values to or receiving values from a respective computation unit in the first subset of computation units over the interconnection network unit; and scheduling instructions of an assigned subset of instructions for execution on the first subset of computation units, and including references in at least some of the instructions to one or more of the allocated registers.

In another aspect, in general, a computing system includes: a plurality of cores; a memory interface to couple at least one core to a memory; and a cache control unit to control a cache memory, the cache control unit included in one of the cores for caching data from the memory. The cache control unit is configured to: receive a request to access data in a memory line of the memory from a requesting core; hash the memory line to identify a cache line to store cached data from the memory line; hash an identifier of the requesting core to generate a hash value; set directory information associated with the identified cache line, the directory information corresponding to the generated hash value; and send the cached data to the requesting core.

In some embodiments, at least some of the plurality of cores each include a respective cache control unit to control a corresponding cache memory.

Other features and advantages of the invention will become apparent from the following description, and from the claims.

DESCRIPTION OF DRAWINGS

FIGS. 16C and 16D are diagrams of a transaction packet.
FIG. 18D is a configuration table.
FIG. 18E is an arrangement of cores.
FIG. 22B is a block diagram of a request control list.
FIG. 63 is a flowchart of a method for fetching instructions.
FIG. 64 is a flowchart of a method for packet processing.

DESCRIPTION

1 Exemplary System Overview

The system described in this section (with reference to FIGS. 1A and 1B) provides an overview of various aspects of a parallel processing environment that can be used for a variety of the techniques described in other sections.

A multicore processor can be manufactured as a chip containing multiple processing engines or cores. Using multiple cores to process applications can provide greater computing throughput and also lower power. There are many challenges to building a multicore processor. These include the challenges of how to connect the cores to each other efficiently, how to manage data sharing between the cores, how to supply data from input-output devices to the cores in a coherent manner, and how to construct operating systems for multicore processors. Bus based multicore chips use a bus to connect the cores, but buses may be a throughput bottleneck and may also consume a lot of power. An alternative way to connect the cores is to use a point-to-point network such as a mesh network or a ring network. Networks such as a mesh have switches arranged in a grid pattern in which neighboring switches are connected to each other. When the cores include a switch component for a network such as a mesh, the cores can be laid out in a simple rectangular tiled pattern. Such multicore chips are called tiled multicore processors. Because the conductor paths are short in tiled multicore processors, signals can travel short distances when neighboring cores need to communicate. Tiled multicore processors generally consume lower power than bus based multicore processors.

Figure 1A:
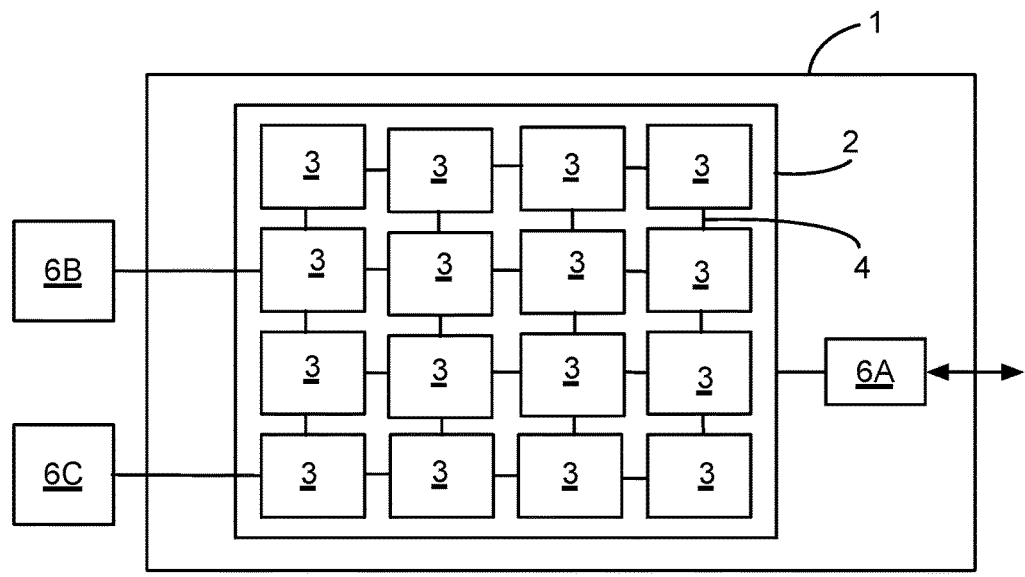
FIG. 1A is a block diagram of a tiled integrated circuit.

Referring to FIG. 1A, an integrated circuit 1 (or "chip") includes an array 2 of interconnected tiles 3. Each of the tiles 3 is a functional unit that includes a processor (or "processor core") and a switch that forwards data from other tiles to the processor and to switches of other tiles over data paths 4. The switch is coupled to the processor so that data can be sent to or received from processors of other tiles over the communication fabric formed by the switches and data paths. The integrated circuit 1 includes other on-chip circuitry such as input/output (I/O) interface circuitry to couple data in and out of the circuit 1, and clock distribution circuitry to provide clock signals to the processors of the tiles.

The integrated circuit 1 shown in FIG. 1A includes a two-dimensional array 2 of rectangular tiles with data paths 4 between neighboring tiles to form a mesh network. The data path 4 between any two tiles can include multiple conductor paths (or "wires") to support parallel channels in each direction. Optionally, specific sets of conductors between two tiles can be dedicated to different mesh networks that can operate independently.

Alternative network configurations include buses, rings, crossbars, hypercubes, trees, or networks having paths that extend to diagonal neighbors or to tiles that are multiple rows or columns away. Other configurations include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 4 from one or more tiles at the edge of the network can be coupled out of the array of tiles 2 (e.g., over I/O pins) to an on-chip device 6A, an off-chip device 6B, or a communication channel interface 6C, for example. Multiple conductors of one or more parallel channels can be multiplexed down to a fewer number of pins or to a serial channel interface. For example, the conductors for one or more channels can be multiplexed onto a high-speed serial link (e.g., SerDes) or a memory controller interface (e.g., a memory controller for DDR or Dynamic RAM—also known as DRAM). The memory controller can be implemented off-chip or in logic blocks within a tile or on the periphery of the integrated circuit 1.

The following exemplary implementations are described in the context of tiles that have the same structure and functionality. Alternatively there can be multiple "tile types" each having different structure and/or functionality. For example, tiles that couple data off of the integrated circuit 1 can include additional circuitry for I/O functions.

Figure 1B:
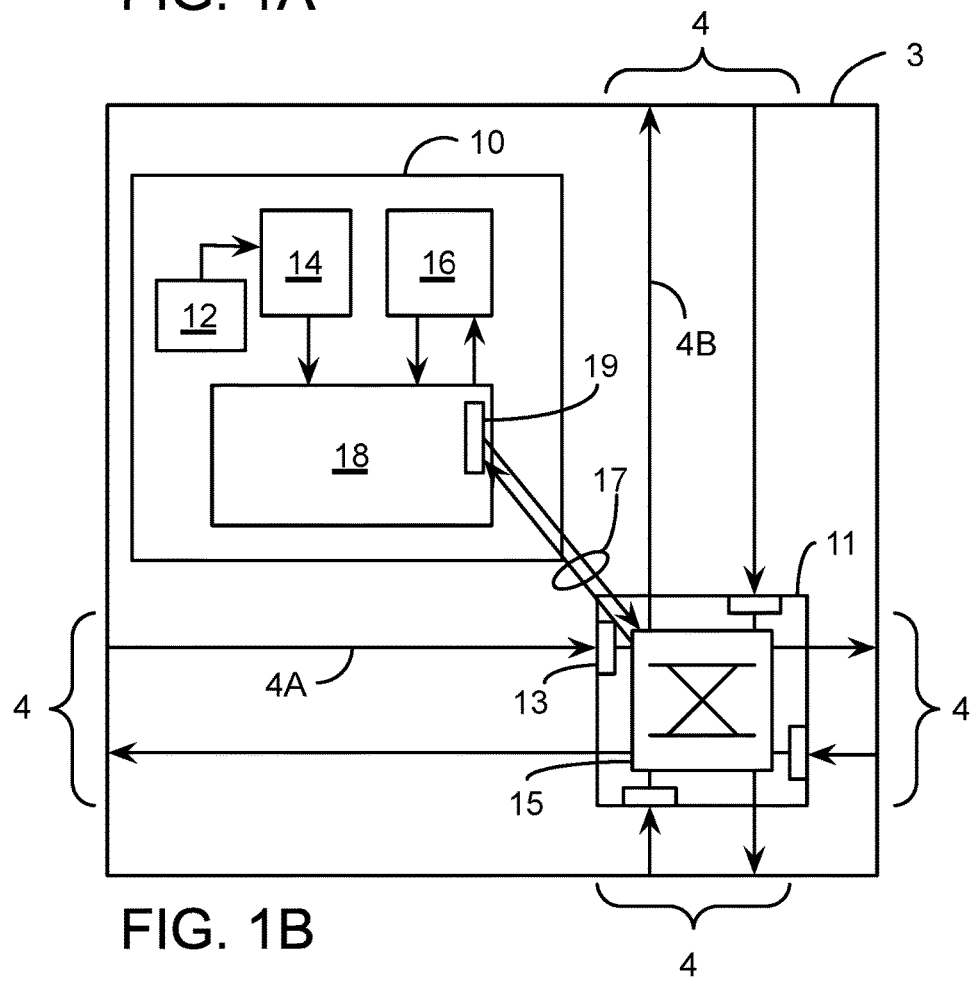
FIG. 1B is a block diagram of a tile.

Referring to FIG. 1B, a tile 3 includes a processor 10, a switch 11, and sets of incoming conductors 4A and outgoing conductors 4B that form the data paths 4 for communicating with neighboring tiles. The processor 10 includes a program counter 12, an instruction memory 14, a data memory 16, and a pipeline 18. The processor 10 can use any of a variety of pipelined architectures. The pipeline 18 includes pipeline registers, functional units such as one or more arithmetic logic units (ALUs), and temporary storage such as a register file. The stages in the pipeline 18 include, for example, instruction fetch and decode stages, a register fetch stage, instruction execution stages, and a write-back stage.

Either or both of the instruction memory 14 and data memory 16 can be configured to operate as a cache for off-chip memory. The cache hierarchy can take many forms, and the description here is just one example. For example, the instruction memory 14 includes an instruction cache that caches instructions, which can be a level 1 instruction cache (L1I), and the data memory 16 includes a data cache that caches data, which can be a level 1 data cache (L1D). Both the L1I cache and the L1D cache can be backed up by a level 2 unified cache (L2U) that is usually larger in size than either of the L1 caches. The caches are controlled by a cache controller.

On a cache miss from the L1I or L1D caches, the L2U cache is checked. If the data is found in the L2U cache, then a cache miss can be averted. If the instruction or data is not found in the L2U, then the instruction or data is fetched from outside the tile. Typically, the processor checks the cache in another tile called the home tile for that particular address that missed. This way, the L2U caches in the other tiles serve as a large distributed L3 cache. If the home tile has an entry for the data item (within a home location of a home cache in the home tile), the home tile can supply the data item to the requesting tile. If even the home tile causes a cache miss, then, as an example, the home tile handles the cache miss by sending the cache request to external memory (to DRAM typically) and obtains the data item from the external memory. The cache miss from the requesting tile gets turned into a message that traverses the network to get to the home tile. Similarly, the miss from the home tile to DRAM traverses the network.

Sometimes, instead of checking a home tile on a cache miss to the cache within a tile, the request is sent directly outside the chip to external DRAM memory.

The tile 3 can also includes a cache controller that performs actions to ensure that cache coherence is maintained in the whole chip. Typically, the cache coherence information for a given cache line is maintained at the home tile for that cache line. The coherence information is stored in a directory to store the current state of the cache line. The home location for a given cache line is stored in a translation lookaside buffer (TLB) along with the page information for that cache line. The home location, within a home tile, for a given cache line can also be determined by hashing the cache line address to yield a home location. The home location can also be modified as the program executes. Data that has a home location in a home cache of a particular home tile is said to be "homed in" that particular tile.

The processor 10 can be multithreaded and/or have capabilities of a Very Long Instruction Word (VLIW) processor, a superscalar processor, or a vector processor.

Together the switches 11 in a multicore chip provide the communications infrastructure for all the cores. Switches can be built in many ways. As one example, the switch 11 includes input buffers 13 for temporarily storing data arriving over incoming conductors 4A, and switching circuitry 15 (e.g., a crossbar fabric) for forwarding data to outgoing conductors 4B or the processor 10. The input buffering provides pipelined data channels in which data traverses a data path 4 from one tile to a neighboring tile in predetermined number of clock cycles (e.g., a single clock cycle). This pipelined data transport enables the integrated circuit 1 to be scaled to a large number of tiles without the need to limit the clock rate to account for effects due to conductor lengths such as propagation delay or capacitance. (Alternatively, the buffering could be at the output of the switching circuitry 15 instead of, or in addition to, the input.)

A tile 3 controls operation of the switch 11 using either the processor 10, or separate switch processor dedicated to controlling the switching circuitry 15. Separating the control of the processor 10 and the switch 11 allows the processor 10 to take arbitrary data dependent branches without disturbing the routing of independent messages passing through the switch 11.

In some implementations, the switch 11 includes a switch processor that receives a stream of switch instructions for determining which input and output ports of the switching circuitry to connect in any given cycle. For example, the switch instruction includes a segment or "sub-instruction" for each output port indicating to which input port it should be connected. In some implementations, the processor 10 receives a stream of compound instructions with a first instruction for execution in the pipeline 18 and a second instruction for controlling the switching circuitry 15.

The switch instructions enable efficient communication among the tiles for communication patterns that are known at compile time. This type of routing is called "static routing." An example of data that would typically use static routing are operands of an instruction to be executed on a neighboring processor.

The switch also provides a form of routing called "dynamic routing" for communication patterns that are not necessarily known at compile time. Dynamic routing is also used for messages that result from cache misses or other cache coherence related transactions. In dynamic routing, circuitry in the switch 11 determines which input and output ports to connect based on header information in the data that is being dynamically routed during execution. A tile can send a message to any other tile by generating the appropriate address information in the message header. The tiles along the route between the source and destination tiles use a predetermined routing approach. For example, one routing approach is shortest Manhattan Routing (also known as dimension-ordered routing), which refers to routing along a first dimension followed by a second perpendicular dimension (where the distance between two points is measured by adding line segments that are arranged in a grid like pattern, with the line segments at right angles to each other, and not the straight line joining the two points). The number of hops along a route is deterministic but the latency depends on the congestion at each tile along the route. Examples of data traffic that would typically use dynamic routing are memory access traffic (e.g., to handle a cache miss) or interrupt messages.

The switch 11 includes dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

The switch 11 is coupled to the processor 10 over processor coupling wires 17. For fast (e.g., low latency) communication between tiles of neighboring processors, the coupling wires 17 are integrated directly into the pipeline 18. The processor 10 communicates with the switch 11 using distinct opcodes to distinguish between accesses to the static and dynamic network ports. Alternatively, the instructions can use register names to refer to switch ports. For example, the processor can send or receive data by writing to or reading from a register interface that is directly mapped to the input buffers 13 of the switch 11. For data going to or coming from the processor 10, a switch instruction indicates that the switch 11 should couple data to or from a selected register or bypass path of the pipeline 18 over a register mapped pipeline integrated switch interface 19. This pipeline integration allows data to be available to the switch 11 the moment an instruction is executed and the register value is available. In the next cycle the same data could appear at an input buffer of another tile.

To improve the latency of dynamic routing switches the tiles can use route prediction in the switches. With route prediction, a message that comes into an input port of the switch is routed to a given destination port of the switch based on a predicted port number. The prediction for a packet coming in from a given input port can be selected based on the route taken by the previous packet from that input port. If the hardware in the tile (e.g., prediction circuitry) determines that the prediction was incorrect, the hardware can take a few extra cycles to make the right routing decision based on the information in the packet header.

Other optimizations include using wide network channels. A tile can send single word messages containing both the packet header and the data value. The packet header includes information such as route information.

A tile 3 can include various types of memory modules to serve as the instruction memory 14, data memory 16, or as a local memory store for other types of information such as control information for the tile. There can be a small SRAM bank in each tile in addition to a large SRAM bank. There can also be a larger DRAM bank in each tile. Each tile can have mode indicators used to select among these banks. Any of the memory modules can be treated as a cache for a larger memory store outside the tile 3 or the integrated circuit 1. Such external memory (e.g., DRAM) is accessible over high bandwidth paths of one or more dynamic networks. The amount of memory can be chosen to roughly balance the areas devoted to processing and memory, and to match the memory access time and the processor clock.

Functions such as virtual address translation, caching, global shared memory and memory protection can be implemented by any combination of hardware and software (e.g., processor instructions). A tile 3 can include a translation lookaside buffer (TLB) to translate virtual addresses as they come out of the processor 10 on each tile 3. Separate TLBs for instruction and data can also be used. A mode bit for each can turn off translation. Events such as cache miss or translation fault can trigger a trap or interrupt to the processor 10, so that the processor 10 can handle the event in software (using instructions executed by the processor).

The software running on the processor 10 can also use various mechanisms to speedup TLB miss handling. For example, a software TLB miss handler can also maintain a software cache of TLB entries. This software cache used by the software TLB miss handler is also called a TSB.

For example, there can be multiple trap lines (conductors carrying trap signals) to the processor 10. Alternatively, there are few trap lines, but there is a trap vector that the processor 10 can access which encodes the type of trap that occurred. There is a mode indicator, which can allow selecting whether the software or the hardware handles these events. A hardware cache tag file can export a hit/miss status to the software rather than stalling the processor pipeline.

An array of tiles 2 can include one or more interface modules coupled to a switch on the periphery of the array to transfer data to and from an external device such as an I/O device. The interface module includes circuitry to mediate between the communication protocols of the dynamic networks and a communication protocol of the external device. An interface module is able to connect to ports of any of the dynamic network switch points on a tile, but any given interface module may only be connected to a subset of the dynamic networks through a subset of the switch points.

The configuration of the circuitry in a tile 3 can be controlled by local control information stored in the tile. For example, a module in the tile can be turned on or off (to save power for example) or configured into a variety of modes (e.g., to set protection levels) based on the state of a "mode indicator" (e.g., one or more bits) stored in a register or other memory store.

Various parts of the multicore chip, for example, a tile, a processor in a tile, a processor and caches in a tile, can also be selectively shut off to save power. When doing so, the system takes care to selectively shut off or activate certain parts of the tile that are needed for other parts of the system to operate. For example, if a tile's cache is the home cache for a given set of cache lines, then that tile's cache controller and cache might be powered up. Alternatively, they might take a set of actions before they are powered down. These actions can transfer responsibility of processing to other parts of the chip.

As line rates of traffic increasingly rise, it is often not possible to timely execute all of the required applications completely in software. For such cases, a processor 10 can include accelerator circuitry to speedup processing for special functions such as security, compression, network packet processing, etc. The accelerator circuits (accelerators) can be connected directly to a tile or a core, or they can be connected to the periphery of an interconnection network (for example, like an I/O device). The accelerators can also be full participants in coherence protocols and can contain caches. They can also use cache coherence transfers to transfer data between them and the other cores, or they can use DMA (direct memory access) to transfer data from the caches on the rest of the chip to the accelerator memory or caches.

In this situation, it is useful to support a unified interface to the accelerators, such as in a MiCA interface (multicore interface for coprocessor acceleration). MiCA like interfaces can support direct transfer of data from the chip's caches to the accelerators. The accelerators can also be virtualized so that more cores can access the accelerators than there are accelerators.

Accelerators often have a queue of requests from processors (or cores or tiles). They can perform the operations requested in the requests in the order in which the requests were received (for example).

A software system for the tiled integrated circuit 1 includes a compiler that is able to schedule instructions for the processors in each of the cores. The compiler can also prepare communication over the static network, or messages to be sent over the dynamic network.

An exemplary operating system (OS) for the integrated circuit 1 can include a Linux-like kernel or a similar kernel running on a single tile 3. The OS can be a symmetric multiprocessing OS such as SMP Linux which can run on one or more tiles. Threads of SMP Linux running on multiple tiles communicate with each other through coherence shared memory. Alternatively, the OS can be a distributed OS running on multiple tiles sending messages to each of the processes on each of the tiles.

Another software system component that can be included is a hypervisor layer that provides physical device drivers for each physical device. The hypervisor also sets protection levels in the hardware. The hypervisor is responsible to multiplex various operating systems on the physical hardware and physical devices.

Application writers can program each of the cores or tiles in the multicore chip using languages such as C. Similarly, they can program multiple tiles by writing parallel programs using libraries such as pthreads, Message Passing Interface (MPI), or parallel languages such as OpenMP.

The software system can also include libraries that provide additional function such as interfaces that allow the user to access various hardware features directly, such as the registers related to the network, special purpose registers, synchronization operations, user-level message passing, etc.

2 Dynamic Code Generation for Trap Handling

Some techniques relate generally to providing support for exceptional events during program execution by generating code on the fly rather than by running conventional exception handling code.

Some instructions executed during normal program executing are "trapping"; that is, they cause an interrupt to be generated by the processor and the trap needs to be resolved before program execution can continue. In some cases the trap can be resolved and the instruction executed a second time to work correctly, as is true for page faults, some types of access violations, and other types of TLB (translation lookaside buffer) traps. In such cases there is typically no way for user space (a portion of memory segregated by the operating system for running user programs, e.g., as opposed to kernel space segregated for running the kernel) to avoid the cost of the trap. In other cases, such as an illegal instruction trap or a divide-by-zero trap, the program is performing an illegal operation and it may be challenging to "optimize" trap handling. Some implementations of a trap handler provide dynamic code generation for management of traps that can be avoided by having a different (typically slower) sequence of instructions be executed by the processor.

Typically a compiler will generate code that assumes the best case, i.e., that no trap will occur. If this assumption is incorrect, the operating system is expected to perform whatever "fix-up" is required to preserve the semantics of the code as generated by the compiler. For example, an unaligned access trap can occur on some machines when the compiler generates an instruction to load a four-byte value from memory, but the address specified is not evenly divisible by four. In this case the operating system may choose to respond to the resulting "unaligned access" trap by loading the appropriate value from memory, updating the application's register state as if the value had been loaded, and then continuing the application from the next instruction.

Such approaches to handling exceptional events are relatively slow, and in particular may not benefit from previous exposure to the same events. For example, each time an unaligned read occurs the same slow process may be performed again.

Dynamic code generation techniques, which include one or more of the following approaches, can be used in handling such exceptional events. For example, one approach would involve translating trapping machine instructions to sequences that do not cause traps. Another approach involves managing an efficient data structure that maps machine instructions to translations. In addition, other approaches involve safely coordinating shared data and machine-generated code without locks, efficiently and securely using user-space memory to store state in kernel code and updating the program image directly for frequently-trapping operations. Other approaches involve supporting pre-generated translations in the compiled code for efficiency; and generating compiler feedback to select trapping or non-trapping implementations.

The following approach may be used to execute an alternate sequence of instructions very efficiently when the original sequence is not performing well (for example, trapping or taking interrupts) for any reason. This example is described in the context of an interrupt handler for unaligned memory, but the approach is general and applies to other situations as well. When a trap due to an unforeseen event takes place, the interrupt handler for unaligned memory performs following actions to handle the trap. On entry, the handler stores some register state securely and efficiently, using user-space memory. The program counter (PC) and faulting instruction are looked up in a hash table to discover a translated sequence of instructions that can be run to perform the required load or store but without generating a trap. The interrupt handler restores the register state, and modifies the PC for the application to return to the translated code directly. The translated code executes (at the same protection level as the original code), performing the required load or store without generating a trap, then jumps back to the appropriate next instruction that the program would have run.

Figure 2:
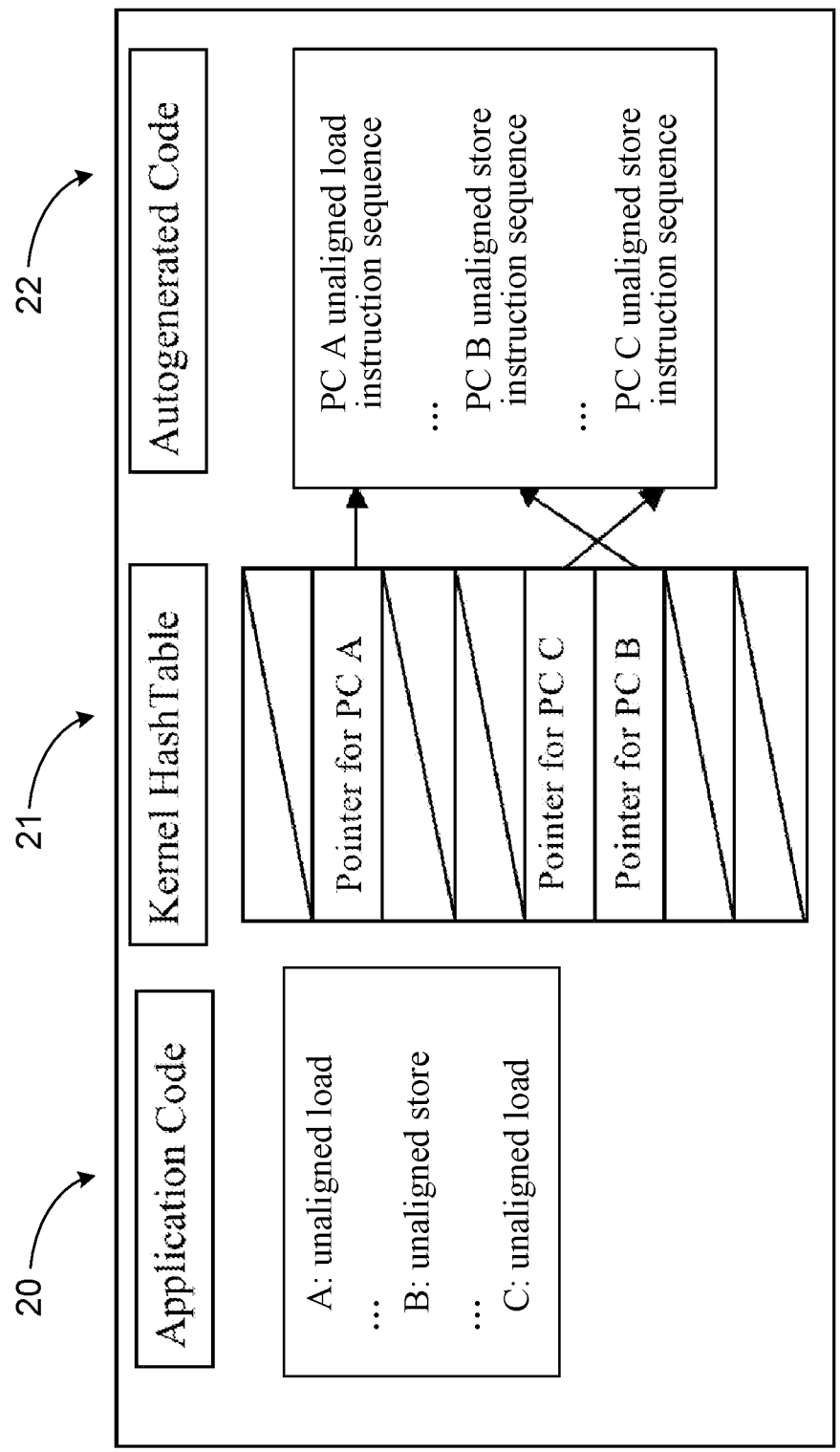
FIG. 2 is a schematic diagram of a memory layout.

FIG. 2 shows an example of a memory layout, which includes application code 20, a kernel hash table 21, and auto-generated code 22 including the generated translations. The application code 20 includes, for example, an unaligned load instruction (A), an unaligned store instruction (B), and another unaligned load instruction (C). The kernel hash table 21 includes a pointer for PC and instruction A, a pointer for PC and instruction C, and a pointer for PC and instruction B. The auto-generated code 22 includes a PC/instruction A unaligned load instruction sequence, a PC/instruction B unaligned store instruction sequence, and a PC/instruction C unaligned load instruction sequence.

Figure 3:
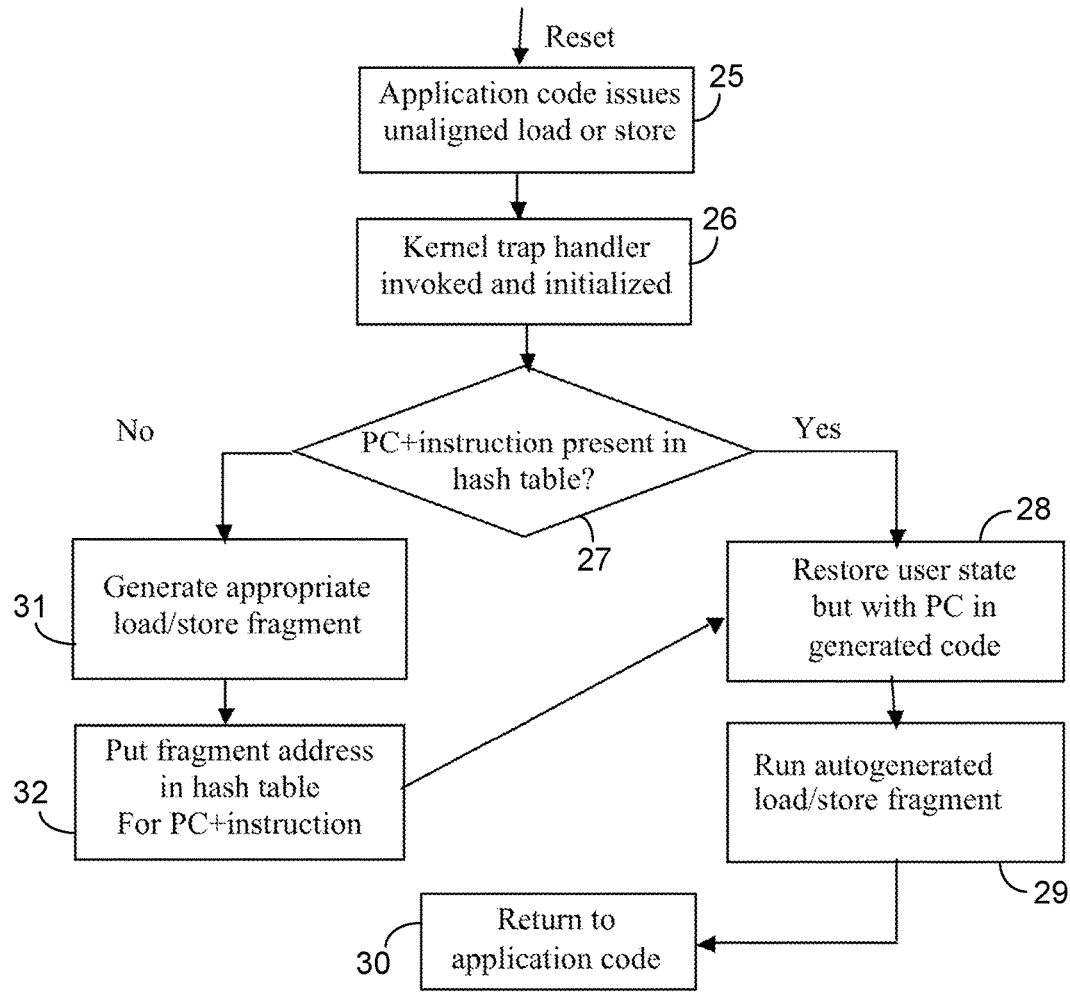
FIG. 3 is a flowchart of a method for interrupt handling.

FIG. 3 shows an example of an interrupt handling procedure. The processor executing the application code 20 issues (25) an unaligned load or store. The kernel trap handler is invoked and initialized (26). The processor determines (27) whether the PC and instruction are present in the kernel hash table 21. If so, a user state is restored (28), with the PC in generated code. The auto-generated load/store fragment is executed (29), and the procedure returns (30) to execution of the application code 20. If not, the appropriate load/store fragment is generated (31), and a pointer address of the fragment is written (32) into the kernel hash table 21, for the corresponding PC and instruction.

If no translation is discovered in the hash table, the interrupt handler generates a suitable translation via a "just-in-time (JIT) compiler" and places that translation in the table, using a lock to avoid corrupting the table with another running process, and also avoiding generating spurious table entries for incomplete entries to other concurrent processes that are reading the table without locks.

With this framework, instructions that typically do not cause traps can continue to run efficiently, since no overhead is incurred when the requested load or store address is aligned. But when an unaligned address is encountered the second and following times, the interrupt handler rapidly transfers control to the existing translation, thus doing the unaligned load or store relatively faster than would normally be required by performing a full interrupt handler entry and interpreting the instruction from scratch each time to determine the actual faulting address, target register, etc.

The following is an example of a procedure for translating trapping machine instructions to sequences that do not cause traps. Instructions can be translated from a multibyte instruction format (e.g., "lw" to load a four-byte word) to shorter instructions that load bytes or halfwords from a series of adjacent addresses and then combine the results.

An example of generated code is shown below, for example with "sw" (store word), and two other instructions in the y0 and y1 pipes specified in the same bundle:
{y0_op; y1_op; sw rN, rM}
=>
{rli rM, rM, 8; addi rN, rN, 1; sb rN, rM}
{rli rM, rM, 8; addi rN, rN, 1; sb rN, rM}
{rli rM, rM, 8; addi rN, rN, 1; sb rN, rM}
{rli rM, rM, 8; addi rN, rN, −3; sb rN, rM}
{y0_op; y1_op; prefetch sp}
{j original_pc+8}
"sh" (store halfword) is similar to the above, and swadd/shadd (sw or sh, plus a post-increment) are also similar (e.g., with a change in the final "addi" value). Note however that if M==N the processor(s) set up a temporary register and a sw/lw to the stack to save/restore the temporary.

For loads the processor(s) set up a temporary register to hold the results being read from memory a byte at a time:
{y0_op; y1_op; lw rM, rN}
=>
{sw sp, r0; addi sp, sp, −8; addi r0, rN, 3}
{lw_na rM, rN}
{lw_na r0, r0}
{dword_align rM, r0, rN}
{y0_op; y1_op; lw r0, sp}
{addi sp, sp, 8; j original_pc+8}
For a half-word load the processor(s) are able to use a "lb" (load byte) instruction:
{y0_op; y1_op; lh rM, rN}
=>
{sw sp, r0; addi sp, sp, −8}
{addi rN, rN, 1; lb rM, rN}
{lb_u r0, rN}
{intlb rM, r0, rM}
{y0_op; y1_op; lw r0, sp}
{addi sp, sp, 8; j original_pc+8}
The lhadd/lwadd are also similar (e.g., adding an "addi" as appropriate).

Code can be added to avoid the save/restore of r0 by determining if the y0_op or y1_op killed a register that was not used in the bundle, and then using that register and omitting the save/restore.

The y0_op and y1_op instructions can be optimized in various ways, e.g. if there's just one of them, and it has a matching x flavor, the processor(s) could bundle it with the jump in the "sw" case (or the load case where the processor(s) optimized away the r0 save/restore).

In some implementations, the processor(s) are configured to manage an efficient data structure that maps machine instructions to translations. For example, a hash table is an effective tool for managing the translations. The processor(s) can use least significant bits (LSB) of the program counter (PC) to initialize the first probe into the hash table, then the processor(s) increment through the hash table looking for matches against the PC plus the address of the actual machine word, until the processor(s) find an empty slot, which indicates the hash table does not hold a translation.

The PC plus the machine instruction address is used, since either one by itself may be insufficient. The instruction could be overwritten, so the instruction is tested. The instruction might contain PC-relative content, so the processor(s) are able to match on the PC as well, otherwise, the processor(s) could potentially end up (for example) branching to the wrong part of the code after running the translation.

In some implementations, the processor(s) are configured to safely coordinate shared data and machine-generated code without locks. Multiple threads can read the hash table for a process simultaneously. In the presence of writing threads (writers) the processor(s) can be configured as follows.

To avoid multiple writers attempting to update the table at once, the processor(s) will take out a process-wide lock just before attempting to place a newly-generated translation into the hash table. This avoids having two threads translate PCs that have the same low bits try to write to the same hash slot. A writer may discover another thread has raced ahead of it to populate the translation before it, so while looking for an empty slot, it also validates that there is no entry that has just been added for the translation that it is in the process of adding itself.

To avoid readers seeing partially-written data, the processor(s) will write the translation to memory first, perform a memory fence (by executing a memory fence instruction), and only then update the hash table. After both the PC and instruction have been written to the hash table, it becomes possible for a reader to match a translation and call the matched translation.

If a processor processing a writer determines that the table is becoming full, it clears the hash table so that no other thread will see any valid entries (under the lock) then allows the writer to write its entry. When the table is cleared, the processor(s) keep the old translation code (since a process might still be running it) and swap to an alternate memory area to write new translations. By the time the processor(s) fill up the hash table again, the processor(s) will switch back to the first translation area again, since all the threads will have finished running code there by that point.

In some implementations, the processor(s) are configured to efficiently and securely use user-space memory to store state in kernel code. Running minimal traps from user-space in the kernel uses some security checking so that the kernel does not write to memory it is not meant to write to. However, it may also be too slow to use the standard idioms for finding the kernel stack, saving all user-space registers, etc.

Instead, the processor(s) can proceed as follows. First, the processor(s) range-check the user's own stack pointer. If it is pointing outside the legal area for user space virtual addresses, the processor(s) can fall through into the normal trap handling code. Otherwise, the processor(s) zero out the low bits to ensure the stack pointer is word-aligned, then write the few registers the processor(s) need to save to the user's own stack. On return, the processor(s) reload the registers and continue. This approach takes advantage of the fact that the ABI requires an aligned stack pointer and requires that memory below the stack pointer is unused.

If the stack pointer is pointing to memory that does not have a valid translation installed, the processor(s) will get a TLB fault from within the kernel. The TLB handler only needs to be aware of the special minimal trap handler; it can restore the stack pointer to its correct value as needed (bumping it based on the number of saves done so far), read the previous PC value that was loaded from user-space, and essentially rebuild the context as if the unaligned instruction had directly caused the TLB miss, not the unaligned memory trap. Then, after the kernel finishes handling it, the processor(s) will retry the instruction, presumably not faulting this time.

The translation can include "instrumentation" support for counting the number of times it is run. If it is run more frequently than a certain threshold, the original trapping instruction can be replaced by a direct jump to the translation. This improves the performance of unaligned addresses loaded or stored by that instruction, at the cost of slowing down any aligned addresses loaded or stored.

Alternately, rather than relying on directly instrumenting the translation, the runtime can perform profiling, and when it discovers that the profiling interrupts frequently hit the translated code (and don't hit the aligned load or store) to replace the load or store with a direct jump to the translation.

The "instrumentation" support can also expose the results it encounters in a form understandable to the compiler. This can then be provided as "feedback" to recompile the application. With that information, the compiler can then choose to automatically generate loads or stores that are slower but safe in the presence of unaligned addresses, thus avoiding the need to involve the interrupt handler code at all.

The compiler can also choose (either heuristically, based on instrumentation feedback, or from direct user annotation) to generate "translations" for some subset of the loads and stores in the application, and emit a hash table referencing those translations as part of the original binary. In this case, the interrupt handler support code can install the compiler-generated hash table initially, rather than initializing an empty hash table, with the result that even the first time that an unaligned load or store occurs, it can take the relatively efficient path through the interrupt handler directly into the translated code, rather than having to run the "JIT compiler" to generate the translation the first time through.

3 Mechanism for Efficient Ring Buffers and Notification Interrupts

Communication in multi-tasking (or multi-threaded) computer systems includes performance and feature enhancement for the synchronization mechanism in the distributed cache coherent environment for a multicore processor system.

Multi-tasking computer systems run multiple tasks on one or more cores. In many systems, the tasks share some or all of their memory address space, such that memory operations by any task to a shared memory address are visible to memory operations issued by other tasks.

This shared memory mechanism is used to implement a variety of communication and synchronization algorithms. One example of a shared memory mechanism is a shared memory queue, in which data objects produced by a "producer" task are stored in a first-in-first-out queue until a "consumer task" task pulls them out of the queue. The producer or consumer tasks can include a process or thread of instructions executing on the processor in a core or tile. In many systems, the queue is capable of storing multiple data items, such that the producer task enqueues multiple items without having to wait for the consumer task to remove the oldest and make more queue space available for new items.

Some systems have more than one producer task and/or more than one consumer task. For example, a pipelined data processing application can be composed of one or more pre-processor tasks that produce data items into a shared memory queue. The queue items can then be dequeued by one or more post-processor tasks. Using a single queue to store data items moving from the pre-processors to the post-processors enables efficient load balancing—as soon as a post-processor task is ready to perform more work, it can pull the next data item out of the queue without having to scan multiple queues or blocking because a queue that contains only a fraction of the data items is empty.

Some implementations of a multi-tasking computer system, shared memory queues use a "ring buffer" with storage for a static number of data items. As data items are produced, they are written at a "tail" location within the ring buffer and the tail pointer is advanced to the next slot in the ring buffer. Similarly, a "head" pointer points to the buffer slot that contains the next item to be dequeued; when that item is consumed, the head pointer is advanced to the new next item to be dequeued. If the head or tail pointers reach the end of the ring buffer, they wrap back to the beginning. Software that configures the processors to implement the ring buffer also ensure that the enqueue operation will block or return an error whenever the user attempts to enqueue an item when the ring buffer's data storage is already full or dequeue an item when the ring buffer is empty.

Figure 4A:
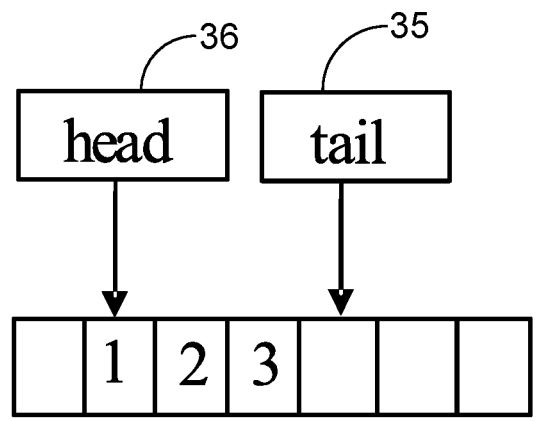
FIGS. 4A and 4B are diagrams of ring buffer mechanisms.

FIG. 4A depicts an example of the ring buffer mechanism. Items are enqueued by writing to the "tail" slot identified by a tail pointer 35, and dequeued by reading from the "head" slot identified by a head pointer 36. Item 1, to which the head pointer 36 points, is the oldest item and next to be dequeued, and item 3, to which the tail pointer 36 points, is the youngest, most recently enqueued, item.

The ring buffer mechanism for implementing shared memory queues has several desirable properties: it does not require any dynamic memory management and, when compared to linked-list queue implementations, uses relatively few instructions to enqueue or dequeue an item. However, in systems with multiple enqueueing or multiple dequeueing tasks, it can suffer from high latency.

Systems that implement support for multiple enqueuers or multiple dequeuers by adding mutexs (locks) around the enqueue and dequeue operations are generally known. Such systems allow only one producer task or consumer task at a time to work on an enqueue or dequeue operation. Other tasks wait for the lock holder(s) to finish their work and release the lock. In some cases, this limits throughput because only one enqueue and one dequeue operation can proceed at a time. In some cases, an enqueuer or dequeuer might stall, perhaps due to a preemptive task switch, and prevent any other task from enqueue or dequeueing.

The mechanism described below allows multiple enqueueing or dequeueing tasks to make simultaneous progress on ring buffer enqueue or dequeue operations. This mechanism can increase throughput on multi-tasking systems and reduce the likelihood of long delays due to a task stalling during an enqueue or dequeue operation.

The hardware implementation of the atomic operations used to implement the mutex operations described above may impact the performance of queuing algorithms. Two examples of powerful atomic operations are the compare-and-exchange operation and the fetch-and-add-one-if-not-overflow operation, which are both conditional write operations.

In one example, the performance of the operation may become a bottleneck in the application performance when the operation is implemented to get exclusive ownership of the data before the compare or the add operation. The data update (write) condition may not be met (e.g., if the current data is not equal to the test value), and therefore the next compare-and-exchange operation may start from the same data again. In a multicore processor system, the performance may be even worse due to the long latency of getting the data ownership between many processors, and most of the time the processors are to stalled due to obtaining the data ownership.

The set of atomic operations provided by a hardware platform also has a potentially significant effect on the performance of queuing algorithms. As will be described below, providing a "fetch and add if greater than or equal to zero" operation avoids an effect commonly seen in compare-exchange based systems, where multiple simultaneous compare-exchange operations result in many operation retries because only one compare-exchange operation succeeds at a time. Thus, with many simultaneous requestors, compare-exchange-based algorithms can impact overall system performance because a significant fraction of atomic operations are repeated, increasing overall memory subsystem load.

For example, a "fetch and add if greater than or equal to zero" (fetchaddgez) operation allows the implementation of a more efficient ring buffer queue. This shared memory operation adds an integer value to the value in a specified memory location, atomically writes the result back to the memory location if the result was greater than or equal to zero, and returns the original value in the memory location. (In addition, "fetch and add if greater than zero" (fetchaddgz) operation that performs a "greater than" comparison to zero, can also be used for the same ring buffer queue implementation. On some systems, the fetchaddgez operation can be implemented via a compare-and-swap operation.

The fetchaddgez operation can be used for implementing a shared memory queue, as described in more detail below. As part of implementing the shared memory queue, the processor is configured to construct an in-memory, integer value that contains a pair of values in different bit ranges: a credit count in its high bits and a ring buffer slot count in its low bits. One of these pairs is used for the enqueue operation, and another pair is used for the dequeue operation. As described below, the fetchaddgez operation can be used to atomically decrement the credit count and increment the slot count and fail the operation if the credit count goes below zero. The fetchaddgez operation can also be used to atomically decrease the credit count and increase the slot count by values other than one. This is useful for atomically enqueueing or dequeueing multiple ring buffer items.

The credit count and ring buffer slot count pair can be implemented in a variety of ways in a variety of systems. For example, the pair can be implemented via an instruction that adds an integer value to a value in memory and checks for any particular bit to become one. If the result bit is one, then the atomic operation fails, does not update the memory location, and returns the old value. The fetchaddgez operation is a specific variant of this operation in which the most significant bit, i.e. the sign bit, indicates whether the operation succeeded. The credit count and ring buffer slot count pair can be used to implement a system in which either the producer task or the consumer task is a hardware engine or a software task. The credit count and ring buffer can be implemented on a home core for the credit count and buffer memory locations.

It is also useful to notify the processor on a receiving core when data arrives in the ring buffer. To do so, various mechanisms can be added to notify the processor on the receiving (or home) core when data has arrived in the ring buffer. The notification can be done through an inter processor interrupt, for example.

A multicore system can be configured to cause an interrupt to happen on core Y on a request by core Y itself. For example, core Y can instruct its cache controller (by making a special memory request) that it should be notified if a given memory location (also called a watched location) is written into (or read, or the target of an atomic operation, or incremented, or modified in any way). The cache controller can store the address to be watched in a special register. The addresses in all remotely requested memory operations serviced by the controller are checked against the watched address. If the watched address matches, then the processor on the core Y can be interrupted. The cache controller can also perform some optional checks when the watched address matches. For example, it can check to see if the data being stored has some given property (for example, it is greater than a certain threshold).

Using the fetchaddgez operation, a shared memory queue can be constructed as follows. The shared memory queue is associated with a ring buffer, an in-memory credits and ring buffer slot count pair for the enqueue location (in a data structure referred to as tail_credits_and_slot), and an in-memory credits and ring buffer slot count pair for the dequeue location (in a data structure referred to as head_credits_and_slot). Initially, the data structure tail_credits_and_slot stores a value of credits=number_of_ring_buffer entries and a value of slot=0, and the data structure head_credits_and_slot stores a value of credits=0 and a value of slot=0.

To enqueue one or more items, a producer task uses the fetchaddgez operation to atomically choose a ring buffer slot and makes sure that credits do not go below zero. This is accomplished by issuing fetaddgez with a value whose high bits subtract num_items credits from tail_credits_and_slot's credit bits, and whose low bits add num_items to tail_credits_and_slot's slot bits. If the operation would cause credits to go below zero, the fetchaddgez operation fails and enqueue returns an error or retries.

If the fetaddgez operation performed by the provider (or "enqueuer") succeeds, the enqueuer uses the slot portion of tail_credits_and_slot to calculate the ring buffer index to which it should write its data item(s). Since the slot count is incremented every time a slot is allocated, and the enqueue location needs to wrap around the ring buffer, the ring buffer index is calculated as (slot % num_ring_buffer_entries). Since the tail_credits_and_slot slot bits start at zero, the first data items will be written to slot 0, the next to slot 1, and so forth until enqueuers cannot make any more progress because credits reaches zero.

Having chosen a slot(s) and written the enqueued data values, the enqueuer informs the consumer task (or "dequeuers") that the data items are available. There are many possible schemes for doing so, including the following two examples.

In an example of a scheme for informing consumer tasks of how many values have been enqueued, the enqueuers can use a compare-and-swap instruction to update a separate in-memory count of how many items have been successfully enqueued. Each enqueuer issues a compare-and-swap that compares the in-memory "enqueued count" against the slot value obtained from tail_credits_and_slot, and swaps it with slot+num_items_enqueued. Thus, multiple enqueuers can simultaneously copy data items into the ring buffer, but the compare-and-swap instructions to advance the "enqueued count" will only succeed in slot order, providing a guarantee that the enqueued count does not include items that are still being copied into the ring buffer.

In a second example of a scheme for informing consumer task of how many values have been enqueued, a pair of generation numbers is included in each ring buffer entry. One generation number is the "enqueue generation" and the other is the "dequeue generation". These generation numbers have enough bits to encode the maximum number of tasks in the application. To enqueue an item, an enqueuer allocates a slot from tail_credits_and_slot, as described above. The enqueuer makes sure that the slot's current dequeue generation number is (slot/num_ring_buffer_entries) & ((1<<generation_bits)−1). This check avoids a possible race where a previous enqueuer allocated the same ring index the previous time around the ring but hasn't yet finished writing it, and thus the dequeuer hasn't finished dequeueing it. After that condition is true, the enqueuer writes its data values and advances the enqueuer generation number to (slot % num_ring_buffer_entries)+1. The advancement of the generation number serves as a flag to consumer task that the ring buffer entry is ready. After the generation number or "enqueued count" has advanced, the producer task issues a fetch-and-add operation to head_credits_and_slot, incrementing the credits count by the number of items inserted and leaving the slot count at the same value.

This second, generation number-based scheme can achieve better latency properties than the compare-and-swap "enqueued count" scheme. This is because the generation number can advance in any order, allowing enqueuers that finish quickly to return before others, with earlier slot numbers completed. In the "enqueued count" scheme enqueuers update the counter in order, and thus enqueuers may have to wait for the enqueueur using the previous slot to finish a delayed enqueue. The generation number-based scheme can still block if the previous enqueuer to the same index hasn't finished enqueuing or the dequeuer hasn't finished dequeueing, but those conditions are less likely because they require that the enqueuers go all the way around the ring buffer before blocking.

Dequeuers use fetaddgez to modify head_credits_and_slot, decreasing the credits value and advancing the slot. If the operation succeeds, the dequeuer is assigned to dequeue ring buffer index (slot % num_ring_buffer_entries). In order to complete the dequeue operation, the dequeuer checks the enqueue generation number (if using the generation number scheme), reads the item, and advances the dequeuer generation number or "total dequeued" counter as appropriate. Finally, the dequeuer uses a fetch-and-add instruction to add credits back to tail_credits_and_slot.

Various modifications can be made to optimize processing or avoid potential errors. For example, one error could have the slot bits in head_credits_and_slot and tail_credits_and_slot overflow into the credits bits if enough items are enqueued or dequeued. This situation can be avoided by issuing a single-byte store to a byte between the slot and credits bits as part of each enqueue or dequeue operation. Alternatively, an atomic-bit-clear instruction could also be used to clear any overflow bits. One modification could be configured to clear the overflow bits at some reduced frequency, for instance only when an enqueuer or dequeuer is assigned to ring buffer slot 0. Similar overflow avoidance can be performed for "enqueued count" and "dequeue count" if using those mechanisms.

Figure 4B:
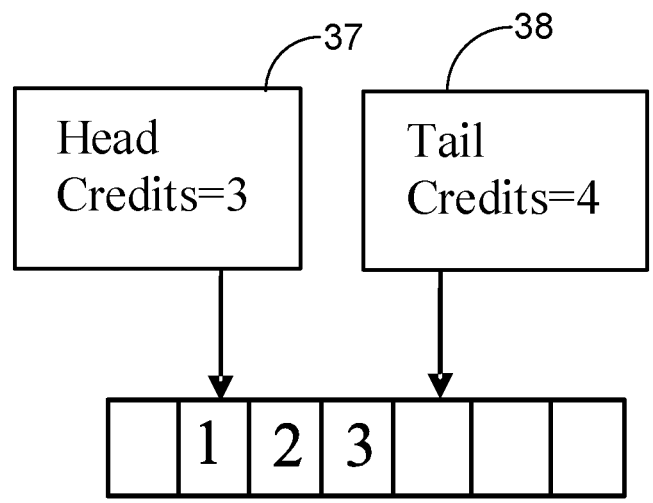

FIG. 4B shows a ring buffer implemented by the mechanism described above. It does not include the generation number or "enqueue count/dequeue count" state. FIG. 4B shows a state of the ring buffer after 4 items have been enqueued and one has been dequeued. A data structure 37 associated with the head pointer includes a "head credits" value, and a data structure 38 associated with the tail pointer includes a "tail credits" value. The tail credits value was initially 7 (the number of ring buffer entries), but has been decremented four times by enqueue operations and incremented once by a dequeue operation. The head credits value was initially 0 and has been incremented four times by enqueue operations and decremented once by a dequeue operation.

The mechanisms described above can be implemented in software by processes running on the processor(s), or using hardware engines for any particular aspect of the mechanism, for example, with either or both of the producer task or consumer task process replaced by a hardware engine. In the case of a hardware engine, it may be convenient to have the hardware store tail_credits_and_slot or head_credits_and_slot in a hardware register rather than in shared memory, since the hardware is the only enqueuer (dequeuer) and thus doesn't need the value to be in shared memory in order to enqueue or dequeue items.

The buffer mechanism is useful when a process A running on one core X wants to communicate with another process B running on core Y. In this example, the ring buffer would be preferably homed on core Y and process A would perform remote stores into the ring buffer on core Y. Process A would also perform atomic operations that are homed on core Y (for example, to update the count). In this case, process B polls the count to see if there is more data for it. The processor(s) can alternatively be configured to include other mechanisms to notify process B when data has arrived in the queue or ring buffer.

Figure 5:
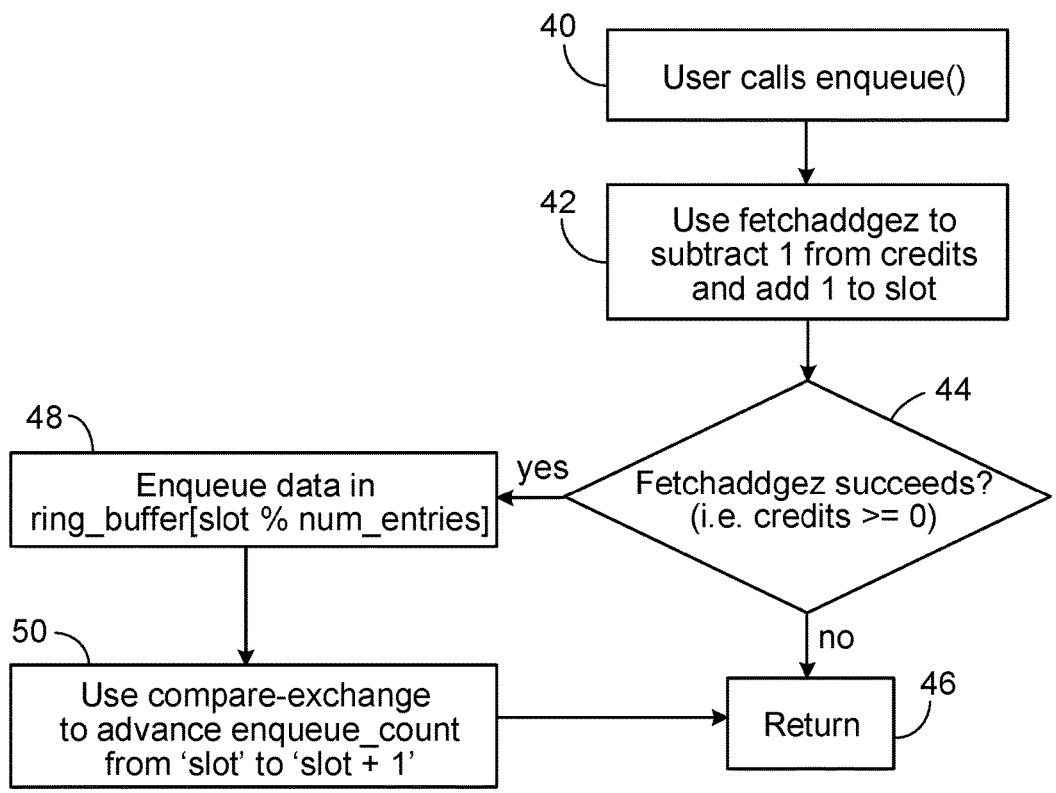
FIG. 5 is a flowchart of an enqueue method.

FIG. 5 shows an example of a generation number-based enqueue method performed by the processor in response to a user calling (40) an enqueue( ) function on input data. The processor performs (42) fetchaddgez operation to subtract 1 from the enqueuer's credits value and add 1 to the enqueuer's slot value. The processor determines (44) whether the operation has succeeded (i.e., if the credits value is greater than or equal to zero). If not, then the processor returns (46). If so, the processor enqueues (48) the input data in ring_buffer[slot % num_entries]. The processor performs (50) a compare-exchange operation to advance the enqueue_count from a value of 'slot' to a value of 'slot+1', and the processor returns (46).

A corresponding generation number-based dequeue method is performed by the processor in response to a user calling a dequeue( ) function. The dequeuer checks enqueue_count to find out when items are enqueued. When it dequeues items, it uses fetchadd to add 1 to the enqueuer's credits value.

Causing interrupts or notifications on a remote core includes mechanisms to notify the remote core (or a process running on the remote core) of an event (e.g., that data has been written into a ring buffer), including the following four approaches.

In a first approach, a process A on core X can send a IPI (inter processor interrupt) message over a dynamic network (e.g., a user dynamic network (UDN) reserved for messages sent by user processes) to core Y. The message causes an interrupt at core Y, notifying core Y that process A has data for core Y. Many such messages can be queued up in an input message queue in core Y. This message can notify core Y that the data has already been written into the ring buffer. The processor(s) also uses a memory fence instruction at core X to ensure all the pending memory operations (for example on the buffer on core Y) have completed, before the IPI is sent.

In a second approach, a core X can write a special memory location or a special purpose register (SPR) on core X. (The core can also write an additional optional data word.) This memory operation can indicate to the core that the memory operation being performed is associated with an interrupt to a specific core. The memory address can also be homed on core Y. The hardware on core X then sends a memory request over the memory dynamic network to core Y. On core Y, the memory request has special bits that cause core Y to treat that memory request as an interrupt. On core Y, the interrupt updates a bit in an interrupt vector. If multiple such memory requests arrive, then each such memory request updates a corresponding bit in the bit vector. Because the effect of multiple requests arriving to cause an interrupt is often the same as that of one interrupt arriving, there is no need to queue up the requests, and so no additional buffering of memory requests is needed. If interrupts arrive to set other bits in the bit vector, those can happen in parallel without the need to buffer the various requests.

Another approach includes sending an interrupt or IPI using a special IPI interface implemented in hardware through IPI reflector circuitry in the on-chip network or on a device attached to the network.

For example, a computing system includes a plurality of cores, with multiple ones of the plurality of cores each comprising: a processor, first switching circuitry configured to couple the processor to a first network among the cores for communicating between cores, and second switching circuitry configured to couple the processor to a second network among the cores for transferring memory access requests and responses between cores and memory coupled to the multicore computing system. The computing system also includes "reflector circuitry" (i.e., "interrupt reflector circuitry") coupled to the second network configured to receive interrupt requests over the second network from respective cores, determine from a particular interrupt request a targeted one of the plurality of cores, and send a message to the targeted one of the plurality of cores that includes information that causes an interrupt at the targeted one of the plurality of cores.

In some implementations, the interrupt reflector circuitry receives interrupt requests from one or more cores and forwards these interrupts to one or more cores. By using a reflector, additional levels of virtualization and services can be applied and the individual core does not require special interrupt dispatch hardware. To send an interrupt, the core performs a store operation to a page that is marked as memory-mapped-IO (MMIO). The page table entry indicates the network location of the IPI reflector, thus the store operation is sent to the reflector. The reflector forwards the interrupt message to the target core. Once the message reaches the target core, an appropriate interrupt is signaled on the target core. Certain bits of the address of the to original store instruction are used to determine the target core as well as interrupt protection level (PL—e.g. user vs. system) and an interrupt number (INT_NUM—there are multiple interrupts per protection level). Depending on the page size chosen for the interrupt page table entry, the target core, PL and INT_NUM may come from the virtual or physical address. This allows system software to decide which cores, PLs, and interrupts a user process is allowed to target.

In some embodiments, the reflector applies additional checks to incoming interrupt requests. For example, the reflector may limit the ability of core X to send interrupts to cores A and B but not core C. The reflector may also implement broadcast and multicast capabilities so that a single interrupt request could be forwarded to multiple targets.

Also, the various mechanisms discussed in these approaches can be combined together. For example, the bit vector that is updated (as described in the second approach) can be used with the IPI reflector approach as well.

In another approach, the processor(s) can also cause the interrupt to happen on core Y on a request by core Y itself. For example, core Y can instruct its cache controller (by making a special memory request) that it should be notified if a given memory location (also called a watched location) is written into (or read, or the target of an atomic operation, or incremented, or modified in any way). The cache controller can store the address to be watched in a special register. The addresses in all remotely requested memory operations serviced by the controller are checked against the watched address. If the watched address matches, then the processor on the core Y can be interrupted. The cache controller can also perform some optional checks when the watched address matches. For example, it can check to determine if the data being stored has a predetermined property (for example, if it is greater than a certain threshold).

4 Implementing and Using "Fetchaddgez" and Other Such Instructions

Described below are techniques for providing efficient locking primitives on a multiprocessor machine. The techniques also relate to providing general mechanisms for such locking primitives and efficient ways of implementing them. The techniques also relate to using fetchaddgez for reader-writer locks.

An example of a shared memory mechanism used to implement a synchronization algorithm is a "reader-writer lock", where synchronization is managed by allowing multiple processes ("readers") to read concurrently, but the process that owns the lock ("writer") is able to lock out not only all other would-be writers, but all readers as well.

Figure 6A:
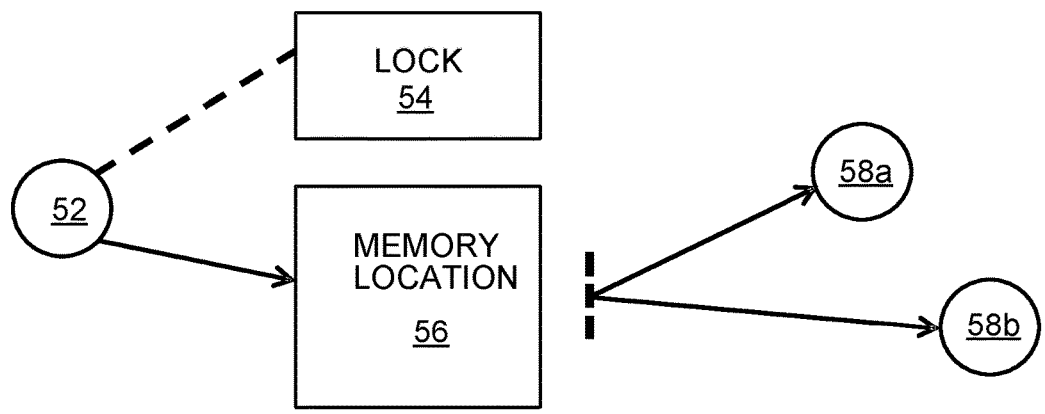
FIGS. 6A and 6B are schematic diagrams of lock procedures.
Figure 6B:
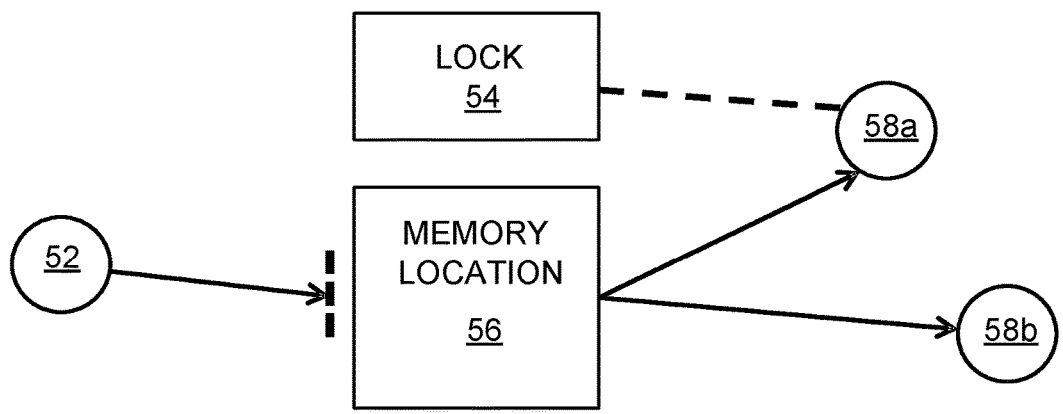

Referring to FIG. 6A, a writer process 52 has acquired a lock 54 and is allowed to write to a memory location 56, while reader processes 58a, 58b are not allowed to read from the memory location 56. Referring to FIG. 6B, a reader process 58a has acquired the lock 54 and is allowed to read from the memory location 56, while the writer process 52 is not allowed to write to the memory location 56. However, the other reader process 58b is allowed to read from the memory location 56 concurrently with the reader process 58a. The lock 54 is provided using a memory word with a count of readers as well as a bit indicating whether a writer currently owns the lock. Readers and writers can attempt to acquire the lock using atomic memory operations, such as load-linked/store-conditional (LL/SC) or compare-and-exchange. However, both of these operations use "retry on failure", so the code to perform the lock is by necessity longer, which may preclude in-lining the fast-path as a useful compiler optimization. In addition, the latency requirements for these operations are higher: for both LL/SC and compare-and-exchange there are two round-trips to the memory coherence point before even a fast-path (successful) lock operation can complete.

A technique for performing atomic operations in a computing system, includes receiving an instruction to perform an operation associated with a memory address of a location in a memory of the computing system; and performing the operation in circuitry coupled to the memory of the computing system, including reading a value stored in the location in memory and performing one or more additional actions atomically with reading the value, with at least one of the additional actions conditionally performed based at least in part on the value read from the location in memory. The technique can include determining whether to send a message invalidating cached copies of the value based on whether the at least one conditionally performed actions writes to the memory address, as described in more detail below.

One example of this technique uses the "fetch and add if greater than or equal to zero" (fetchaddgez) atomic memory instruction to efficiently acquire read/writer locks. This shared memory operation adds an integer value to the value in a specified memory location, atomically writes the result back to the memory location if the result was greater than or equal to zero, and returns the original value in the memory location. A hardware implementation of the operation can be included in the cache controller of a home core, that is, at the cache controller of the core in which the memory location has a home location. On the core on which the processor issued the instruction, the cache controller sends a message to the home core indicating the memory address and the operation to be performed. The memory address on which these atomic memory instructions are performed is also be set in uncached mode, which will force a cache miss in the cache of the core issuing the instruction.

In a coherence protocol, because the fetchaddgez operation updates a memory location, the coherence protocol sends out invalidations to all cached copies, and waits for all the acknowledgements to come in. This can cause long latency. The issue of long latency in read-modify-write atomic operations (like fetchaddgez) (due to the need to acquire exclusive ownership of the data item before performing the operation) can be avoided if the criteria to update the data are tested first with minimal cost. If the data are not required to be updated, there is no need to invalidate all the shared copies among the processors. The lock operations can continuously make forward process without waiting for the exclusive ownership until data are changed. The same mechanism can be used with other atomic operations that update a piece of data in memory if some condition is met. Rather than send out the invalidations right away, the cache controller can wait until the condition is tested, and if the condition is not met, the memory location does not need to be updated, and so no invalidations need to be sent.

The fetchaddgez operation can be used to construct an in-memory, integer value that contains a reader count in its low bits and a writer count in its high bit (e.g., the sign bit). As described below, the fetchaddgez operation is used to atomically increment the reader count unless a write lock is currently in place. (The fetchaddgz operation, which performs a "greater than" comparison to zero, can also be used for the same reader writer lock implementation.)

The reader/writer lock could also be implemented via an instruction that adds an integer value to a value in memory and checks for any particular bit to become one. If the result bit is one, then the atomic operation fails, does not update the memory location, and returns the old value. The fetchaddgez operation is the specific variant of this operation in which the most significant bit, i.e. the sign bit, indicates whether the operation succeeds.

Another IO-centric synchronization mechanism called the fetch-and-add-one-if-not-overflow is also described. Other similar mechanisms are also possible. This mechanism is implemented to test if a certain condition is met, for example, to test if a buffer count in an I/O controller is overflowed. The fetch-and-add-one-if-not-overflow is complementary to the compare-and-exchange in that no current buffer count information is required. When the count reaches the overflowed condition, the data is not updated and the last good data is preserved.

A mechanism to provide a new atomic operation on the fly (e.g., the "lock-free" atomic operation) is also described in more detail below.

Figure 7A:
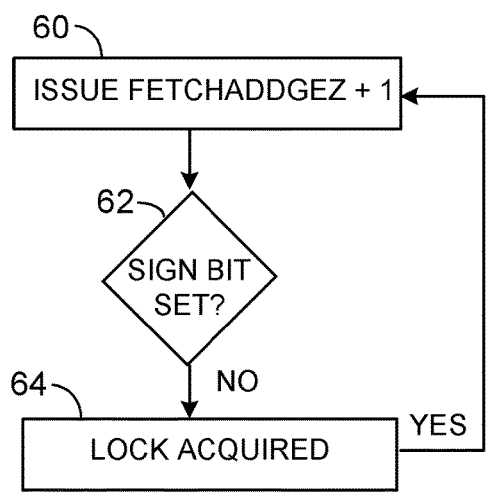
FIGS. 7A-7D are flowcharts of lock algorithms.
Figure 7B:
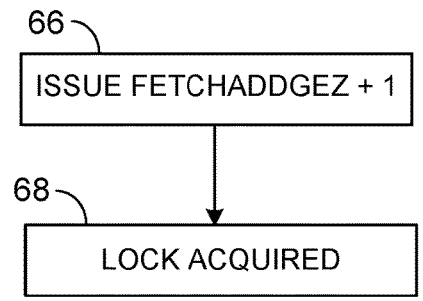

FIG. 7A shows an example of a read-lock algorithm, and FIG. 7B shows an example of a read-unlock algorithm. Using a fetchaddgez instruction, a reader-writer lock can be constructed as in the following example. The lock is initialized to zero, indicating no readers and no writer. In the read-lock algorithm, to acquire the lock for reading, a would-be reader issues (60) a fetchaddgez instruction to add the value "+1" and checks (62) the result, with negative result of the operation indicating that the sign bit is set (having a negative value), which means a writer currently has the lock, and the reader suspends (or "spins") waiting for the writer to complete in a loop in which the reader repeatedly issues (60) the fetchaddgez instruction.

In some implementations, the read-lock acquisition "fast path" (i.e., a positive result is achieved on the initial attempt) has a single fetchaddgez instruction and a "branch on negative" instruction that is statically tagged as "unlikely" so the compiler will move the target out of the hot path of execution. This is effectively as fast as a load from memory (followed by a conditional branch) and takes little space when in-lined into the function that is trying to acquire the read lock.

If the initial fetchaddgez fails (returning a false value), the "slow path" for the read lock is invoked. The would-be reader then spins repeating the fetchaddgez instruction periodically until the fetchaddgez returns a true value indicating the sign bit is no longer set, at which point the lock has been acquired (64) for reading.

To release a reader lock, an atomic add instruction is used to decrement the count. For example, referring to FIG. 7B, a fetchaddgez with a "−1" argument is issued (66) by the current reader task, with no need to test the result to confirm that the lock has been released (68), since the lock is known to have been held by at least one reader (the current task).

A "trylock" instruction can also be written having the same pattern of a fetchaddgez instruction with testing the value returned to determine if the trylock succeeded. No slow-path is required, since the value returned by the fetchaddgez encodes in the sign bit whether the "trylock" succeeded.

To acquire the lock for writing, a would-be writer could use an atomic "fetch-and-or" instruction to set the sign bit (if available), or a more traditional compare-and-exchange or LL/SC instruction. Acquiring the lock for writing is generally performed less frequently than acquiring the lock for reading.

Figure 7C:
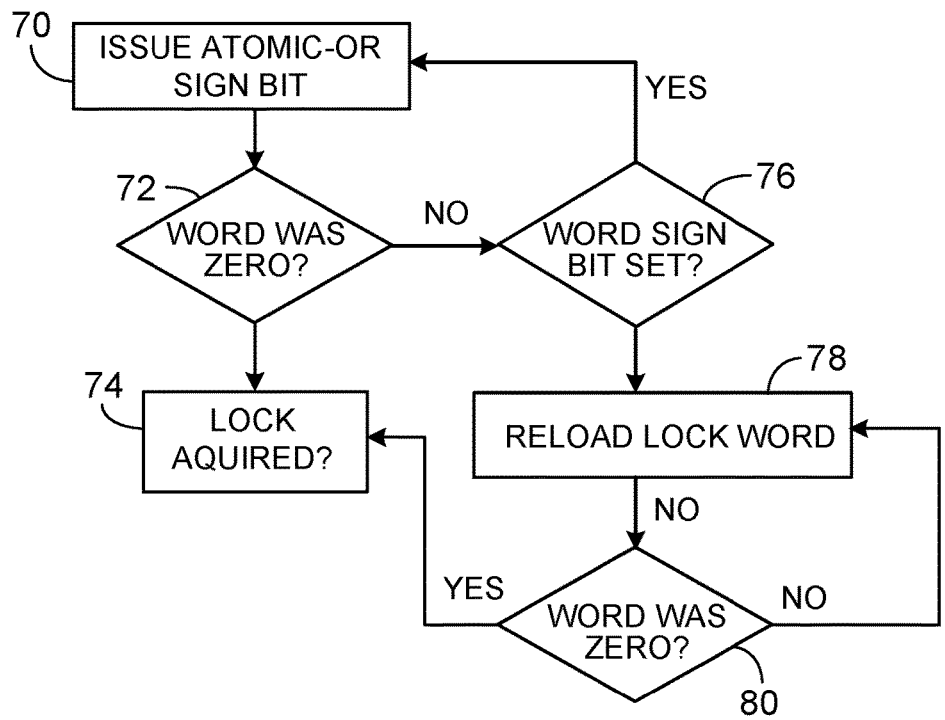
Figure 7D:
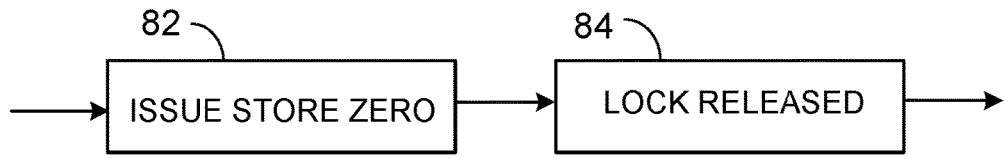

FIG. 7C shows an example of a write-lock algorithm, and FIG. 7D shows an example of a write-unlock algorithm. In the write-lock algorithm, the would-be writer task issues (70) an initial instruction (an atomic-or instruction in this example, or another instruction such as a compare-and-exchange, etc. in other examples) that atomically sets the sign bit (called the "writer bit"). The would-be writer examines (72) the returned value of the word to determine whether the value was zero. If the value was zero, the lock has been acquired (74) by this would-be writer task for writing. Otherwise, if the word value was not zero, the would-be writer task waits for any current writers to finish by determining (76) whether or not the word sign bit was set. If the sign bit was set on the value returned by the initial instruction, the lock is currently owned by a writer. The would-be writer task loops back to issue (70) the atomic instruction attempting to atomically set the writer bit, spinning in this loop until the atomic instruction returns a non-negative value, at which point the would-be writer task has determined that no other writer was active, and that its atomic instruction has set the sign bit, and as a result the task is now the "next writer". At this point the would-be writer task confirms that no readers are actively using the lock, which can be done by periodically re-reading (78) the lock word until all the reader locks have been released and the low bits are determined (80) to be zero.

Referring to FIG. 7D, to release the write lock, the writer issues (82) an instruction to store a zero to the lock, with no need to confirm that the lock has been released (84).

The hardware implementation of the atomic instruction can be included in the cache or cache controller in the home core for that memory location. On the core issuing the instruction, the cache controller can force a cache miss so that the instruction and the memory location can be sent to the home core.

A hardware implementation of the fetchaddgez operation, or other similar synchronization operation, can be included in the cache controller of a home core. On the core on which the processor issued the instruction, the cache controller can send a message to the home core indicating the memory address and the operation to be performed. The memory address on which these atomic memory instructions are performed is not cached in the requester's cache, so that the instruction will force a cache miss in the cache of the core issuing the instruction.

At the cache controller in the home core the following actions may be performed. If the cache line is indicated as cached, the coherence protocol is invoked and the cache line is invalidated from the various caches. The hardware can optionally mark that cache line as uncacheable in the future.

Another optimization that can be performance is to not issue the invalidations if the atomic operation is going to fail. For example, for the fetchaddgez instruction, if the operation fails, then do not invalidate the caches.

Yet another optimization is for the user, library code, the compiler, or operating system to put a memory location on which an atomic operation might be performed on its own cache line. This way, false sharing is avoided on cache lines. In false sharing, a core might request an address on the cache line, which will cause that cache line to be cached somewhere, even though a atomic memory location might be present in a different part of the same cache line.

The following two examples provide more details on a well-performing implementation of the fetchaddggez synchronization operation (and similar operations such as the fetch-and-add-one-if-not-overflow). The implementation of the fetchaddgez operation has a direct effect on the overall performance of the queueing algorithm described above. A well-performing implementation can be implemented using one or both of the following exemplary mechanisms.

In a first exemplary mechanism, in the multicore environment, data coherency is maintained by one cache controller among the distributed cache system based on the address of the memory reference. A lock operation, either the compare-and-exchange or the fetchaddgez or the fetch-and-add-one-if-not-overflow is first forwarded from the requesting processor to the cache controller at the home tile. The home tile for a given block of data maintains coherence information for that block of data. The comparison or the add operation is first executed without updating the data or invalidating all the share copies. The cost is small, estimated to be a few processor clock cycles, and the result is immediately used to make the subsequent hardware operation decision. If the data are required to be updated, and if there are any share copies in any other processors that are required to be invalidated, the normal process resumes to obtain the exclusive data ownership first. If the data is not required to be updated, no further coherency operation is needed. A potential saving of hundreds of processor clock cycles to obtain the data exclusive ownership is achieved. Even in a few-thread system the synchronization mechanism performs without the data coherency bottleneck.

In a second exemplary mechanism, leveraging the first mechanism, the fetch-and-add-one-if-not-overflow is implemented first to add the current data with the desired value at the dedicated cache engine. The result is shown after a couple of process clock cycles. Once the result is known, a test on the overflow condition is performed to make the subsequent hardware operation. If the overflow condition is not met, i.e. if the add operation should proceeded, a coherency flow begins. If the overflow condition is met, no further operation is required to save the operation latency.

A more general implementation of lock-free atomic operations is also possible. In the fetchaddgez instruction, the operation is fixed at the time the chip is built. Instead, the processor(s) can be configured to provide a mechanism that can provide new atomic operations dynamically as needed.

To do so, a processor issues an instruction such as "CREATE NEW ATOMIC OP" (or "create" for short). This instruction takes as arguments an operand and a function and optionally a memory address. The create instruction causes a message to be sent to the home location of that memory address to provide the new atomic operation.

(Optionally, software can also send a message to all cores on the chip to provide that new atomic operation in all the cores.)

At the home core, the cache controller provides the new atomic operation in response to the create instruction. In some implementations, the cache controller will take a value of the function field and write it into a register, which in turn applies it to an ALU (arithmetic logic unit) to select a specific operation. The operand is also written into a register, which in turn supplies it to one of the ALU inputs. The other ALU input will be used when some core issues an instruction to execute this new atomic operation.

8 Management of Huge Pages

Described below are techniques that relate generally to providing a range of "huge page" sizes in page tables to improve the efficiency of translation of virtual addresses to physical addresses.

Modern computer systems typically use "page tables" that provide an efficient data structure for converting virtual addresses into physical addresses, as well as providing information to a memory management unit on whether particular addresses are valid for reading, writing, or execution.

In some page table implementations, multiple levels of page tables are used in a hierarchy. For example, a "top level" page table might contain pointers to lower level page tables. The "bottom level" of the page table hierarchy then contains the information for single pages (e.g., the physical address and permission data for a page). Each page may be in the range of 4 to 64 kilobytes (KB), for example.

In some implementations, processors contain a translation lookaside buffer (TLB) that caches recently-read entries from the page table. The TLB allows translation of virtual addresses to physical addresses to occur rapidly. However, since a TLB is typically a complex hardware structure, it often contains fewer entries than are needed to completely describe the valid virtual addresses in a process. For example, 16 TLB entries of 64 KB pages only spans 1,024 KB of virtual address space.

In some implementations, "huge pages" are provided as a way to "span" a larger quantity of virtual address space using the same relatively small number of TLB entries. Each "huge page" of memory describes a larger region of memory that is mapped contiguously from virtual address to physical address. For example, a single huge page might cover 16 megabytes (MB) of memory, and thus 16 such TLB entries would cover 256 MB of virtual address space, allowing programs with large memory footprints to run much more efficiently, since memory references would be much more likely to "hit" in the TLB.

An example of a method for representing huge pages in the page table is to set a special "page" bit on one of the upper level page table entries. For example, in a three-level page table, the top level is configured to divide memory into 4 gigabyte (GB) granularity. The next level of the page table is configured to contain page tables spanning one 4 GB range, and whose entries divided memory into 16 MB ranges. The final level of the page table is configured to contain entries dividing memory into 64 KB pages. By setting a bit on the middle level page table entry, the processor(s) are able to use that page table entry to provide a single mapping for the entire 16 MB range that would normally be covered by the entry.

This approach provides sufficiently flexible for some uses. Using the example above, with this approach pages may have limited sizes of 4 GB, 16 MB, and 64 KB. For some processors, this data structure representation limitation is irrelevant, since they have few sizes that can be expressed in the TLB. For other processors, this limitation becomes relevant, since the processor may be able to represent a wider range of page sizes in the TLB than the page table representation can naturally provide.

Being limited to page sizes that match the sizes of the intermediate pages may be a limitation for applications with large address requirements. The intermediate size might not span a sufficient quantity of memory for such an application, but the largest size might be awkward for the operating system to provide due to internal fragmentation or other issues.

Memory-mapped I/O (MMIO) can be provided on some systems using page tables, both mapped in the core itself, as well as potentially mapped in the I/O device itself, to allow virtual addresses to be used in both places. It may be useful to provide a wide range of page sizes, since an I/O device may provide a limited number of address space mappings, and no efficient way to fault in new mappings on demand. Allowing a range of sizes of huge pages that can be used in both the core and in the I/O device provides flexibility in this case.

Some implementations enable coalescing of adjacent page table entries together within the existing page table data structure to indicate larger page sizes. The coalescing can be performed by setting a bit for each entry indicating it is part of a contiguous set. In other words, if a bit is set in one entry, it means the next entry is coalesced, and so on. Other coalescing methods are also possible. Coalesced entries indicate that that together these entries represent a larger page. In a multi-level page table, adjacent page table entries can be coalesced together at a first, high level in the page table. Such huge pages can be used in I/O device MMIO mappings to provide the necessary granularity and address-space coverage.

To provide a wider range of huge page sizes, a page-table entry (PTE) includes a field that indicates that the entry is part of a contiguous region of memory. When the operating system first sets up the page table for this region of memory, it provides a contiguous portion of memory larger than the page size. The operating system can then populate all the page table entries that could be used to reference the just-allocated region of memory, marking each PTE with the field to indicate that it is part of the larger memory region.

For example, a one-bit field (called the "super" bit) that when set represents a flag that indicates that a block of sixteen page table entries describe a single page 16 times as large as a normal page (for an aggregation ratio of 16). In this case, when the operating system sets up memory for an address in this region, it will allocate a physically-contiguous block of memory 16 times the size of a regular page, and will write 16 PTEs to the page table, setting the "super" bit on each PTE.

Figure 8:
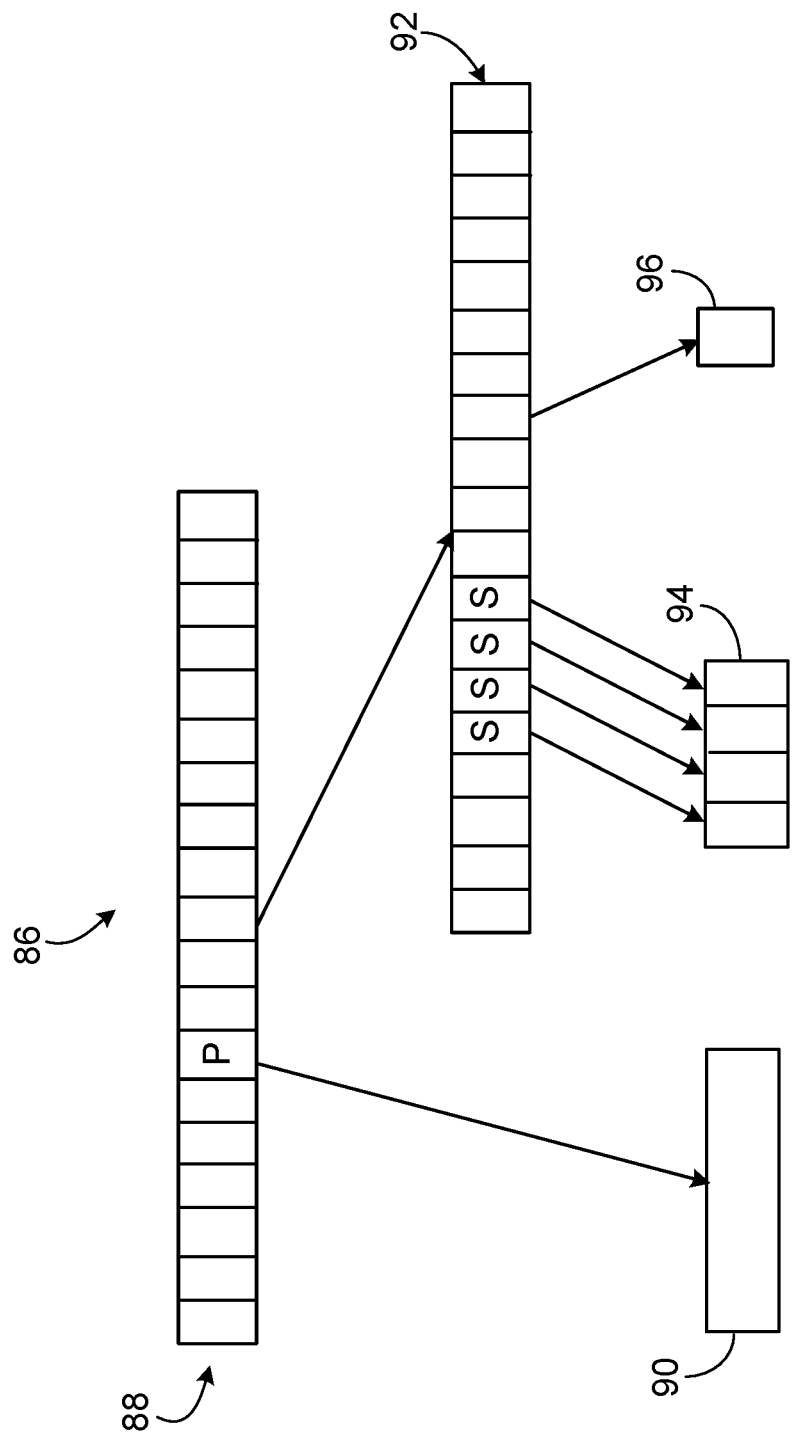
FIG. 8 is a schematic diagram of a page table layout.

FIG. 8 shows an example of a layout 86 of page tables including "super" bits ("S") as well as huge-page indicators ("P"), assuming a 64 KB size for standard pages, and a 16 MB size for huge pages, and "super" pages with a size of 256 KB in an example in which a super page is four times the size of a standard page (an aggregation ratio of four). A first level page table 88 includes a PTE with a huge-page indicator P set, corresponding to a huge page 90. A second level page table 92 includes four PTE entries with their super bits S set, corresponding to a span of four contiguous normal pages 94. A PTE in the second level page table 92 with a super bit S that is not set corresponds to a single normal page 96.

Figure 9:
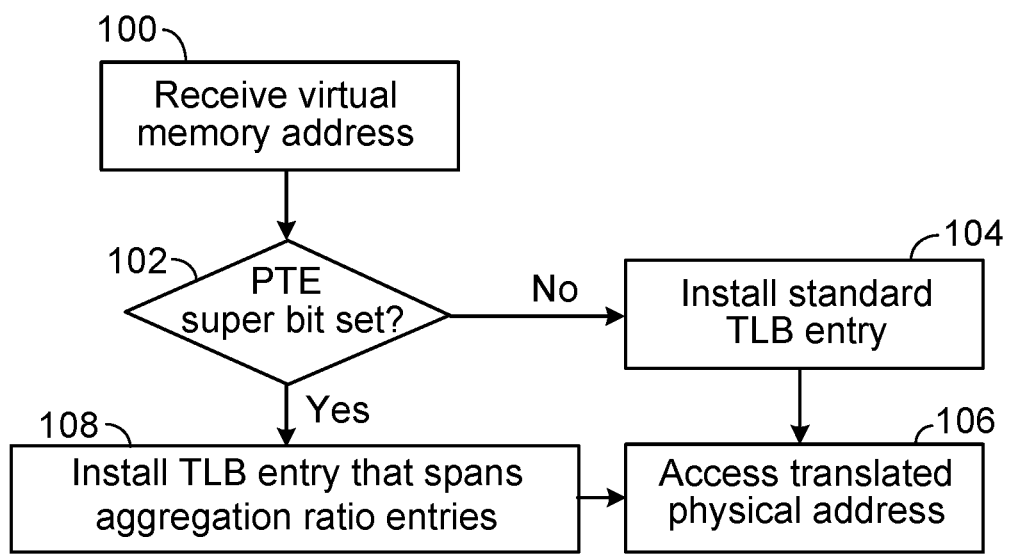
FIG. 9 is a flowchart of a virtual address procedure.

FIG. 9 shows a procedure for accessing a virtual address. A processor receives (100) a request to access a virtual address. The processor determines (102) whether the PTE corresponding to the address has the corresponding super bit set. If the super bit is not set, then the processor installs (104) a standard page table entry in the TLB and accesses (106) the translated physical address. When an attempt is made to access a virtual address in the range of a super page, the TLB handling code will find a corresponding PTE entry with this super bit set. Rather than installing a standard page table entry in the TLB, it will install (108) a TLB entry that spans 16 times as much memory (for an aggregation ratio of 16), and that is aligned to 16 times the usual page alignment. The processor accesses (106) the translated physical address after installing (108) the entry. Using the example from above with 64 KB pages, and an aggregation ratio of 16, the operating system would install a single 1 MB TLB entry for a 1 MB super page corresponding to 16 standard pages.

It is also possible to use more bits in the PTE to describe a wider range of possibilities. For example, a two-bit field could contain 00 (indicating a standard page), 01 (indicating a four-page "super page"), 10 (for a 16-page "super page"), or 11 (for a 64-page "super page").

This "super" bit (or whatever PTE field is chosen) can be used at each level of the page table to provide multiplicative page sizes. Thus, a 16-way "super" bit at the middle level of the page table for the example above would aggregate 16 of the 16 MB pages to provide a 256 MB super-page, or 16 of the 4 GB pages to provide a 64 GB super page.

In some implementations, processors provide page-table lookups via hardware; in this case, the hardware would perform the lookups as described and update the TLB directly. In some implementations, processors provide page-table lookup via software running on the processor. Such software may provide support for a cache of possible TLB entries in memory that can be quickly looked up and placed into the hardware TLB if found, prior to performing the actual page-table lookup. This effectively provides a second-level software-managed TLB cache. To support "super" pages the operating system would place multiple copies of the "super page" TLB into the TLB cache, one for each location in the cache where the TLB entry for a normal-size page would naturally be found. Any instructions that the hardware might offer for efficient access to such a cache of TLB entries would ignore the page-size specification in the TLB entry to ensure that a match could be properly made. Supervisor code that needed to flush the TLB would then also be aware that a given page table entry was a "super" entry, and flush a range aligned to the "super" page size.

In some implementations, page-table entries include special "accessed" and "dirty" bits that are set by the hardware page-table walker or by the software page-table lookup code. Such bits can be set in a standard way for the "super" pages. Two options include setting the bits on only the first page in the group, or always setting the bit on all pages in the group.

When such pages are available to the core, they can then also be used to map MMIO ranges in the core and in the I/O devices. The result will be a more efficient use of address space resources in the I/O devices.

6 Direct-to-User Hardware Virtualization and Memory Mapped I/O (MMIO)

In a multicore or other processor, multiple processes (running under a single operating system or under multiple operating systems) can be running. These processes and operating systems may have to access hardware resources such as network interfaces or hardware accelerators. Often, it is difficult to provide as many hardware interfaces as there are processes, so there may be many more processes than there are hardware interfaces. A given process is able to receive data from (or provide data to) hardware resources when that data is destined for that process. A protection mechanism may be required to prevent one process from accessing the data destined for another process. A technique called I/O virtualization may be used, where a smaller number of I/O resources are shared by a larger number of processes or operating systems.

I/O Virtualization techniques may degrade system performance due to layers of software for each interaction with the hardware. In other words, processes may not be allowed to access the I/O data directly, rather an OS or hypervisor software layer is interposed to make the transfer. In this case, software can make sure that only the process for which a given packet (for example) is destined, is able to receive it. Massively multicore processors potentially exacerbate this problem due to choke points in the system such as shared locks and other shared resources. Both bandwidth and latency can be impacted by I/O virtualization software running in the context of a high bandwidth packet or data stream, for example. This may further compound the performance problems by using more buffering and hence more off-chip backing store (memory).

Fine grained protection of hardware resources may come at the cost of many TLB entries which can be thought of as keys to the allowed hardware resources. TLB pressure (an increase in the number of entries that are to be placed into the TLB) can further degrade system performance as normal application code competes for TLB resources with I/O virtualization code.

Interrupt delivery from I/O devices to user software may be a challenging area for virtualization. Delivery of interrupts directly to the user improves response latency but may require the ability for hardware to configurably demultiplex its interrupts across many dozens or hundreds of clients running on a multicore processor.

Dedicated hardware resources on a per-client basis provide a direct-to-user I/O virtualization environment. In such environment, I/O data can be accessed directly by a process without the need for intervening hypervisor or operating software overhead. The dedicated per-client hardware resources then access the shared hardware resources such as buffers, DMA engines, load-balancers, interrupt logic, and packetization logic through efficient hardware locking and time sharing. This avoids software locking and software context switching of hardware at the high data rates in some I/O systems. The clients can be different user processes running under one operating system, or could be user processes from multiple instances of operating systems running on the same system.

Some techniques for providing shared access to a resource for multiple processes executing on a computing system include: storing, in a translation lookaside buffer that translates virtual addresses to physical memory addresses of locations in a memory of the computing system, a translation mapping between at least a portion of a virtual address and a physical address of one of multiple registers coupled to the resource; and fulfilling requests to access the resource based on messages stored in respective ones of the multiple registers, with different respective processes requesting access to the resource by writing a message at a virtual address allocated to that respective process that includes at least a portion mapped to a physical address of a respective one of the multiple registers.

Some implementations of the techniques are mainly for processes and clients running on various cores on a chip to communicate with an I/O controller. For example, software clients running on one of the multicore processors or cores or tiles communicate as needed with their dedicated hardware resources (such as a buffer stack manager that they are able read and write directly) via user-level load and store instructions. These loads and stores are mapped through a page table entry into the I/O space (this form of mapping is called memory-mapped I/O or MMIO). Since page table set up is not required for each packet, this form of software virtualization may only be required at a time at which a session is initially set up or at a time at which the session is terminated, as opposed to each packet or transaction within the session.

In some implementations, when a process or core prepares to communicate with the hardware resources, software (in the hypervisor or operating system for example) uses one or more page table entries (PTE) that map some portion of the address space of the I/O device. For example, the PTE identifies the physical page in the I/O space. The physical page number from the TLB entry plus some bits from the virtual address forms the physical address. This physical address identifies a register in the I/O space. Further, some bits in the physical address also identify the service domain table entry (SDTE). The physical address (including both the SDTE and the I/O register address) is sent with loads and stores directed to the IO hardware. The I/O hardware indexes the service domain table located at the I/O device with these bits to provide a service domain table entry. This SDTE indicates which hardware resources are allowed to be accessed by the software client. If access is attempted to a disallowed resource, the access fails.

Further, when a cache coherence protocol is used in this example, when a process polls a queue in memory for I/O data, the data is automatically transferred from the I/O device cache or memory to the process running on a core by the coherence mechanism. To enable this, the I/O device interface is configured to be a participant in the cache coherence protocol.

A protection scheme with multiple protection levels can be provided for the I/O interface. In some implementations, to reduce I/O hardware interaction with software, packets are delivered directly to the user by the hardware ingress DMA (iDMA) engine. This iDMA engine writes into virtual address space (which is subsequently translated into physical address space). The user process is able to poll in the local virtual address space for packets to arrive on a queue. No direct interaction with the I/O hardware is required.

Similarly, on egress, the user process writes packet descriptors into virtual address space and the hardware reads and processes these descriptors with no direct user interaction required. These mechanisms allow a scalable virtualization environment without the need for intervening hypervisor virtualization software.

Egress DMA descriptors stored in a ring in the client's virtual address space are configured to use a generation bit to indicate the presence of a valid descriptor without the need for the bit to be cleared each time hardware processes that descriptor. Hardware periodically fetches descriptors in "hunt" mode looking for valid descriptors on each of the client descriptor rings that it is responsible for. When valid descriptors are found, the hunt-mode logic fetches additional descriptors more aggressively until no new valid descriptors are found. This eliminates and need for software to interact with the I/O hardware while preventing significant wasted bandwidth by the hardware "polling" for descriptors.

Software executing on the processor(s) may also post descriptors by writing them to their ring and sending an MMIO store to the DMA descriptor engine. This post can indicate how many descriptors are now valid or just provide a hint that the descriptor fetch should look for new descriptors.

TLB pressure due to I/O virtualization may be eliminated by a two-tier protection scheme. In other words, since I/O is handled through memory mapped I/O, one or more page table entries have to be allocated for each region of memory that is shared between the process and the I/O device. Each such page table entry generally needs an entry in the TLB.

To reduce the number of TLB entries, the processor(s) could map all the resources in an I/O device using a single page table entry. However, this alone could allow a software client to interact with hardware resources that don't belong to that client. To address this potential issue, a service domain table provides programmable protection of individual hardware resources. Each software client is associated with a single service domain table entry via its page table entry. (A few bits in the page table entry identify the specific service domain table entry). The service domain table entry contains enable bits for groups of hardware resources. Thus, the mapping of hardware resources to software clients can be configured depending on system requirements without requiring more than a single page table entry. The service domain table can be configured by the hypervisor or by an operating system.

In some implementations, interrupts from I/O devices to user software utilize a mesh network (or other on chip interconnect such as a ring, or a bus, or a hypercube or a broadcast network or a crossbar) and are delivered to the multicore processors. Each processor contains multiple interrupt events at each protection level. These events can be mapped to individual I/O hardware interrupts or multiple I/O interrupts can share an event. This allows an interrupt from a specific I/O device service to be delivered to an associated software client without intervening virtualization software that would typically need to read various device registers to determine the source of the interrupt and then deliver it (virtually) to the right software client.

Interrupts share a mesh network utilized by other on-chip multicore communications protocols. This avoids additional point-to-point conductors and packetization of the interrupts allows many thousands of different interrupt types to be delivered across a relatively small number of conductors.

A potential benefit of this set of mechanisms is that the hypervisor or operating system or other software need not be involved in I/O operations once the I/O operation is set up (e.g., assignment of page table entries and service domain table entries) by the OS or hypervisor or other privileged process (at a high protection level).

Figure 10:
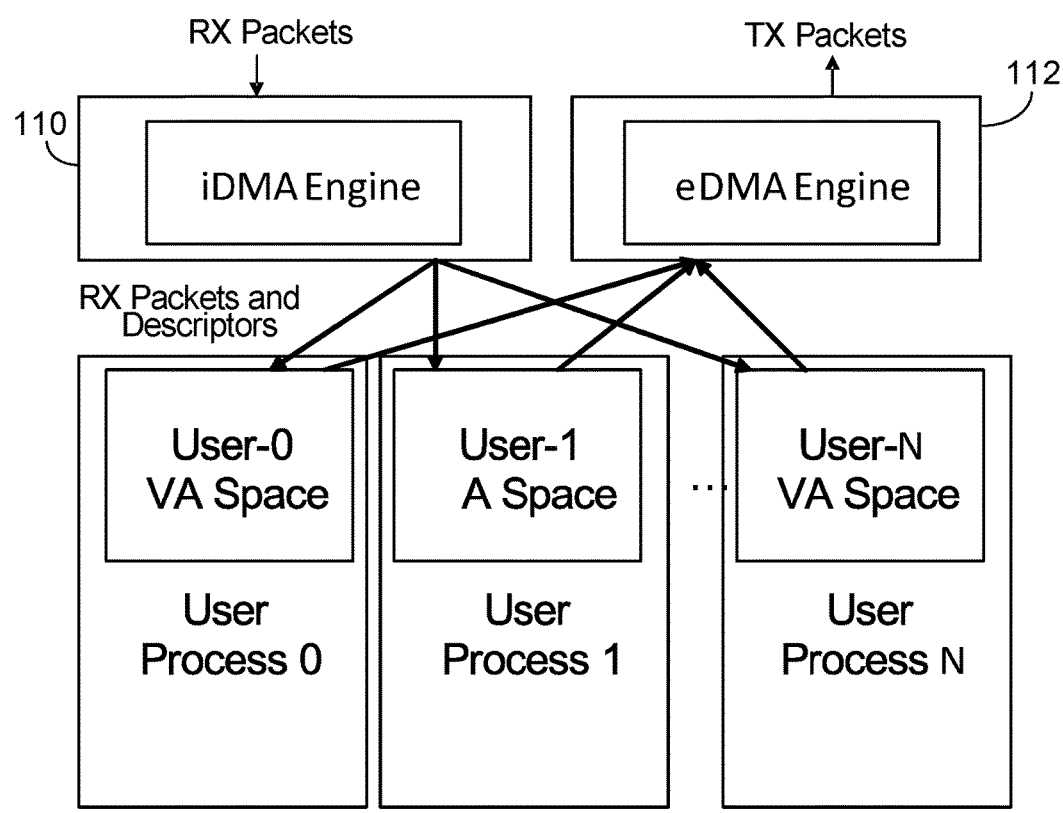
FIG. 10 is a block diagram of a MMIO system.

FIG. 10 shows an example of a configuration of an MMIO system. Arriving packets are received by an iDMA engine 110, that assigns the packet to a software client represented by a process (e.g., a user process running on a core or tile) and to a portion of virtual address space associated with the client.

In this example, there are N clients running as User Process 0, User Process 1, . . . User Process N, and N portions of virtual address space. Packet data that has arrived at the iDMA engine 110 and descriptors associated with the packet data are written by the iDMA engine into the virtual address space associated with the assigned client. Clients retrieve their assigned packets and descriptors from this virtual address space without necessarily being required to directly interact with the hardware of the MMIO system.

Packets egress by an egress DMA (eDMA) engine 112 that transmits packets retrieved by the iDMA engine. The descriptors and packet data that have been written into a client's virtual address space are read by hardware circuitry that is configured to read the descriptors and data from that virtual address space without necessarily being required to directly interact with the software clients.

Figure 11A:
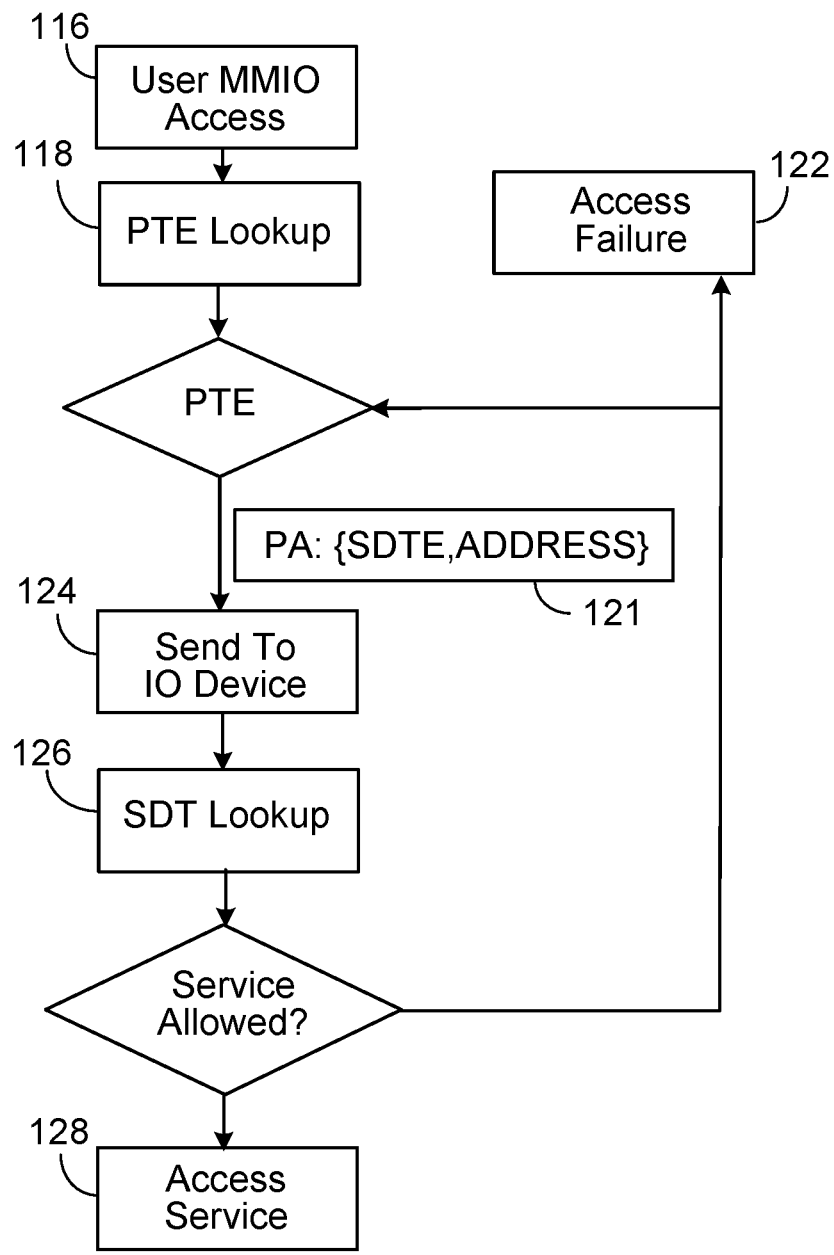
FIG. 11A is a flowchart of a MMIO access procedure.

FIG. 11A shows an example of a MMIO access procedure. When access to an I/O interface is requested (116) by a user client, software (in the hypervisor or operating system for example) performs a lookup (118) using one or more page table entries (PTE) that map some portion of the address space of the I/O interface. In some implementation, using only a single PTE entry or a few PTE entries reduces the TLB pressure. The PTE lookup identifies the physical page in the I/O space. The physical page number plus some bits from the virtual address forms the physical address 121 that results from a successful lookup. In the case of an unsuccessful lookup, an access failure procedure 122 is performed. This physical address 121 includes a first portion that identifies a register in the I/O space, and a second portion that identifies the service domain table entry (SDTE). The physical address (including both the SDTE address and the I/O register address) is sent (124) with loads and stores directed to the I/O interface. The I/O interface indexes the service domain table located at the I/O interface using an SDT lookup (126) with the SDTE address bits to provide a SDTE. This SDTE indicates which hardware resources are allowed to be accessed by the user client. If access is attempted to a disallowed resource, the access fails (122). If access is attempted to an allowed resource, the access is granted (128).

Figure 11B:
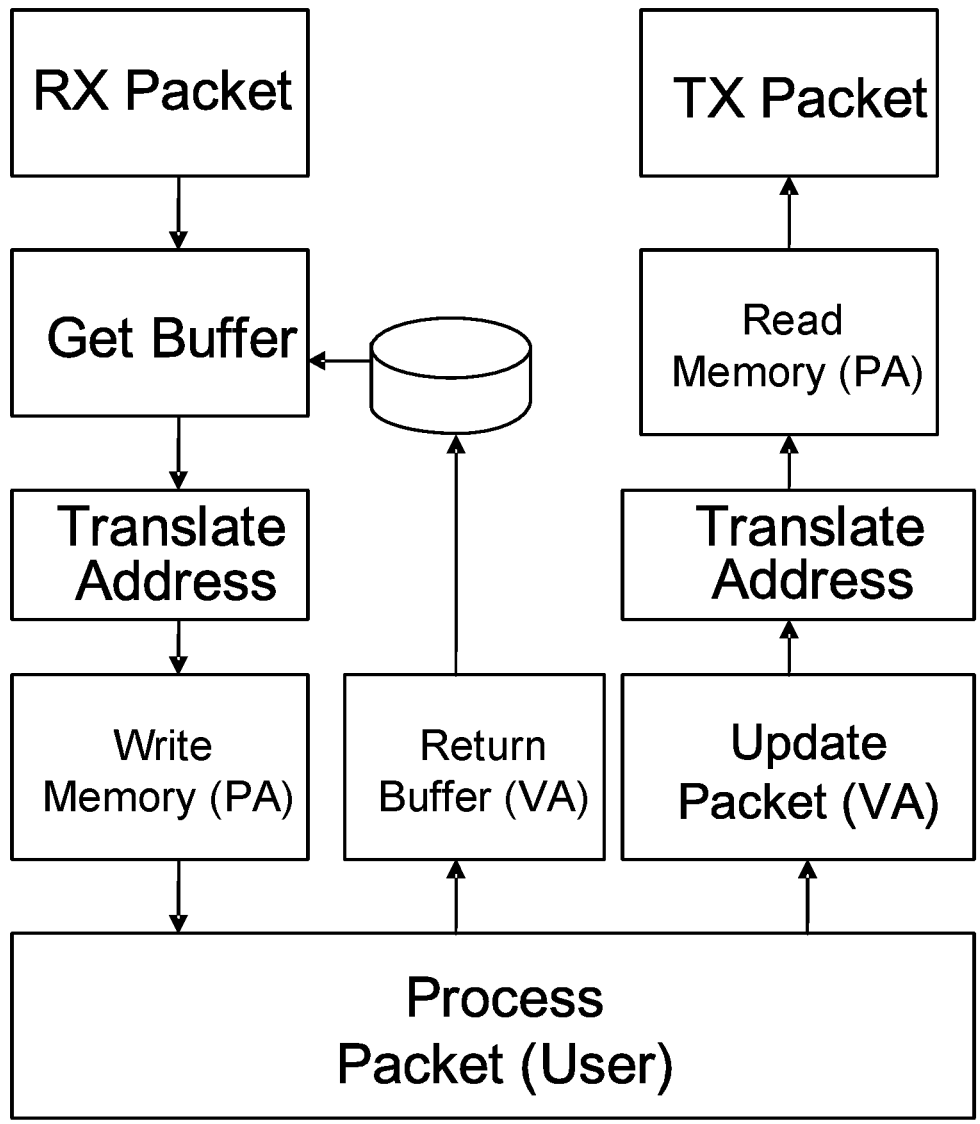
FIG. 11B is a flowchart of an address translation procedure.

FIG. 11B shows an example of a direct-to-user address translation procedure for both packet reception and packet transmission. [[[Packets arriving in the RX path receive buffer pointers from the buffer manager. These pointers contain a virtual address (VA). The VA is translated to a physical address via the IO TLB. The packet data is then written to physical address space and a VA pointer is provided to application software. The packet data is directly visible to software via the application's virtual address space. When user software processing is complete, the user process can return the buffer pointer by passing the VA to the buffer manager. TX processing uses a similar translation method. VA pointers are provided by the application to the TX hardware. The TX hardware translates these VAs into physical addresses before reading the packet from physical memory space. The translation steps on RX and TX allow direct communication between hardware and software.

The physical address (PA) can be configured to encode both a specific register in the I/O space and access control bits or permission bits (which provide the virtualization).

Interrupts due to arriving packet data or other events can be associated with software clients via an interrupt binding table. When the interrupt condition occurs, a packet is sent to the client's processor, privilege level, and event number based on the binding. An on-chip mesh network is used to deliver the interrupts.

Individual I/O resources, such as general purpose input/output (GPIO) pins of a chip package, can be dynamically grouped into service domains to allow a user to access a specific set of pins without allowing access to another application's pins. The pins can be mapped such that the user's view is of a single set of contiguous pins. For example, pins 1, 3 and 4 can be assigned to user application 'A' while pins 0, 2, 5 and 6 can be assigned to user application 'B'. The hardware can be configured so that application 'A' interacts with its 3 pins as if they were contiguous (0,1,2) as can application 'B' (0,1,2,3). This allows an application to be written in a generic way, protects the applications' pins from being affected by other applications, and provides an efficient access mechanism.

7 Transaction I/O

Some processors can be configured to expose a set of control registers into a communication interface address space so that other devices (for example, external to the processor) can access those registers via the interface (e.g., a bus or a network). For example, a network interface card coupled to a host machine can be configured to expose a register that allows the host machine to write to an "egress packet count" register via writing an address in the address space of a PCI bus in order to cause the network interface card to send an egress packet.

It is generally known that some systems can be configured to map their registers at fixed offsets from the start of the system's assigned bus address range so that remote applications can statically encode the register numbers needed for their communication algorithms. This mechanism may be provided for requests coming in from outside the system, for example, from an external device connected to a PCI bus.

Alternatively, a dynamic mapping mechanism is described below that has the set of mappings on a bus interface dynamically configured by software running on the processor(s) of a system (e.g., a multicore system). Configuration registers, modified by on-chip software running on the processor(s), are used to assign different operations to different ranges of bus address space. For example, the low megabyte of a bus address space could be dynamically configured to map into the memory space of application A, and the second megabyte of the bus address space could by dynamically configured to map into the memory space of application B. Operations other than simple memory-mapping are also possible; for example, mapping to a set of hardware registers, mapping a set of interrupt-generating registers, or using a memory-map that dynamically changes whenever the remote requester accesses a special "doorbell" address.

Figure 12:
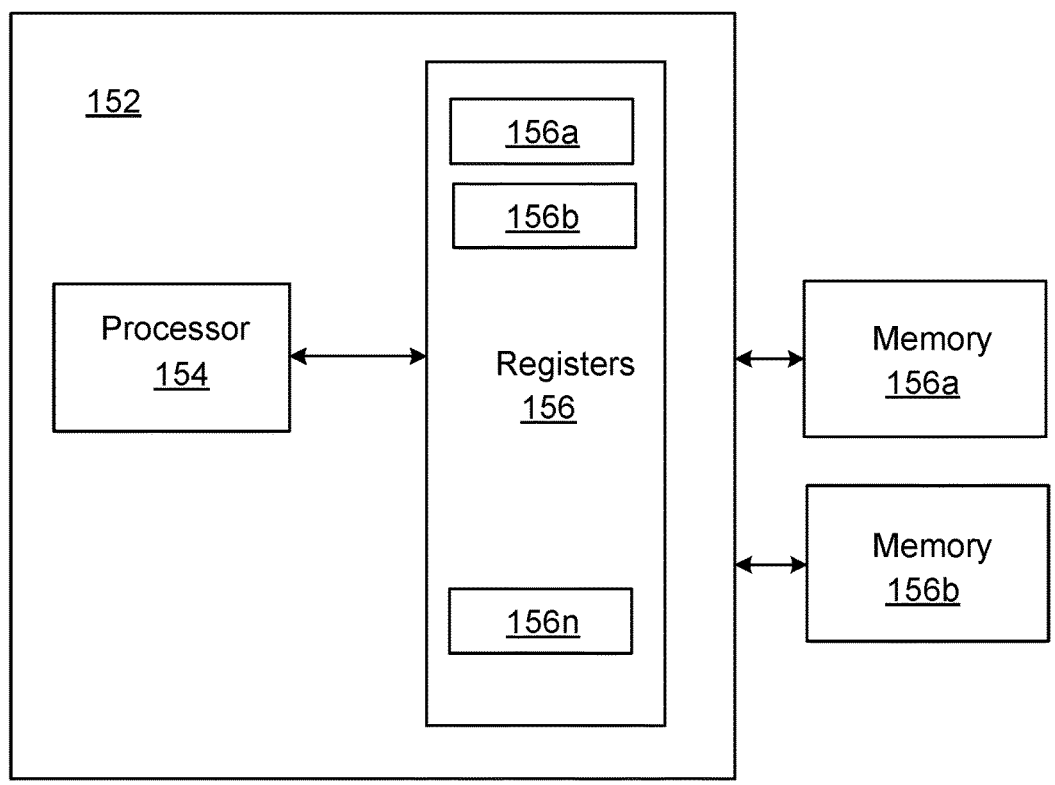
FIG. 12 is a block diagram of a core and memory modules.

FIG. 12 shows an example of a system that includes a core 152 (e.g., within a multicore system such as a tiled processor) having a processor 154 coupled to a set of base-and-bounds registers 156. The memory that is being mapped may include one or more memory modules 156a, 156b coupled to the core 152 (e.g., over a network of a tiled processor).

Figure 13:
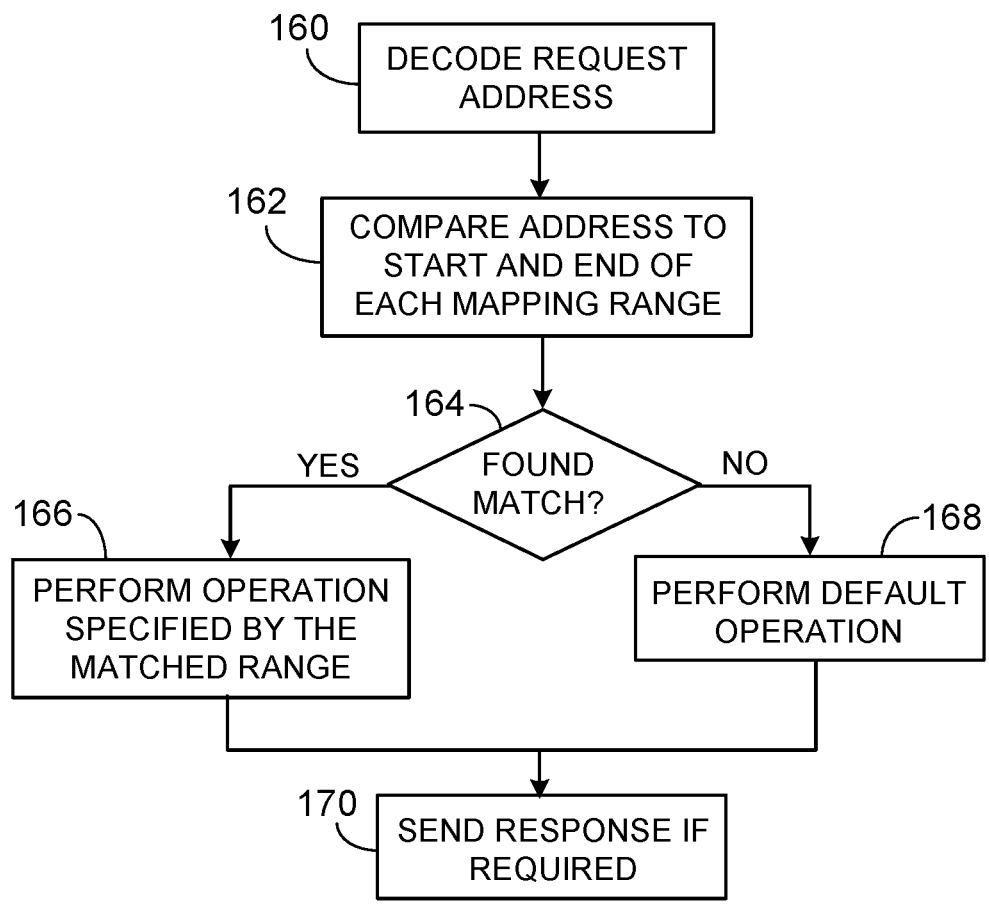
FIG. 13 is a flowchart of a method for handling a request.

FIG. 13 shows an example of a procedure for handling an incoming request. When a request arrives from the PCI bus, the processor 154 decodes (160) the request address. The address value in the address field of the request is compared (162) to start and end addresses stored in the set of base-and-bounds registers 156 for one or more ranges of addresses called "mapping regions." The processor 154 determines (164) whether a match is found by determining whether the address falls within one of the mapping regions. If a match is found, an associated set of "region parameters" is used to determine how to handle the incoming request, and a selected hander performs (166) one or more operations specified by the matched range. Possible operations performed by different handlers include: mapping the request to memory within the system, mapping the request to a set of hardware registers, or triggering an interrupts, for example. If a match is not found, the processor performs (168) a default operation. Optionally, the processor sends (170) a response if required.

The dynamic mapping mechanism can be implemented using either software or hardware or a combination of software and hardware.

In an example of an implementation that uses a software mapping engine, for each mapping region, a software engine executing on a processor maintains a start address, end address, enable bit, and operation selector. This information can be stored in an array, for example, with one set of entries for each mapping region. When a bus request arrives, the software decodes the request and compares the request's target address to the start and end addresses of each mapping region. If the target address falls within that address range, and the enable bit is true, the operation selector is consulted to figure out what operation should be performed to satisfy the incoming request.

In an example of an implementation that uses a hardware mapping engine, the engine stores the per-mapping-region state in software-configurable registers, then use hardware comparators or a CAM (content addressable memory) to perform the address matching. In this case, for example, the hardware engine is implemented in an I/O shim or controller.

If a request does not match any of the configured mapping regions, the engine can perform some default action. For example, incoming write requests could be discarded and incoming read requests could return all zeroes or all ones as result data.

8 Component with Multiple Contexts

Systems can be configured to provide a virtualized interface to hardware resources for use in multicore systems. Components of the system with multiple contexts can be used to provide multiple functions of function-specific engines such as an I/O device, a co-processor, or accelerator, for example.

Some known multi-processing computer systems do not allow user processes to directly access services of shared hardware resources such as function-specific engines. Instead, the operating system controls the hardware, and provides an abstraction through software APIs to allow user processes to request those services. One reason for this may be that the component is single-threaded; in which case, the OS provides a single point for coordination and synchronization such that the user processes accesses to the component do not interfere with one another. This operating system control of the hardware may exhibit relatively low performance in switching between the user process and the OS.

In SOCs (systems on a chip) that contain multiple cores (e.g., cores that are general purpose processors), an interface to hardware resources may be provided to accelerate certain operations for which the general purpose processor is inefficient. A few such examples are cryptographic or compression co-processors for network applications.

Some known multi-processing computer systems control the hardware resource using a single set of registers, and an access procedure executing on the processor(s) (e.g., as part of the operating system) determines how access and scheduling are controlled. While using a software-configured access procedure is flexible, it may be difficult to avoid performance, live-lock, and dead-lock issues associated with controlling access to the single register set. An alternative to the single register set for control of the resource is to instead provide a register set for each client (e.g., processor or process).

In some implementations of a multicore system with a plurality of cores, multiple ones of the plurality of cores, each include a processor and switching circuitry configured to couple the processor to a network among the cores. The system includes a plurality of registers coupled to the network, and configured to store data from respective processes executing on the cores that target the data to addresses mapped to the registers. The system includes a plurality of function-specific engines each configured to perform a particular function on received data. The system includes a scheduler coupled to the plurality of registers and the plurality of function-specific engines, and configured to schedule data stored in the registers to be sent to the function-specific engines and to return a result of performing a particular function on data from a particular register to the process that targeted the data to the address mapped to the particular register.

The hardware resource may be arranged as either a single resource, or a pool of resources performing related operations. Having a pool of resources allows a single hardware interface to be expanded by additional resources to the pool while providing the same software programming model. Additionally, supplying a specific unit of performance for a given function might be more efficient, and such an arrangement of expanding the pool of resources permits using a number of units with lower throughput to form a high throughput resource.

The function-specific engine may include a component such as a coprocessor (or hardware accelerator), performing, for example, cryptographic or compression/decompression operations. There may be a performance benefit to allowing a user process to directly request an operation to be performed by the function-specific engine, and receive a notification when the operation is complete. (The process can also poll to find out if the operation is complete). The user process can either perform other processing in parallel with the operation, or enter an idle state if there is no other useful processing to be performed. The overhead in time and latency may be avoided or reduced by using the OS as a proxy (in other words, using the operating system to mediate access to the function-specific engine).

This arrangement supplies multiple contexts for control of function-specific engines that can be accessed in a shared manner by a number of processors, processes, cores or tiles, or threads. The number of processes can be different (larger or smaller) than the number of contexts in the accelerator. Each of the contexts has a set of registers (called context registers). The context registers are arranged to permit efficient access control and implementation on SOCs. For example, the context register sets may be arranged to have a single context register set per virtual memory page, permitting the use of the processors' virtual memory system as a protection mechanism for the context registers. (For example, the direct to user virtualization and memory mapped I/O described above may provide a protection mechanism).

In some implementations, a data-movement scheduler chooses among the requesting contexts and selects some number of those to copy data into and out of the function-specific engine. A data-movement interface function then moves data for the selected contexts into an input buffer that is part of the interface. A separate optional function scheduler allocates the requested function-specific engines and performs the requested operation. The number of supported context registers can be much larger (or smaller) than the number of data-movement interface functions, which may be larger (or smaller) than the number of function operation units.

Figure 14:
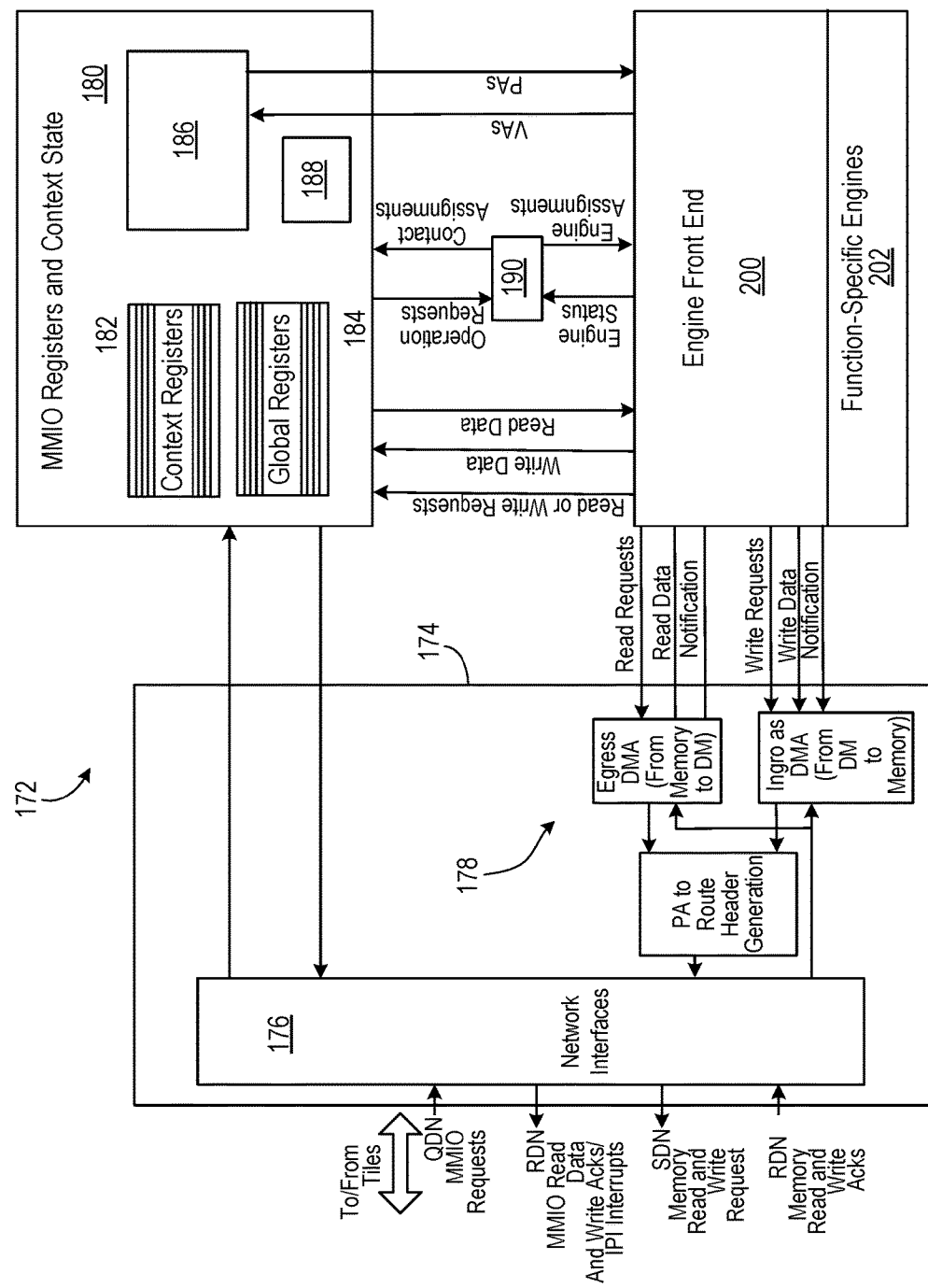
FIG. 14 is a block diagram of a module for interacting with function-specific engines.

FIG. 14 shows an example of a module 172 for interacting with function-specific engines performing various configurable operations. For example, one operation that can be performed by a function-specific engine is compression/decompression. There may be multiple function-specific engines that are configured to perform a given operation (e.g., multiple compression engines) to provide greater throughput, and/or multiple types of hardware that perform different operations (e.g., compression/decompression). A mesh interface 174 includes network interface circuitry 176 for coupling data to or from the tiles of a tiled processor, for example. The network interface circuitry 176 is coupled to a context module 180 including context registers 182, global registers 184, a TLB, and storage for context specific state 188. The mesh interface 174 also includes transfer circuitry 178 for handling ingress and egress of data and results to and from an engine front end 200 that provides access to a set of function specific engines 202. The context module 180 provides multiple contexts resources that enable the contexts to provide access points to the function-specific engines 202 including memory mapped registers used to request operations (e.g. data pointers, operation parameters), and provide status, as well as address translation and protection hardware, and interrupt bindings. Each context contains a unique set of these resources.

A user process requests an operation by writing the parameters of that operation (e.g., source and destination memory addresses, operation type, length, etc.) into one of the context registers 182 of that context. An additional parameter provided is a pointer to optional "extra data" in memory. As used herein, "extra data" is metadata (as opposed to source data) that are useful for some types of operations, but not needed in others. For example, encryption uses keys, initialization vectors, and other types of metadata.

The writes by the user process into the context registers of a corresponding function-specific engine are able to use a standard store operation at the requesting processor core. Details of how these store operations proceed over the network to write into the registers in a protected manner are described in more detail in the section on "direct to user virtualization and MMIO."

A hardware scheduler 190 is coupled to the context module 180 and to the engine front end 200, and the scheduler selects from among contexts requesting an operation and assigns the contexts to an appropriate function-specific engine for the type of operation requested. The scheduler 190 implements different policies based on system requirements; for example the policies can support different priority levels (requested by the user, OS or hypervisor) or be optimized for guaranteed bandwidth or latency limits. In some implementations, a protection mechanism is provided such that no user process can corrupt any other user process (due to either software errors or execution of malicious code). A first exemplary protection mechanism has each context protected by tiled processor memory management. A context is allocated to a user process by the OS. Typically this would be a long-lived allocation, during which the user process would request many operations. Once allocated, only that user process will be given access to the memory mapped registers of that context by the OS. The context registers are spaced apart in pages that are of the same protection size as the tiled processor pages (e.g., 4 kByte spacing), so that a page mapping only allows access to one context's registers.

A second exemplary protection mechanism has the user process define the data used by an operation (source and destination) in its own virtual memory space. Translation hardware in the I/O device requests access to those virtual addresses through the OS, which then provides the corresponding physical address (the I/O device caches those translations in an I/O TLB to improve performance). Thus, no user process can get access to memory not allowed to it by the OS. Sharing of virtual memory by multiple user processes can be allowed, if desired.

A third exemplary protection mechanism has the hardware scheduler fairly arbitrates among all contexts, and therefore no user process can starve others from use of the function-specific engine performing the operations.

A fourth exemplary protection mechanism has the function-specific engine notify the user process of completion of the operation via an interprocessor interrupt. The interrupt binding can only be modified by the OS.

The multi-context interface is able to provide a large number of context register sets in an efficient method. The number of context register sets may be different in different implementations, and may be determined by the application. For example, the number of context register sets may be equal to the expected number of simultaneous users, or the number of processors. The context registers' data is stored in a mixture of power and area efficient structures such as RAMs, and low-latency structures such as registers. The low-latency data may be used to form requests for the data-movement scheduler and the optional function scheduler. The data movement scheduler chooses some number of contexts and allocates a data-movement engine to fetch the input data from an external source (such as DRAM, or coherent caches) and store it into the input data buffer in the interface. The data movement engine may read additional information from the context registers to supply the function scheduler, and the function-specific engines.

The architecture of the multi-context interface permits, but does not require, a second function scheduler. If the function scheduler exists, when sufficient data is available in the data buffer, then data movement engine supplies a request to the function scheduler that allocates an available function-specific engine. When the function-specific engine is allocated, it receives its data from the input data buffer and writes results into an output data buffer. The data movement engine sends the output data to the consumer task (internal or external to the interface). When the function-specific engine completes, it is freed and becomes available to the function scheduler. When the data movement engine completes, it becomes available to the data movement scheduler.

The separation of the context registers, data movement engines, and the function-specific engines allows tuning the interface for varying number of requesters, function-specific engines, and external latencies. For example, in a system where there is a long external latency, the interface might have a larger input and output buffers, and more data movement engines so that the input data movement for the next operation, and output data movement for the previous operation, may be executed in parallel with the data movement and functional operation on the current request. In systems with low external latency, there may be a single data movement engine for each function-specific engine, and a second function scheduler might not be required.

Figure 15:
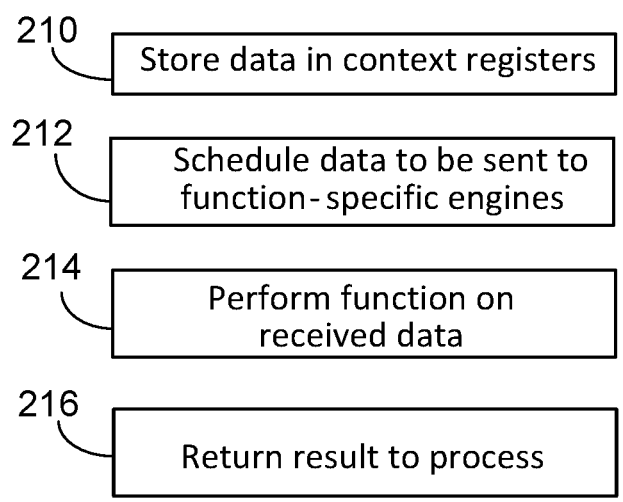
FIG. 15 is a flowchart of a method for interacting with a multi-context interface.

FIG. 15 shows an example of a procedure for interacting with the multi-context interface. Context registers store (210) data received from respective processes executing on the cores. The processes target the data to addresses mapped to the context registers. A scheduler coupled to the context registers, and to the function-specific engines, schedules (212) data stored in the registers to be sent to the function-specific engines. The data is sent to the function-specific engines at the scheduled time, and the function-specific engines each perform (214) a particular function on received data. The function-specific engines return (216) a result of performing a particular function on data from a particular register to the process that targeted the data to the address mapped to the particular register.

9 Mechanism for Incremental Decompression

Data compression and decompression techniques, such as the Deflate algorithm, compresses data into a more compact form. In some techniques, a block boundary is embedded in the compressed data. With a block boundary a data stream after the boundary does not refer to a data stream before the block boundary. Because of this property, the memory buffer associated with the previous block can be released after the end of a data block is reached, reducing the amount of memory required by a compression algorithm that has this block boundary property.

While the data may be compressed into multiple blocks, the compressed data may need to be sent over a packet network. When packetization occurs, the packet size may not be same as the block size, for example, a packet may not be aligned with the compressed data block boundary. This introduces complexity for buffer management and data decompression. One way to handle this complexity is to make sure packets always end at the compressed data block boundary. An alternative technique is to provide an interface to support data decompression for cases in which a transaction packet (containing the compressed data associated with one decompression transaction) may not be aligned with a compressed data block boundary. A transaction packet may include multiple network packets. For example, a file might be compressed into 10K bytes. A decompression transaction request decompresses these 10K bytes. The compression engine fetches the compressed 10K bytes after it has been divided into multiple network packets. A network packet may be one cache line, for example (e.g., when the data transfer engine transfers one cache line at a time).

In some implementations, a decompression procedure initiates a decompression transaction request over a multi-core interface for coprocessor acceleration (MiCA) hardware accelerator interface. Configuration information along with the request specifies how the decompression engine should behave, for example, when a compressed data block boundary is reached, or when the end of a transaction packet is reached. The decompression engine sends back the status over the interface. Memory buffers will be released and reassembled based on the decompression results. Incremental decompression can make forward progress, for example, restart from a most recent compressed data block boundary, or resume from the end of the most recent transaction packet.

Figure 16A:
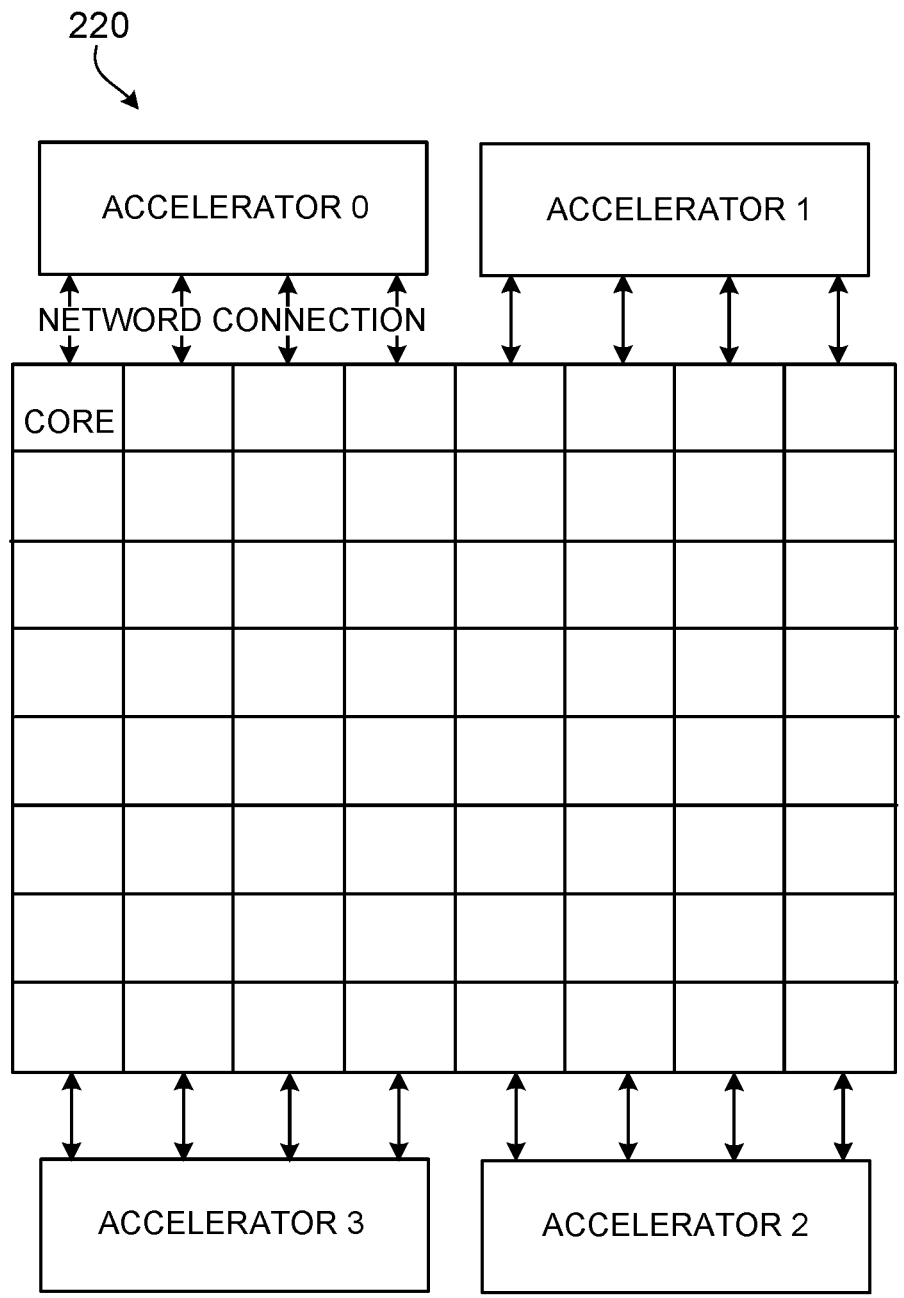
FIG. 16A is a block diagram of a multicore processor.

FIG. 16A shows an example of a multicore processor 220. The processor 220 has multiple cores, arranged in this example as tiles of a tiled processor array, and four accelerator modules Accelerator 0, Accelerator 1, Accelerator 2, and Accelerator 3. Each core can initiate a decompression transaction request. In other examples, a single accelerator is coupled to a multicore processor. Each accelerator module is connected to one or more tiles of the tile array, for example, through a mesh network. Each accelerator module has a MiCA interface (multiple context accelerator interface, described below).

A decompression opcode is defined in the MiCA interface. Other decompression related operands are also defined, for example, source virtual address, destination virtual address, packet size, etc. These operands can be used for a decompression operation, as well as other acceleration tasks, for example, DMA and encryption, etc.

The MiCA interface provides multi-context support. Each core can access an accelerator module (e.g., using direct-to-user virtualized memory references) through its own set of sets of contexts, or through a shared set of the contexts. Each context has its own context registers for control and status. The MiCA interface provides the translation from a virtual address to a physical address.

The MiCA interface also provides multi-channel support. Physical resources are channelized. For example, in some implementations, each channel has its own buffer to queue the packet requests and packet responses from the network connections. Also, each channel can have its own hardware reordering logic if multiple network packets are returned out of order and can have its own hardware logic to deal with address alignment. Each channel is responsible to move data from the source memory subsystem (for example, cache or external DRAM) to the accelerator, to move data from the accelerator to the destination memory subsystem (for example, cache or external DRAM). Flow control logic can be implemented to arbitrate between the multiple channels and the physical network connections, for example, when all channels use one physical network connection. Each channel can be assigned with an allocation weight to use the physical network resources.

Figure 16B:
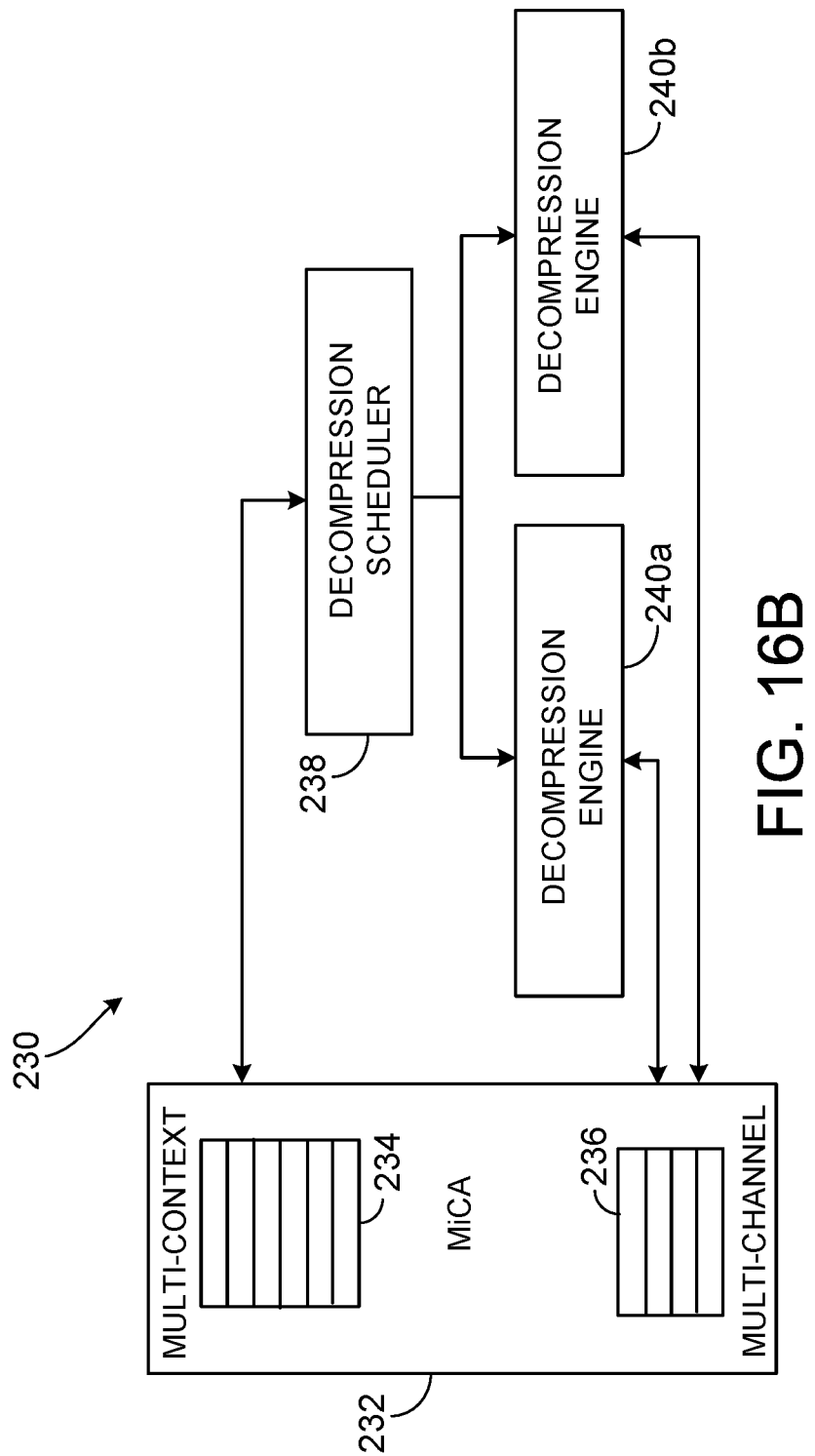
FIG. 16B is a block diagram of an accelerator module.

FIG. 16B shows an example of an accelerator module 230 that includes a MiCA interface 232. The MiCA interface 232 includes a set of multiple context registers 234 for respective contexts, and a set of multiple channel modules 236 containing physical resources for respective channels. Software running on the processor sends a decompression transaction request to a decompression scheduler 238 over the MiCA interface 232, which sends the request to one of multiple decompression engines 240a, 240b. The transaction request specifies, for example, where the compressed data is stored and the size of the compressed data. The compressed data associated with one decompression transaction is called a transaction packet.

FIG. 16C shows an example of a transaction packet 244, including two complete blocks and a partial block. The accelerator module 230 may generally have one or multiple decompression engines, and in this example there are two decompression engines 240a, 240b. The decompression scheduler 238 is used to select the binding between one context and a decompression engine. After the binding is selected for the current transaction request, all packets associated with the current transaction request will go through the selected decompression engine. Each decompression engine will use one physical channel to receive compressed data and send the uncompressed data.

Figure 17A:
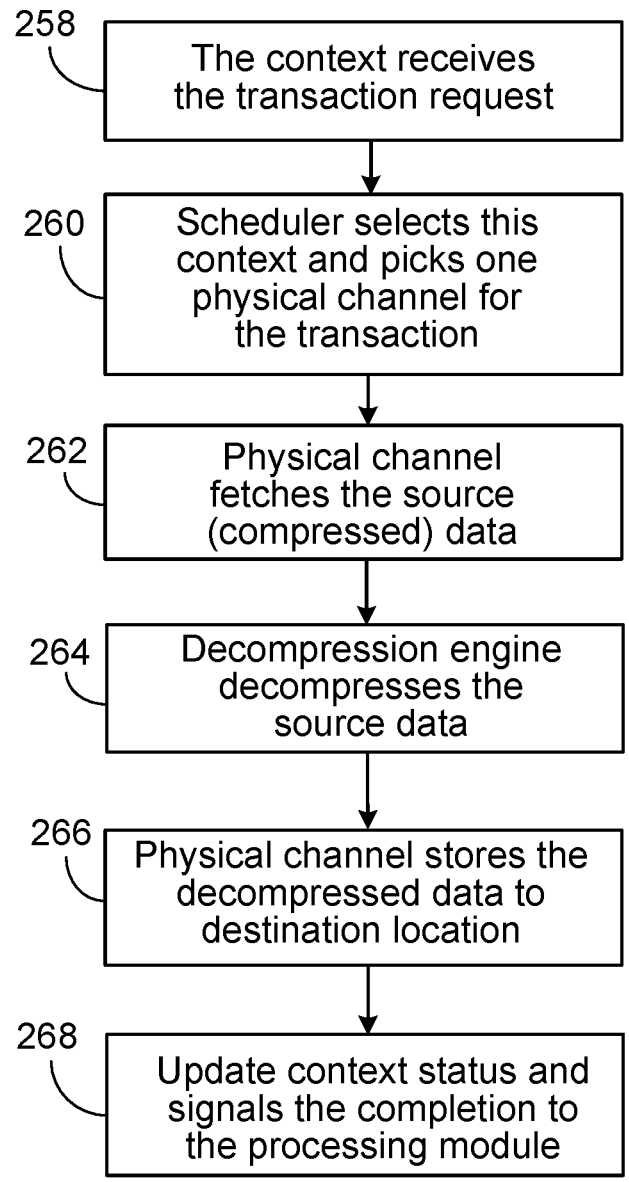
FIG. 17A is a flowchart of a decompression operation.

FIG. 17A shows an example of the data flow in a decompression operation using the accelerator module 230. A context register of the interface 232 receives (258) a request from a core (or other processing module of the system) to start a transaction for a particular context. The decompression scheduler 238 selects (260) the particular context corresponding to the context register, and a channel for the sending the transaction packet 244 to one of the decompression engines 240a. The decompression engine 240a fetches (262) the transaction packet 244 with the compressed data from the source over the selected channel. The decompression engine 240a decompresses (264) the compressed data in the transaction packet 244. The decompression engine 240a sends (266) the decompressed data over the selected channel for storage at the destination. A transaction packet may have zero or one or multiple complete blocks, and may end with a partial block. In this example, the transaction packet 244 does not end with a block boundary between adjacent blocks, but rather ends with a partial block. The decompression engine 240a may suspend or pause the decompression processing under some conditions. For example, a decompression engine may suspend the decompression for any of the following reasons. A decompression engine may suspend decompression after reaching the end of a compressed data block boundary.

Referring again to FIG. 16C, a decompression engine may suspend decompression at a location 246 after detecting a symbol "E" indicating the end of a block.

Referring to FIG. 16D, a decompression engine may suspend decompression after reaching the end 248 of a transaction packet. The end of the transaction packet may or may not be aligned with the compressed data block boundary. The decompression engine 240a has a status monitor to keep track of various possible conditions for a particular context. For example, one status indicator determines whether the block boundary is reached at the end of the transaction packet. One status indicator determines how many input bytes (compressed data) have been processed in this transaction packet. One status indicator determines how many output bytes (uncompressed data) have been produced from this transaction packet.

Referring again to FIG. 17A, the decompression engine 240a updates (268) the context status and stores the status in status registers, for example, with a status register for each context. The engine 240a signals the completion to the core that requested the transaction. Software running on the processor performs memory management associated with the transaction packet. For example, if the transaction packet aligns with a compressed data block boundary, then memory buffer space associated with the transaction packet can be released. If the transaction packet does not align with a compressed data block boundary, some of the memory buffer can be retained (to store an unprocessed partial block).

Figure 17B:
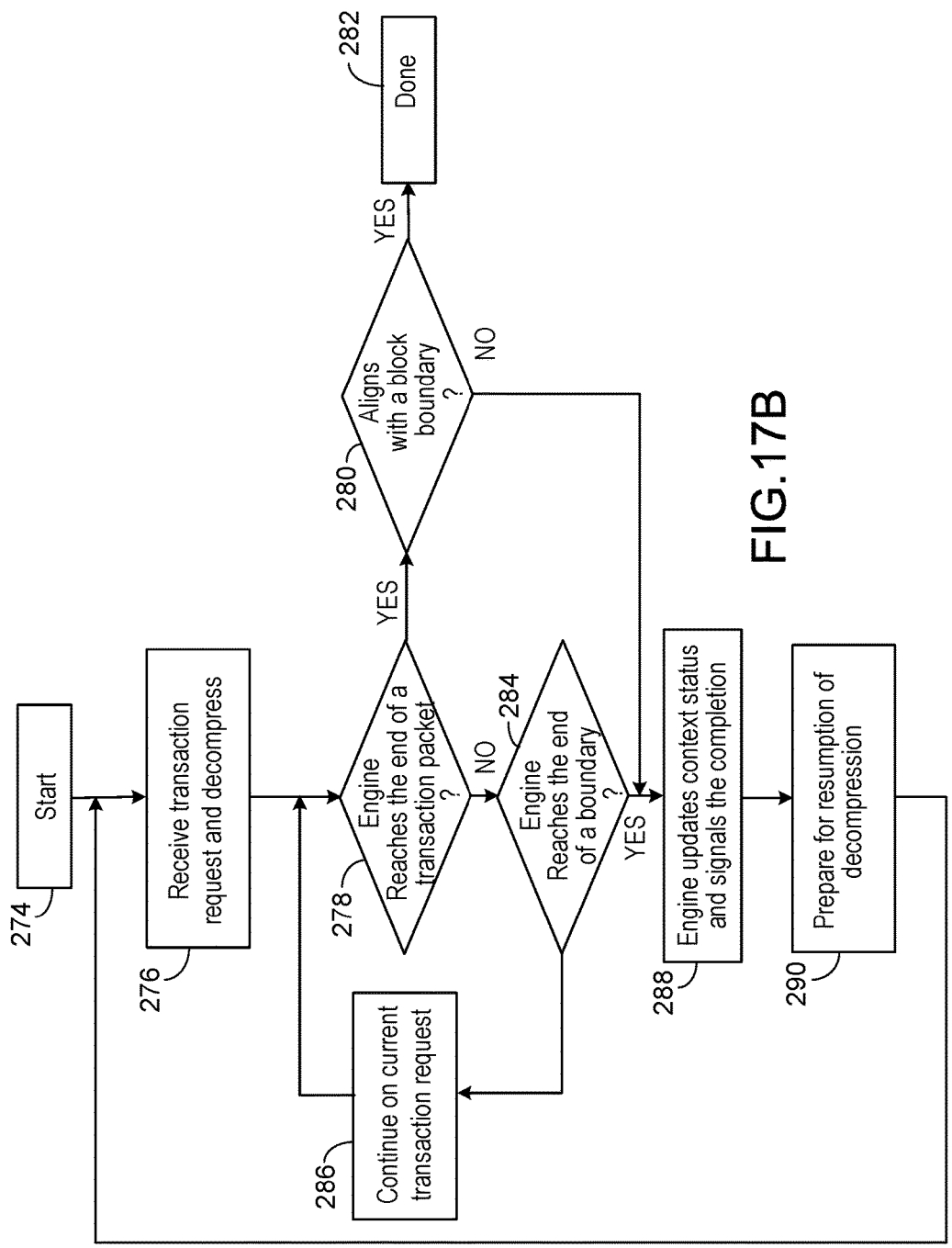
FIG. 17B is a flowchart of a method for processing transaction requests.

FIG. 17B shows an example of a procedure for processing transaction requests. Transaction packets that end with a complete block are handled differently from transaction packets that end with a partial block. There are also different techniques that can be used for continuing the decompression after a previous transaction has ended with a partial block. The procedure starts (274) with the decompression scheduler 238 scheduling a decompression engine 240a to handle a transaction request. The engine 240a receives (276) the transaction request and starts to decompress the compressed data in the transaction packet. The engine 240a is able to detect (278) when the end of the transaction packet has been reached, and when the end is reached determines (280) whether the end of the transaction packet aligns with a block boundary. If there is an alignment, the procedure is done (282) with the decompression for the transaction request. The engine 240a is also able to detect (284) when the end of a block boundary is reached, and if not continues (286) to process the current transaction request. If the end of a block boundary is reached, or the end of a transaction packet is reached without aligning with a block boundary, then the engine 240a suspends decompression and updates (288) the context status with information that will be used when decompression resumes and signals completion of the block or transaction packet. The accelerator module 230 prepares (290) for resumption of decompression (e.g., including releasing buffer space that is no longer needed) and issues a new transaction request to be received (276) by the same engine 240a, based on the assigned context, for continuing the decompression.

Different techniques can be used for preparing (290) for resumption of decompression. In one technique, the decompression resumes at the beginning 246 of a block boundary, even if the most recent transaction packet ended with a partial block. Software executing on the processor that sent the transaction request retains the memory buffer associated with the partial block of the most recent transaction packet. Decompression restarts from the beginning 246 of the partial block and additional compressed data is appended to the end of the partial block from a new transaction packet, including the remainder of the partial block. The decompression engine 240a does not have to retain the partial block in this technique since it is stored in a memory buffer. The decompression engine 240a treats the rest of the transaction packet that was appended the same way as any transaction packet.

In another technique, the decompression resumes from the end 248 of a partial block starting with the remainder of the partial block. Software executing on the processor that sent the transaction request releases the memory buffer associated with the most recent transaction packet. The decompression engine 240a preserves the state (e.g., the decompression state) of the partially processed partial block, in order to continue processing the remaining portion of the partial block.

The software specifies a "pause" flag when a new transaction request is initiated. The "pause" flag can be part of an instruction or opcode or transaction provided to the decompression engine 240a. When the "pause" flag is enabled, the decompression engine 240a will pause after finishing the current transaction packet.

The software is able to instruct the engine 240a to resume decompression with additional transaction packet(s) associated with the appropriate context. For example, the software is able to ensure that the engine 240a does not receive unrelated transaction packets interleaved. One way to preserve the engine 240a when resuming decompression is to use a particular context (any context) for the decompression, so that interleaving from any other unrelated transaction packets can be avoided. For example, the software can set up a binding between a particular context and the decompression engine 240a by storing binding information in one of the context registers 234. When the decompression engine 240*a* is paused, only the binding context can resume additional transaction packets into this paused engine 240*a*.

The software determines whether to restart from the beginning 246 of the block boundary (pause flag=0) or to resume from the end 248 of the partial block (pause flag=1). When a transaction packet aligns with a compressed data boundary, a new transaction packet will not reference to any previous transaction packet. In this case, because there is no leftover partial block from a previous transaction packet, it is essentially the same to restart from the beginning of a block boundary or to resume from the end of a leftover partial block.

10 Implementing Cache Coherence Optimizations for Multicore Processors

Various performance enhancements can be made to the distributed cache coherent environment for a multicore processor system. The caches with associated cache controllers contained in the cores (or tiles) form a larger shared cache system for the memory references to an external memory from any of the cores. In other words, a union of all caches (for example, Level 2 caches) in the system serves as a higher level unified cache (for example, level 3 cache). The cache controllers handle cache access and maintain coherence among caches of different cores. Latency reduction techniques for the larger shared cache system are applied to further optimize the memory operation performance. Several features also enable the software executing on the processors of the cores to control the cache partition and utilization from the processor and the I/O system while maintaining the data coherence.

In some implementations, data fetched from the external memory in response to a cache miss is first sent to the cache controller of the cache that suffered the miss (e.g., the cache in the home tile), and then forwarded to the core that requested the data. This may add significant latency to the original memory request. Some implementations enable the memory controller controlling the external memory to directly send the data to the core that originally requested it, and also to the cache controller at the home tile that requested it, greatly reducing latency. The latency can be further reduced by delivering data directly from the network that is attached to the processor in a multicore environment, i.e. bypassing levels of cache hierarchy that might exist in some processors.

In some implementations, the home locations for cache lines (or memory pages) are substantially evenly distributed among the cores in the system, or the cores in a coherence domain in the system, even when systems or coherence domains have differing numbers of cores. Some systems may have 36 cores, 64 cores, or 100 or more cores, for example. The same hardware hash function may be used for all these cases, but the processor(s) may be configured to write some configuration bits into registers or memory tables. The software executing on the processor(s) may set up one or more special registers so that the hash function evenly distributes cache lines across whatever number of cores are contained in the chip.

For example, a hardware hash function may be included that is cheap to implement in hardware and fast. The hardware hash function, together with configuration registers, is able to uniformly hash the memory address produced by a processor to target home cores such that all the home cores get approximately the same number of memory addresses (or cache lines or memory pages) that map to them.

One example uses a two-step hash function. The processor(s) hash the address to produce index bits to index into a table, which in turn produces the home location. By having a table with more entries than there are home locations, the processor(s) can make the mapping more uniform than if there were exactly as many locations in the table as there are cores.

In some implementations, by setting attributes in the processor's translation lookaside buffer, software can dynamically allocate the data into the processor's private cache (e.g., local L2 cache) or in the larger shared distributed cache system (e.g., in the home location) in the coherent domain depending on the predicted data temporal locality. Data duplication may occur in the shared distributed cache scheme, because the data is generally present in both the home cache and in the local cache. An adaptive allocation technique eases data duplication with an "inclusiveness" property in which the cache line is included in both the local cache and in the remote home location. The adaptive allocation allocates a cache line in only the local L2 cache on the first miss. Then on the second miss (or on a later miss), the software writes the configuration attribute in the TLB such that the cache line is cached both in the local L2 and the home location L2.

In some implementations, a multicore processor provides coherent I/O packets directly into the shared cache system with various "pinning" and allocation configuration directly managed by the software. When cache lines are "pinned" (or fixed) in a cache, the system ensures that the cache line is not evicted from the cache by other cache lines.

In some implementations, performance counters are used for remotely homed references. Each core can also maintain multiple performance counters. A specific counter can be incremented each time a core issues a memory reference to another core, for example, when that other core is the home core for that memory reference. These off-core memory references to another core's cache can occur in various situations, such as: if the core has a cache miss and the data is homed on another tile's cache; or if the core makes a reference to a memory location that is in a mode in which only the home core has a copy of the data and it is not cached in the local core's cache. A core can also maintain multiple counters for each of the above two types (or more) or remote cache accesses. Performance counters can also be maintained for stores that are sent to remote tiles. Performance counters can separate reads and stores to remote core accesses.

A hardware or software mechanism can read the performance counters and adaptively change the homing mode of a given cache line of page. For example, it can make a cache line be allocated only in the local cache as private data, or in both the local cache and in the distributed shared cache system. Similarly, the system can change the home location of a page to be closer to the cores that are missing to that home location.

In some implementations, a scheme with a software programmed lookup table is provided to interpret a bit-vector hardware directory for different chip configurations. These chip configurations include different number of cores in a chip, different number of cores in a coherence domain (a subset of cores whose caches are configured to be coherent with each other) or any physical distribution of the cores in the same coherence domain. Different run-time applications can enable the most effective hardware directory configuration by programming the lookup table.

In some systems, when a memory request misses a local cache of a requesting core, the data is fetched from external memory to multiple levels of the cache hierarchy, including both the home location and the requesting processor (if they are different).

One possible scenario is as follows. A processor receives a memory access request for accessing data in a particular cache entry. The processor misses in its local L1 and L2 caches. The request is then sent to the home location for that cache entry. If the access of the cache at the home location also suffers a miss, then the request is sent by the cache controller to the memory controller of an external memory system. The external memory system responds with the data to the cache controller at the home location. That cache controller responds with the data to the core that first requested it. The requesting core will store the data in the L2 cache, and then send the data to the L1 cache and then to the processor that requested the data in the first place (e.g., to the register file of the "requesting processor" in the "requesting core"). In this scenario the latency of access is relatively large.

In an alternative technique for forwarding data to a requesting core, the cache controller in a home core can send a data miss request with a software programmable attribute to the memory controller. The attribute enables the memory data delivery mechanism in the memory controller to send two identical copies to both the requesting processor and the home core cache controller, thus reducing latency to the requesting processor.

A core can also be configured to bypass higher levels of cache hierarchy. For example, when the data arrives at a network interface that is attached to the requesting processor in the multicore environment, the data that is requested by the requesting processor for placement in its register file is directly sent to the register file without going through any local cache hierarchy (e.g., the local L1 or L2 cache).

Combining these two techniques together, the data travels as a point-to-point message between the memory controller and the requesting processor's register file with the shortest latency.

Figure 18A:
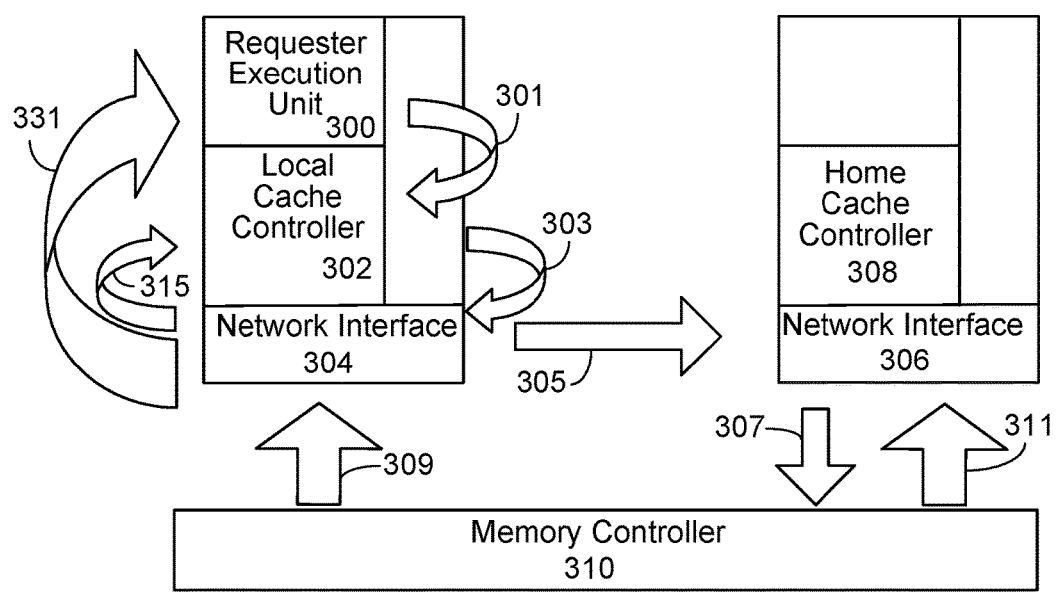
FIGS. 18A and 18B are schematic diagrams of data request flows.

FIG. 18A shows an example of the request and data flow for fulfilling the request. A data miss request 301 sent from a requester execution unit 300 of a requesting processor is sent to the local cache controller 302 of the requesting processor. Upon the cache miss, a miss request 303 with a software configurable attribute is sent from the local cache controller 302 to a network interface 304 of the requesting processor. The miss request is sent 305 over the network, from the network interface 304 of the requesting core to a network interface 306 of the home core, and is received at a home cache controller 308 at the home core. If the data is not in the home location, the miss request is sent 307 to the memory controller 310. The memory controller responds to the miss request with two copies of the requested data (or the cache line containing the requested data). The data is sent over one path 309 to the requester's core. The data sent in parallel over another path 311 to the cache at the home core. The requesting core's network interface 304 forwards the requested data from the received cache line to the execution unit 300 using the path 313, while the data from the whole cache line is stored in the local cache by the local cache controller 302 using the path 315.

In some implementations, home locations for cache lines (or memory pages) are substantially evenly distributed among the cores in the system or a coherence domain, as described above. When the number of cores is a power of two, e.g., 2 cores, 4 cores, 8 cores, etc. simple and fast hash functions exist, for example, selecting some of the bits of the address itself, using xor functions, etc.

However, when the number of cores is not a power of two, the hash function may be slower or more complex to perform. Suppose as an example that the system has 10 cores. If the processor(s) hash a 32 bit or 64 bit address into 4 bits, then those 4 bits will select one of 16 cores, but the system has only 10.

Using the numbers in the above example, one possible approach is to hash the 32-bit or 64-bit address A into another number B with a greater number of bits than needed to encode addresses of the 10 cores, e.g., 8 bits. This yields 256 possible home locations, which is larger than the system's 10 cores. The processor(s) implement a software-writable table with 256 locations and index into this table with the 8 bits. Each of the table locations stores the number of a home core, for example, 3. If the software knows that there are 10 cores, then the software writes the following home locations into the 256 locations: 1, 2, 3, 4, 5, 6, 7, 8, 9, 10, 1, 2, 3, 4, 5, 6, 7, 8, 9, 10, 1, . . . 1, 2, 3, 4, 5, 6. The number B with the 8 bits is used to index into this table and produce a home core location. In this example, although 1, 2, 3, 4, 5, 6 appear as home locations one more time that the other locations, it is still substantially uniform because it occurs only one more time over 25 times (so only about 4% more likely to serve as home locations).

In general the number of table rows or entries may be about 2 to 10 times the largest number of cores that are expected to be in any system, for example.

A benefit of this scheme is that the software can make any particular core serve as the home for a greater or smaller number of pages by simply repeating it in the table.

In the hashing process described previously, each page also can have a TLB attribute that allows that page to be hashed over a subset of the cores (e.g., 4 out of 10). This way, some pages can be distributed across more or fewer cores. This way, some processes can be assigned more home cores than other processes. Furthermore, this way a given process's home cores can be separate from those of other processes. This is useful because each process can then be independent of other processes by not interfering with them. To accomplish this, one of the indexes can be shifted and masked depending on the configuration in each data page stored in the translation lookaside buffer to generate the entry index in the table in a way that the index is limited to a subset of the entries. This enables the software to divide the mapping table into different sections, e.g., to effectively slice the distributed cache system into different domains.

A technique can be used to avoid or reduce data duplication in the home cache and the local cache. For this example, a processor has a local L1 cache a local L2 cache within the core of the processor, and each cache entry has a location in a home cache (which serves as a part of a distributed L3 cache system) that may be in a different core. For a fixed cache storage that is shared by the processor's private L2 cache system and the shared L3 cache system, the same data may be allocated in both systems, i.e. data can be duplicated in the requester's private L2 cache and at the home location in the home core, e.g., within the home core's L2 cache. This duplication can result in reducing the effective cache capacity.

A technique to address this issue prevents the caching of the data in the local L2 cache if the data is not expected to be used very often in an adaptive manner. The first time the processor suffers a miss on the data, the processor allocates the data in the smaller private L1 cache only, and does not allocate it in the local L2 cache. The data can optionally also be allocated in the home location cache. Then, on the second miss, the processor allocates it in the local L2 cache as well.

This allocation can be done for cache lines in a given page, by setting an attribute value (called a non temporal attribute) for the page (for example, in the TLB). The attribute can be programmed in the TLB page by the operating system or other software.

Figure 18B:
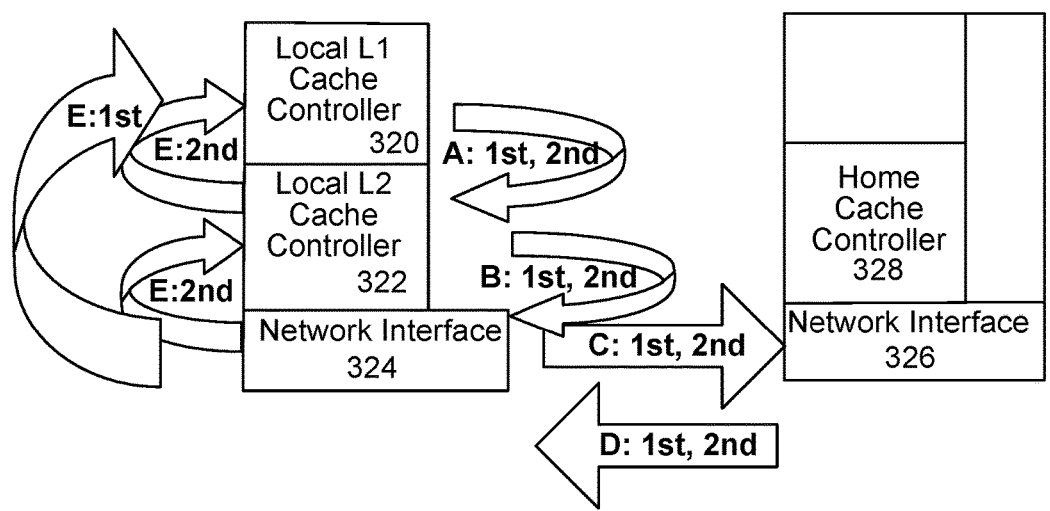

FIG. 18B shows an example of a data request flow (A, B, C), and a data return flow (D, E) for a processor that requests data. The flows A-D are the same between the first miss and the second miss. The return flow E is a cache allocation flow, which is different between the first miss ($E:1^{st}$) and the second miss ($E:2^{nd}$). The return data for the first miss is stored in the local L1 cache but is not stored in the local L2 cache.

The flows for requesting a particular data block in a particular cache line are as follows. The local L1 cache controller 320 checks for the requested data in the local L1 cache. If there is a miss in the local L1 cache, flow A corresponds to the local L2 cache controller 322 checking for the requested data in the local L2 cache. If there is a miss in the local L2 cache, flow B corresponds to the network interface 324 receiving the request, and flow C corresponds to the network interface 324 sending the request over the network to a network interface 326 of the home core. The home cache controller 328 checks for the requested data in the home cache. If necessary, the data is retrieved from external memory into the home cache. In a return flow D, the data is sent back over the network to the network interface 324 of the requesting core, and the flow $E:1^{st}$ corresponds to the first miss for the requested data block, in which the requested data is returned directly into the L1 cache, and is not written it into the local L2 cache. Then, on the second miss (or on the $n^{th}$ miss, for n>1) of the same data block, the local L2 cache controller 322 can automatically store the data into the L2 cache in addition to the local L1 cache controller 320 storing the data into the L1 cache.

Streaming data that is used infrequently can disrupt cache performance by causing unnecessary invalidation of more useful data. This may be true, for example, of I/O data. In some multicore systems I/O data is streamed directly into the local caches on a chip without necessarily going to memory first. To prevent the problem of streaming data invalidating more useful data, the processor(s) can be configured to use either of the following examples of procedures for managing streaming data.

A first example uses a processor configuration register to configure the cache capacity that can be used by the incoming I/O or stream packets. If the packets are in a processing phase that requires substantial processing power, or are expected to be shared by different processor units to be processed, the configuration register can be programmed to allow full caching ability. In anther mode, when the stream data is not expected to be reused often, the configuration register can be written to limit the cache capacity that can be used by the streaming data.

More specifically, for example, the configuration register can indicate which cache banks (or which cache regions or which ways of the cache) the data might reside in.

Figure 18C:
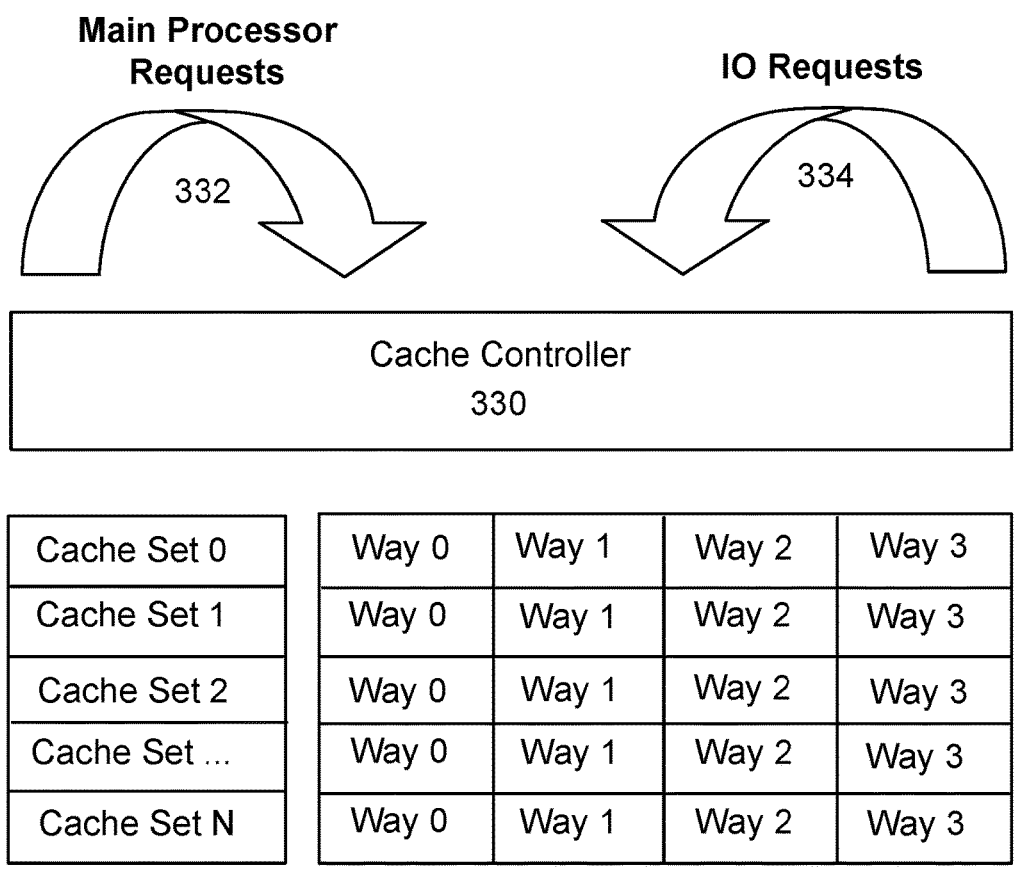
FIG. 18C is a schematic diagram of a cache controller and set associative cache.

FIG. 18C shows an example of a 4-way set associative cache in which software is able to configure the cache controller 330 to limit the I/O data to only occupy at most one quarter (¼) of the cache storage. Main processor requests are stored in one of three "Ways" (Way 0, Way 1, or Way 2) of a corresponding set. I/O requests are stored in a single predetermined one of the "Ways" (in this example, Way 3). Accordingly, there is not more than one quarter (¼) of the cache locations occupied by streaming I/O data.

A second example enables the software running on the processor to manage the I/O data lookaside buffer (in other words the TLB for I/O data) to provide a page-based "non-temporal" attribute for the I/O requests to the page. This page based temporal attribute indicates that no data temporal locality is forecast, so the I/O data should be limited to a small region of the cache, so that the shared cache system is not over occupied by less important data.

The shared cache system can also disallow any data caching of I/O requests that have this page based temporal attribute. The shared cache system either forwards the requests directly to the memory controller on cache misses, or invalidates the data block after responding with data on cache hits for the read requests. Cache storage is efficiently used and data integrity is preserved by in-order point-to-point data transfer between the cache controller and the memory controller.

Figure 19A:
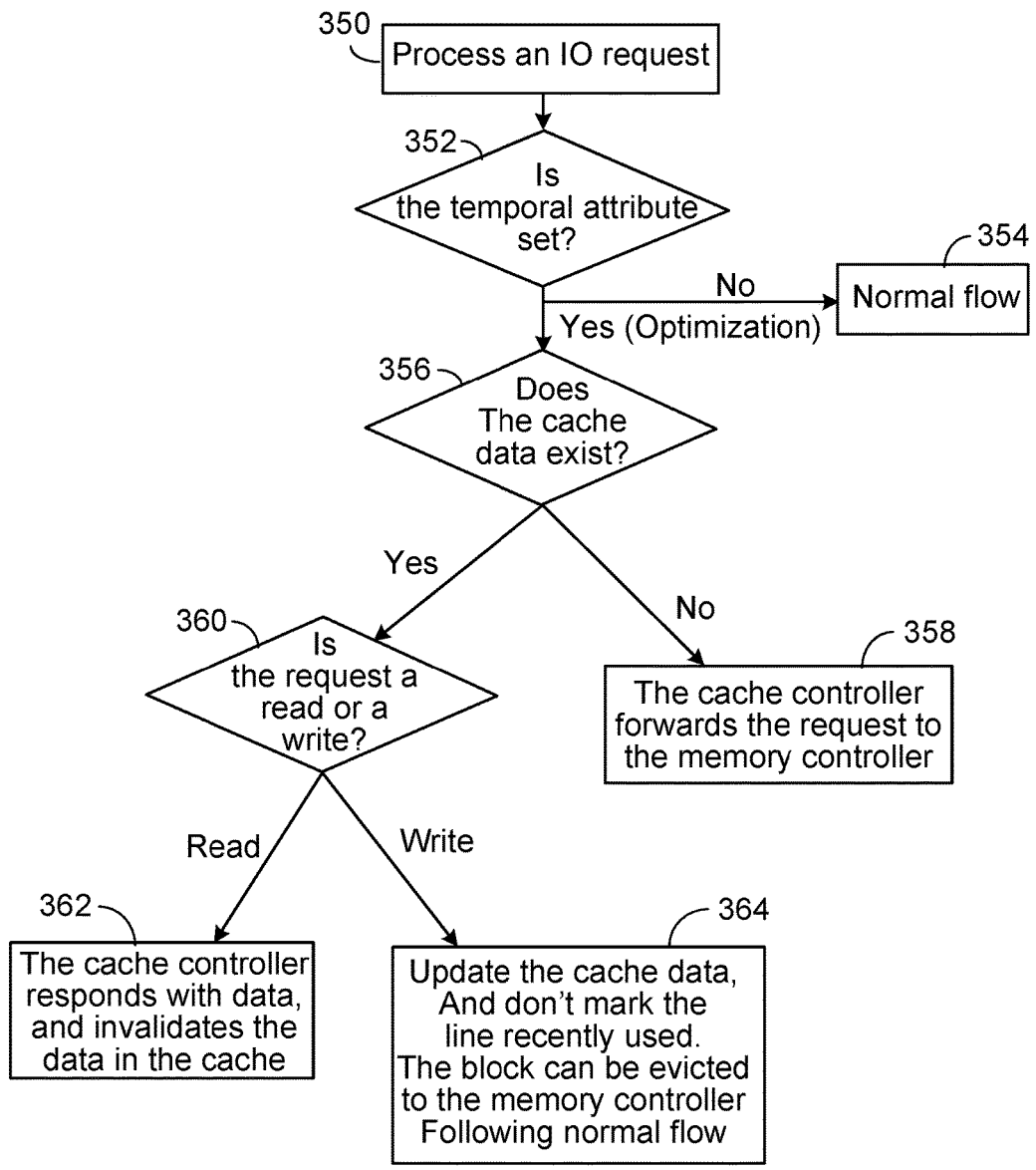
FIG. 19A is a flowchart of a method for handling an I/O request.

FIG. 19A shows an example of a procedure for handling an I/O request. A requesting core processes (350) an I/O request and determines (352) whether or not a temporal attribute is set. If not, then a normal flow proceeds (354). If so, then the cache controller determines (356) whether or not the requested data is cached. If the data is not cached, then the cache controller forwards (358) the request to the memory controller for retrieving the requested data, and the memory controller responds directly to the I/O system without the cache being polluted. If the data is cached, then the cache controller determines (360) whether the request is a read request or a write request. If the request is a read request, the cache controller responds (362) by providing the data, and invalidates the data in the cache. If the request is a write request, the cache controller responds (364) by updating the cached data without marking the cache line as recently used. The data block can be evicted to the memory controller following a normal flow.

Performance counters can be used for determining when it is appropriate to perform data rehoming procedures. When a cache miss occurs in a local L2 cache, the home location is checked. If there is a miss in the home location, the request is sent to the memory controller. In some implementations, the cores are configured to monitor the distributed cache performance, and adjust the homing configuration to improve the performance. For example, the cores maintain counters to count the number of various types of misses (for example, misses to remotely homed pages) and the cores can software to rehome a page, or to change the attribute of a page to make it only locally homed.

Figure 19B:
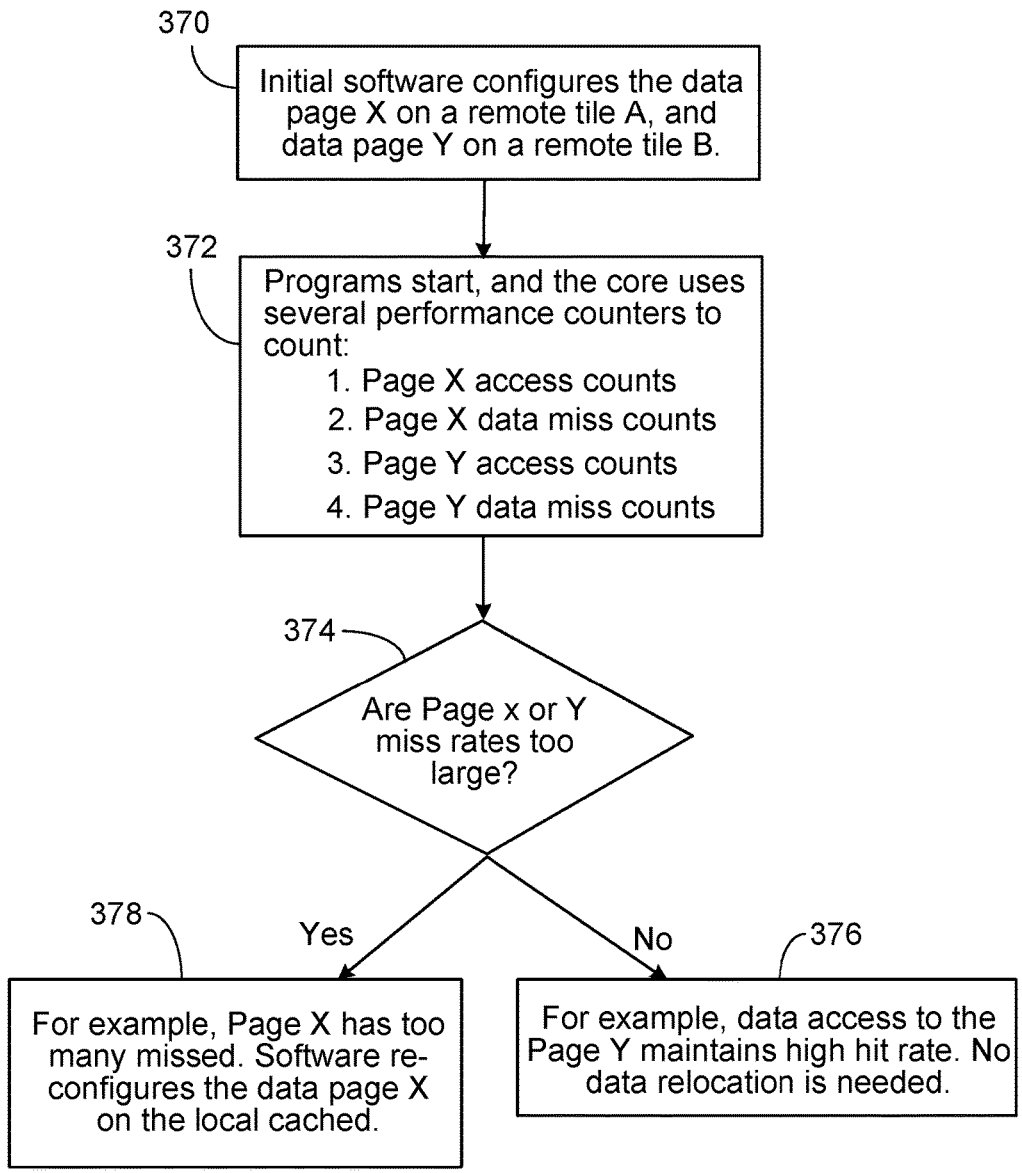
FIG. 19B is a flowchart of a rehoming operation.

FIG. 19B shows an example of a rehoming operation for a tiled array multicore processor. In an initial procedure for assigning home locations, software running on one or more tiles configures (370) a data page X to have a home location on a tile A and a data page Y to have a home location on a tile B. During the course of running a program that uses the data pages X and Y, the tile(s) monitor performance counters (372) to count: page X access counts, page X data miss counts, page Y access counts, and page Y data miss counts. Periodically, the tile(s) determine (374) whether the page X or Y miss rates (miss counts for a particular amount of time) are higher than a predetermined threshold. If not, then no relocation is needed (376). If so, then the tile(s) relocate (378) the home location of a page that has a miss rate larger than the threshold. For example, if page X has a large miss rate on tile C, then the tiles respond by relocating the home location of tile X onto tile C.

Some implementations include a scalable directory structure, hardware directory that tracks those cores that have the shared data. The hardware directory has a fixed numbers of pointers or bits (or mask bits) in a bit vector. One model is to have one bit to track one core, or a bit to track a fixed number of cores. When a bit tracks multiple cores, the bit vector directory has been compressed since the number of bits can be smaller than the number of cores on the chip (or chips). When a data update or invalidation is required, a message is sent to one core (or the set of cores) for the operation if the mask bit is set. This scheme may not scale well with increasing core counts if one bit always corresponds to one core. Similarly, it may waste bandwidth in the case where one bit corresponds to multiple cores by sending messages to those cores that do not have the data.

An alternative scheme is to use coherence domains that are no larger than the number of bits in the bit vector. So, if the bit vectors have 32 bits, the processor(s) can choose coherence domains that are no larger than 32 cores. This way, a data item will only be present in a maximum of 32 cores.

Another approach to support coherence domains is by configuring the way in which a bit in the directory bit vector corresponds to a set of cores. For example, a software programmable lookup table can facilitate the configurability. The table enables selection of one of multiple possible compression modes. The modes represent a number of cores sharing a particular mask bit, and the physical shape of the region in which the cores in a coherence domain reside. This configurability helps achieve scalability with increasing number of the cores in a multicore environment by flexibly assigning cores and region shapes to each bit in the bit vector directory entry. For example, the modes can be configured as follows.

One code has one core per mask-bit (which may be a default configuration). Another mode has two cores per mask-bit and the two cores are north-south adjacent to each other. In another mode there are two cores per mask-bit and the two cores are east-west adjacent to each other. Another mode has 4 cores per mask-bit and the four cores are physically arranged in a two-by-two pattern. There is another mode with 4 cores per mask-bit, and the four cores are arranged in an east-west row. In another mode there are 4 cores per mask-bit and the four cores are arranged in a north-south column.

Other modes are also possible. For example, there may be a mode with N cores per mask-bit, and the N cores are a physically arranged in an X-by-Y pattern, where X is the number of cores in the X dimension and Y is the number of cores in the Y dimension. Typically, X times Y will be equal to N. Other arrangements for 1D, 2D, 3D or more are also possible, where 1 bit can represent N cores in several dimensions.

Each mask-bit can also have a corresponding configuration register to further specify the participating cores. The feature removes non-existing cores or non-participating cores, or cores that are not in the given coherence domain. For example, if the core at the upper-left corner does not participate in the coherence domain in a 2×2 compression mode configuration, the configuration register can be programmed to exclude the top-left core.

FIGS. 18D and 18E show an example using a 9-bit directory. The example demonstrates how a 9-bit directory can make a 25-core coherence domain fit using a mode with 4 cores.

Referring to FIG. 18D, a configuration table 336, which can be used for interpreting the bit vectors corresponding to all of the cache entries in a cache. The table indicates the compression mode, 2×2 in this case. The table also has 9 entries corresponding to the 9 bits in the bit vector of the physical directory entries. Each entry indicates which of four cores in the 2×2 arrangement are valid.

FIG. 18E shows an example of an arrangement 338 of 25 cores arranged in a grid pattern (5 by 5). The number within each core (represented by each square) represents the specific bit in the bit vector of a directory entry that controls this core. For example, the four cores in the top left corner are controlled by bit 1 of the directory (corresponding to Entry 1 of the configuration table 336).

Each of the entries in the configuration table 336 further shows which of the cores controlled by that directory bit are actually participating in a coherence domain. For example, the 9 table entries indicate which cores participate in the coherence domains as follows.

Entry 1, 2, 4: all cores participate in the coherence domain
Entry 3, 6: only the north-west, and the north-east cores participate
Entry 5: all but the south-east one participate
Entry 7, 8: only the north-west and the south-west ones participate
Entry 9: only the north-west one participates 11 Mechanism for Multi-Channel Context-Based DMA Engine in a Multicore Processor A Multicore Processor can be configured to include a DMA Engine that has multi-context and multi-channel support with configurable resource allocation. In a multicore processor, different types of processing modules (for example cores, or I/O modules) may be configured to initiate DMA operations. In some processors, the number of DMA engines that are available to perform those operations may be limited. The access to DMA engines among all processing modules can be provided in various ways. For example, each processing module may be configured to control its own DMA engine, or its own sets of DMA engines.

Each application may have different DMA requirements. Each application may need hardware acceleration for tasks other than DMA operations. The workload may change at run-time. Resource sharing and resource allocation may introduce other potential constraints.

Some techniques for configuring a multicore processor to provide DMA operations include one or more of the following.

DMA operations are supported through the MiCA interface. A DMA opcode is defined.

Multi-context support is provided for DMA operations. Each process or processor has its contexts or shared contexts to access the hardware DMA engine.

DMA engines have multiple physical channels. The channel resources can be shared with other hardware acceleration tasks.

A bypass path is implemented on the hardware acceleration engines.

Scheduling from Context to Task scheduler can be configurable, at run-time.

Binding from Opcode to Task scheduler can be configurable, at run-time.

Binding from Task scheduler to Task engine can be configurable, at run-time.

One or more hardware accelerators can be connected to the multicore processor (e.g., an array of tiles with each accelerator coupled to one or more tiles in a mesh network interconnecting the tiles as shown in the example of FIG. 16A). Each accelerator has an interface for accessing the accelerator functions, such as the MiCA interface described herein.

A DMA opcode is defined in the MiCA interface. Other DMA related operands are also defined, for example, source virtual address, destination virtual address, transfer size, stride, etc. These operands can be used for a DMA operation, as well as acceleration tasks, for example encryption and compression, etc.

The MiCA interface provides multi-context support, and is accessible to all of the processing modules. Each processing module can access the accelerator through its own or own sets of contexts, or through a shared set of the contexts. Each context has its own context registers for control and status. The MiCA interface provides the translation from a virtual address to the corresponding physical address.

The MiCA interface provides multi-channel support. Channels are used by the accelerators to send and fetch data from the memory system. Physical resources can be channelized. In addition to multi-context support enabling multiple processing modules to be concurrently interacting with the accelerator, multi-channel support enables multiple outstanding memory transfers. Each channel represents a logical memory transfer. Each channel can include resources so that data to different channels can be stored concurrently as the data arrives (in any order) from the memory system. Multiple channels enable multiple memory requests to be in flight simultaneously. For example, each channel can have its own buffer to queue the packet requests and packet responses from the network connections. Each channel can have its own hardware reordering logic if multiple network packets are returned out of order. Each channel can have its own hardware logic to deal with address alignment. Each channel is responsible to move data from the source memory subsystem (for example, cache or external DRAM) to the accelerator; to move data from the accelerator to the destination memory subsystem (for example, cache or external DRAM). Flow control logic can be implemented to arbitrate between the multiple channels and the physical network connections, for example, when all channels use one physical network connection. Each channel can be assigned with an allocation weight to use the physical network resources.

Figure 20A:
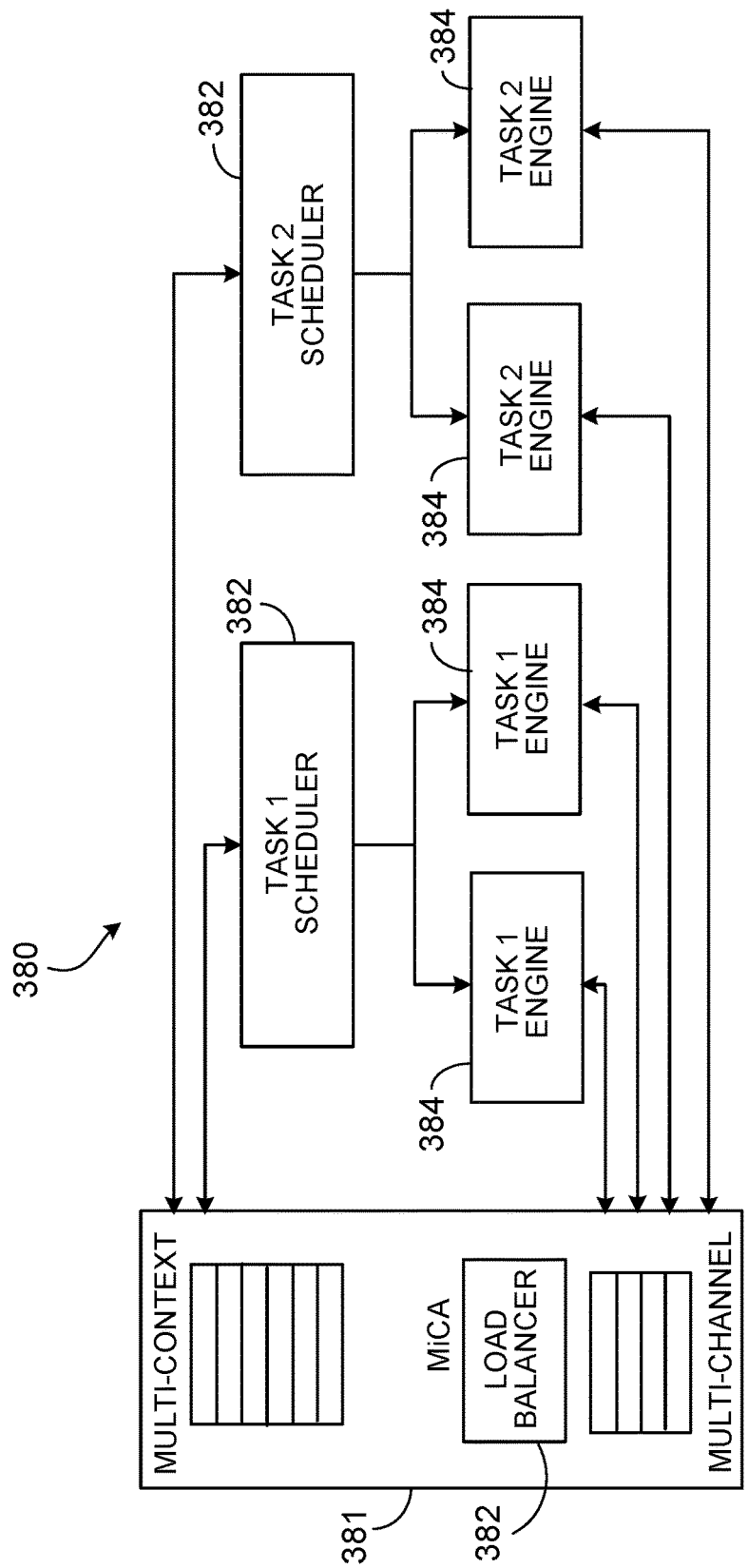
FIGS. 20A and 20D-20F are block diagrams of accelerators.

FIG. 20A shows an example of an accelerator 380 with a MiCA interface 381. The accelerator 380 includes task schedulers 382 and task engines 384, including a Task 1 Scheduler for scheduling tasks for two Task 1 engines, and a Task 2 Scheduler for scheduling tasks for two Task 2 engines. The MiCA interface 381 includes a load balancer 386, and provides access using multiple contexts and multiple channels.

The accelerator 380 provides acceleration to certain tasks, for example, encryption, compression, etc. Each task may use one or multiple task engines 384, and in this example the accelerator 380 includes two tasks (Task 1 and Task 2), each having two task engines 384. The number of task engines and the number of channels can be implementation specific. In one example, the number of task engines is same as the number of the channels, and one to one mapping can be implemented.

Figure 20B:
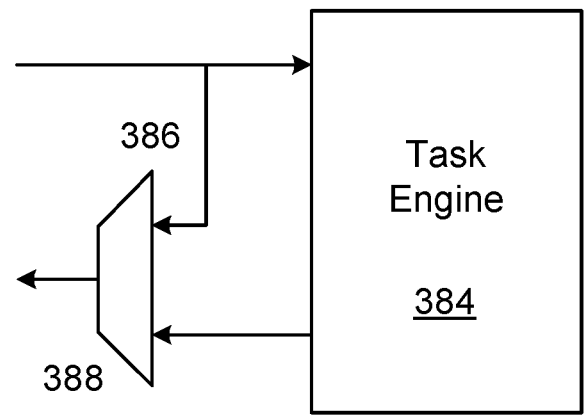
FIG. 20B is a block diagram of a task engine.

Referring to FIG. 20B, each task engine 384 can include circuitry that provides a bypass path 386, where the output of the task engine 384 is selectively provided, by multiplexer 388, either from an output port of the task engine 384 or from the input via the bypass path 386. Together with the existing multi-context logic and the channel logic (for the task engine), the bypass path 386 provides a basic function of the DMA, that is to copy without modification. Thus, the accelerator engines are able to support DMA operations as a basic operation in which the task engine does nothing else.

Figure 21:
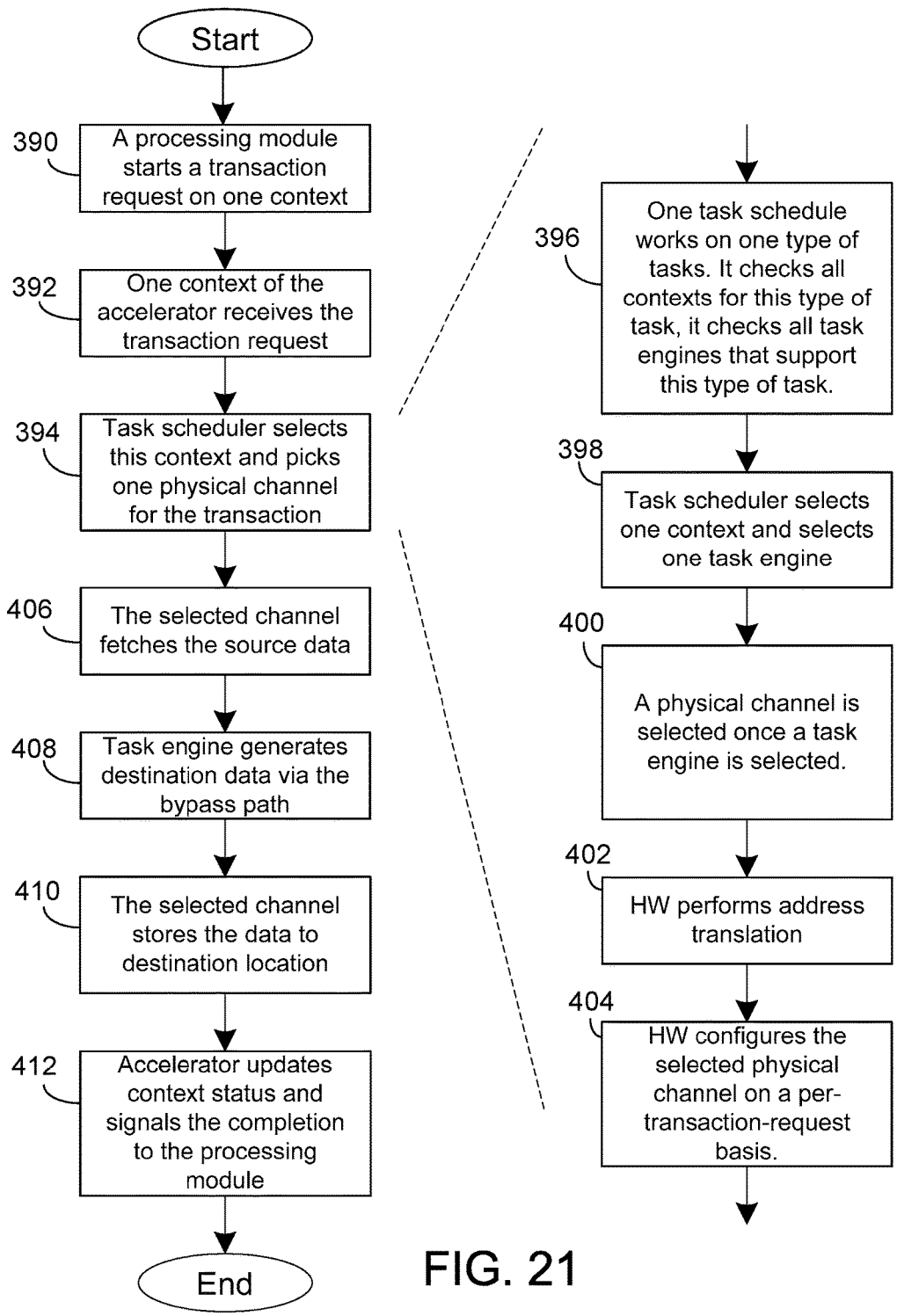
FIG. 21 is a flowchart of a DMA operation.

FIG. 21 shows a flowchart of an example of the sequence of steps in a DMA operation. A processing module (e.g., a core) sends (390) a transaction request to a targeted context. The accelerator receives (392) the transaction request (for example, a DMA request) in association with the targeted context. A DMA request specifies a source and destination, and other information related to the DMA operation. A task scheduler selects (394) resources. The resource selection includes checking (396) the contexts for the particular type of task and checking the task engines that support the particular type of task. The task scheduler selects (398) a context and an available task engine for the selected context. The task scheduler also selects (400) a MiCA physical channel. A MiCA physical channel handles the network connections, in other words, the connections to the on-chip interconnect from which the data will arrive, or be sent. The data transfers can be done using cache lines and a coherence protocol. The binding between a task engine and a physical channel can be a one-to-one mapping. Hardware is used to perform (402) address translation from virtual address to physical address, for both source address and destination address. For each DMA request, the hardware configures (404) the selected physical channel (dynamically on a per-transaction-request basis) based on source physical address, destination physical address, transfer size, stride, etc. The physical channel starts to fetch (406) source data and the task engine generates (408) the destination data via the by-pass path (in the case of a DMA request), and the physical channel stores (410) destination data to the destination location. The accelerator updates (412) the context status after the transaction request is completed and signals the completion to the processing module that requested the transaction.

Figure 20C:
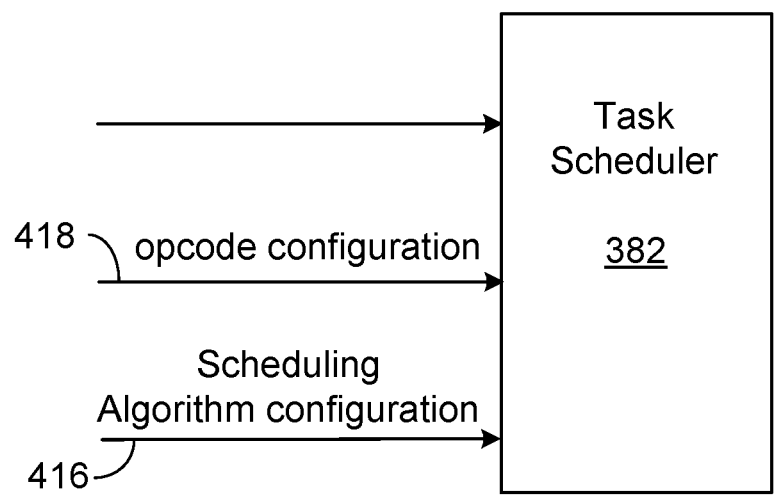
FIG. 20C is a block diagram of a task scheduler.

FIG. 20C shows a configurable task scheduler 382. The task scheduler 382 is used to schedule operations specific to the task engines. A scheduling algorithm can be configured by receiving a scheduling algorithm configuration input 416. For example, the task 1 scheduler picks one requesting context, and then rotates to another requesting context, if a round-robin algorithm is configured.

The binding of the Task scheduler and the Task engine can be configured via the task engine configuration. For example, which engines can be dispatched to from this task scheduler.

The binding of the scheduler and the supported opcode can be configured by receiving an opcode configuration input 418. For example, the task engines associated with this task scheduler supports one type of opcode, but not the other.

The scheduling algorithm configuration, the task engine configuration, and the opcode configuration are set up at run-time in an application.

Figure 20D:
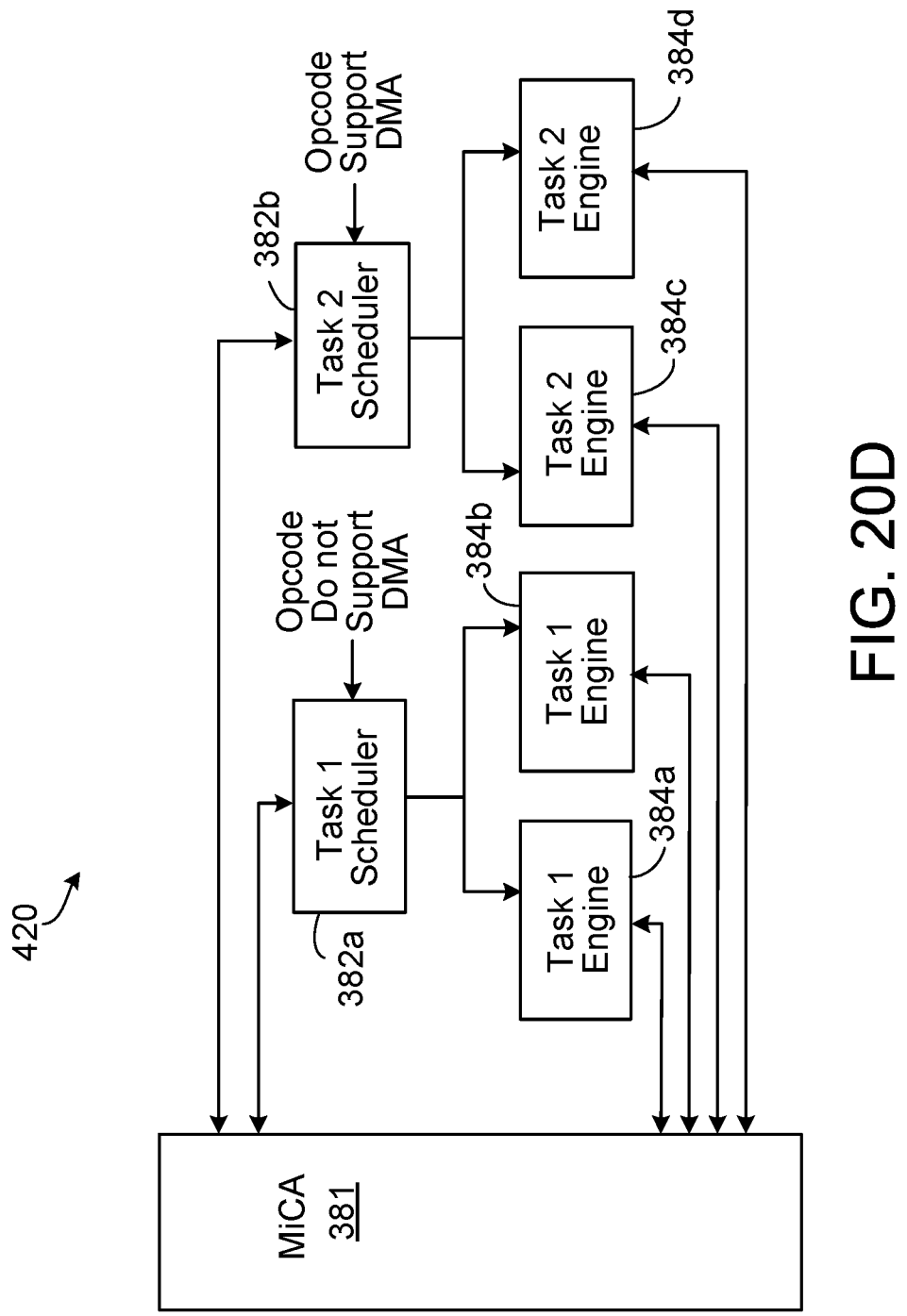

Referring to FIG. 20D, an accelerator 420 includes a Task 1 Scheduler 382a for Task 1 engines 384a-384b that are configured to perform tasks that are significant to performance, and a Task 2 Scheduler 382b for Task 2 engines 384c-384d that are configured to perform tasks that are not as significant to performance. In this example, DMA operations are assigned to the Task 2 Scheduler 382b through the opcode configuration. For example, some of the Task 2 engines can be enabled and others can be disabled through the task engine configuration, to meet a lower performance requirement. By providing configurability based on support for particular opcodes, DMA and other tasks can be shared on one scheduler.

Figure 20E:
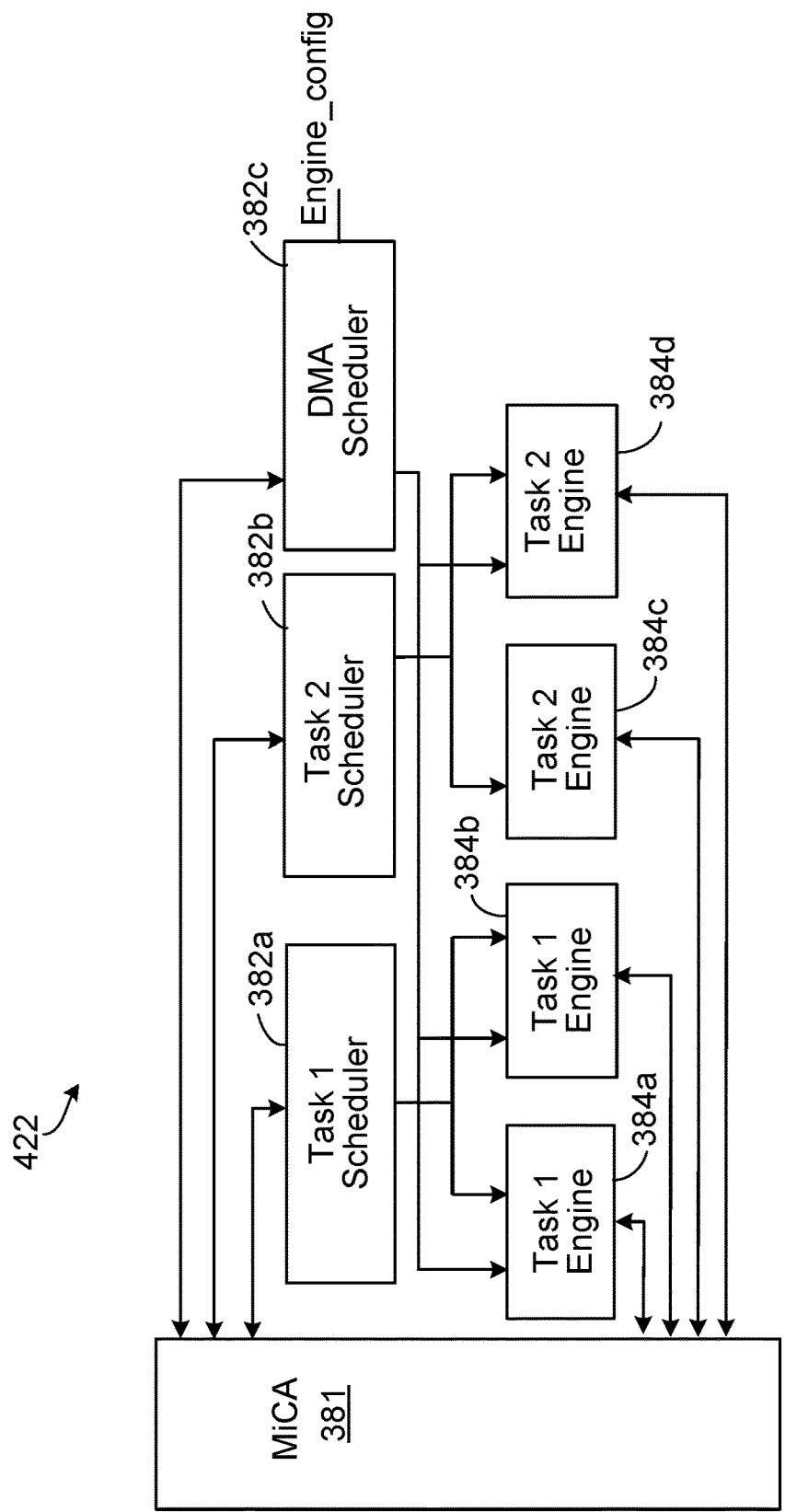

Referring to FIG. 20E, an accelerator 422 includes a DMA scheduler 382c. The DMA scheduler 382c includes an engine_config input that specifies which task engines 384a-384d will be used to support the DMA operations.

Figure 20F:
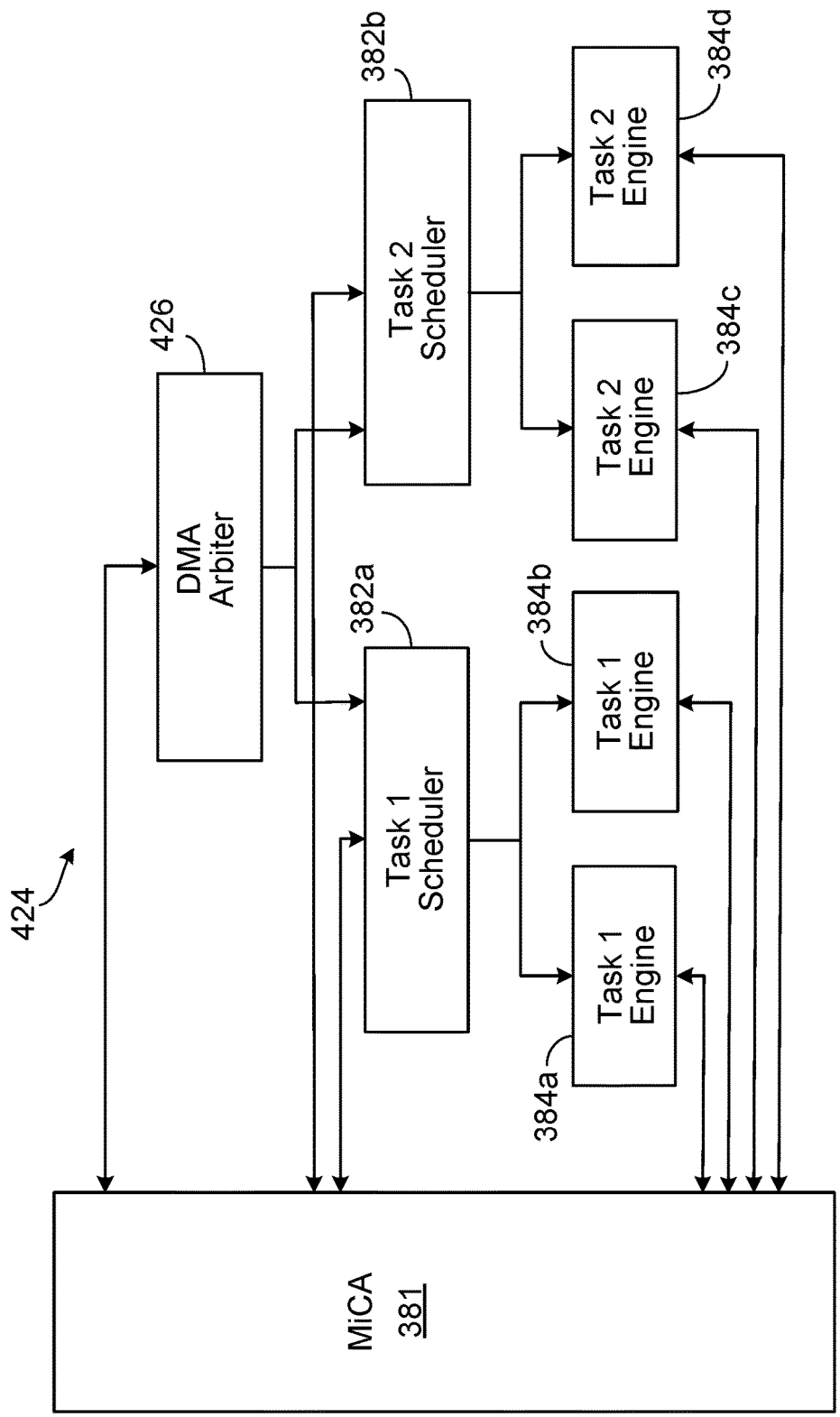

The DMA operations and other tasks to be scheduled by the Task Schedulers for execution by a Task Engine can be assigned dynamically, for example, through hierarchical arbitration. Referring to FIG. 20F, an accelerator 424 includes a DMA Arbiter 426 that dynamically arbitrates between the Task 1 Scheduler 382*a* and Task 2 Scheduler 382*b*. A configurable hashing mechanism is used to optimize DRAM bank and rank allocations. The DMA engines described previously can transfer data from on-chip caches or from external memory, such as DRAM. Bank related optimizations are possible for DRAMs.

Large amount of external DRAMs are used in some applications with multicore processors. The DRAM modules may be organized as ranks. Some ranks may be in the same DIMM socket, some ranks may be in a different DIMM socket. Each DRAM rank has internal bank structures. One DRAM page can be opened on each DRAM bank. There is some overhead to open a new page on the same bank. There is some overhead to turnaround from one rank to another rank. To improve DRAM bus utilization, it is desirable to utilize more banks on the same rank, and utilize more ranks in the system. Various techniques can be used to provide hashing for optimizing the DRAM bank and rank allocation. Logical rank and bank can be converted to physical rank and bank, based on a hashing function. A physical bank is an internal structure of the physical memory (e.g., of a DRAM). A physical rank is a set of memory modules (e.g., DRAM modules) connected to a particular system port (e.g., chip select), which may be accessed concurrently. Hashing function can be applied on per-rank and per-bank basis. Address bits in the hash functions can be configurable based on applications.

Figure 20G:
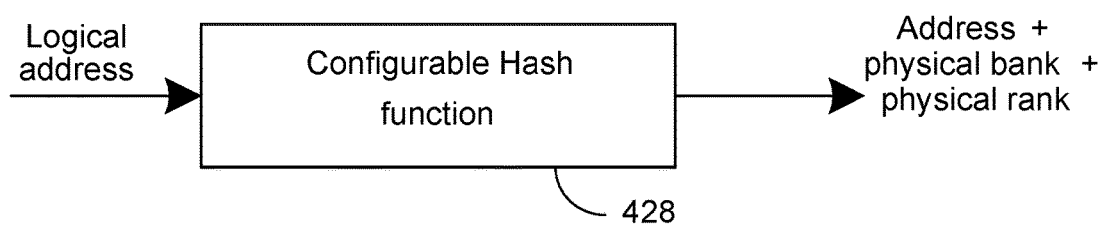
FIG. 20G is a block diagram of a hash function.

A memory controller supports multiple DRAM ranks, for example, using N rank bits. Each DRAM rank support multiple DRAM banks, for example, using M bank bits. FIG. 20G shows an example of a configurable hash function 428 that can be used to convert a logical memory address to an address of a physical bank on a physical rank. In some implementations, each bank bit has a configurable hash function, and each rank bit has a configurable hash function.

For example, the following hash functions can be used.
bank[0] is the default first bank bit to index the DRAM banks, bank[M−1] is the default (M−1)th bank bit to index the DRAM banks. hashed_bank[0] is the first bank bit after the hashing.

A function for a hashed bank is:
hashed_bank[i]=hash (bank[i], other configurable address bits)
where i=0 to M−1, inclusively, bank[i] is the default bank bit [i] to index the DRAM banks, and hashed_bank[i] is the bank bit [i] after hashing, hashed_bank[i] is the final bank bit [i] to index the DRAM banks.

A function for a hashed rank is:
hashed_rank[j]=hash (rank[j], other configurable address bits)
where j=0 to N−1, inclusively, rank[j] is the default rank bit [j] to index the DRAM ranks, and hashed_rank[j] is the rank bit [j] after hashing, hashed_rank[j] is the final rank bit [j] to index the DRAM ranks.

A configurable function can be used to select which address bits are used in the hash function. For example, the following functions can be used:
Address vector={addr[i], addr[i−1], . . . , addr[1], addr[0]}
Configurable selection vector={cfg_en[i], cfg_en[i−1], . . . cfg_en[1], cfg_en[0]}
Selected address={addr[i] & cfg_en[i], addr[i−1] & cfg_en[i−1], . . . addr[1] & cfg_en[1], addr[0] & cfg_en[0]}

The hash function can be implemented based on the selected address bits. For example, the following function can be used:
Final_bank[x]=bank_addr[x]^hashed_bank[x]
where hashed_bank[x]=(addr[i] & cfg_en[i])^(addr[i−1] & cfg_en[i−1])^ . . . ^(addr[1] & cfg_en[1])^(addr[0] & cfg_en[0]).

The following function can be used:
Final_rank[y]=rank_addr[y]^hashed_rank[y]
where hashed_rank[y]=(addr[i] & cfg_en[i])^(addr[i−1] & cfg_en[i−1])^ . . . ^(addr[1] & cfg_en[1])^(addr[0] & cfg_en[0]).

To avoid aliasing, it may be desirable not to enable the same address for bank_addr[x] and addr[i], i.e. i !=x. Otherwise, bank_addr[x]^addr[x]=0, no matter whether bank_addr[x]=1 or 0.

The bit offset for bank address can be different depending on the DRAM page size. An operating system typically supports multiple page size. When a new page is allocated, certain address bits tend to toggle more than the others.

The configurable selection vector can be different based on the banks and ranks. For example, a different cfg_en vector for bank[0] and bank[1] can be used, and a different cfg_en vector for rank[0] and rank[1] can be used.

The hash function can be disabled, for example, not to hash to all eight banks on the same rank.

The following function can be used:
Final_bank[x]=bank_addr[x]^(hashed_bank[x] & cfg_bank_hash_en[x])
where hashed_bank[y]=(addr[i] & cfg_en[i])^(addr[i−1] & cfg_en[i−1])^ . . . ^(addr[1] & cfg_en[1])^(addr[0] & cfg_en[0]).

The hash function can be disabled, for example, not to hash to rank 2 and rank 3 if there are only two ranks in the system.

The following function can be used:
Final_rank[y]=rank_addr[y]$^4$ (hashed_rank[y] & cfg_rank_hash_en[y])
where hashed_rank[y]=(addr[i] & cfg_en[i])^(addr[i−1] & cfg_en[i−1])^ . . . ^(addr[1] & cfg_en[1])^(addr[0] & cfg_en[0]).

12 Configuration Modules for Memory Controller Performance Monitoring within a Multicore Processor A multicore processor has different types of processing modules (e.g., cores, coprocessors, I/O devices). Each processing module may initiate memory requests. The characteristics of the memory requests may not be the same from the processing modules. A performance monitoring device can be included inside a module such as a memory controller.

Performance monitoring devices can be configured to provide feedback to optimize the applications, especially on performance important memory requests. The memory request pattern can be complex when the memory requests come from multiple types of processing modules. If the performance monitoring is not selective on the targeted memory requests, the performance statistics can be misleading. For example, one configuration of an application that has a higher DRAM page hit rate overall but lower page hit rate may be less desirable than another configuration of the same application that has a lower DRAM page hit rate overall but higher page hit rate on important tasks.

An alternative is to provide a configuration module for the performance monitoring devices. The selected memory requests can be used in the performance data collection.

Techniques for providing a configuration module for the performance monitoring devices include the following.

In one technique, a configuration module (such as the Request Control List) is implemented in the memory controller to specify the type of memory requests (writes, prefetches, etc.) to be monitored. The configuration module can be configured by the software at any time. The software can configure the module in response to a request by a user through a debugger or performance analysis interface (for example, to determine why a program is running slow, the user might want to check the number and types of requests at various memory controllers).

In another technique, the memory controller checks each memory request, and determines whether the memory request type is to be tracked in the performance monitor based on the information in the configuration module. Performance data collection can apply to selected memory requests.

In another technique, each memory controller has its own configuration module that can be customized on a controller basis.

In another technique, software accessible performance counters in the memory controllers can be incremented depending on the type of memory reference seen. For example, one configuration could monitor the latency within the memory controller for various types of memory requests.

In another technique, the configuration module can be used to specify additional properties (such as the memory request priority).

Figure 22A:
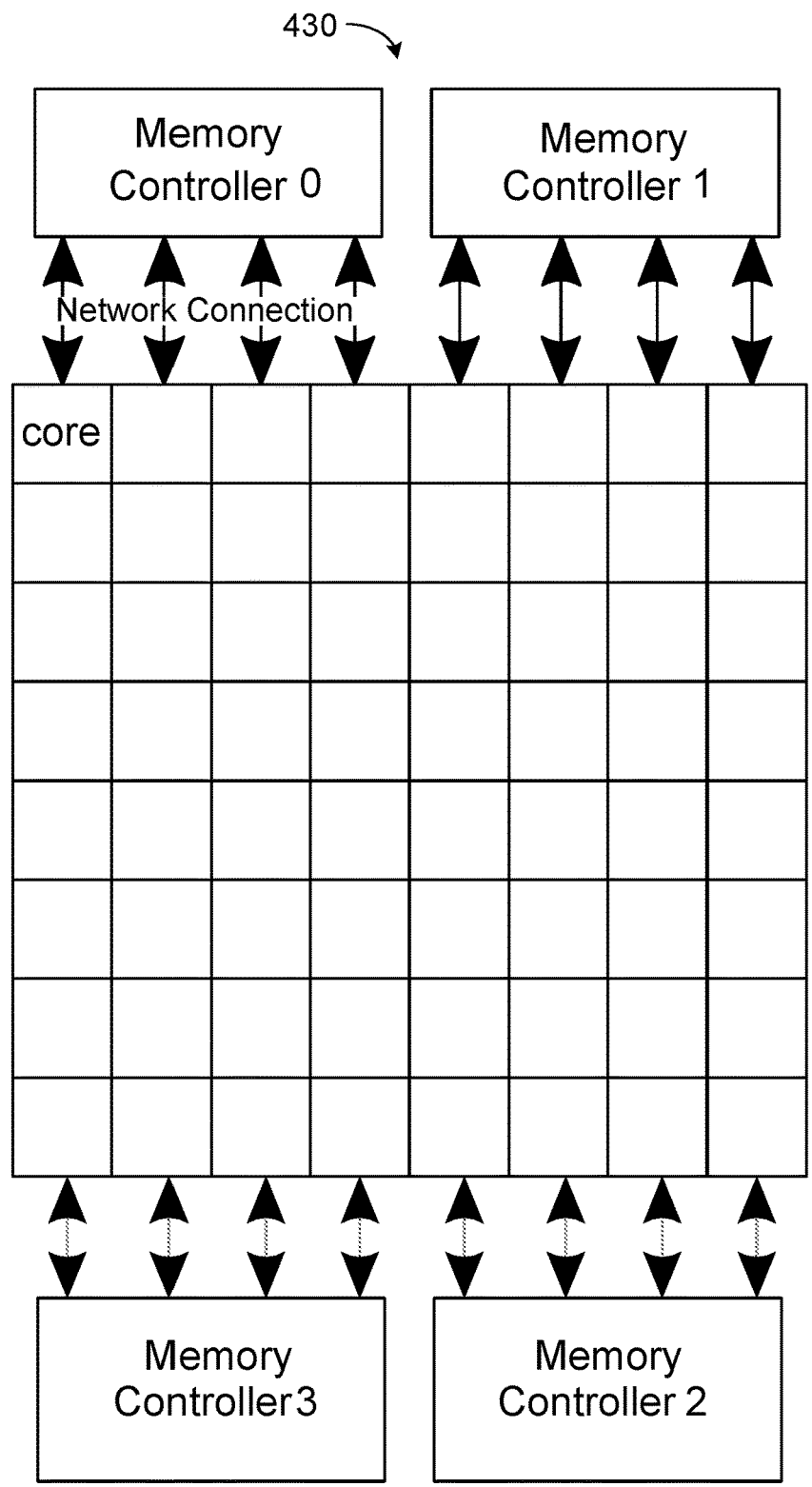
FIG. 22A is a block diagram of a multicore processor.

FIG. 22A shows an example of a multicore processor 430 that includes cores, arranged in this example as tiles of a tiled processor array, and four memory controller modules Memory Controller 0, Memory Controller 1, Memory Controller 2, and Memory Controller 3. The memory controllers and the cores are connected through a mesh network. A memory controller may have multiple network connections to the cores. A memory request can have many associated attributes including, for example, one or more of the following:
  which processing module requests the memory reference, for example, which core, or which I/O controller or I/O device.
  which route does the memory request come from, for example, a route identified by a network connection number
  what is the request type, for example, read, write or compare-and-exchange or other synchronization request
  what is the memory request address
  what are the memory flags in the request, for example, a data stream or an instruction stream, a L2 miss or a L3 miss, a prefetch or not, etc.

FIG. 22B shows a Request Control List 431 that is included in each memory controller to control memory requests to memory coupled to the memory controller (e.g., external DRAM). The Request Control List 431 is provided as a structure, e.g., a table in memory (e.g., in a register bank or accessible to the memory controller) that outputs priority level for a given request. The Request Control List 431 includes multiple entries (Entry 0-Entry n) that correspond to rules, with each entry having multiple sections. For example, entry 432 includes: a "core/IO" section identifying a core or I/O controller, a "network" section identifying a network connection, a "type" section identifying a type of request, and a "flag" section identifying one or more flags. The entries in the Request Control List 431 also specify additional properties, which include "track" and "priority" properties in this example.

Each section specifies one aspect of the memory requests, and can be configured to cover multiple cases that may occur for that aspect. For example, for a "prefetch" aspect, two bits are used to identify one of the following cases (one bit is a "prefetch" flag, and one bit is a "not" flag).
  If prefetch=1 and not=0, then only any prefetch request is a match.
  If prefetch=1 and not=1, then any request (no matter prefetch or not) is a match; in other words, the prefetch flag is a don't-care. Don't-care results in a match.
  If prefetch=0 and not=1, then any non-prefetch request is a match.
  If prefetch=0 and not=0, then any request will not be a match. In this case, this entry of the Request Control List 431 indicates that this entry is not valid or is not defined.

A request comes from one of the processing modules. If some cores in a group of cores are enabled by a rule entry, then any request from that group of cores is a match.

A memory request matches to an entry in the Request Control List 431 only if all sections of an entry match. For each memory request, the memory controller processes the rules of all entries in the Request Control List 431.

If there is a match for a particular memory request, then an additional property for this memory request can be specified. For example, the "track" field specifies that this memory request is to be tracked in the memory performance monitor. For example, the "priority" field specifies the priority level of this memory request. The memory controller scheduler takes into account the priority in its scheduling decisions.

Figure 23:
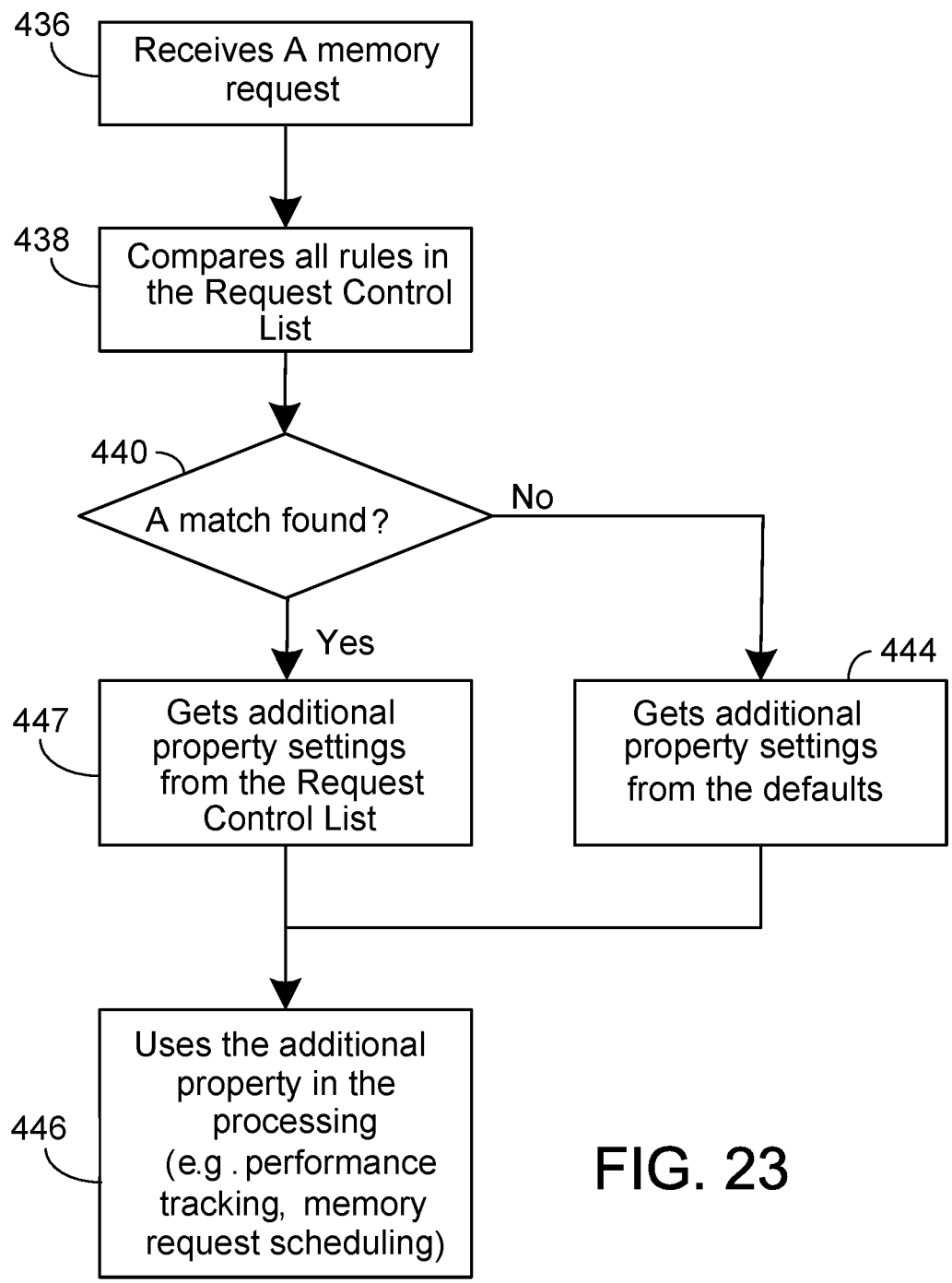
FIG. 23 is a flowchart of a method for handling a memory request.

FIG. 23 shows an example of a process for defining additional properties for a memory request. A memory controller receives (436) a memory request and the memory controller compares (438) all rules in the Request Control List 431 to the received request. The memory controller determines (440) whether or not a match is found for one or more of the rules. If a match is found the memory controller gets (442) additional property settings from the Request Control List 431. If a match is not found the memory controller gets (444) additional property settings from default settings. The memory controller uses (446) the additional property in the processing (e.g., performance tracking, or memory request scheduling) of the request. The Request Control List 431 can be configurable by the system software for a given application. The rules can be defined based on any memory attributes. For example, the following rules can be defined: (1) a rule for all write requests from a specified I/O module (for example a high data rate XAUI); (2) a rule for all read requests from a specified core (for example a core that is in performance bottleneck); or (3) a rule for all compare-and-exchange requests from an identified group of cores.

The memory controller can be configured to include performance monitors, for example, performance counters. After the Request Control List 431 is configured, the memory controller keeps track of the selected requests in performance counters. The meaning of the performance counters can be reconfigured depending on what memory requests are to be tracked.

After a memory request is identified to be tracked, the "track" bit is carried around with this request throughout the memory controller. The memory controller determines when a tracked memory request enters a processing pipeline and leaves the processing pipeline. The latency within the memory controller for various types of requests can be monitored.

A core can be implemented as a memory profiler core. It can initiate memory requests and receive responses from the memory controller. Statistics can be collected based on the counters on the core.

In one implementation, the round-trip latency (from the profile core and to the profile core) can be detected by the profile core. The latency (within the memory controller) can be detected by the performance monitor in the memory controller, for example, when certain memory requests from the profile core are configured to be tracked. The latency outside the memory controller is the difference between the two measured latencies.

Each memory controller has its own Request Control List. The Request Control List can be customized by the system software because each memory controller may be used differently in applications. For example, the rules in the Request Control List may not be same on each memory controller.

13 Mechanism for Memory Controller Coherency Handling on Atomic Read-Modify-Write in a Multicore Processor DRAM operations may be burst-oriented, for example, the minimal transfer size may be a burst of 4 words (e.g., for DDR2 SDRAM). If only a part of the burst data is to be modified in the DRAM, data mask pins can be used so that only part of the burst data is modified. Data mask pins are extra pins that come out from the multicore chip in addition to the DRAM address and data pins. These data mask pins indicate which part of the burst data is to be modified. Burst data can be several words in length. This allows only a part of the burst data to be modified (e.g., modify only one of the 4 words of the burst data), and so does not require that entire burst data be written. The data mask pins increase the pin cost on the memory controller. When ECC bits are used, background data is read in order to update the ECC bits. Background data may need to be read even when data mask pins are presented on the memory controller.

Multiple processing modules (for example, cores and I/O modules) in a multicore processor may be configured to access the DRAM at the same time. To avoid the contention, the processing modules can be configured to apply a synchronization mechanism, for example a lock, so that the data integrity on the DRAM can be maintained. Synchronization incurs additional overhead in system operations.

A coherency structure can be included in the memory controller, such as s structure that implements a read-modify-write atomic operation.

Techniques for managing coherent memory access (e.g., to memory in a multicore processor 430) include the following. A memory controller implements coherent structures to make a read-modify-write operation as an atomic operation. An atomic read-modify-write operation allows other memory requests to be scheduled between the background read and merged data write-back. DRAM bus utilization can be improved. External mask pins can be eliminated to reduce system cost with the assist of the atomic read-modify-write operation. A coherent structure removes some of the system synchronization when multiple cores are to perform read-modify-write operations. A coherent structure supports atomic DRAM background scrubbing operations.

Some memory requests call for a read-modify-write operation. For example, in some implementations the minimal DRAM burst has 64 bytes, so a non-64-byte write becomes a read-modify-write if ECC bits are to be updated. Such memory requests can be partitioned into two phases: read the background data from DRAM, and then write-back the merged (where a piece of the read DRAM data is modified) data to DRAM.

Coherent structures are implemented to keep track of the states, for example, whether background read is required or not, whether the background read request can be scheduled (for example, is there any internal buffer available to store the background read data, is there any other memory request going for the same memory address, etc), whether the background data is returned, whether the background data is merged with the foreground data to be written, whether the merged data is written back to DRAM.

Figure 24A:
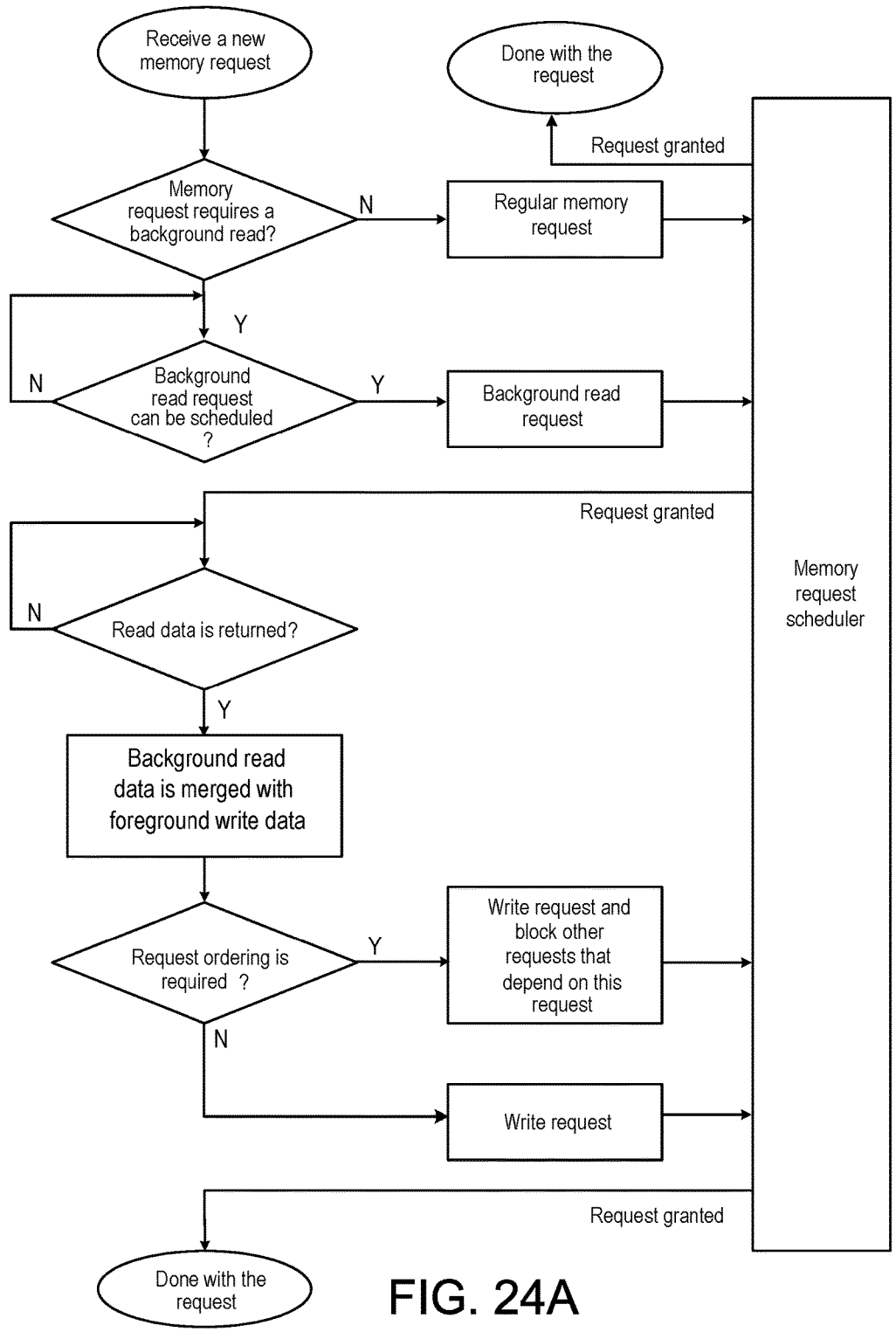
FIG. 24A is a flowchart of a read-modify-write operation.

FIG. 24A shows a flowchart of an example of the event sequence for the read-modify-write operation. A merge buffer is used to merge the background data and foreground data from a memory request. The number of merge buffers depends on the number of outstanding read-modify-write requests to be supported.

A memory request may have many associated attributes, for example, what the memory reference address is, where the response will be sent to. The attributes will be kept along with the memory request when the state transition occurs.

To improve the DRAM bus utilization, other memory requests can be scheduled between the background read and merged data write-back. For example, background read+ other memory read+other memory write+merged data write-back.

A read-modify-write memory request is kept as an atomic operation. If other memory requests are scheduled between the read and the write-back, request address should not collide with each other to keep data coherency. Address comparison logic is implemented to check the addresses among the pending memory requests. Request ordering can be enforced if multiple memory requests want to access the same address.

Figure 25A:
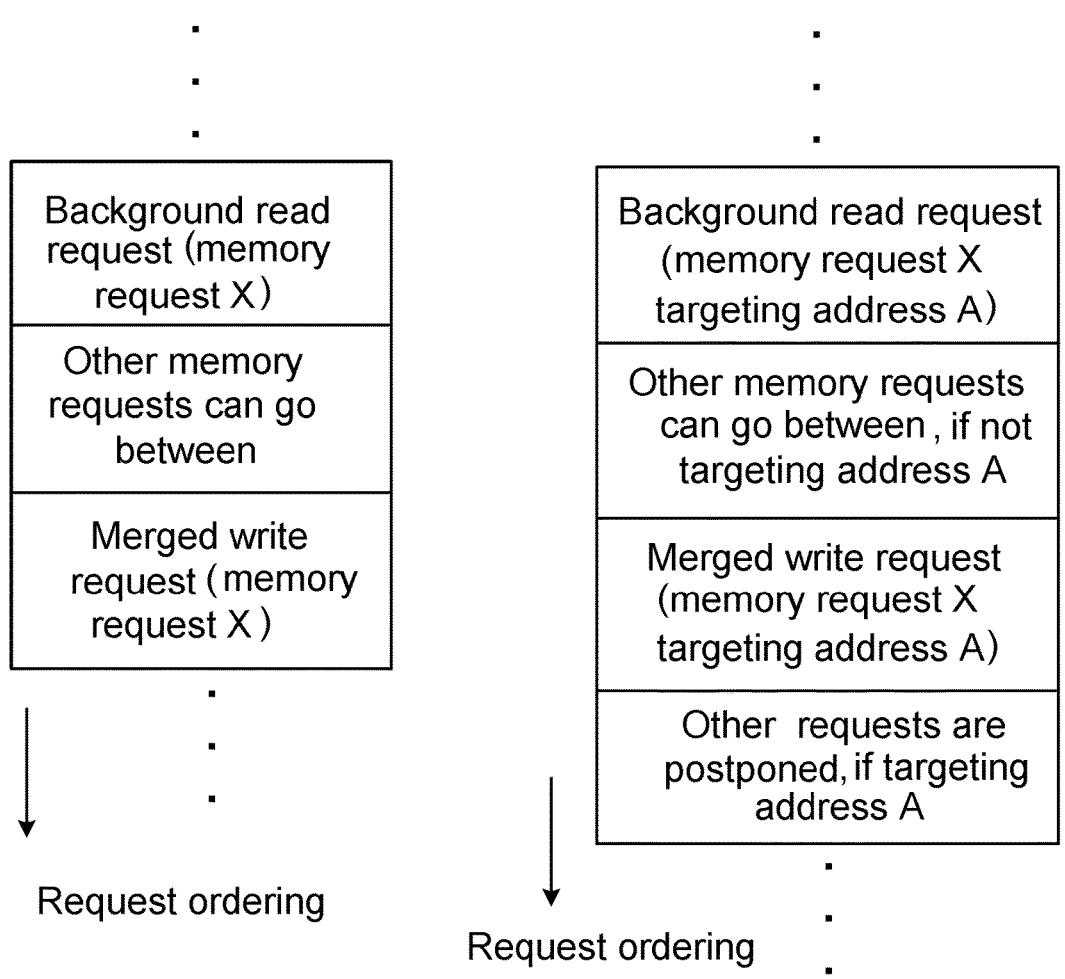
FIG. 25A is a diagram of request sequences.

FIG. 25A shows two examples of request sequences. In each of a first sequence and a second sequence, a read-modify-write operation is to be performed corresponding to a memory request X, which targets a memory address A. In the first sequence, the background data is first read. While the merging is being performed, other memory requests are allowed to go to memory. Then, the merged write request corresponding to memory request X goes to memory. This first sequence is considered unsafe. In a second sequence, the background data is first read, as in the first sequence. But, while the merging is being performed, other memory requests are allowed to go to memory, provided that they do not target address A. If intervening memory requests arrive that must target address A, then they are postponed until after the merged write to address A. Then, the merged write request corresponding to memory request X goes to memory. Finally, the postponed memory operations targeting address A are performed. This second sequence is considered safe.

Full DRAM burst operations are performed on background fetch and merged data write back. There is no need for data mask pins, which reduces chip cost.

Multiple processing modules in a multicore processor may be configured to access the DRAM. Because the read-modify-write operation will be enforced as an atomic operation in the memory controller, software locks could be avoided if different processing modules are to perform read-modify-write operations at the same time.

Figure 25B:
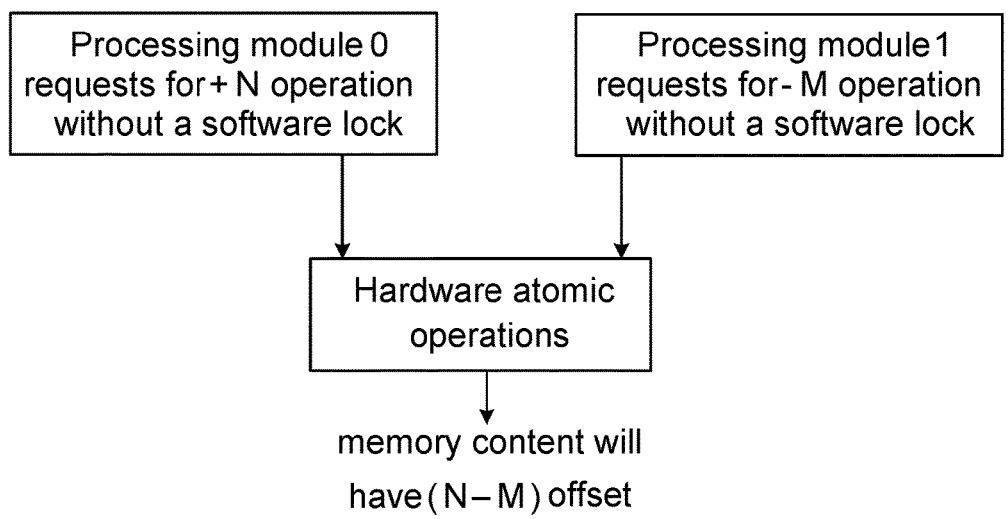
FIG. 25B is a diagram of a procedure for performing atomic operations.

Referring to FIG. 25B, assume that a performance counter is implemented at address A and Processing module 0 is configured to increase the counter by N at address A (requesting a +N operation without a software lock), and processing module 1 is configured to decrease the counter by M at address A (requesting a −M operation without a software lock). Hardware atomic operations are performed for both of these operations. In this example, the counter will be adjusted by N−M (and memory content will have a (N−M) offset), no matter what order in which these two atomic operations are scheduled. DRAM may incur soft errors. A single bit error can be fixed by conventional ECC logic. A single bit error should be scrubbed before multiple bit errors are accumulated in the DRAM. The scrub operation first reads DRAM, and then writes back with ECC correction if single bit error is detected. DRAM does not have to be in a sleep mode because the scrub operation is kept as atomic by the memory controller. Application software can still access the DRAM on any address while the scrub operation occurs in the background.

A scrub operation does not require foreground data. Entire background data with ECC correction will be written back to DRAM. To skip the conditional write-back if no ECC error is detected, one signal is introduced, for example, the second phase of the write-back can be retired after the background data is returned and ECC integrity is confirmed.

Figure 24B:
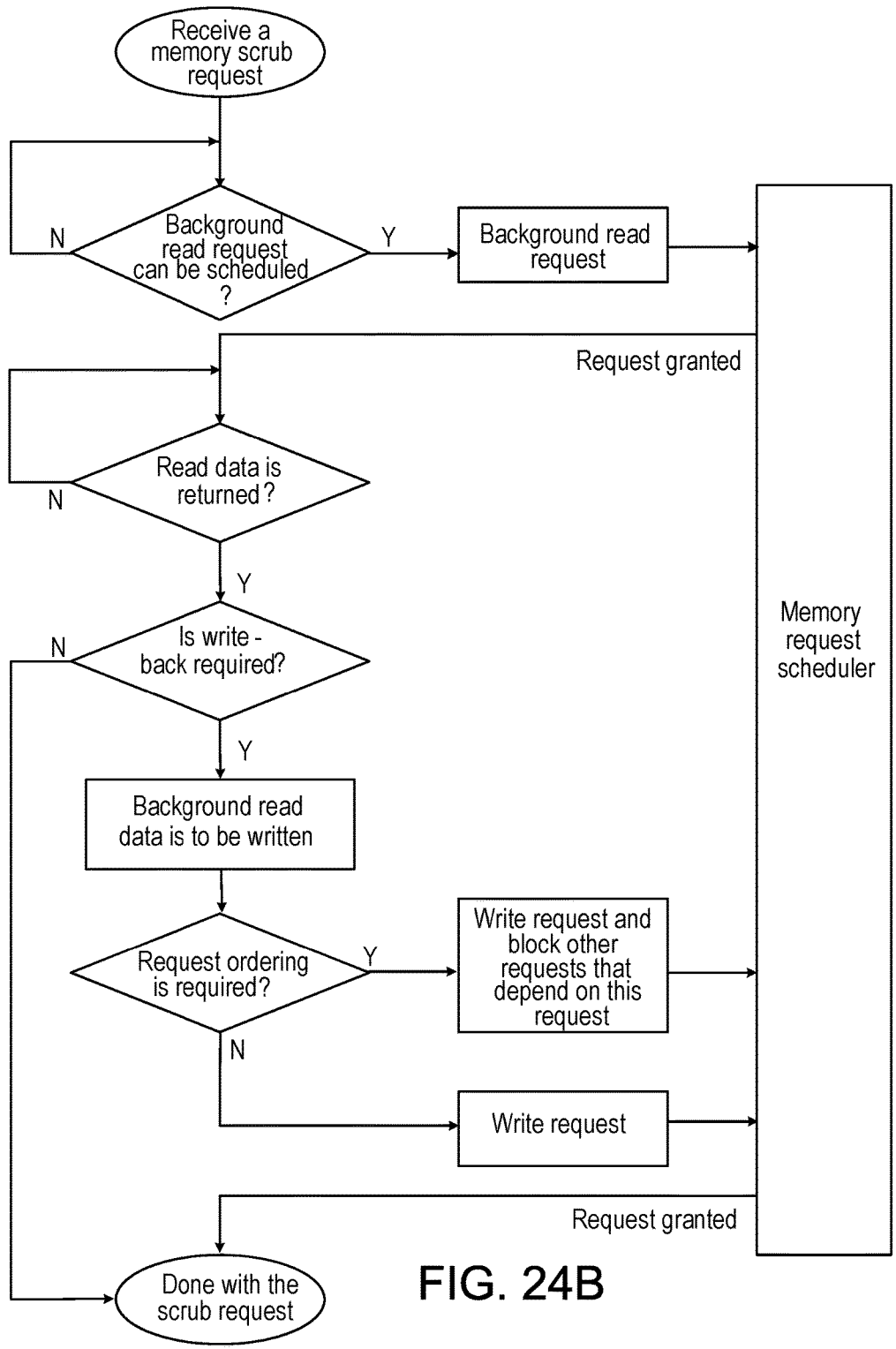
FIG. 24B is a flowchart of a scrub operation.

FIG. 24B shows an example of the event sequence for a scrub operation.

14 Mechanism for Hardware Compression Acceleration in a Multicore Processor

Data compression technology, such as the Deflate algorithm, is widely used in many applications. In general, compression is achieved through several steps. For example, steps may include searching and replacing duplicate source strings with pointers. Steps may include using Huffman coding to replace symbols with weighted Huffman codes based on frequency of use.

String pattern search is memory intensive, and Huffman coding is computation intensive. As a result, it may be a challenge to increase the compression speed and achieve good compression ratio.

Several techniques can be applied to speed up the compression speed while maintaining the compression ratio. For example, compression operations are supported through the MiCA interface. Multi-context support is provided for compression operations. Each processing module has its own contexts or shared contexts to access the hardware compression accelerators. A virtualized interface is provided, for example using the accelerator 380 (FIG. 20A) with the Task 1 Engines configured as compression engines. To speed up the compression process, a speculative Huffman Tree is used to encode the symbols from the search result. The speculative Huffman Tree can be a pre-compiled, instead of run-time Huffman Tree that is constructed based on the entire packet. Several speculative Huffman Trees can be pre-complied to optimize for different types of uncompressed packets. The processing module can select the Huffman Tree on a per-packet basis. For example, if the processing module has some pre-determined information about the packets, the processing module can provide a "hint" to this packet, such as, the size of the uncompressed packet, or whether the packet is a binary file or an ASCII file, etc. The processing module can choose to not select the Huffman Tree on certain packets, the hardware compression accelerator will select or construct the Huffman Tree in this case. It is not necessary to construct a tree based upon the entire packet. For example, the hardware filters a portion of the packet to collect characteristics of the packet, and constructs a Huffman Tree before the entire packet is received. The hardware uses a buffer to hold the partial packet before the packet is encoded with the constructed Huffman Tree.

Figure 26:
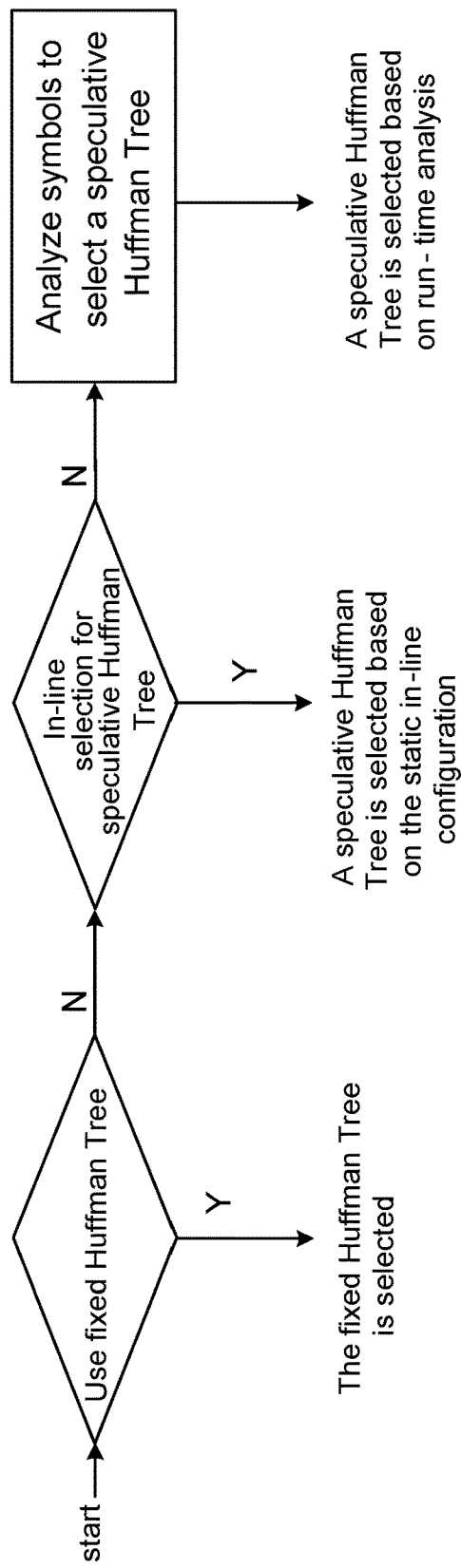
FIG. 26 is a flowchart of a compression procedure.

FIG. 26 shows an example of a compression procedure using a speculative Huffman Tree.

A Hash function can be used to convert the original uncompressed bytes into some pattern in a different domain. Each bit of the 8-bit byte carries some information. After the hash function is applied, certain bits may carry more information than the other bits. For example, if the source is an ASCII file, then the most significant bit of each byte for source data contains less information. In this case, the hash function takes less weight from the most significant bit of each byte. If the source contains a large amount of numbers or letters, then a mapping can be applied first so that most of the information about the numbers or letters is encoded in lower several bits. In this case, the hash function takes less weight from the higher several bits.

Figure 27A:
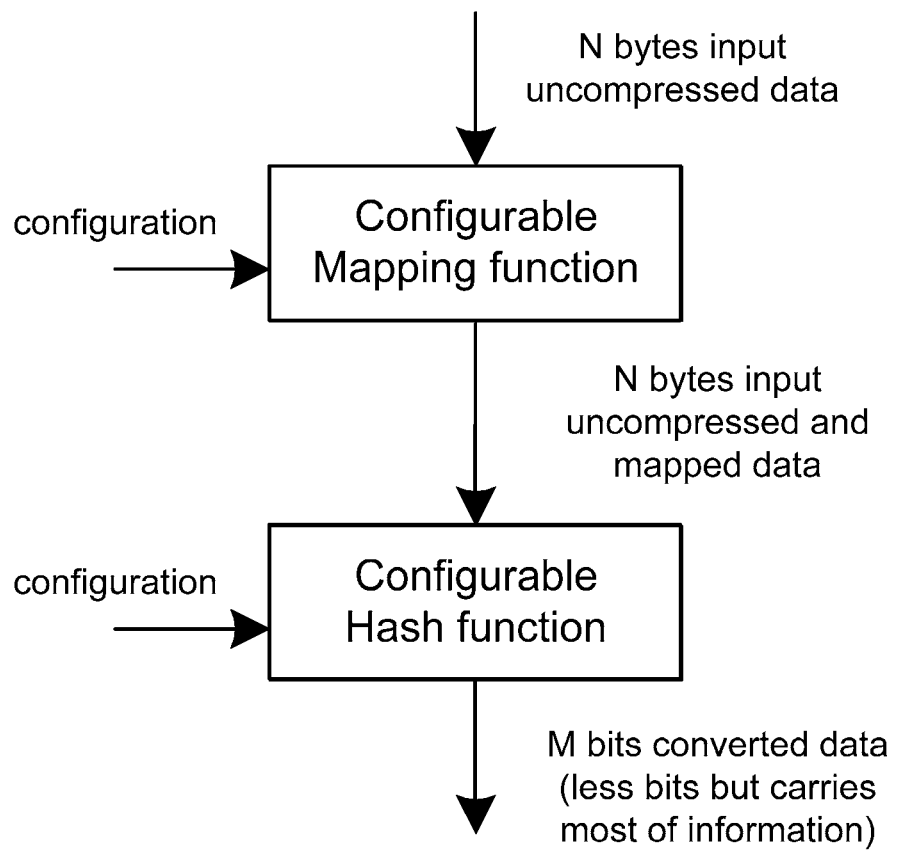
FIG. 27A is a schematic diagram of mapping and hash functions.

FIG. 27A shows inputs and outputs for a configurable mapping function, and a configurable hash function.

Packet history alias prevention can be provided using a compression accelerator that screens the incoming packet, and identifies the potential candidates for a pattern matching. The potential candidates are stored in memory. The memory stores the potential candidates from this incoming packet, as well as the leftover candidates from previous packets. To invalidate the leftover candidates, revision bits can be introduced so that only candidates for the incoming packet will be used for the incoming packets. Compression speed can be improved when unnecessary operations are avoided.

To speed up processing, multiple bytes can be processed in the same cycle, in a parallel operation. The first byte triggers one memory read (addr X), followed by one memory write (addr X); the second byte triggers one memory read (addr Y), followed by one memory write (addr Y). In some case the addr X=addr Y, then the first memory write and the second memory read can be skipped, to reduce the memory access bandwidth.

Parallel pattern matching can be performed using multiple pattern matching modules to speed up the search process. For example, one match module starts from the most recent pattern match candidate, and another match module starts from the next pattern match candidate. One match module starts to compare data from the current location, and another match module starts to compare data from the current location with positive offset of 1. For example, pattern starts from current location=one data byte+pattern starts from the current location with positive offset of 1. Not all match modules will finish the search at the same, and not all match modules will result in a positive match. A MiCA configuration can specify when a search result is made, for example, whether to wait for all match modules to be done, or to wait for some of the match modules to be done.

Figure 27B:
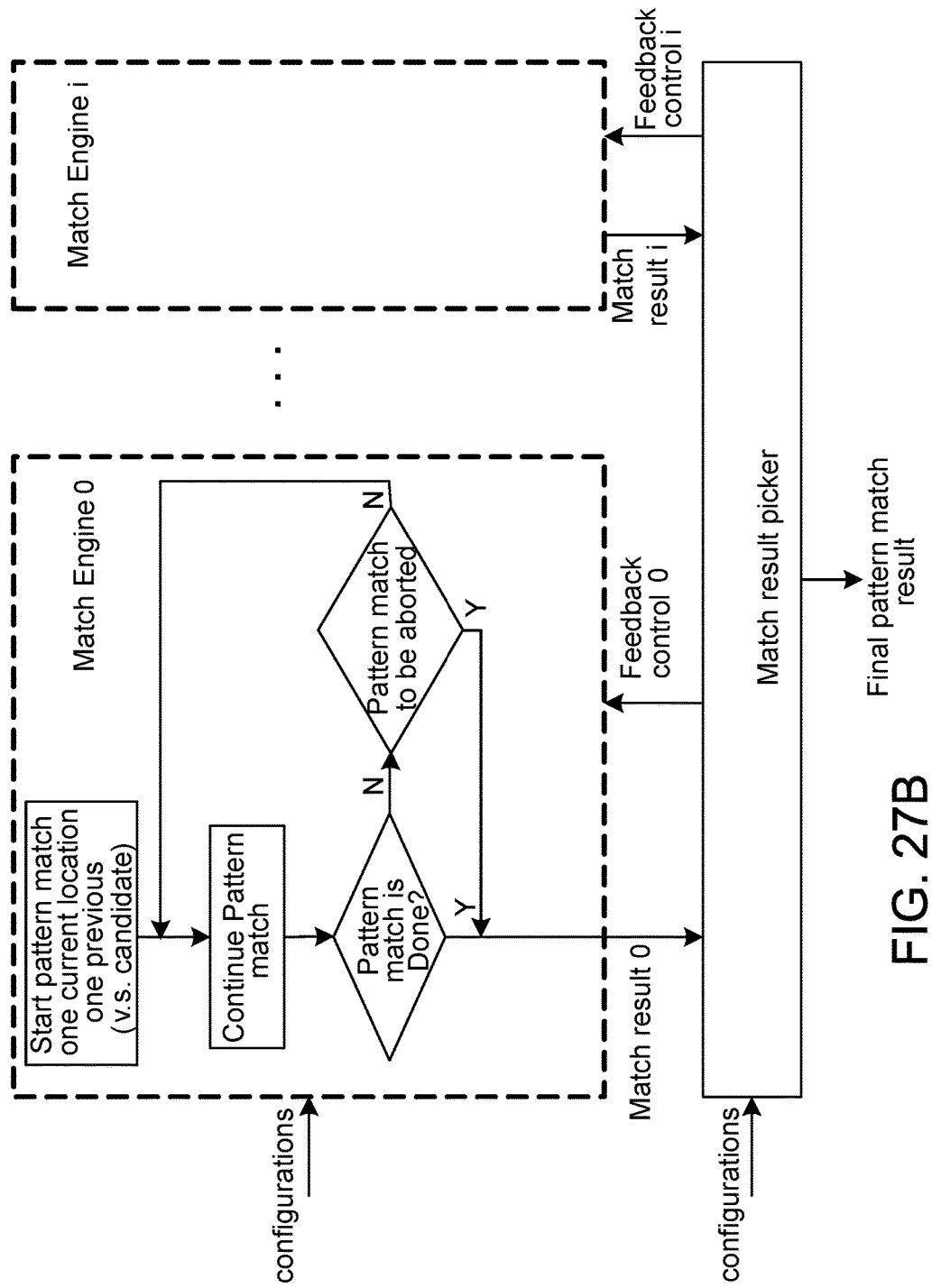
FIG. 27B is a diagram of a pattern matching system.

FIG. 27B shows an example of a pattern matching system with match engines (Match Engine 0-Match Engine i) coupled to a Match result picker providing a final pattern match result. Multiple processing modules on the multicore processor may have access to the hardware compression accelerator. Packets from each processing module may have different characteristics. In-line configuration on a packet basis is provided to support customization. Various in-line configurations are provided, for example, for compression algorithm selection, for compression speed optimization or compression ratio optimization, for Huffman tree selection, or for Hash function, etc.

15 Compressing Directory Entries in a Cache Coherence Scheme

In a directory based cache coherence scheme, directory state can be configured to keep track of all locations in which a given cache line might be stored in cache memory. This directory state can be stored as a bit vector, for example. Thus, in some implementations, there is a bit vector for each cache line. When a read request from another core (e.g., from core 15 of 16 cores in a 4×4 array of cores) comes into a home core (or the directory location) for a given cache line, the cache controller at that location typically sets the 15th bit in a bit vector for that cache line to track that core 15 has a copy of the data in that cache line. Similarly, when a write request comes in to the home core for a given cache line, the cache controller sends out an invalidation message to all the cores whose corresponding bit is set in the bit vector for that cache line.

When the number of cores in a multicore system grows to hundreds or thousands or more, even one bit of storage per cache line (at the directory or home cache) to track each cached copy of data can result in a very large overhead for directory storage. For example, if cache lines are 64 bytes (512 bits), a 1000-core processor would need 1000 bits of storage for each directory entry associated with the cache line (an overhead of almost 200%).

Compression is a useful technique to reduce the size of directory entries. One useful property of some compression schemes is that there cannot be any false negatives. In other words, while the directory entry might have false positives (it can include in its list cores that do not have a copy of the cache line), the directory entry should ensure that a core that has the cache line cached is definitely included in the set.

In one approach to compression, the multicore system can use 1 bit to represent a group of processors, and upon receiving an invalidation message, the multicore system invalidates the cache lines in each of the processors that are in the group represented by that bit.

In another approach to compression, the multicore system maintains a bit vector that has N (e.g., 16) bits (which is smaller than the number of cores M). When an access request (e.g., a read or write request) comes into the cache, the home core identification number (possibly greater than N) is hashed such the number of possible hashed values of the M cores is smaller than M (e.g., N possible hashed values). Then, the bit in the bit vector corresponding to the hashed value is set. An exemplary workflow is: a read address comes into a home core, the read address is hashed to find a cache line, the core number that of the core that issued the read request is hashed to produce a bit to set in the bit vector associated with that cache line.

On an invalidation, each bit out of the N bits (16 in the preceding example), can correspond to multiple cores that might have a copy of the cache line (since any of multiple core identification numbers could have been hashed to a given hash value). In order to be able to send an invalidate message to the appropriate cores, the multicore system associates each bit with a list of cores that can potentially map to that bit. Instead of a list, if a bit is set, the multicore system uses a function (e.g., a hash function) or table that lists the possible cores that could have mapped to that particular bit position. The multicore system sends an invalidation request to each of these cores.

The multicore system can optionally also maintain a counter associated with each bit position, which keeps track of the number of cores that actually have copies of the cache line. On each read or write request from another core, the multicore system increments the counter. Then, after broadcasting an invalidation request, the multicore system receives acknowledgements from the various cores and decrement this counter. The multicore system only needs to wait for as many acknowledgements as indicated by this counter.

In another approach to compression, a filter such as a Bloom filter is used to compress the bits in the bit vector. Suppose that the bit vector has N bits, where N is less than the number of cores in the system. In this scheme, for example, the core number (corresponding to the core that issued the read or write request) is hashed using multiple hash functions (one, two, three or more) to produce multiple numbers that are less than N. The bits in the vector corresponding to each of these hashed numbers is set. This can result in greater compression than the bit vector scheme.

On invalidation, the N bits (16 in the previous example) of the bit vector, index into a table. In such a table each row in the table lists which specific cores could have produced the given bit vector. Invalidation messages are sent to these cores.

As in the previous approach, the multicore system can also include a counter per row in the table to track the number of outstanding copies.

Figure 28:
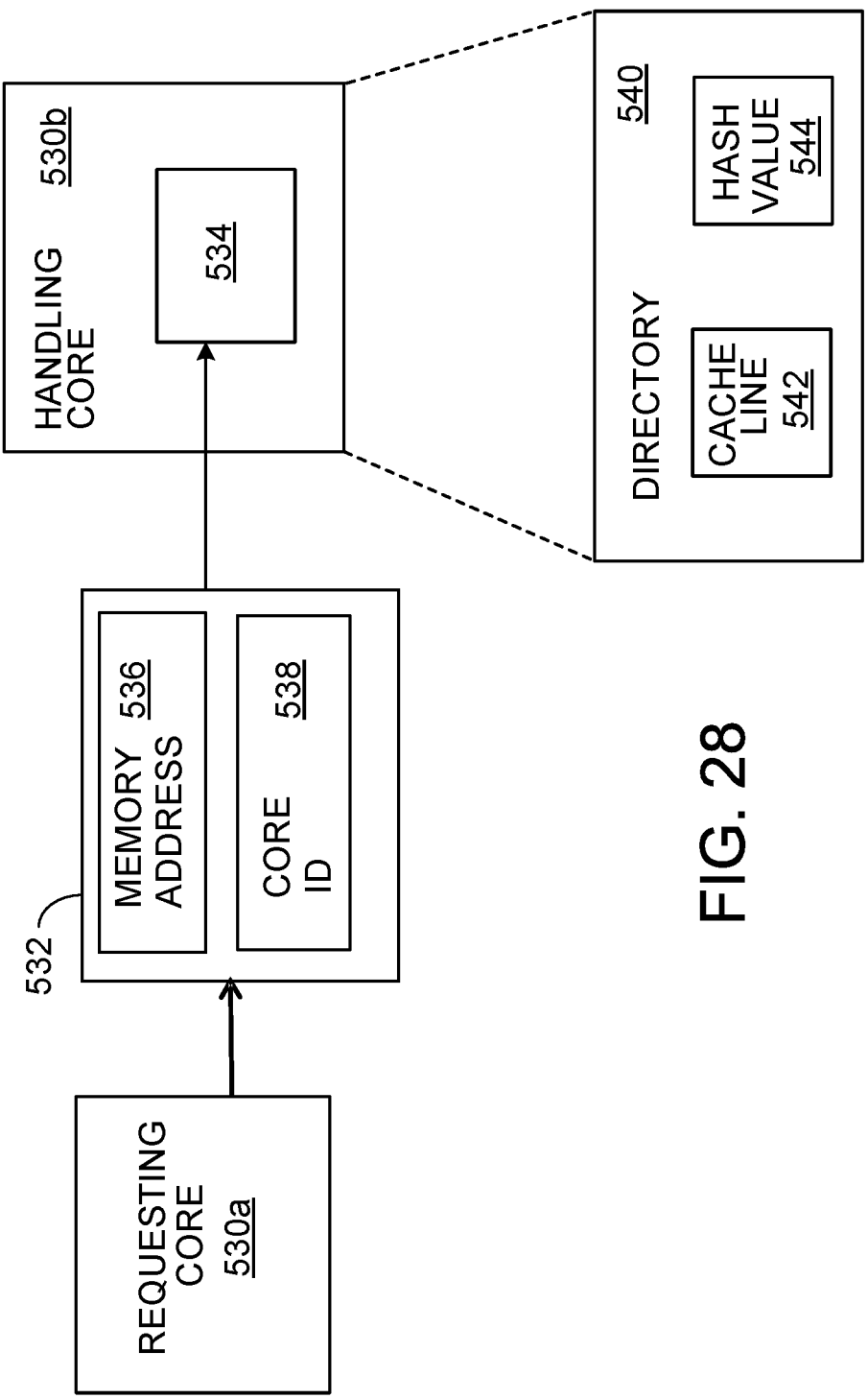
FIG. 28 is a diagram of requesting and handling cores.

FIG. 28 illustrates an example of an approach for handling a memory request based on hashing values associated with the request. A requesting core 532*a* sends a request 532 to access data in a memory line whose address 536 is identified by the request 532. The request 532 also identifies the core identification (ID) value 538 of the requesting core 530*a*. The request 532 is received by a handling core 530*b* that includes a cache controller 534 that will handle the memory request (e.g., the home core). The cache controller 534 maintains a directory 540 that stores directory information for a set of cache lines, including the identified cache line 542.

Figure 29:
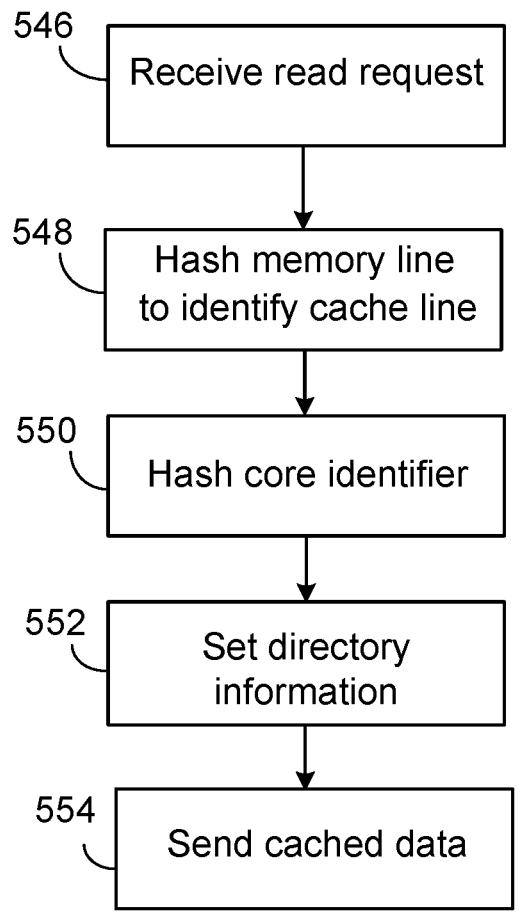
FIG. 29 is a flowchart of a memory request handling procedure.

FIG. 29 shows an example of a procedure for handling a memory request. The cache controller 534 in the handling core 530*b* is configured to receive (546) a request to access data in a memory line from the requesting core 530*a*. The cache controller 534 hashes (548) the memory line address 536 to identify a cache line address 542 of a cache line that stores cached data from the memory line, and hashes (550) an identifier of the requesting core to generate a hash value 544. The cache controller sets (552) directory information associated with the identified cache line. The directory information corresponds to the generated hash value 544. The cache controller 534 sends (554) the cached data to the requesting core 530*a*.

16 Performance Optimizations in a Distributed Cache Coherent Environment for a Multi-Core Processor System In a hierarchical caching system, there are multiple levels of cache managed by a cache control unit within a core, including a level that is private to a particular core and relatively small with short latency (e.g., a level 1 (L1) cache), and higher levels that may be relatively larger with relatively longer latency. A memory block that is requested from a main memory storage system (based on a memory reference in a memory operation) can sometimes be referred to as a "cache block" (or a "cache line") in the context of a core that is making the request for a particular memory block to be fetched (from main memory or from a higher level cache) and allocated into its cache. Latency reduction techniques for the higher level cache can be applied to further optimize the memory operation performance.

The hierarchical caching system is part of a computing system that includes a plurality of cores and a memory interface to couple at least one core to a main memory device. The computing system also includes a cache control unit to control a cache memory that is part of the hierarchical caching system. The cache memory caches data from the main memory. The cache control unit receives a request from a first of the cores to access a block of the main memory, retrieves the block from the main memory, sends the block to the first core, and stores information (for example, in the cache control unit or in the cache associated with the cache control unit) indicating that the block is exclusively cached in the first core.

In an "exclusive caching" scheme, when a core requests a cache block, the request goes to a home location (for example, a home core or home tile, which might be remotely located on another core, or a higher level of cache—for example, an L3 cache). The home core (or higher level of cache, or a cache controller in the home core or higher level of cache) requests the block from main memory and fetches the block. In one approach, after this block is fetched from main memory, this remotely homed block is allocated exclusively into the requesting core's cache (e.g., requester's L2 cache) only (in an "exclusive mode"). In other words, the fetched block is not allocated both into the requesting core's cache and the remote core's cache (or the higher level cache). The remote core (or a cache controller associated with the remote core) incorporates a mechanism to track whether a block is in exclusive mode. The remote core can also include a mechanism to track which core currently has the exclusive copy of a block that is in exclusive mode. After the block is eventually displaced from the L2 cache of the requesting core, the block is sent back to the home core, and may be allocated into the cache of the home core (or the higher level cache) at that time: the "home L3" (or the higher level L3) acts as a victim cache for displaced L2 blocks. With this exclusive caching scheme, a system can be configured such that a non-shared cache block (which may be the most common type of data) will occupy at most a single entry in the cache system at any time.

Another caching scheme that would be beneficial from a capacity standpoint, would be to never allocate remote blocks in the requester's L2 cache because this would reduce duplication of cache blocks. However, this might add latency to a request, because if the request misses in the requester's L1 cache, the request will not find the block in the requester's L2, and the request goes to the remote core or L3 cache to potentially find the block. Another caching scheme, which would be beneficial from a latency standpoint, would be to always allocate remote blocks in the requester's L2 cache. If the request misses in the requester's L1 cache, the request will potentially find the block in the requester's L2, and need not go to the remote core or L3 cache to find the block.

An "adaptive cache allocation" scheme dynamically determines whether or not to allocate a memory block into a requesting core's L2 cache along with allocating the memory block into the requesting core's L1 cache. The adaptive cache allocation scheme achieves some of the benefits of an always or never cache allocation scheme, by dynamically determining the scheme based on a criteria associated with the type of data block being allocated or on the access pattern of the data block. An example of how this can be achieved is as follows. For the case where there is no temporal reuse of data (e.g., streaming data) or in the case where the "working set" of memory blocks being referenced fits in the requesting core's L1 cache, the cores are configured to not allocate the memory blocks into their local L2 cache. For the case where there is temporal reuse of data, combined with that working set not fitting in the requesting core's L1 cache, the cores are configured to allocate the memory blocks into their local L2 cache. The cores can be configured by a programmer, by the compiler, or by runtime software or hardware, for example.

An exemplary algorithm works by classifying the first request to data particular memory block as potentially streaming, non-temporal data and not allocating it into the local L2 cache. If there is a second request that misses in the L1 cache to the same memory block (or third, or subsequent request depending on a predetermined count), then the algorithm changes its classification of the memory block as not being a streaming block, and then allocates it into the local L2 cache. The algorithm can be performed in software or in hardware, or a combination of software and hardware, for example.

Other techniques can be used alone or in combination with these schemes to provide additional advantages. For example, cache lines can be distributed evenly among non-power-of-two numbers of caches/cores/etc. Even distribution can be helpful because poor cache usage and high contention can occur if some nodes are oversubscribed.

Exclusive Caching

When a core suffers a cache miss in its L1 and L2 caches (assuming L1 and L2 caches are present in each core), the request is directed to a remote core (called the home core) for servicing. Typically, if the home core has the requested data cached, it will return the data to the requesting core. If not, the home core circuitry is configured to get the data from memory, optionally store it in the home core cache (L2), and then return it to the requesting core. Thus, the data may be stored both at the home core cache and the requesting core cache.

Thus, a non-locally homed block X can occupy a cache slot at the home core and at the requester core. Expansion out of the local L2 cache is an advantage of non-local homing (block X may be displaced from local L2 but can still be fetched from home), as is bandwidth (BW) distribution. However, if a non-locally homed block occupies both a local cache entry and simultaneously a cache entry at the home, then if all data is non-locally homed, the cache footprint will be doubled—each block occupies a slot at the home and at the requester. Looked at from another angle, when a core loads a non-locally homed block into its L2, the core displaces a block at the home and the core also displaces a block at its L2. These could both be L3 blocks, thus a fill of a non-locally homed blocks can cause two L3 victims—and the associated back invalidates.

Exclusive caching provided a caching scheme that retains the benefits of non-local homing (expansion out of L2 into other caches, BW distribution, unknown producer/consumer relationships), but reduces the detrimental impact on the effective cache size due to the replication. Exclusive caching achieves this by not initially allocating remotely homed blocks at the home cache. A remotely homed block is allocated into the requesting core's L2 only. When the L2 block is eventually displaced, it is sent back to the home, and may be allocated into the home cache at that time: the "home L3" acts as a victim cache for displaced L2 blocks. A non-shared cache block (which may be the most common type of data) occupies at most a single entry in the cache at any time.

Exclusive Caching Flow and Microarchitecture

As an example, a mechanism is provided to support an additional "exclusive directory" at each L2 cache to support exclusive caching. The existing cache directory can remain unchanged from an existing approach, and the basic existing underlying protocol does not need to change. The new exclusive directory tracks blocks that have been requested by other (remote) nodes. These blocks are exclusive because they are not cached at the home. They are cached only at a (single) remote node. The new exclusive directory contains the tag and the "owning core" ID. The size of the exclusive directory can range from a few bytes to Megabytes. As an example, a cache may use the same size as the normal directory.

Figure 30:
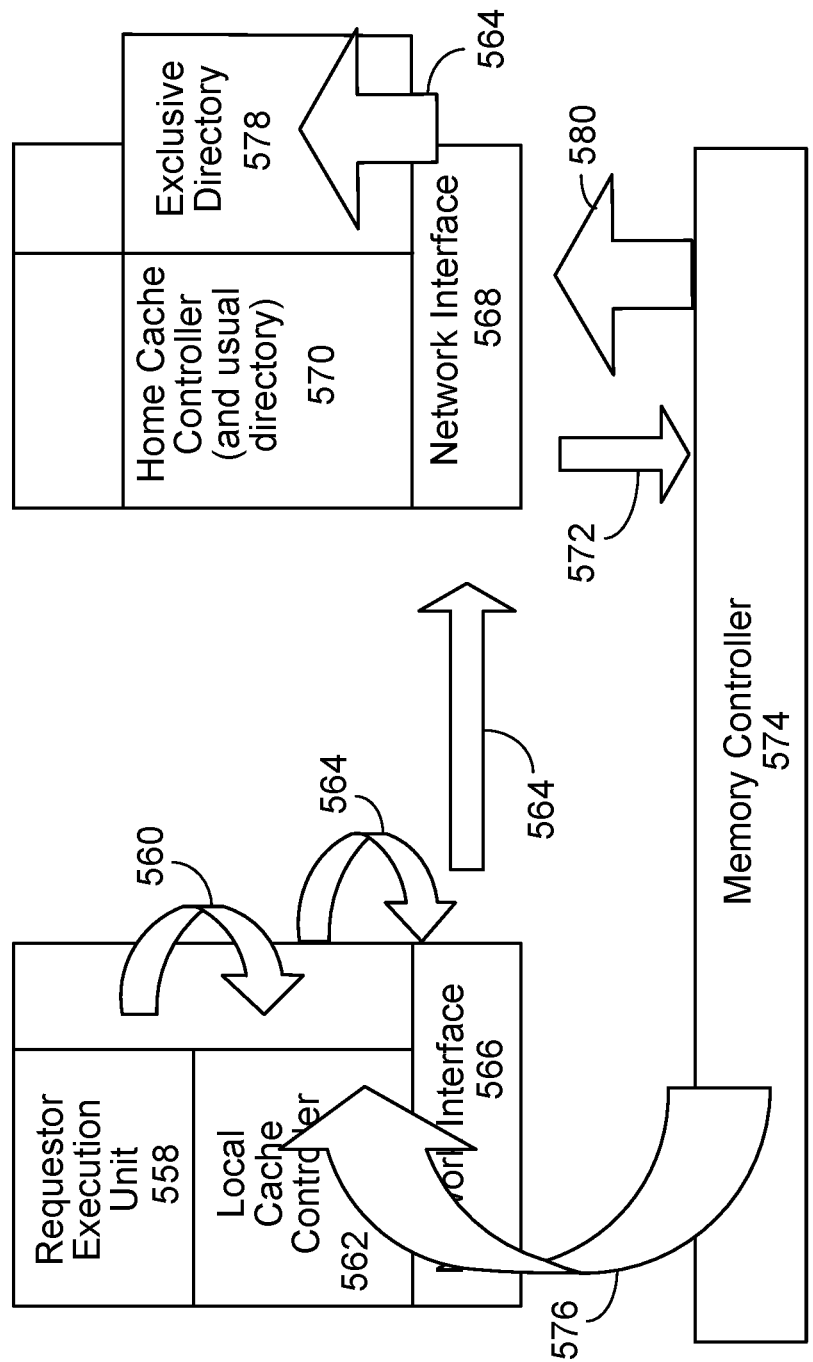
FIG. 30 is a schematic diagram of a data request flow.

FIG. 30 shows an example of the request flow and data flow for an exclusive caching scheme. A requester execution unit 558 sends a first miss request 560 to the local cache controller 562 (e.g., to the local L2 cache). After a cache miss in the local cache, a second miss request 564 is generated to be sent from a network interface 566 of the requesting core to a network interface 568 of a home core. A home cache controller 570 at the home core checks the home cache location. If the data is not in the home cache location, a third miss request 572 is sent to the memory controller 574 to retrieve the data from external memory. The memory controller 574 responds to the request 572 with the data 576 and sends it to the requesting core. At the home core an exclusive directory 578 is provided (in addition to or as part of a directory structure) that tracks cache blocks. The block corresponding to the data 576 that is the subject of the cache miss is marked as exclusively cached (with directory information 580 indicating where the data 576 is exclusively cached) in the exclusive directory 578. Other ways of tracking the exclusive block are also possible. The block 580 is sent to the requesting core but a copy is not stored in the home core.

In other implementations, a home core would also have the block stored in the home core cache, as well as in the requesting core's cache. Such a block would have been tracked in the usual directory, which is maintained by the home cache controller. The exclusive directory is not necessarily associated with any storage for cache data, rather the exclusive directory stores information as to where the block is stored and its state. In this scheme, cache blocks can be of two types on the chip—exclusively cached or multiply cached (both in home core and requesting core) in the usual way. The software or the programmer can mark a block as being exclusively cached. The same can also be done dynamically in the hardware. For example, a block can start out being an exclusive block. Its state can be changed to a multiply cached block based on access patterns. For example, if multiple caches begin requesting the cache block, or if the cache block suffers multiple misses over time in the requesting core.

The basic cache controller pipeline and protocol stays the same, and incoming transactions now lookup both the normal directory and the new exclusive directory (in parallel). An incoming request will hit in either the normal directory or the exclusive directory (it will not hit both).

Adaptive Allocation

In some hash-for-home pages cache schemes, blocks are allocated at the home L2 as well as at requester's L2. This replication reduces the overall capacity of the cache, in favor of reduced latency for hitting in the local L2. In particular, allocating a remote block at the requesting core's L2 cache competes with blocks for which the cache is serving as the home (either locally homed pages or via HFH). Furthermore, this allocation in the requesting core's L2 may often be unnecessary because the requested block may already be cached in the requesting core's L1 cache.

As mentioned above, one caching scheme that provides a capacity standpoint improvement is to never allocate remote blocks in the requester's L2 cache. This would yield the highest L3 hit rate because all the L2's are used as L3's. Another caching scheme (beneficial from a latency standpoint) is to always allocate remote blocks in the requester's L2 cache. Some techniques reduce the L3 miss rate (e.g., by preserving the caches for homed data) while at the same time reducing the L1 miss penalty (e.g., by replicating data in the remote requestor's L2). For the case where there is no temporal reuse (e.g., streaming hash-for-home data) or in the case where the working set fits in the requesting core's L1 cache, allocating the block into the L2 can be detrimental. The caches can be configured to use a cache protocol that selectively allocates into the requesting core's L2 cache if a condition is met, such as the condition that the working set does not fit in the requesting core's L1 cache. The caches can also be configured to distinguish the first (or "initial") request to a non-local block from later (or "non-initial") requests to the same non-local block.

The cache control unit is configured to include a per-cache-block "Touched" bit and an AdaptiveAllocation Page attribute. This way, a data block can be denoted as one that needs to be adaptively allocated. The programmer, software or the compiler, or the hardware can determine whether to and when to set the adaptive allocation attribute. It can be set by cache block or by page. The "Touched" bit indicates whether access to the corresponding cache block has previously been requested. If access has not previously been requested, upon a first access (a "first touch") the bit will be set. If access has previously been requested, upon a subsequent access, the bit will have already been set.

The response from the home cache to the requester can fill the requester's L2 and L1 caches, but if this is a first touch (as indicated in the response packet. First touch can be tracked in various places, for example, in the home core directory) the cache control unit can fill the response block into the requester's L2 as the "LRU way". (LRU stands for least recently used). By filling it as the least recently used block in the cache set, the cache control unit can ensure that this block is the one that is replaced first. If it is not a first touch at the home, the cache control unit fill the response block into the requester's L2 as usual (i.e., in the WIRU way—WIRU stands for most recently used).

So for the case where data is streaming through remotely homed memory, the cache control unit will tend to displace only a fraction (e.g., ⅛th in an 8-way associative cache) of the requester's local L2 cache AND, for the case where there is a working set that doesn't fit in the requester's L1 cache, the cache control unit will re-request the block and install in the requester's L2 as WIRU.

Figure 31:
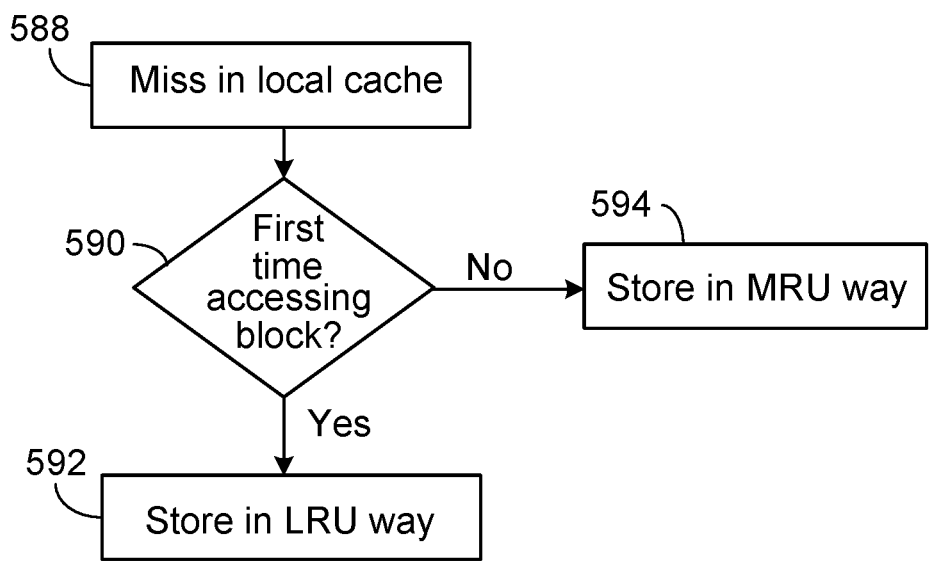
FIG. 31 is a flowchart of an adaptive allocation procedure.

FIG. 31 shows an example of a procedure for adaptive allocation. A core has a miss (588) for data in its local cache and requests the block from the home location in the home core. When the block comes back from the home core, the requesting core determines (590) if this is the first time the core has accessed the block. If so, the core stores (592) the block in the LRU way in the cache. If this is not the first time (or greater than a prescribed number of times, e.g., 2), then the core stores (594) the block in the WIRU way in the cache.

It can be useful to distribute cache lines evenly among non-power-of-two numbers of caches, cores, etc. Even distribution is useful because poor cache usage and high contention can occur if some nodes are over-subscribed.

The cache control unit uses an N-entry table with 3 fields per entry (A, B, fract). The fields have the following meaning:

A=a first tile/cache ID;
B=a second tile/cache ID;
Fract=the fraction of lines that map to the A tile/cache versus the B tile.

The cache control unit uses two hash functions HashT and HashF from the physical address. HashT provides an index into the N-entry table. HashF is used to determine whether this physical address maps to the "A" tile or the "B" tile. This is determined by comparing HashF to "Fract" for the entry.

To evenly distribute among a group of 3 tiles (called X, Y, Z), an exemplary table could be programmed as follows (assume in this example a 7-bit "Fract" field):

| A | B | Fract |
|---|---|-------|
| X | X | 127 |
| X | Y | 42 |
| Y | Z | 85 |
| Z | Z | 127 |

Assume that the output of HashT is evenly distributed among entries 0-3. So ¼ of addresses map to each table entry. All addresses that map to entry 0 will be assigned to tile X, because Fract=127. For entry 1, 42/127 addresses that map to entry 1 will be assigned to tile X, and 85/127 addresses will be assigned to tile Y. For entry 2, 85/127 addresses that map to entry 2 will be assigned to tile Y, and 42/127 addresses will be assigned to tile Z. For entry 3, all addresses will be assigned to tile Z. If HashT and HashF are evenly distributed, this will result in an even distribution among the 3 tiles.

17 Mechanism for Processor Single-Stepping

Software Debugging and Analysis Tools provide a number of functionalities to users who are trying to understand the behavior of a program. One useful debugging technique is to execute a test program one instruction at a time. This is can be referred to as single-stepping the processor.

With single-stepping, the debugger turns control of the processor over to the debugged program; one instruction is executed; and the debugger regains control of the processor. At this point, the processor's state is examined to determine what changes were made by the execution of the last instruction. Alternatively, the debugger may single-step instructions, one after another, until a particular condition is satisfied; for instance, the debugger single-steps, until a particular register reaches a specified value.

A number of approaches can be used to achieve this behavior.

1) In one approach, which is often referred to as software instruction emulation, the debugger does not use the facilities of the host processor to execute the traced instructions. Instead, the debugger uses a software emulation module that maintains the processor state (for instance, register contents) in software. The emulation module is called, when the debugger single-steps an instruction. The emulation module reads an instruction; decodes the instruction in software; emulates the execution of the instruction, modifies the software copy of the processor state appropriately (for example, modifies the software copy of the processor state to reflect the actions identified in the instruction), and then returns the processor state to the debugger.

In some cases, software instruction emulation is slow, for example for cases where the debugger uses single-stepping to await a particular condition. In general, developing an emulation module to accurately emulate the processor's behavior could be time consuming and expensive. Further, changes in the processor behavior, even if minor, may need to be mirrored in the emulator for accurate analyses. In general, an imperfect implementation of the emulation software can result in a mismatch between what a program does while being single-stepped by the debugger, and what the program does while running on the processor.

In some cases, another approach, often referred to as dynamic breakpoint insertion, can be used. In this approach, the debugger temporarily modifies the code being debugged to accomplish a single-step operation. The modification is to insert a breakpoint instruction that instructs the processor to return control to the debugger, after the instruction that is desired to be single-stepped. When the debugger regains control, the temporary breakpoint is replaced with the original contents of that instruction location.

While dynamic breakpoint insertion is generally faster than instruction emulation, the performance can be slower than that of some of the approaches that are discussed below. While the dynamic breakpoint insertion approach does not require an instruction emulator, a debugger using this approach reads and at least partially decodes the instructions. To ensure that only one instruction is executed, the debugger attempts to insert a breakpoint before any possible instruction that follows the stepped instruction. If the stepped instruction does not modify the control flow of the processor, debugger insertion of a breakpoint is relatively straightforward. However, if the stepped instruction does modify the control flow of the processor—for instance, if the stepped instruction is a branch instruction—then there may be more than one possible instruction that could follow the stepped instruction. Modification of the control flow of the processor can be determined, for example, by decoding the stepped instruction. However, writing software to decode instructions can be time-consuming and prone to errors. Also, because this approach modifies the instruction memory, the approach cannot be used when a processor is executing from read-only memory. In addition, modifications to instructions made by the debugger could potentially confuse other software on the system being debugged which needs to access those instructions. For instance, one or more of another debugger, a dynamic loader, or a security inspection program may need to access an instruction that is modified by a debugger. In a multiprocessor system which shares instruction memory between processors, single-stepping a program running on one processor could affect the behavior of another copy of that program running on another processor. With this approach, it can be difficult to single-step complex programs which use interrupts, such as an operating system, because an interrupt could transfer control to a different instruction at any time.

In another approach, often referred to as post-execution interrupts, the processor provides a feature to assist the debugger with the single-step operation. When the debugger turns control over to the code being debugged, it sets a processor configuration bit requesting a post-execution interrupt. The processor returns control to the debugger after the execution of an instruction, based on the set configuration bit. In some implementations, it can be challenging for multiple debuggers to use this feature simultaneously, particularly if the debuggers have conflicting requirements for the current setting of the configuration bit. This can also make it hard to debug the debugger itself.

Because the interrupt that returns the control to the debugger is executed after the instruction execution, such execution can lead to the debugger missing some instructions. One example might be if the debugger is trying to debug the operation of an operating system and returns control of the processor to a user program running under that operating system. If the instruction that is to be single-stepped takes an interrupt, the debugger might not get control until the first instruction of the interrupt routine is executed, which can be undesirable if the user wants to stop before that interrupt routine began.

In some implementations, a particular debugger running on a particular processor can use a combination of the approaches described above.

Figure 32:
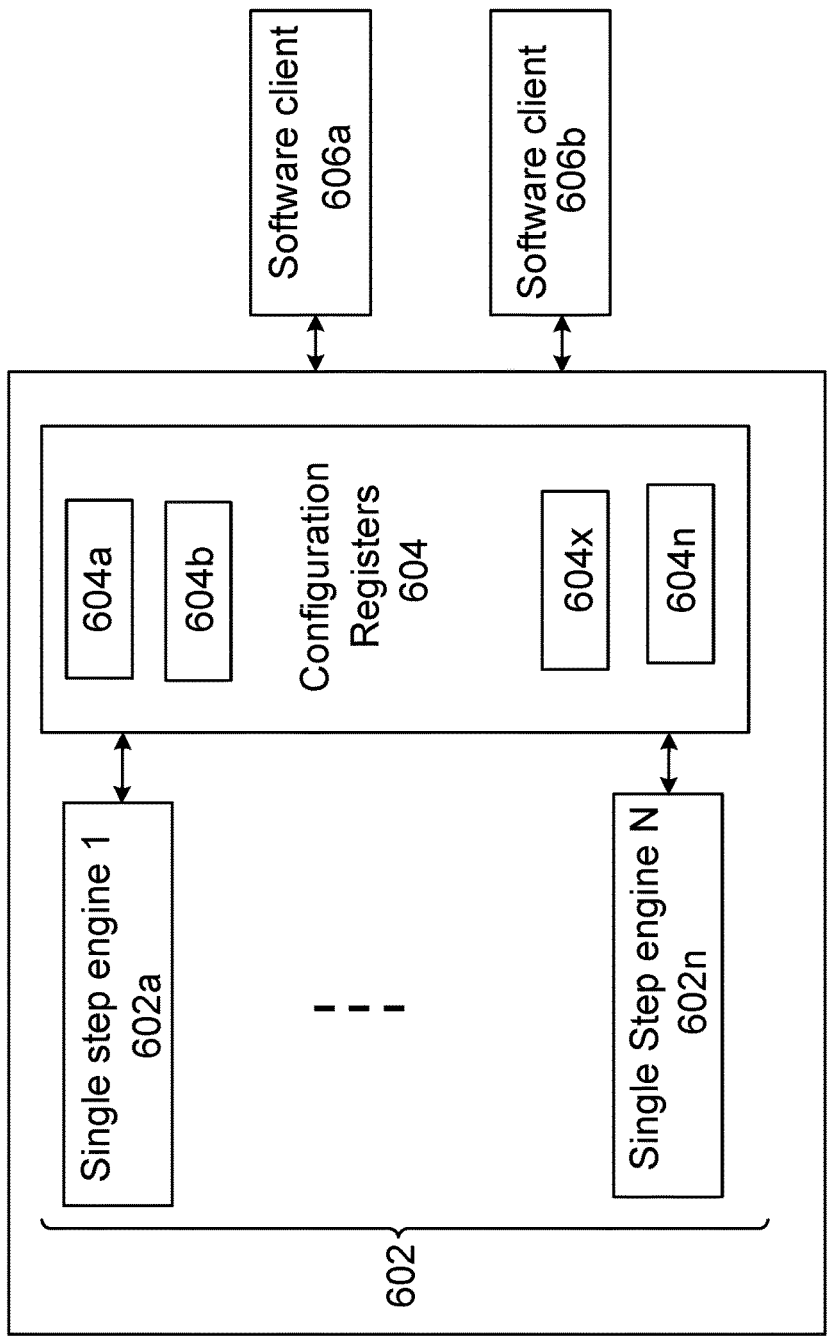
FIG. 32 is a schematic diagram of a single-stepping system.

FIG. 32 shows a schematic diagram of a single-stepping system. In some implementations, a processor 10 can provide one or more single-step engines 602a-602n (602, in general) each of which provides instruction execution information to one or more software clients 606, 606b (606, in general) such as a debugger. Each engine 602 can single-step instructions executing at one or more hardware protection levels, and does not interfere with the operation of other engines that may be active simultaneously. Single-step engines 602 provide speculative notification of the execution of an instruction before execution begins, and can also provide accurate data about whether such execution was actually completed.

A single-step engine 602 is, for example, a single-step interrupt that is controlled by a specific configuration register 304 and the associated logic. In some implementations, the processor provides N separate single-step interrupts that are controlled by N separate sets of configuration registers 604a-604n. In general, N can be any integer, the value of which depends on a particular application requirement or processing capability of the processor. In some implementations, N can be 4.

Each single step engine 602 can cause interrupts for a given protection level (or lower protection levels). In some implementations, the processor(s) can also have multiple single step engines 602 at the same protection level, in which case the interrupts are addressed one after another. Thus, at any given time there can be multiple single step engines 602 running at different protection levels. For example, the hypervisor may be debugging an operating system (OS), while a user may be concurrently debugging a user application. Running multiple single step engines 602 at the same protection level is useful, for example, having two debuggers running one after another.

A software client 606a associated with a given single-step engine (602a, for example) need not be aware of the existence or activity of other engines; this allows a particular software client 606a itself to be single-stepped by another software client 606b, so that the debugger itself can be debugged. Similarly, a software client 606 not involved in single-stepping need not be aware of whether a single-stepping procedure is currently being performed. In some cases, a software client 606 may determine the complete sequence of instructions executed without the need to inspect or decode any instructions, regardless of whether some instructions in the sequence are interrupted.

Operation

In some implementations, the processor provides N single-step engines (referred to as engines 602a-602n in this example). A single-step engine 602 has all of the processor states related to single-stepping a particular thread of execution. The states vary depending upon the processor architecture. In general, the states include a set of configuration registers 604 that are used by the debugging software to control the activities of the engine and an interrupt that is used to invoke the software client 606 when a single-step event occurs. In some implementations, a single step engine 602 can also include an internal state that is unique to the particular engine and is not visible to the debugging software. In some cases, the engine 602 can interact with other parts of the processor to execute some functions. In the description below, the interrupts associated with each engine 602 are referred to as INT_SINGLE_STEP_e, where e is a number between 0 and N−1.

In order to increase an amount of useful tracing information, in some implementations it could be advantageous for the single-step interrupts to have a higher priority than other interrupts in the processor.

In general, each engine is assigned a specific protection level (PL). The assignment could be statically or dynamically configurable. The associated single-step interrupt is delivered at the assigned protection level, and that assigned protection levels that are less privileged than the assigned protection level do not have the ability to modify the configuration of, or inspect the state of, the single-step engine.

Each single-step engine 602 has a configuration register 604 that describes which PLs are single-stepped by that engine; this is referred to herein as SINGLE_STEP_EN_e. If bit b is set in that configuration register 604, then the PL b is stepped by engine e. The term "stepped" means that before any instruction is executed at that PL, the processor(s) will take the INT_SINGLE_STEP_e interrupt, thus allowing the single-step handler to execute desired debugging or tracing operations. The single-step handler is provided with the address of the not-yet-executed instruction. Note that typically, the processor would not allow an engine 602 to single-step a PL more privileged than the PL which owns the engine.

This arrangement has a number of important benefits. Because the single-step engine 602 is implemented in hardware, that the engine has significantly better performance than software instruction emulation, with lower complexity in the debugging software 606 than what would be needed with dynamic breakpoint insertion. Because multiple single-step engines 602 may be supported allows simultaneous debugging of multiple levels of the software system, including debugging the debugger itself. In addition, because the debugging software is notified before the execution of a specific instruction the debugger has full control of the instruction stream, even in the presence of other interrupts.

INHIBIT Bit

Consider an example where the single-step handler executes, encountering a particular instruction (e.g. instruction I), noting that another particular instruction (e.g. instruction A) would have been the next instruction to execute. In such cases, the processor(s) may execute instruction A and this single-step interrupt can be temporarily suppressed. Otherwise, the processor(s) would continually take the interrupt, run the single-step handler, return to instruction I, and then start the process again with another single-step interrupt. To temporarily suppress the single step interrupt, each single-step engine 602 has another state bit, referred to as the INHIBIT bit. When this bit is set for an engine 602, it suppresses the very next occurrence of that engine's single-step interrupt. Once such an interrupt has been suppressed, the INHIBIT bit is cleared.

The single-step interrupt handler itself would typically be at a different PL than the single-stepped code; thus, properly setting the SINGLE_STEP_EN_e configuration register to exclude that PL would prevent the handler from attempting to single-step itself. Alternately or in addition, the processor provides a state bit that denotes that a single-step interrupt is currently being handled, or that processing of new interrupts is temporarily suppressed. This state bit is used to suppress additional single-step interrupts, potentially allowing a handler to single-step a code running at the same PL.

CANCELED Bit

In some implementations, single-step interrupts are higher priority than other interrupts. In such cases, when the single-step handler returns to an instruction, the instruction might not actually execute. Instead, the single step handler might be interrupted by a lower-priority interrupt. For instance, if the instruction (e.g., instruction A) is a load instruction, a virtual address which is not currently in the processor's TLB may be targeted, thus triggering a TLB miss interrupt.

If that interrupt happens at a PL which is being stepped by the single-step handler, the handler will get to see all of the instructions in that lower-priority interrupt, because they'll be stepped as well. If the interrupt is at a higher PL, the instructions in the lower-priority handler will be invisible to the single-step handler. In either case, there will be an eventual return from the lower-priority handler to instruction A. Because the processor(s) would have already cleared the INHIBIT bit the first time the processor(s) returned to A, a second single-step interrupt would be taken. Finally, after the single-step handler returns, the INHIBIT bit would be set, and instruction A will be executed to move forward.

The ability to see an instruction that causes an interrupt, followed by the handler for that interrupt, assists the debugging process. However, this causes the processor(s) to be interrupted before instruction A twice, whereas the instruction is executed once. In some cases, the single-step handler determines whether the instruction actually executed, or not. For instance, the debugger may count the number of times instruction A runs, or in some cases, the user may request that the debugger note when the load is completed, such that the user can examine the content of some registers. In such cases, an assumption that the load is completed on the single-step interrupt after the processor(s) first encounters the instruction, can be erroneous.

In some implementations, in order to provide the information whether an instruction has actually executed, each single-step engine 602 provides another state bit, referred to as CANCELED. This bit is cleared when the last instruction corresponding to a single-step interrupt is actually executed. Therefore, if this bit is set, the instruction is yet to be executed, for example, due to an interrupt. The data (i.e. the CANCELED bit) is for the instruction that the single-step handler last returned to, the address of which was provided to the processor(s) in the immediately previous invocation of the single-step handler. Therefore, the state of the CANCELED bit depends upon whether the instruction that the single-step handler last returned to was executed, or not. In some implementations, the following operations may be executed:

1. Single-step handler is entered, and instructed that the single-step interrupt was invoked on instruction X.
2. Single-step handler sets the INHIBIT bit, and resumes execution at address X.
3. Instruction X is executed.
4. Single-step handler is entered, and is instructed that the single-step interrupt was invoked on instruction X'. The corresponding address can be X+<instruction size>, or a different address if the instruction at X was a branch or other control-flow change.
5. Single-step handler examines the CANCELED bit. In this case, the value of the CANCELED bit encountered by the single step handler in step 5 will be '0' or "False."

In some implementations, the sequence of operations can be as follows:

1. Single-step handler is entered, and instructed that the single-step interrupt was invoked on instruction X.
2. Single-step handler sets the INHIBIT bit, and resumes execution at address X.
3. Instruction X takes an interrupt, and thus does not execute.
4. Single-step handler is entered, and is instructed that the single-step interrupt was invoked on instruction X'. The corresponding address can be X, if the interrupt handler for the interrupt which prevented instruction X from being executed is not being single-stepped and returned to the same location; or some other address, if that handler is not being single-stepped and decides to return to another address; or the first instruction of the interrupt handler, if the handler is being single-stepped.)
5. Single-step handler examines CANCELED. In this sequence of operations, the value of the CANCELED bit encountered by the single step handler in step 5 will be '1' or 'True.']

Figure 33:
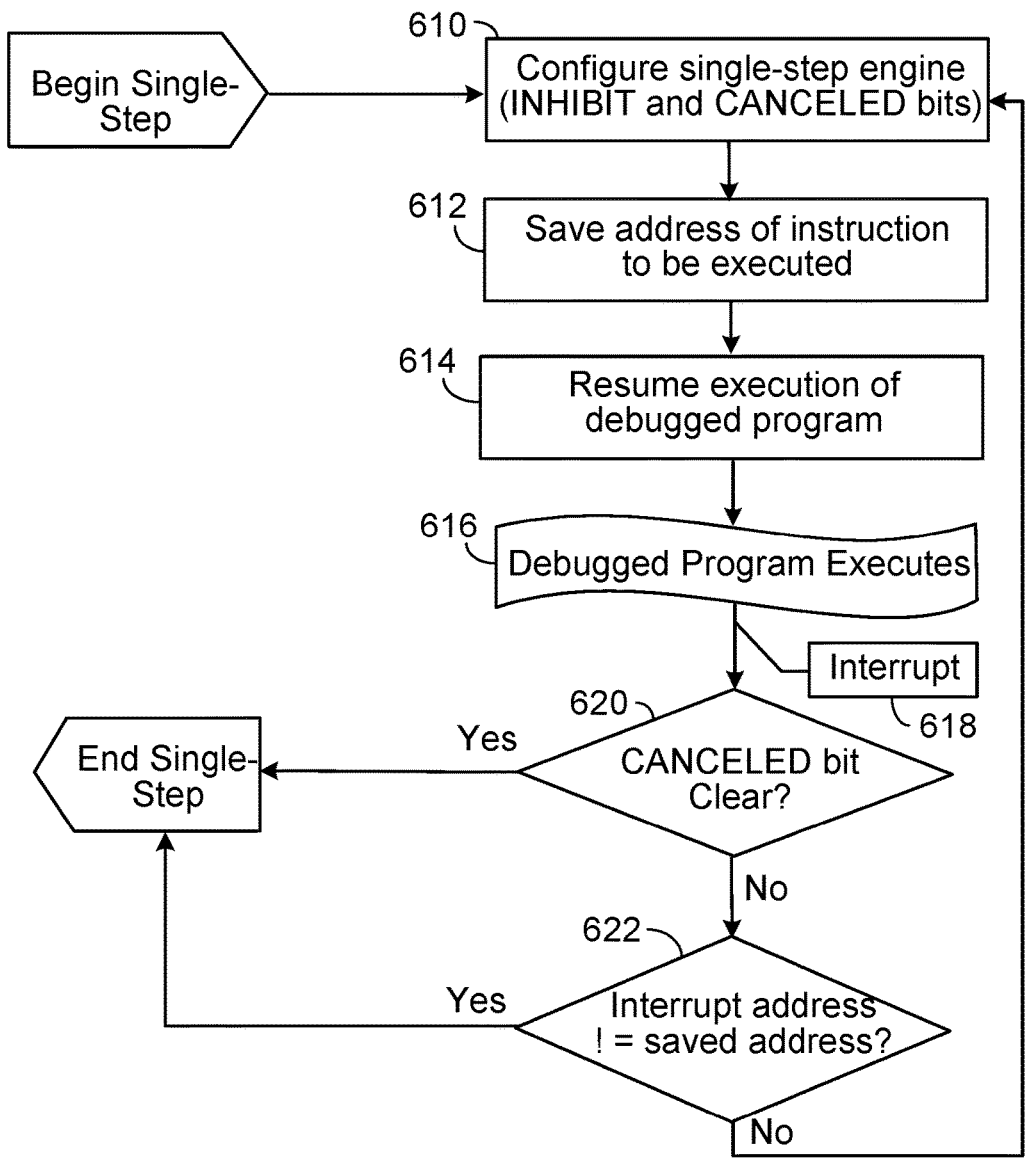
FIG. 33 is a flowchart of a method for single-stepping.

FIG. 33 is a flowchart 608 showing an example sequence of operations to illustrate how the CANCELED bit is used. Some software interfaces (for instance, the Unix or Linux ptrace API) provide a service to a debugger, which executes exactly one instruction in a program, and then returns. In order to do this, the processor(s) enable a single-step engine, and then jump to the target program. When the single-step interrupt handler is entered, the single step engine is configured (610) by setting or resetting the INHIBIT and CANCELED bits. Operations also include saving (612) an address of the instruction to be executed. The execution of the debugged program is resumed (614) and that continues (616) until the end of the debugged program is reached or an interrupt 618 is encountered. The handler returns to the stepped code when either the CANCELED bit is found to be clear (620) or the address of the single-stepped instruction is different from that when the interrupt handler was last entered (622).

The latter condition (622) is needed to cope with those instructions that never completed execution. For instance, in order to execute a system call, processors often support an instruction which causes an intentional transition to an interrupt routine at a higher PL. Typically, the system call handler does not return to that instruction, but instead manipulates the processor state so that execution is resumed after the system call instruction. In such cases, the instruction that causes the intentional transition never appears to have completed execution.

In a situation where a debugger is tracing the execution of multiple software components executing at different PLs, the CANCELED bit may provide other useful bits of information. For instance, if the user is trying to debug interrupt behavior, it could be useful for the single-step handler to step instructions until the handler encounters the CANCELED bit set. The handler can then notify the user so that the user can examine the current processor state.

CANCELED Bit Implementation

In some implementations, the CANCELED bit is implemented if the processor does not need to always compute the bit after every instruction. In some implementations, the CANCELED bit can be cleared by the hardware whenever an instruction completes execution at a stepped PL. The single-step handler itself can be used for setting the CANCELED bit before the handler returns to the code under test.

In some implementations, placing the CANCELED and INHIBIT bits in the same control register increases efficiency.

Interactions Between Multiple Single-Step Operations

In some implementations, two or more of the single-step engines 602 execute simultaneously, and more than one engine asserts a corresponding single-step interrupt before execution of a particular instruction. This can happen, for instance, when multiple engines are stepping the same PL. In such cases, the different interrupts can be prioritized and a particular interrupt chosen to be taken first. Consider an example where single-step engines 0 and 1, with 1 having the higher priority, are active. In this example, execution proceeds as follows:

1. SINGLE_STEP_INT_1 interrupt is taken, single-step handler 1 runs, sets the INHIBIT_1 bit, and returns to traced code.
2. SINGLE_STEP_INT_1 interrupt is suppressed, and INHIBIT_1 is cleared.
3. SINGLE_STEP_INT_0 interrupt is taken, single-step handler 0 runs, sets the INHIBIT_0 bit, and returns to traced code.
4. SINGLE_STEP_INT_1 interrupt is taken again, since INHIBIT_1 is now clear; single-step handler 1 runs, sets the INHIBIT_1 bit, and returns to traced code.
5. SINGLE_STEP_INT_1 interrupt is suppressed, and INHIBIT_1 is cleared.
6. SINGLE_STEP_INT_0 interrupt is suppressed, and INHIBIT_0 is cleared. INHIBIT_0 is now cleared, because this is the first time that SINGLE_STEP_INT_0 was the highest-priority interrupt.
7. Traced instruction executes.

In some implementations, the higher-priority engine can be configured to step the lower-priority single-step handler. This allows a debugger using the single-step feature to itself be debugged.

When a PL is implemented as a dynamic processor state that designates the privileges accorded to the program currently running on the processor. The number of privilege levels available varies with the processor implementation. Some examples include the two-level user versus kernel protection level found in some processors, and the four-level scheme found in the Tilera® TILE64™ processor.

18 Mechanism for Work Distribution and Rebalancing in a Parallel Processor

An intelligent software network device is implemented on a multicore chip using dedicated cores. In order to handle high incoming packet rates to a network device, some systems distribute packet interrupts and processing to a single central processing unit (CPU), limiting throughput according to the capability of that CPU. Other systems randomly assign interrupts and packet processing to a set of CPUs, which can cause unnecessary cache misses, (cache thrashing) for example, because packets related to the same flow can be randomly distributed amongst different CPUs or because interrupted CPUs may have to rapidly switch between application work and handling incoming packets. This cache thrashing can reduce throughput and lead to packet drops.

Figure 34:
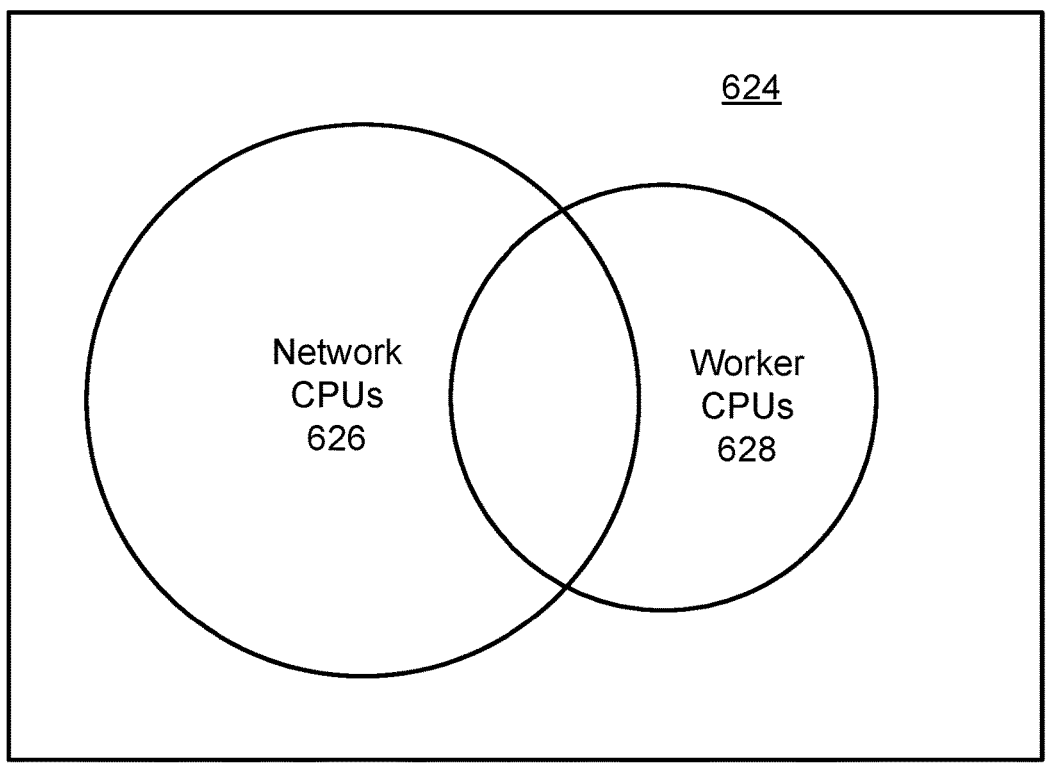
FIG. 34 is a Venn diagram showing work distribution.

FIG. 34 shows a Venn diagram illustrating an example of work distribution. In some implementations, the set 624 of available CPUs (or cores or tiles) in a system is divided into different sets (e.g. network CPUs 626 and worker CPUs 628). The sets 626 and 628 may be disjoint or the sets may overlap, as shown in FIG. 34. In some implementations, using disjoint sets can improve instruction and data cache performance. The number of CPUs in each of the sets 626 and 628 can be substantially same or different and the sets 624 of available CPUs can be further divided into disjoint and/or overlapping sub-sets.

In the current example, the worker CPUs 628 run application code, including the socket calls that merge received packets into a data stream and fragment outgoing data into network packets. Processing of low level incoming network traffic (packets) is performed on the network CPUs 626. The incoming packets are distributed to the network CPUs 626 based on, for example, flow affinity, to reduce data cache misses. Some packets (for instance ACK packets) are handled entirely by the network CPUs 626. In some implementations, other packets are associated with a connection and placed on a list for later processing by an application CPU.

Rebalancing of work on the CPUs 626 is used to prevent packet drops due to unbalanced flows. For example, random rebalancing can be used to prevent poor multicore chip performance due to higher level flow control protocols that prevent triggering of a deterministic rebalancing mechanism.

Figure 35:
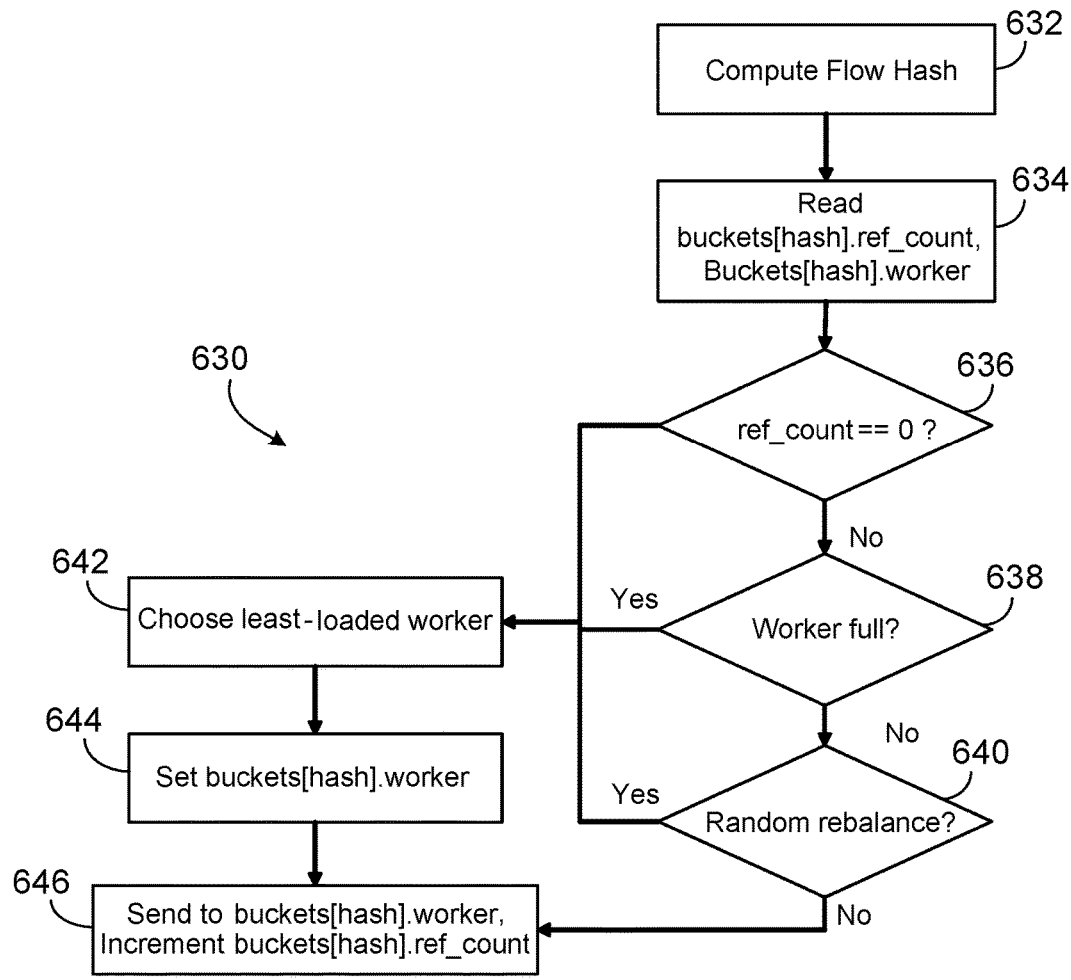
FIG. 35 is a flowchart of a method for work distribution.

FIG. 35 shows a flowchart 630 that illustrates an example of a sequence of operations for work distribution and rebalancing in the multicore chip. Operations include computing a flow hash (632) from incoming packets. For example, when an incoming packet arrives, a software module (running on one or more CPUs separate from the operating system) analyzes the packet, extracts a flow ID from the packet's source, destination, and protocol, and hashes each of the extract flow ID's into a corresponding bucket ID. Each of these bucket IDs are assigned to a corresponding CPU, and in general, corresponding incoming packets are sent to the corresponding CPU, triggering an interrupt, and causing that network CPU to process the packet. Triggering processing of the packet is caused, for example, by reading (634) one or more parameters related to the hashing.

Rebalancing prevents packet drops due to unbalanced flows by preventing. When a particular CPU from being disproportionately overloaded and thus unable to keep up processing at a rate similar to the other CPUs in the multicore chip. In some implementations, as packets are sent to a network CPU 626, a reference count of outstanding packets for that network CPU 626 can be incremented, and it is not decremented until the network CPU 626 has finished processing the packet.

Referring again to FIG. 35, operations include checking (636) the reference count of the assigned CPU. If the reference count reaches a given maximum or predetermined threshold, then the CPU is considered to be full. In some cases, upon determining (638) that the CPU is full, the bucket is reassigned. In some implementations, the CPU with the lowest reference count is chosen (642) and the bucket reassigned (644) to the chosen CPU. Future packets are sent to the newly chosen CPU and the corresponding reference count increased accordingly (646).

Random rebalancing can also prevent poor performance due to higher level flow control issues, for example, one in which packets are sent to a network CPU which is slow, but not slow enough to become full, and higher level logic throttles back traffic to match the slowness of the CPU. In such cases, as packets arrive, the bucket for a particular packet is reassigned to the network CPU with the lowest reference count, as if the original network CPU was full.

In some implementations, the network CPU reacts to the incoming packet interrupt by processing all the packets queued up for that network CPU by alternating two phases of analysis to improve instruction cache performance and only re-enabling the interrupt once all pending packets have been processed. For example, each phase of analysis may want to bring in a different set of instructions into the instruction cache. In such cases, the two sets may compete for cache space. Therefore, in some cases, it could be desirable to execute the same set of instructions as much as possible, before starting to execute another set of instructions.

In some systems, the network CPUs are dedicated to only handling network traffic. In such cases, interrupts are not needed and polling can be used instead to maximize or at least enhance cache efficiency while reducing system latency.

The set of dedicated network CPUs can also be modified based on network load, dynamically moving application threads from newly dedicated network CPUs onto worker CPUs, and from busy worker CPUs onto previously dedicated network CPUs, as needed. Such dynamic reconfiguration occurs when requested by an application program or a configuration program or it can be done by an automated process that checks the amount of idle time on network CPUs and increases the number of CPUs when the CPUs are busy and decreases the number of network CPUs when the CPUs are idle.

19 Mechanism for Providing a Larger Address Space

Describe are approaches for providing a larger address space in a processor than the address space that can be directly supported by hardware.

Many applications (for example, memcached, i.e., a free and open source, high-performance, distributed memory object caching system for use in speeding up dynamic web applications by alleviating database loading,) use a much larger address space than what is available in the hardware. Memcached, for example, caches objects for web requests. For websites such as FACEBOOK®, BAIDU® and other websites that have a large number of simultaneous users, the total amount of data that needs to be stored in a cache can be very large, exceeding the capacity of available computer memory systems. Further, some processors only support a 32-bit (for example) address space, while an application such as memcached might need a much larger address space, for example, one that requires 40 to 64 bits of address space.

In some implementations, a larger memory space is emulated, for example, using software, for an application that caches objects. In such cases, the application is divided into a distribution process and several server processes, each of which typically runs on a separate core. However, in some implementations, two or more processes may run on the same server core. Requests that come in (which include references to a large memory space) are handled by the distribution process to produce an indexed table. This produces a server process id and a smaller memory address. The distribution process can send the small memory address to a server process for handling. The server process responds through the distribution process, or directly to the requester with the requested object.

In some implementations, the distribution process can also dynamically provide additional processes for incoming requests that refer to a memory space even larger than it that being currently handled.

Application process that use large memory spaces can include, for example, memcached, or other processes for caching objects. The objects can include, for example, text, video, webpages, and images.

The caching of objects by an application can be, for example, in response to requests (or clicks on links on a web page) by users over the web. The requesting application can be, for example, a webserver such as Apache, Lighttpd, or NgineX. Set forth below is a software mechanism to provide the impression of an address space that is larger than that is directly supported by the hardware.

Figure 36A:
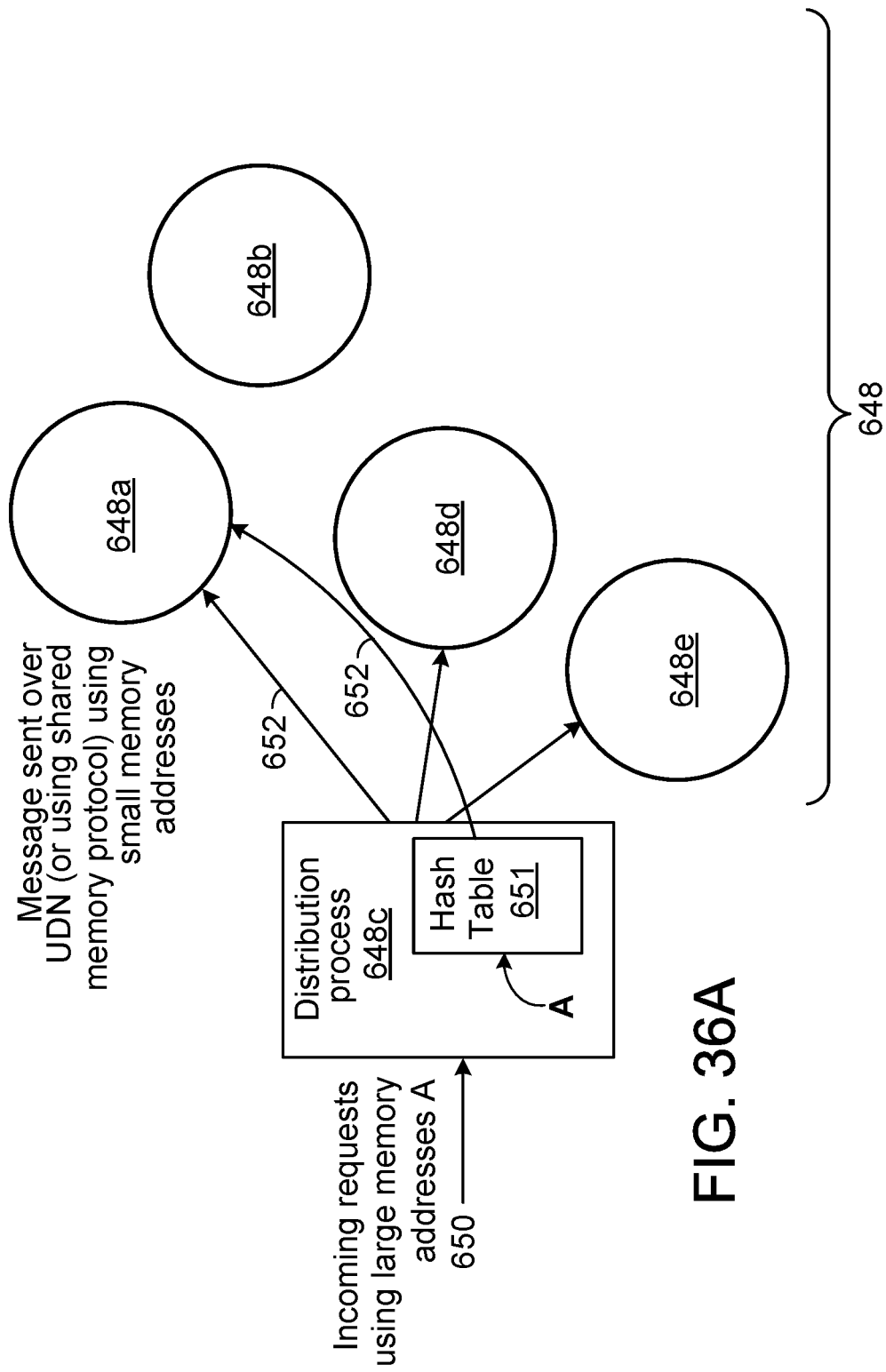
FIG. 36A is a schematic diagram of an address space mechanism.

FIG. 36A is a schematic diagram illustrating the mechanism for providing such a larger address space. In this example, an application running on a multicore processor has several processes 648a-648e (648, in general). One or more processes (for example, 648c) serves as the distribution process and other processes (648a-648b, and 648d-648e, for example) serve as the server processes. Each of the server processes have a relatively small memory limit that is addressable using a small address space. The role of the distribution process 648c is to accept incoming requests 650 that refer to large memory spaces and turn them into requests 652 that refer to a smaller memory space. The distribution process 648c sends the smaller memory space requests 652 to one of the server processes (648a, for example) for handling. The distribution process typically maintains information in a table (for example, the hash table 651) indicating which tile or core each process is running on. The large memory space (for example, of size 64 Gigabytes (64 GB)) is divided up into many smaller memory spaces (for example, of size 2 GB each) and each server process is responsible for a 2 GB chunk of that large memory space. Thus, in the current example, the processor(s) may need up to 32 server processes to handle each of the 2 GB spaces present in the overall 64 GB space.

Figure 36B:
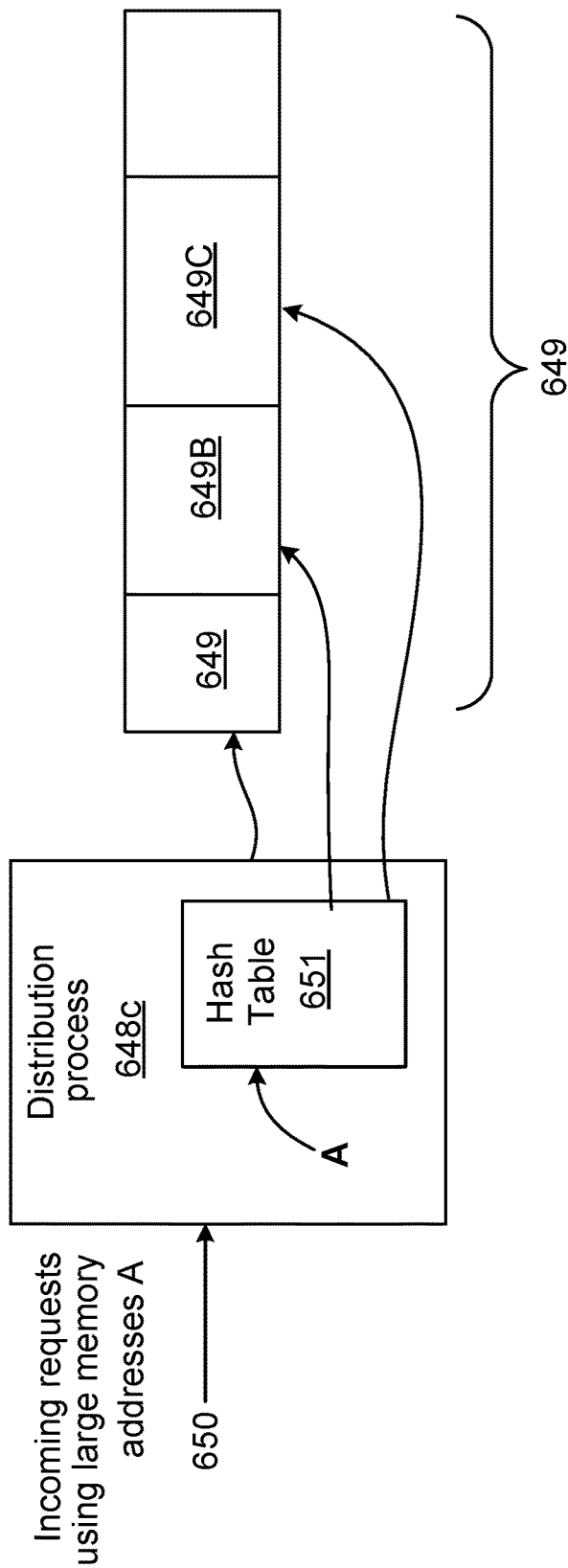
FIG. 36B is a schematic diagram of a distribution process.

The same technique can also be used if the hardware supports large memory addresses to begin with. This is illustrated in FIG. 36B that shows a large memory 649 that is addressable using large memory addresses. In this case, distributing the accesses to multiple processes happens in substantially the same way as described above with reference to FIG. 36A with the large memory 349 being divided into smaller chunks of memory that are addressable using a smaller address space. The benefit is that many processes handle requests. Further, because a given process handles requests to a region of memory, many of those references can get cached in the on-chip cache of the core on which that process is running.

Figure 37:
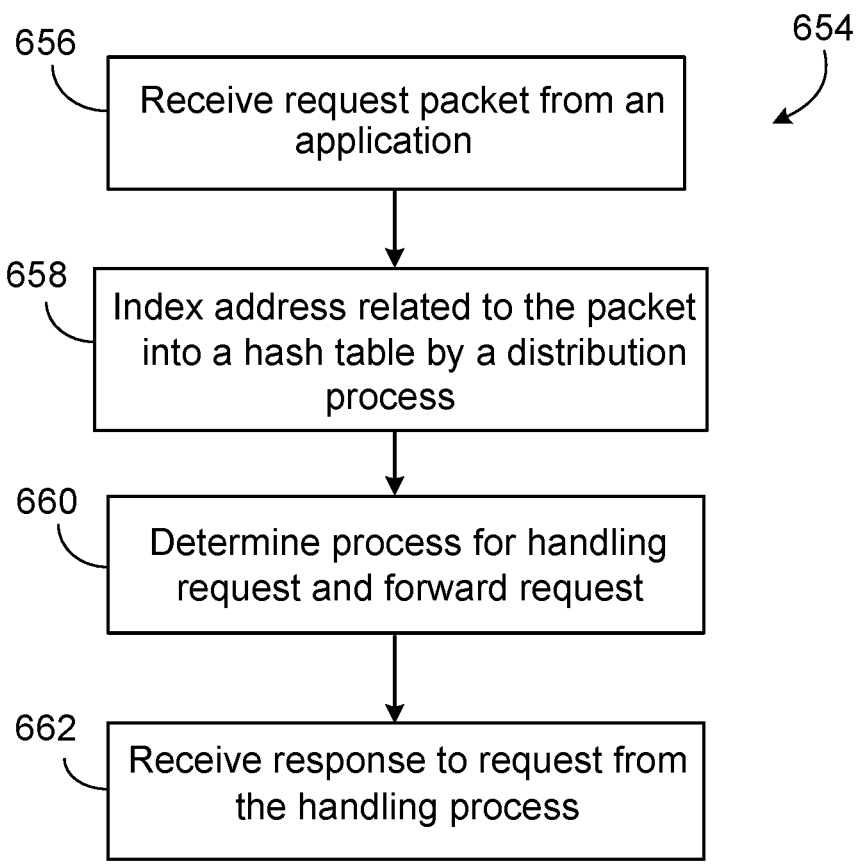
FIG. 37 is a flowchart of an address space operation

FIG. 37 illustrates an example sequence 654 of operations for providing an expanded address space. Operations include receiving at an application program a request packet from another application (656). For example, a request packet can arrive for application X from another application over a network. In some implementations, the packet is received by the application and is first handled by the distribution process in the application. The request packet includes an address from a large address space. The distribution process takes the large address (for example, "A") and indexes the large address into a hash table (658). The address A can be for an object, a page, or some other item requested by the application sending the request packet. Operations can also include determining a handling process (for example, a worker process 648) for the request packet and forwarding the packet to the determined handling process (660). The hash table can be looked up to find out which process should handle the request. In some implementations, the distribution process converts the address "A" from the large address space (for example, a 64 GB address space) into a pair of numbers: a process id "p" and a smaller address "a" (which can, for example, refer to a 2 GB address space). The distribution process sends the request on to process p. The distribution process typically maintains information in a table (for example, the hash table 651 shown in FIG. 36)

indicating which tile or core each process is running on. In some implementations, multiple server processes can also run on a single tile, and when a request for a particular process p comes in, a local dispatch process causes the process p to run responsive to the request. The process p handles the request. In the memcached application example, the request is usually for an object or a webpage.

Operations also include receiving a response to the request from the handling process (662). In some implementations, the process p looks up the address "a" in its 2 GB memory and returns the object to the distribution process, which in turn returns the object to the requesting application. In some implementations, the distribution process can also send the requester's address to the handling process p, so that the handling process can respond directly to the requester instead of going back through the distribution process.

The message from the distribution process to the server process or handling process can be sent in many ways. For example, the processor(s) can use an UDN (user dynamic network) on the multicore chip to send the message. In this case, the message is sent to the input UDN queue of process p running on a given core (or tile). The process p works by looking at the UDN input queue each time the process finishes processing the most recent request. The process retrieves the request off the UDN queue and process the request in turn.

In some implementations, the message from the distribution process to the server process is also sent to coherent shared memory by using on chip networks. For example, the processes could use a piece of shared memory (that is shared by both the process p and one or more of the distribution processes) into which the distribution process writes the request. The server process looks at the queue of requests in the shared memory. In some implementations, the processor(s) have a separate shared page for each of the server processes. All of the shared pages can also be shared with the distribution process. The UDN approach does not need shared memory between the server process and the distribution process. In some implementations, the distribution process and the server process can also reside on separate computers.

In some implementations, the distribution process does not know a priori the size of the large address space. In such cases, the processor(s) starts the application with a given number of server processes (each implementing a small address space of for example 2 GB) that together implement a given large address space (say 64 GB). The distribution process determines that a request for an object has an address of the object that is outside the currently handled large address space of 64 GB. In this situation the distribution process adopts one of several possible approaches. The distribution process can provide one or more new processes to handle requests to this larger address space, and can schedule these new processes on idle cores. If there are no idle cores, the distributor process can schedule the new processes on cores with pre-existing processes. In some implementations, the distribution process has an existing process handle an address space larger than 2 GB. In this manner, applications such as memcached-like applications can support a growing address space.

20 Power Reduction Techniques in Multicore Processors

Derivative parts can be generated via package substrates and mechanisms or signal isolation can be used between powered down and powered on regions. Some designs use internal control mechanisms such as eFUSE or Laser fuses to enable or disable functionalities when providing derivative based products. Derivative based products can include products that are slightly different in some form from each other. For example, products with differing number of cores can be referred to as derivative based products. In some implementations, some logic blocks can be disabled by disabling clocking and AC signaling power to the corresponding logic blocks. If voltage is still applied to the disabled block, leakage power caused by leakage currents through devices still results in power consumption. When such leakage power is significant, for example, half of the active power, using internal control methods to disable certain functions of the chip may not a suitable technique for providing reduced function low-power derivative products.

Sometimes certain parts of a chip can be powered down to save energy while other parts are still powered up. In other situations, certain parts of a chip that are faulty can be turned off, while other parts continue to operate. In such cases, the signals between the powered on and powered off regions can be floating (for example, because the signals are not being driven actively from the powered off region).

The floating signals can be isolated by introducing a logic gate in a path between the powered-on and powered-off regions. A control signal can be used to disable the powered off region from undriven logic to prevent propagating an unknown state into the powered-on region. In such cases, an additional gate delay in timing paths between the regions can increase latency. If such a timing path includes a critical timing path, the additional latency could limit the overall operating frequency of the chip.

In some implementations, providing single, dual and multiple isolated power supply rails within each block and bringing the power rails to unique die bumps allow each bump to be connected to VDD or VSS though the package substrate. The blocks can then be enabled and disabled based on where they are connected to. For example, if a block supply rail is connected to VDD, the corresponding block would be functional and if the block supply rail is connected to VSS, the corresponding block would be disabled. When a block is disabled (i.e. connected to VSS) the block would not consume any leakage power. The connections can be made changeable, for example, using customized substrates for each derivative, which cause power to be supplied or not supplied to each block, or eFUSEs. Other methods for making connections or breaking existing connections can also be used. In some implementations, a dedicated package substrate is used for each derivative product. Such a package substrate, as a particular example, can be configured to turn off one or more cores or tiles. In some implementations, the package substrate can also be configured to turn off parts of a core or tile, for example, just the processor, but not one or more of the cache, the coherence engine and the switch in that tile.

When a region or domain (e.g., domain A) is completely powered down, then instead of introducing a logic gate into a path between the powered-down domain and a powered-on domain (e.g., domain B), a single transistor can be used. The output signals crossing into the powered-on domain are connected to the drain of an NMOS transistor, and the NMOS transistor's gate is connected to a control signal that is logic low (or logic '0' or false) when the domain A is powered up and logic high (or logic '1' or true) when the domain A is powered down. Thus, the NMOS transistor will hold the signals to a known logic '0' state when the source domain is powered down without the attendant gate delay impact to timing, as mentioned above. Typically, the delay impact is eligible because only the source-drain capacitance of the transistor is added to the existing logic and the transistor only has to hold the logic value, not drive this logic state from a timing perspective. Other benefits can also include less power consumption because the gate capacitance of small NMOS transistors on the control signal is less than the gate capacitance of logical gates. If the powered-off domain is at a high potential, then PMOS transistors can also be used instead of the NMOS transistors.

Figure 38A:
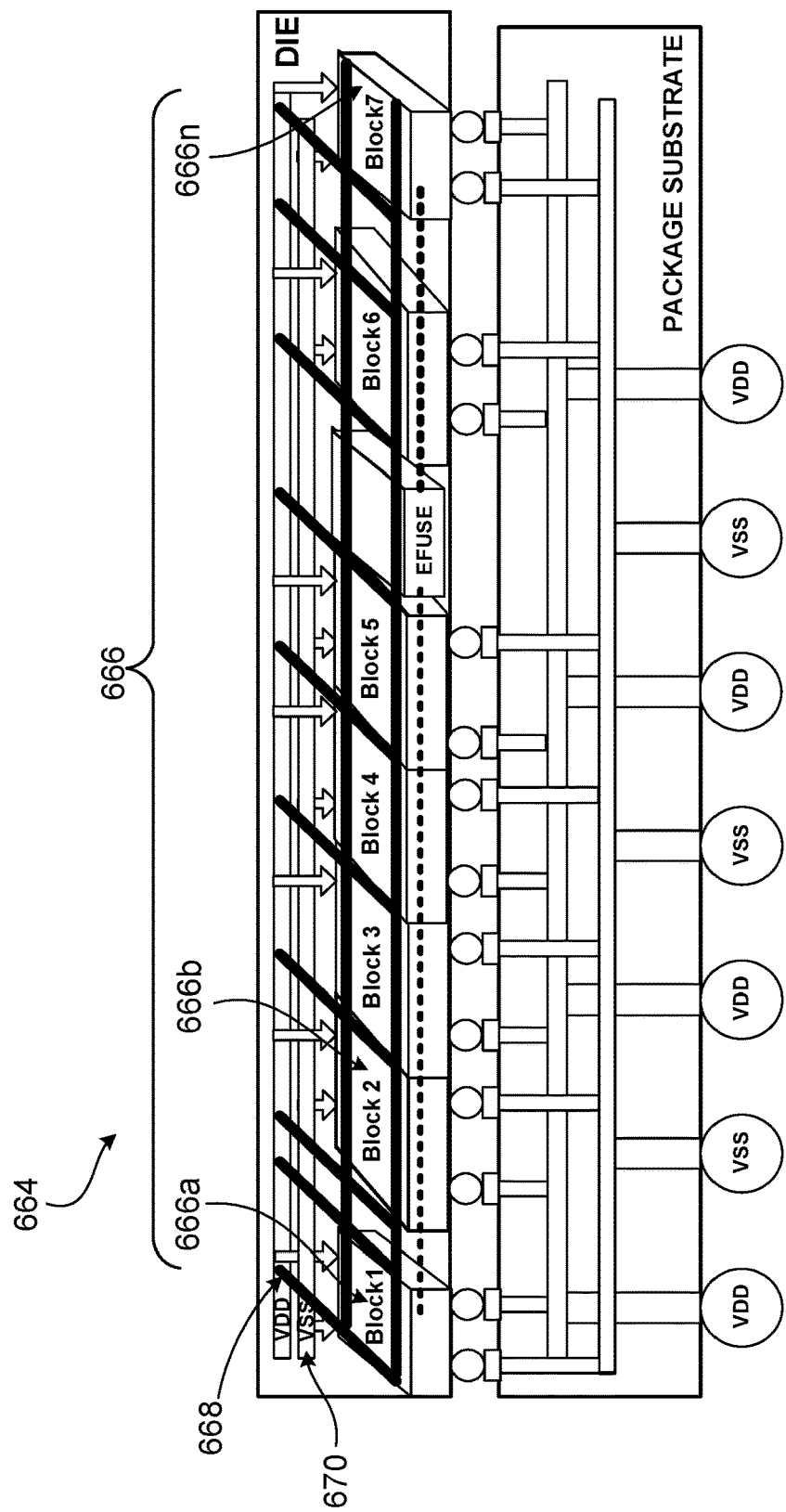
FIGS. 38A-38C are schematic diagrams of a system for distributing power.

FIG. 38A shows a schematic diagram of a system 664 that illustrates powering down blocks for providing derivative products. The example shown in FIG. 38A includes several blocks of logic 666a, 666b, . . . , 666n (666, in general) which are powered by VDD line 668 (positive of the power supply) and a VSS line 670 (negative of the power supply). The blocks 3?66 of logic or devices can utilize an internal control mechanism, such as an eFUSE 672 that distributes control signals to individual blocks 666 controlling when those blocks power down. In some cases, a block is powered down by turning off, for example, its clock and other incoming signals. However, when a block is disabled in this manner, leakage currents may still occur because power is still being supplied to the block.

Figure 38B:
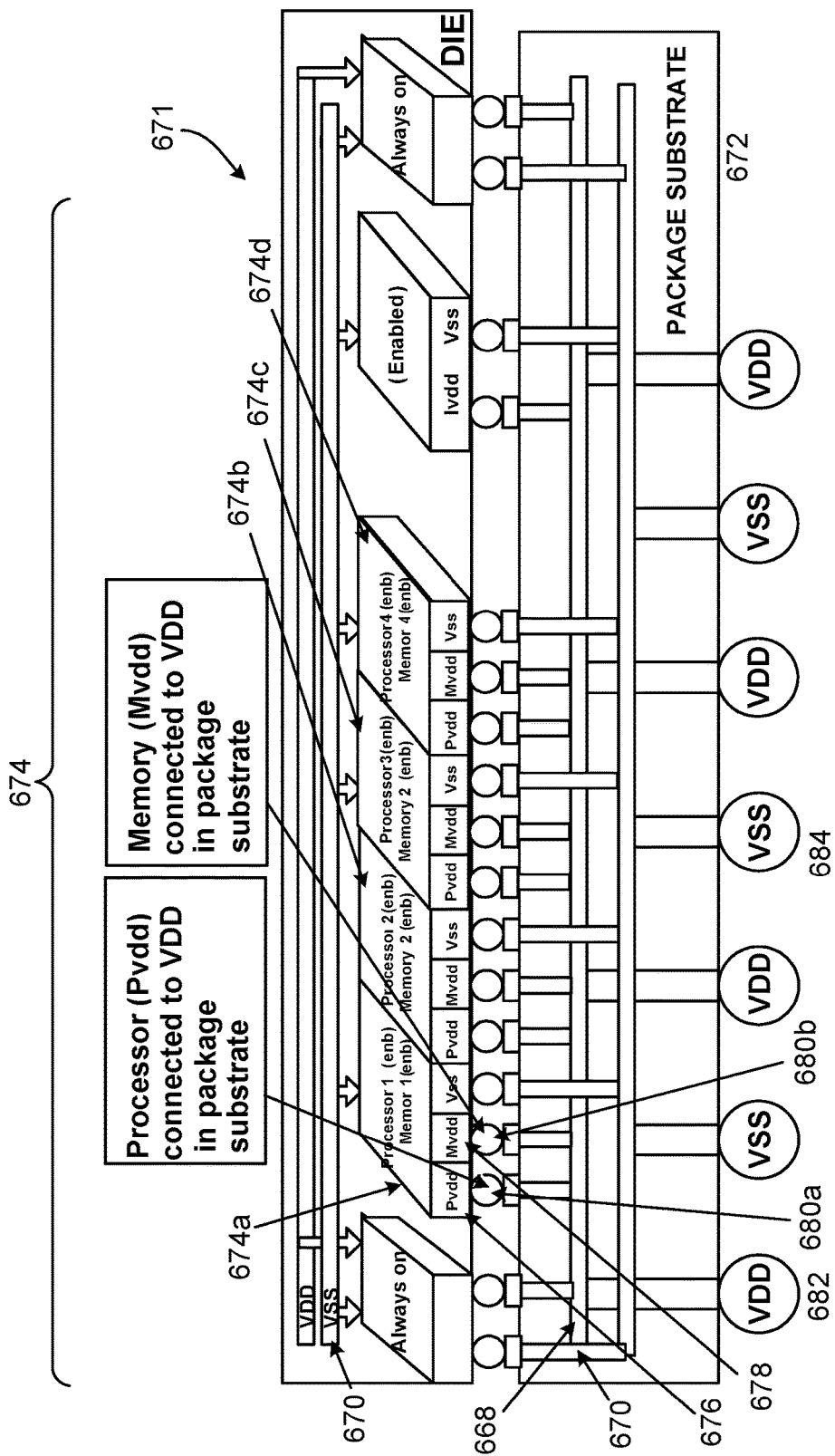

FIG. 38B shows an example of a four processor product 671 that uses a package substrate 672 to provide derivative products. The processor product 671 can include a plurality of processing engines. In the current example, the processor product 671 includes four processing engines 674a-674d (674, in general). Each of the four processing engines 674 includes two isolated supply rails. Pvdd 676 is the supply rail for the processor 674 and Mvdd 678 is the supply rail for the memory subsystem. The Pvdd 676 and Mvdd 678 supply rails for each processor are electrically isolated and can be used to enable any combination of powered-up or powered-down features. The die bumps 680a and 680b indicate that the corresponding block isolated supply rail (Pvdd 676 or Mvdd 678) can be connected to Vdd 682 (to cause the block to be powered up) or Vss 684 (to cause the block to be powered down) within the package substrate 672. If all of the processing engines 674 are enabled, the system 671 shown in FIG. 38B can be considered as functionally equivalent to the system 664 of FIG. 38A with all the blocks 666 powered up.

Figure 38C:
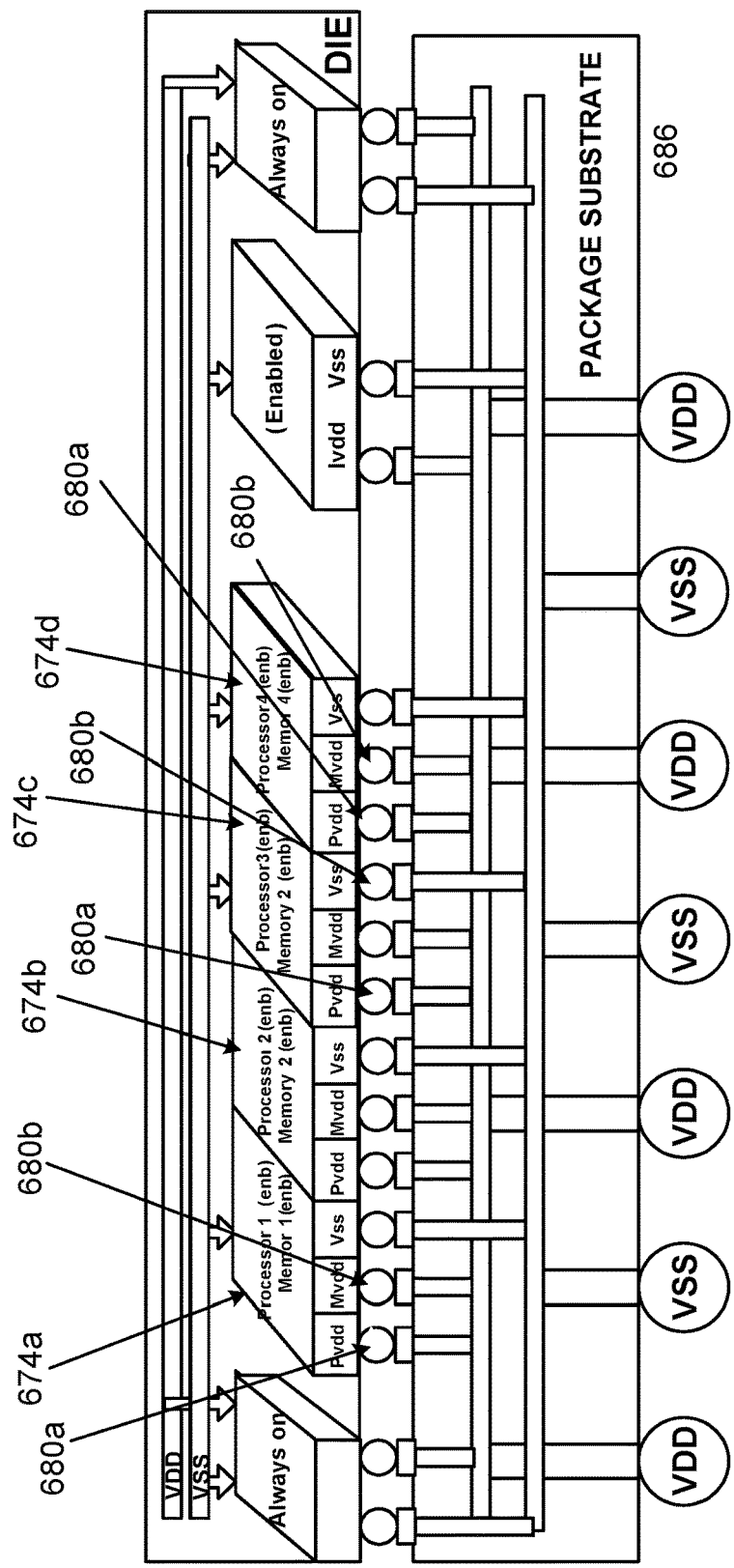

FIG. 38C shows an example of a system that illustrates a derivative part with two fully active processing engines 674a and 674b. However, for processing engine 674C the processor is disabled but not the memory subsystem. The processing engine 674d is fully disabled (notice the VSS connections to the Pvdd rails). The package substrate 686 is used to provide this derivative product. In this example, the die bumps are identical to that of the package substrate 672 of FIG. 38B with the exception that the Pvdd of the processing engine 674c and the Pvdd and Mvdd of the processing engine 674d are connected to Vss (as opposed to Vdd in the package substrate 672. In this example, the processor portion of the processing engine 674c as well as the processor and memory subsystem portions of the processor 674d do not consume any leakage power because their power supply rails are connected to Vss.

Using a customized substrate to power up or power down logic blocks is also useful because the approach allows selectively enabling parts of a processing engine such as a core or a tile. In a multicore chip containing many cores or tiles, it could be desirable in some cases to turn off just the processor portion, while keeping the cache and cache controller powered up. Such an approach allows for selectively increasing the processing or cache memory capacity of a chip.

Figure 38D:
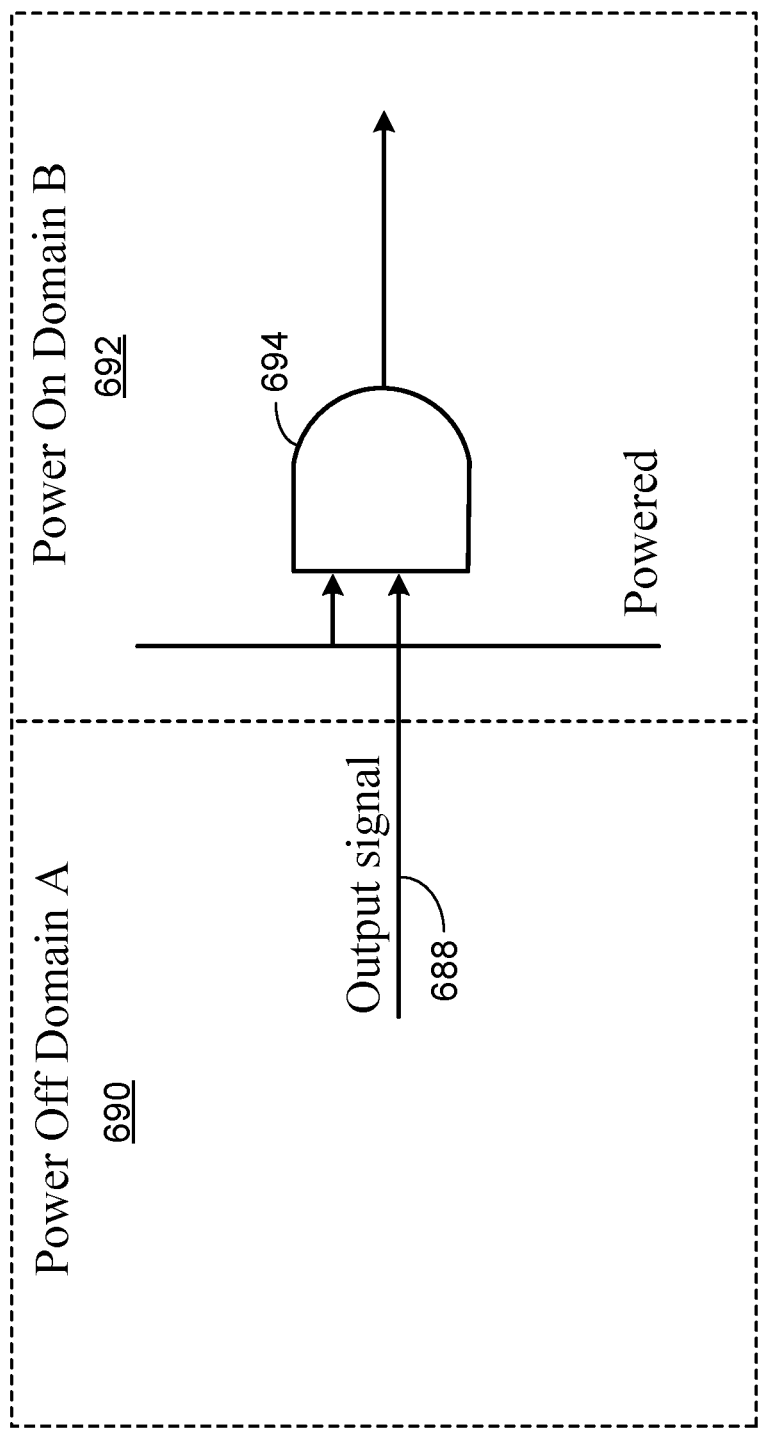
FIGS. 38D and 38E are diagrams of power control mechanisms.

When a particular domain or region is completely powered down, signals that cross from the powered-down (or powered-off) domain to a powered-on (or powered-up) domain can cause a problem if their values are floating. Such a situation is illustrated in FIG. 38D. In this example, an output signal 688 propagates from a power-off domain 690 to a logic gate 694 in a power-on domain 692.

Figure 38E:
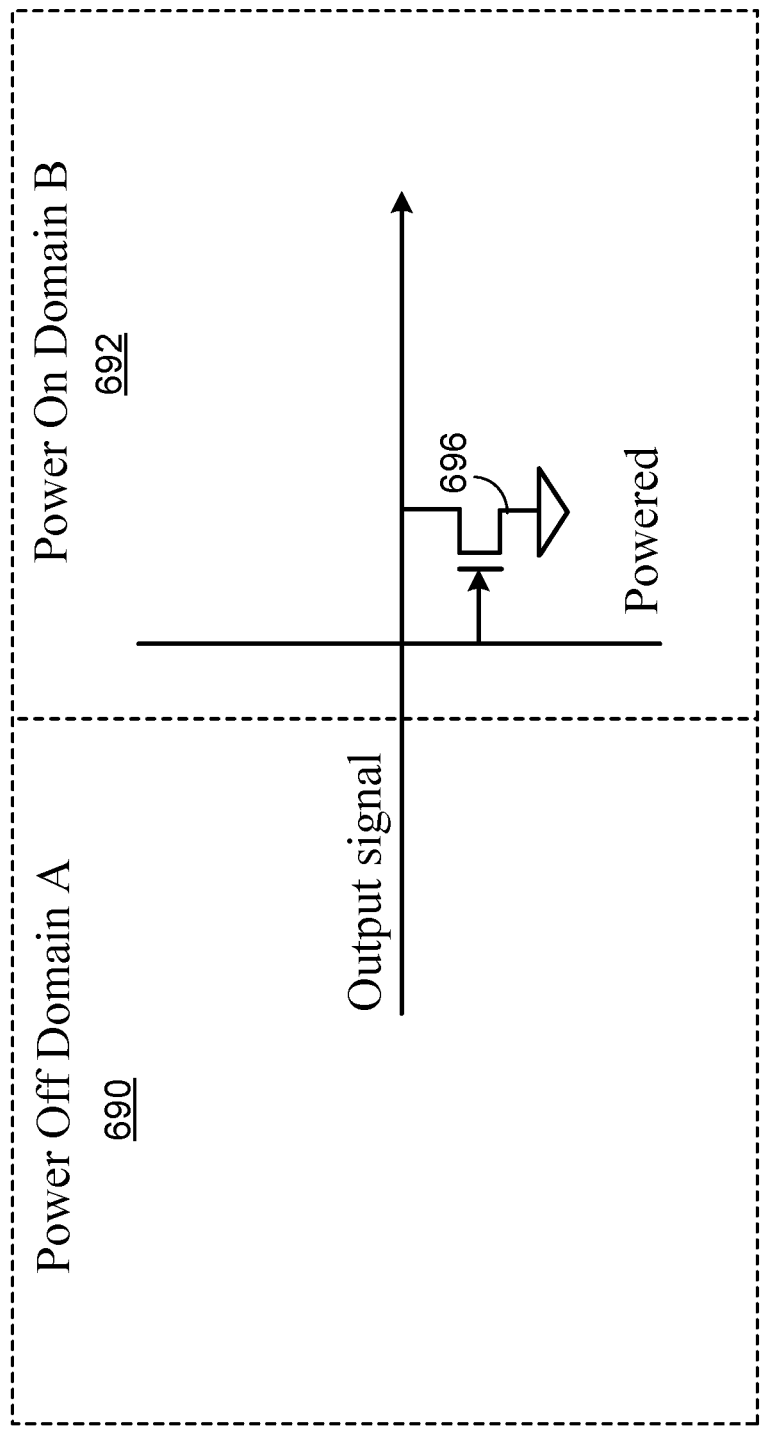

In some implementations, instead of a logic gate, a single transistor is introduced in the path of all signals that travel from one domain to another. FIG. 38E shows such a configuration where a signal line from a powered-down domain is received by a single transistor in a powered up domain. The circuit shown in FIG. 38E enables a control signal (that conveys the information that the domain A 690 is powered off) to directly control a NMOS transistor 696. The source of the NMOS transistor 696 is connected to the ground and the drain of the NMOS transistor 696 is connected to the output signal from the powered off domain 690.

Assume that the powered enable is on when the domain A 690 is powered up. Similarly assume that the powered enable signal is off when the domain A 690 is powered down. The inverted version of the powered enable signal controls the transistor 696, so that when the powered enable is off, the transistor 696 is on. Therefore, when the enable is 'off' the transistor 696 does nothing to the logic. When the enable is 'on,' the transistor 696 actively holds the signal to ground to ensure that a logic level '0' is maintained.

Figure 39:
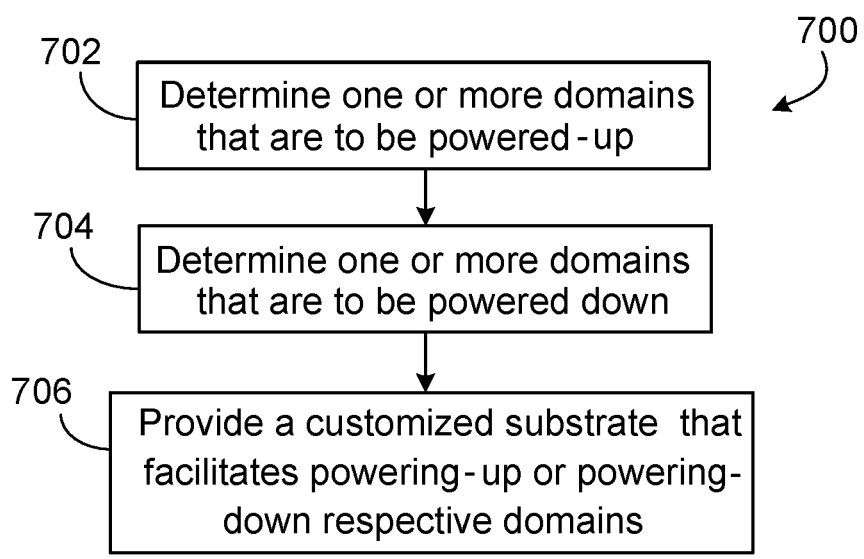
FIG. 39 is a flowchart of a power reduction method.

FIG. 39 shows a flowchart 700 illustrating an example sequence of operations for achieving power reduction in multi-core processors. Operations include determining one or more domains that are to be powered up (702). Operations also include determining one or more domains that are to be powered down (704). The domains that are to be powered up or down are in different regions of a multi-core processor. For example, a domain can include an entire core or tile of the multi-core processor. In some implementations, a domain includes one or more portions of a core or tile. For example, for a given core or tile, a processor portion can be within a power-off domain, whereas a memory subsystem of the same core can be within a power-on domain. Operations can also include providing a customized substrate that facilitates powering up and/or powering down of the respective domains (706). The customized substrate can be provided, for example, as described above with reference to FIG. 38A-38E.

21 Software Virtualization of Accelerator Descriptor or Result Queues

Acceleration engines use descriptor/result queues (which are also called rings) held in a cache or memory or registers in the accelerator engine for communicating with user processes that can request acceleration of certain functions. These queues may need to be accessed by the user processes running on the cores. There are different ways of communicating with these queues. Such acceleration engines are used for multicore interface for coprocessor acceleration in (MICA) such as with public key authentication (PKA).

In one approach, memory-mapped input/output (MMIO) hardware mechanisms are used to allow user processes to read from and/or write to an accelerator's registers directly. MMIO mechanisms virtualize the accelerator's registers allowing a number of user processes to access these registers directly in a protected manner using, for example, a memory interface with normal loads and stores.

Alternatively, the queues are virtualized using a software approach, for example using the hypervisor to multiplex the queues among multiple user processes. This is useful in applications of accelerator engines where very high performance is not required for certain applications, as discussed above. The software approach of virtualizing queues can be a low-cost (for example, requiring less hardware) way of achieving similar goals as MMIO.

Although virtualization of descriptor and result queues are discussed herein using PKA security acceleration, the techniques can be applied for other acceleration engines as well. PKA is used only as an example. A software virtualization layer in the hypervisor is used to extend the capacity of the queues or rings to manage them efficiently.

Typically the PKA engine's descriptor/result queues are multiplexed among multiple user processes in a way that the processes do not interfere with each other's use of the accelerator. Furthermore, the descriptor/result queues are stored in a static random access memory (SRAM) memory structure such as "window RAM." Window RAM refers to memory that resides in the PKA block on the MICA shim configured as a block of MMIO registers to a tile or core. This RAM, which stores the queues, is of a limited size, and if the PKA keys to be authenticated are large, then only a small number of keys can be queued for processing. In some cases, the queues may stall when the application running the queues is swapped out by the operating system (OS), because, for example, the accelerator engine is configured to wait until the result is acknowledged by the application before advancing the queue.

In some implementations, a software mechanism (or virtualization layer) is added at a higher protection level (PL) to facilitate larger queues, and restrict access to the virtualized queues on a per-application basis. The software virtualization layer can be implemented, for example, in a hypervisor or an operating system. The user application can communicate with the software virtualization layer, which in turn communicates directly with the PKA hardware via the window RAM. In such cases, the software virtualization layer running as part of the hypervisor mediates access to the queues among multiple user processes. Several advantages are provided by this approach. For example because the only path to the hardware queues is through the software virtualization layer, the software layer can mediate access to the hardware. This can allow the software virtualization layer to prevent interference between multiple applications running on different cores. The software layer can extend queue sizes beyond the capacity offered by the window RAM. The capacity of the window RAM can be relatively small due to the high cost of dedicated on-chip RAM. The software layer can use the normal tile memory space, which can be supplemented by lower-cost external DRAM, to provide extended capacity. A user application (for example an application A) using the queues is swapped out by the operating system while a PKA engine operation requested by the application A is in progress. In this situation, the virtualization software swaps out the state corresponding to the application A (including the result), and keeps the hardware queue busy with processing for other applications. The application A is informed of the result when the application A is swapped back in.

Features of the software virtualization layer can include one or more of the following: The software virtualization layer runs in the hypervisor (or the operating system, for example) at a higher protection level (e.g., PL2) than user processes or user applications (that may be running at PL1), and maps the address space for the hardware queues' window RAM in the accelerator to a higher protection level. The higher protection level is associated, for example, with the hypervisor that cannot be accessed by the user-level applications. The descriptor/result queues are managed using software. The number of queues and the number of entries per queue are configurable, and can exceed the capacity of the hardware. Access routines in the software application can allow user applications to add descriptors to the virtualized descriptor queues and poll the virtualized result queues. These routines can perform a system call into the hypervisor. A service routine can run at a high priority and maintain the hardware descriptor and result queues. The service routine can monitor the queue depths (for example, via polling of completed results or by receiving threshold interrupts from the hardware), and feed and/or drain the hardware queues as needed. The descriptor queues can be fed from the virtualized descriptor queues, and the results read from the hardware result queues can be buffered in the virtualized result queues until they are passed to the applications. Methods can be provided to allow user applications to register for and receive completion interrupts when the PKA operation is completed. In some implementations, the methods can include delivering interrupts from the hypervisor to user code.

Figure 40A:
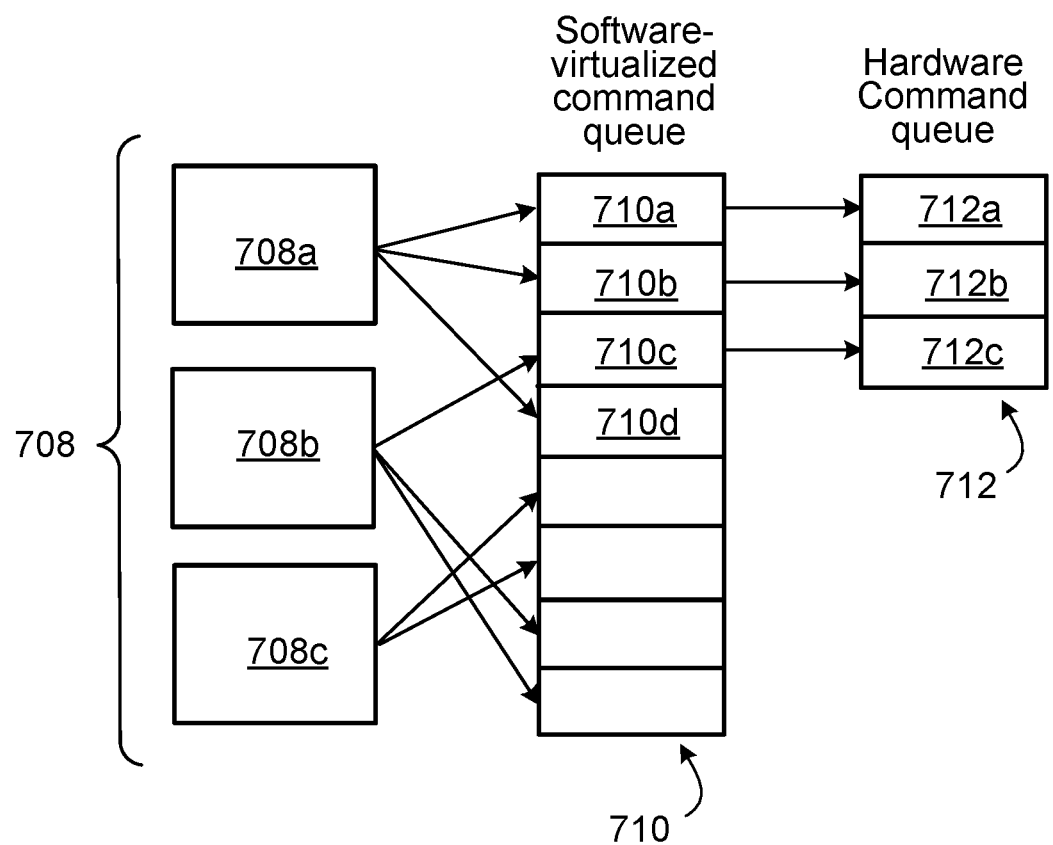
FIGS. 40A-40C are diagrams of queues.

FIG. 40A shows an example of virtually extending a small hardware queue. Different applications 708a, 708b, 708c (708 in general) place their commands on the software-virtualized command queue 710, and the virtualization software moves or copies the commands to the hardware queue 712 if there is room or as space becomes available in the hardware queue. In this example, the topmost (or first) position 710a and the second position 710b of the software queue 710 contain commands or instructions from the application 708a. The third position 710c of the software queue 710 is taken up by a command from the application 708b whereas the fourth position 710d is taken up by a command from the application 708b. In general, the software virtualized queue 710 has a higher capacity than the hardware queue 712. In this example, the hardware queue 712 includes only three elements 712a, 712b, and 712c that are taken up by the first three elements 710a, 710b and 710c of the software queue, respectively.

Figure 40B:
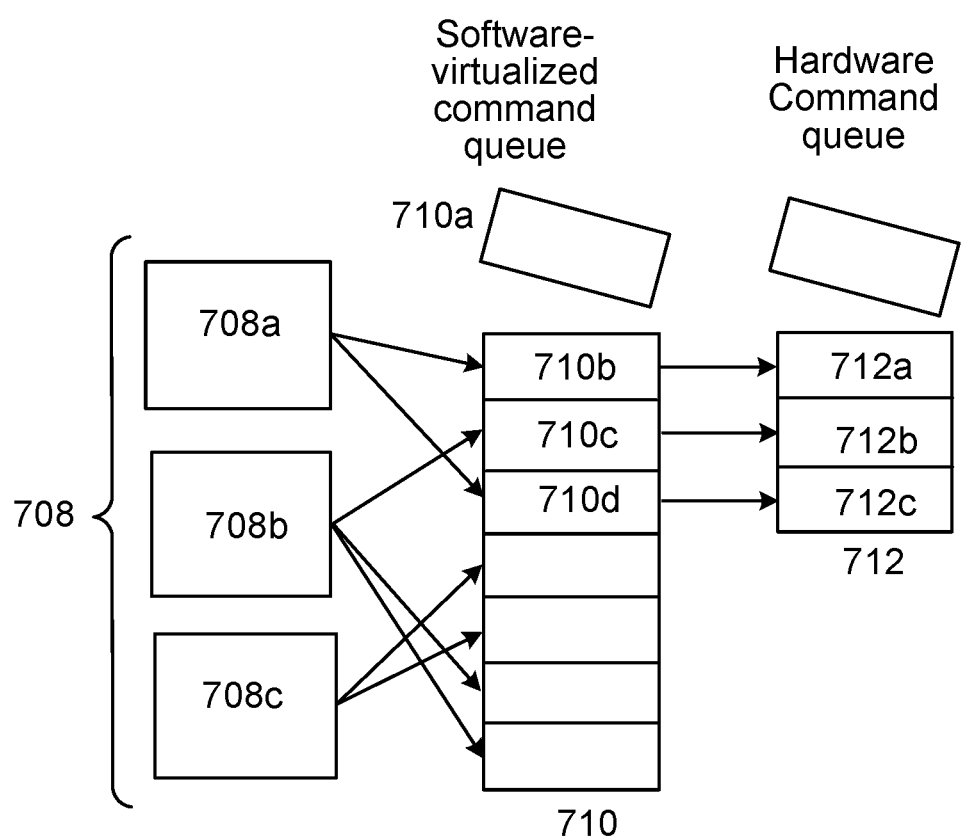

FIG. 40B is a schematic diagram illustrating an example of a command being completed by the hardware. In this example, when an element (e.g. the element 710a of the software queue that was originally in the element 712a of the hardware queue) is popped off of the hardware queue (for example, upon completion of execution), the contents of the elements 712b and 712c move up to the elements 712a and 712b, respectively, making room for the command stored in element 710d from the software queue 710 to move into the element 712c of the hardware queue 712. The virtualization software can monitor the hardware queue and perform this action.

Figure 40C:
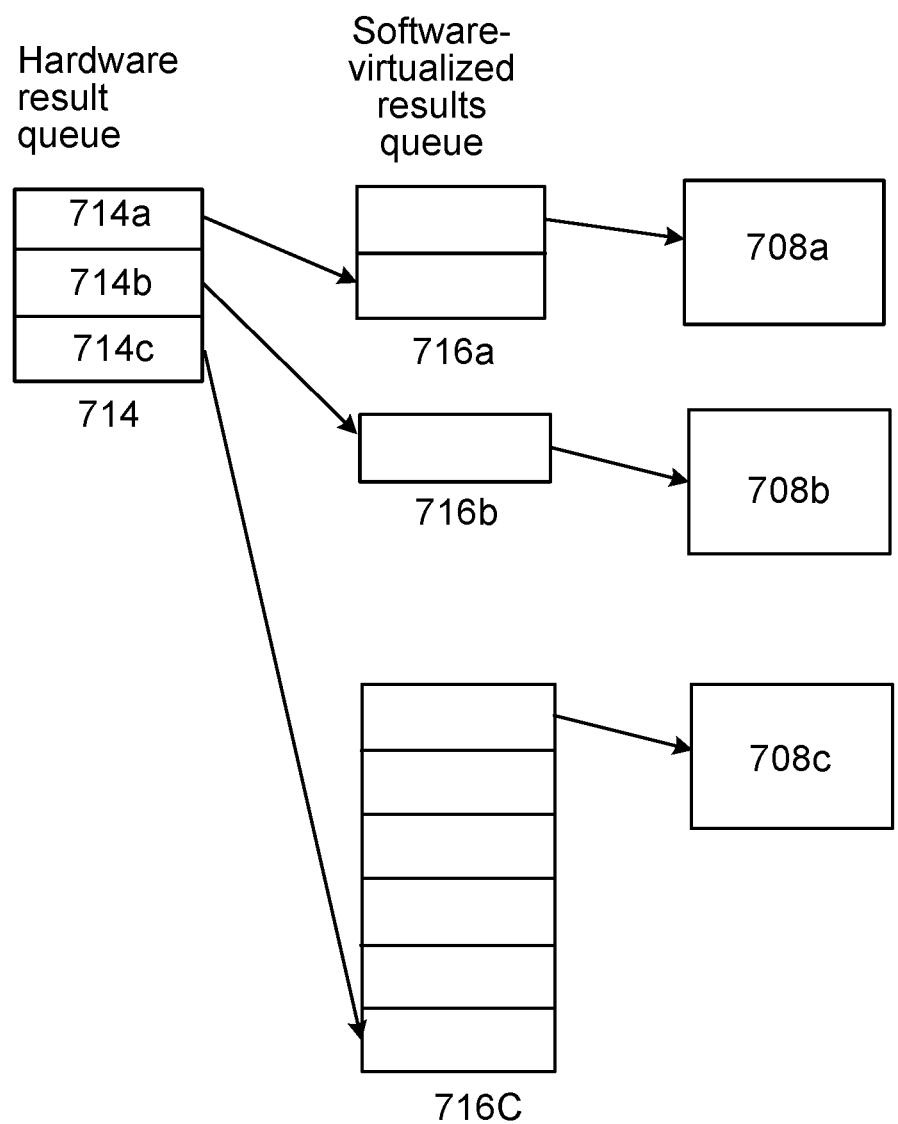

FIG. 40C shows a schematic diagram illustrating how a small result queue 714 of the hardware is extended and split into separate destination queues (for example, the queues 716a, 716b and 716c). In this example, the application 708c is blocked from running, and therefore cannot remove elements from a result queue. Without software virtualization, the small hardware queue 714 would not have been able to advance. However, the virtualization software removes results off the hardware result queue 714 as they are ready, thus allowing the hardware to continue working on other applications' commands.

Figure 41A:
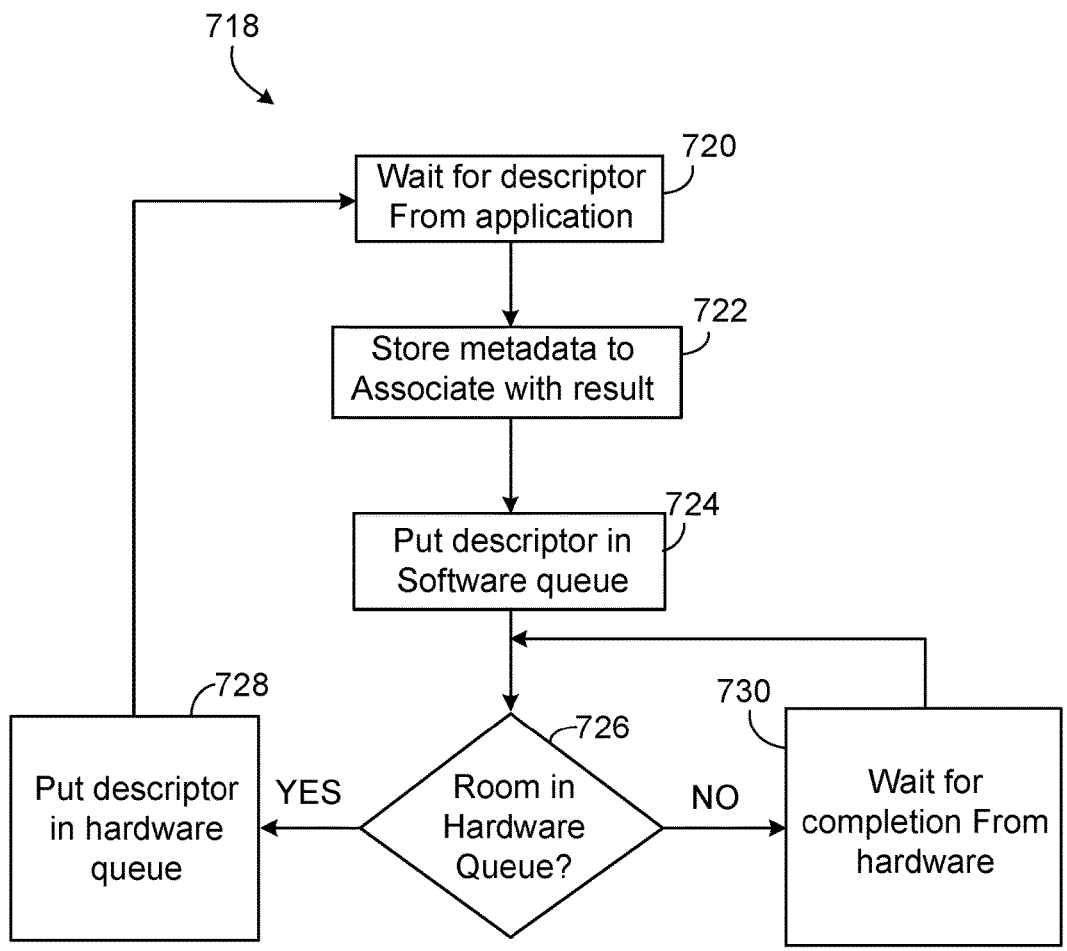
FIGS. 41A and 41B are flowcharts of hypervisor operations.

FIG. 41A shows a flowchart 718 illustrating an example sequence of operations performed at the hypervisor in the processing of a command descriptor queue such as the command queue 710. Operations include waiting for a descriptor from the application (720). Once a descriptor (or command) is received from an application, metadata related to the descriptor is stored (722) such that a corresponding result may be associated with the result. Operations also include placing the descriptor in the software queue (724) such as the software queue 708. Typically, the software is configured to track the software queue and the descriptor is placed in the memory location corresponding to the next available position in the software queue. Operations also include checking (726) whether there is room or memory location available in the hardware queue. If the hardware queue has an available memory location, the descriptor or command is placed in the hardware queue (728) and the Hypervisor continues to wait for another incoming descriptor (720). On the other hand, if the hardware queue is filled to capacity, completion of command(s) in the hardware queue is waited on (730) until the hardware queue is freed up.

Figure 41B:
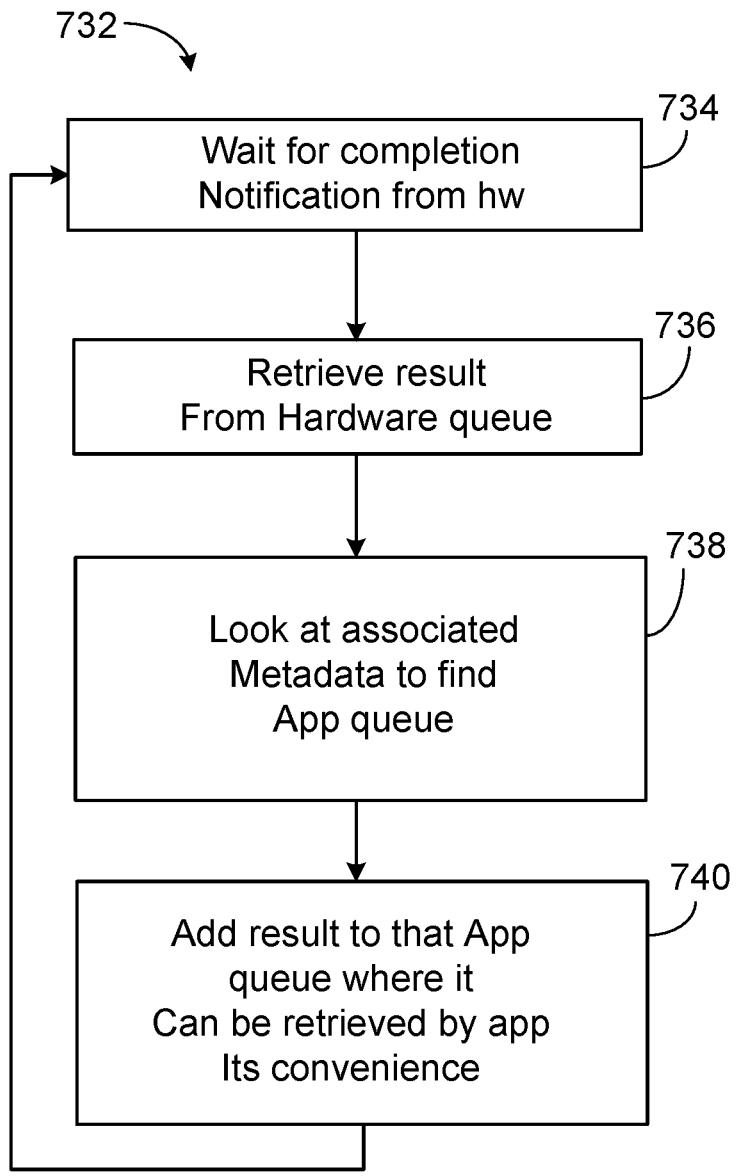

FIG. 41B shows a flowchart 732 illustrating an example sequence of operations performed at the hypervisor to process the result queue. Operations include receiving a completion notification (734) from the hardware. Once the notification is received, a result is retrieved from the hardware result queue (736). Operations also include looking at associated metadata to determine which application the result corresponds to and finding the appropriate software result queue (738). Once the appropriate software result queue is located, operations also include adding the result to that software result queue (740) such that the corresponding application can retrieve the result as needed.

22 Mechanism to Pre-Fetch Instructions into Instruction Cache and Mechanisms for TLB Optimizations In a multicore processor such as the Tile processor, it is sometimes desirable to pre-fetch instructions into the Icache to minimize latency. For example, when executing a mutually exclusive code, a lock may be acquired, which can be released once the code is executed. Because other processes are blocked during the time the lock is held, it could be desirable to minimize or reduce the time spent holding the lock. If the code to be executed under the locked condition is not in the Icache, the time spent waiting for the Icache fill is spent while holding the lock, increasing the time the lock is held. One approach can be to pre-load (or pre-fetch) the code into the Icache prior to acquiring the lock. In such cases, the time spent waiting for the Icache fill is spent without holding the lock.

Typically, the processor(s) can execute an "iprefetch" instruction. This can provide a virtual Address related to the pre-fetch. In some implementation, such an instruction facilitates one or more of: a virtual to physical address translation (for example, using the ITLB or an Icache probe to see if the instructions are already present, and if not, request the instructions from the memory system, or writing the instructions into the Icache when the requested instructions are returned. Because the pre-fetch is done in addition to normal Istream access that also use ITLB and Icache, some type of arbitration or pipeline stall are used to allow the Istream access. This can add complexity to the pipeline control.

In some implementations, a function already in the processor pipeline can be used for pre-fetching instructions. An advantage of this approach is that a need for a separate process or mechanism (designing, validation etc.) is eliminated.

In some implementations, to accelerate the access to a software table (for example, a software managed hash table) residing in the memory and containing, for example, TLB entries and possibly metadata, a register can be added to the hardware to store the base address of the software table. In some cases, this can be referred to as TSB_BASE_ADDR register. The TSB_BASE_ADDR register can also be configured to store additional information on the software table such as the number of entries, the size of each entry, and the page size for the particular table.

Implementing Pre-Fetch Using the Single Step Mechanism

The mechanism for a single step interrupt, which is useful for program debug, can also be used for instruction pre-fetching. The single step function is implemented such that, when the function is enabled, each instruction causes an interrupt prior to completion. This allows the single step interrupt handler to examine the program counter (PC) (for example, to determine the address of the next instruction) and re-start execution of the instruction to allow the execution to be completed (possibly after completing one or more other single step related activities such as examining registers, memory, etc.).

In some implementations, the instruction pre-fetching can be accomplished by changing the value of the PC that the single step handler returns to, such that execution of the instruction is not completed at that time. However, because the instruction is interrupted just prior to completion, the instruction is already fetched from the memory and placed into the Icache. In such cases because the instruction is already in the Icache the fetch and fill steps can be skipped.

Figure 42:
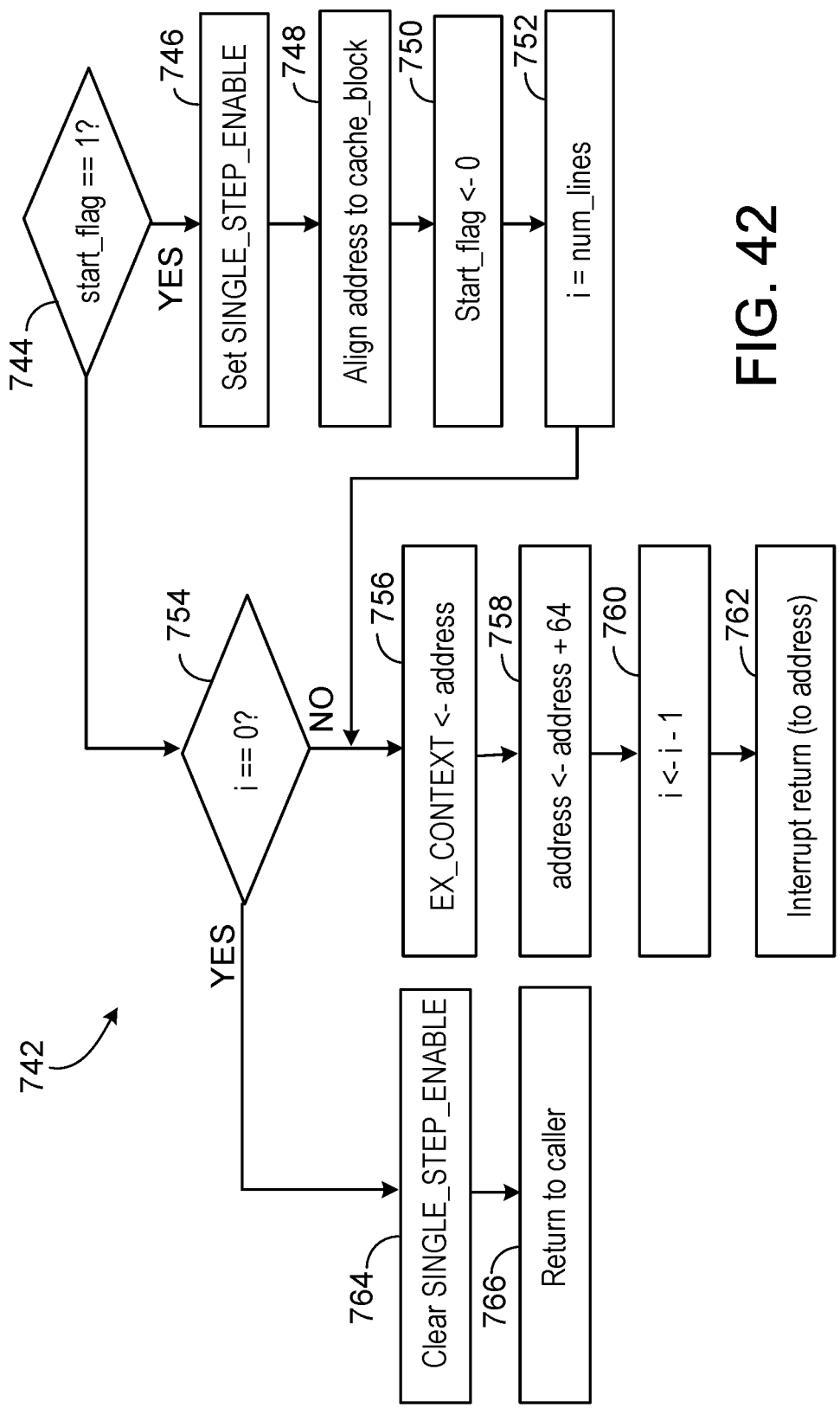
FIG. 42 is a flowchart of a prefetch procedure.

FIG. 42 shows a flowchart 742 illustrating an example sequence of operations for pre-fetching instructions. A program that requires a pre-fetch of some instructions executes a call, much like a function call. The input parameters to the call include, for example, a starting address virtual address (VA to pre-fetch, and the number of cache lines for which pre-fetch is requested. The caller program then invoke the single step handler directly, via a subroutine jump instruction rather than due to a stepped instruction. Operations of the single step handler can include checking if a start flag is set (744). If the start flag is set, single set enabler (e.g. the bit or register SINGLE_STEP_ENABLE) is also set (746). Setting the single set enabler can make the instruction "iret" trigger an interrupt. Operations also include aligning the address to the Icache block (748) and resetting the start flag to zero (750). The number of cache lines for which pre-fetch is requested is saved in a variable (752) (the variable i in this example). This variable is decremented by one (760) each time an instruction corresponding to a cache line is pre-fetched and the pre-fetching continues until the variable becomes zero. Operations can also include checking (754) if the value of the variable (i in this example) is zero. If the variable has a non-zero value, the address of the line to preload or pre-fetch is provided to EX_CONTEXT and the address value is increased (e.g. by 64 or another appropriate number of bits) (758). After the variable storing the number of cache lines is decreased (760), the interrupt returns to the line (762). The check 754 is then repeated and the above set of operations performed again if a non-zero value is detected. When a zero value is detected by the test 754, the SINGLE_STEP_ENABLE is cleared (764) and control is returned to the calling program (766), for example, via a subroutine return instruction. Exemplary pseudo code for the above operations is given below:

single_step:
  // Single step interrupt handler code used to preload Icache.
  // Inputs:
  // r20—address
  // r21—number_of_lines_to_pre-fetch
  // r22—start_flag

```
// Outputs:
// r0—0=success, 1=fail
if (start_flag)
{
   set SINGLE_STEP_ENABLE // This makes the
      instruction iret goes
      // to interrupt before committing
   address %=64 // Align the address to Icache block
   start_flag=0
}
// Loop to preload each requested line
for (i=num_lines; i>0; i--)
{
   EX_CONTEXT=address // iret addr is the line to
      preload
   EX_CONTEXT_3_1=PL1
   address+=64 // Next line
   iret // int return to the line
}
clear SINGLE_STEP_ENABLE
return 0
```

In some implementations, the Single Step handler is entered for the first time by the subroutine call, and again as each line is fetched. The value in start_flag is used in differentiating between these two situations. The handler can be configured to run at a privilege level that allows the handler to set and clear the SINGLE_STEP_ENABLE (for example, via a SPR). Typically, the caller does not need any specific privilege level. The overhead of each line fetch is only several instructions; if the pre-fetched code is not in Icache then the overhead is usually small compared to the overall time.

In some implementations, the pre-fetched lines can be kept in the Icache by ensuring, for example, that the pre-fetched lines are not evicted due to other Icache misses (also called "pinning" the pre-fetched lines). This can be implemented, for example, by setting aside one or more lines of the Icache for pinning, which has the side effect of diminishing the effective size of the Icache for other codes.

Translation Lookaside Buffer Optimizations

Figure 43:
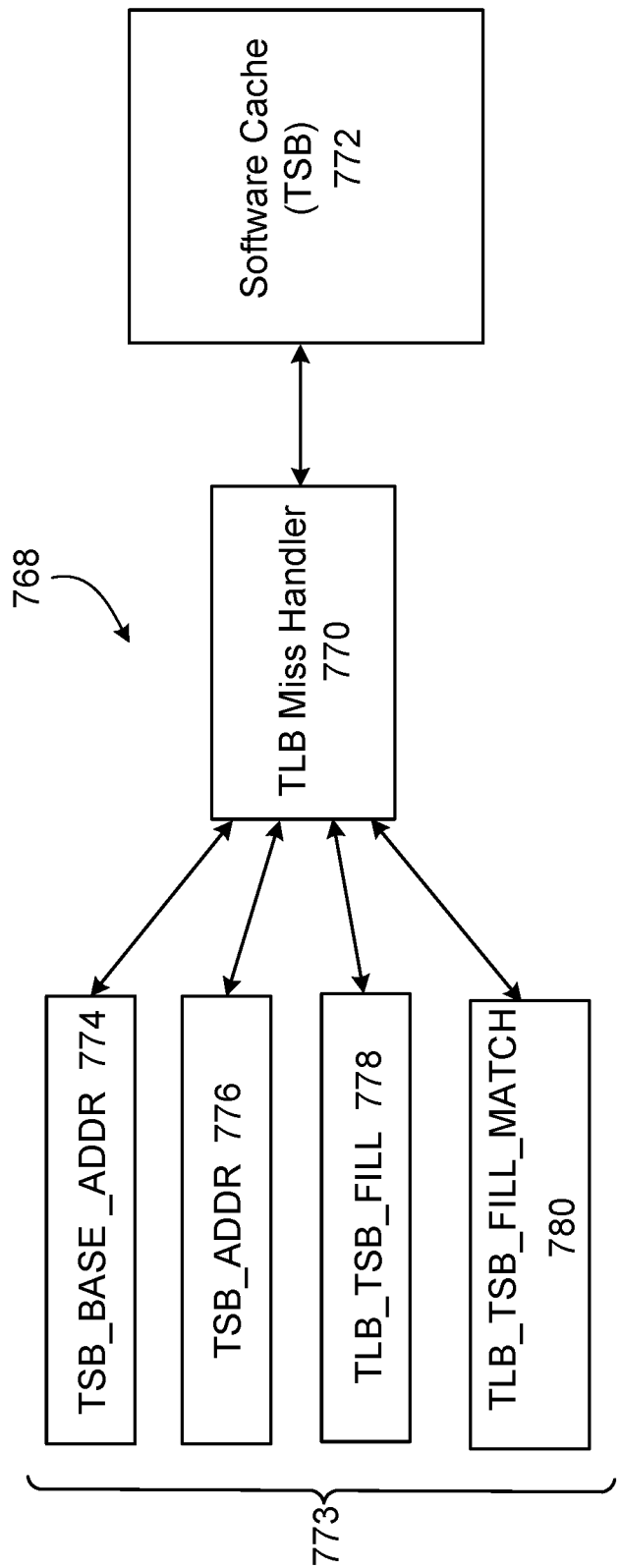
FIG. 43 is a block diagram of a translation system.

A multicore processor typically also includes a translation lookaside buffer or TLB. Various optimizations for the translation lookaside buffer are also possible. TLB misses are often handled in software and can be accelerated. FIG. 43 shows a block diagram 768 of an example of a system for optimizing a TLB miss handler 770. For example, one approach is for the software for the TLB miss handler 770 to maintain a software cache 772 of TLB entries. This software cache 772 used by the TLB miss handler 770 is sometimes referred to as a translation software buffer TSB A translation software buffer it is simply a cache of translation entries maintained in software.

The software cache 772 of the TLB entries, or TSB, can also be optimized. For example, additional hardware 773 is provided to accelerate the access to TSB 772 and to accelerate the filling of a hardware TLB (which is typically managed using software). In order to accelerate the access to a software table that resides in the software cache 772 and which includes TLB entries and possibly metadata, a hardware register 774 (such as the TSB_BASE_ADDR register described above) is provided to store the base of the software table. When a miss occurs, a register TSB_ADDR 776 is loaded with a memory address, with an entry that may satisfy the miss is found. Alternatively, the TSB_ADDR register 776 may store and return the address of the entry corresponding to the last cache miss. In some implementations, multiple sets of TSB_BASE_ADDR 774 and TSB_ADDR registers 776 are provided such that dedicated ones of those registers are used for data and instructions and such that different registers can be used for differing page sizes. In some implementations, a unified set can be used for data and instruction TLBs.

Another way to accelerate TLB filling is to use the hardware to check whether a TLB entry successfully addressed the last TLB miss. In order to accomplish this, an extra TLB fill register or set or registers is added to check whether the TLB entry being written matches the last address missed in the TLB. Each of these one or more registers referred to here as a TLB_TSB_FILL register 778. If a TLB entry is larger than a single register, multiple TLB_TSB_FILL registers 778 (referred to as TLB_TSB_FILL_xxx registers) can be used. When a single TLB_TSB_FILL or the last one of the multiple TLB_TSB_FILL_xxx register is written into, the last address that was missed in the TLB is checked against the TLB entry being loaded. If the entry matches (e.g. in address range and page size), the TLB is filled with this entry, else the TLB is not modified. This can mechanism can work for both instruction and data TLBs, unified TLBs, or direct mapped and associative TLBs. In some implementations, multiple of these registers can be in a single architecture.

In addition to the TLB_TSB_FILL and TLB_TSB_FILL_xxx registers, in some implementations, it could be useful to indicate to the software whether a TLB write occurred or did not occur. Therefore, in some implementations, a TLB_TSB_FILL_MATCH register 780 is loaded when the TLB_TSB_FILL or the last one of the multiple TLB_TSB_FILL_xxx register is written into. The TLB_TSB_FILL_MATCH register 780 value indicates whether a modification to the TLB occurred in response to a write operation into the TLB_TSB_FILL or any one of the TLB_TSB_FILL_xxx registers. One example implementation could load this register with a '1' if a write occurs and a '0' if no modification to the TLB takes place. In some implementations, there can be multiple TLB_TSB_FILL_MATCH registers 780, for instance one for the instruction TLB and one for the data TLB, or there can be a unified register for the instruction and data. In some implementations, multiple TLB_TSB_FILL_MATCH registers 780 can be paired with multiple TLB_TSB_FILL or TLB_TSB_FILL_xxx registers 778.

23 Mechanism to Power Down Processors and Distributed Caches in a Multi-Processor In some implementations, a cache-coherent multi-processor can be powered down for energy savings and reliability. In a distributed cache-coherent multiprocessor system, data may be distributed widely and in a manner which is unknown or unpredictable to user-level software. In order to save power in these systems, it may be desirable to be able to shut off the power of, or power down, the processor, and/or distributed cache elements, when utilization of these elements is low such as below a threshold. Managing the power down may require some additional processing in the network and distributed caches, for example, to maintain cache and data coherence when the elements are powered down. This could be relevant, for example, where data homing is used in the cache coherence protocol).

In some implementations, a network 788 receives a message from a client (e.g. a connected processor or cache system, or a core 782), the message including information that the client or core 782 is no longer operational because of a power down. The network 788 ignores egress traffic 790 (i.e., traffic coming out of the core 782 and into the network 788) from the processor and discards traffic 792 destined for the core 782. System software or hardware can ensure that cache coherence is maintained even if the cache on a powered down core is shut off. The power supplies 796 for the network can be isolated from the power supplies 794 for the processor and cache system to allow the network to function while the processor and cache system is powered down.

The processor (within a core or a tile) can receive a power down message from several possible sources. One possible source is the actual power rails. Other sources include, for example, software programmable registers, and non-volatile EFUSE bits. Power down conditions can affect one or more portions of a core. For example, a power down may shut off power to both the processor and the distributed cache subsystem, or only the processor.

Figure 44:
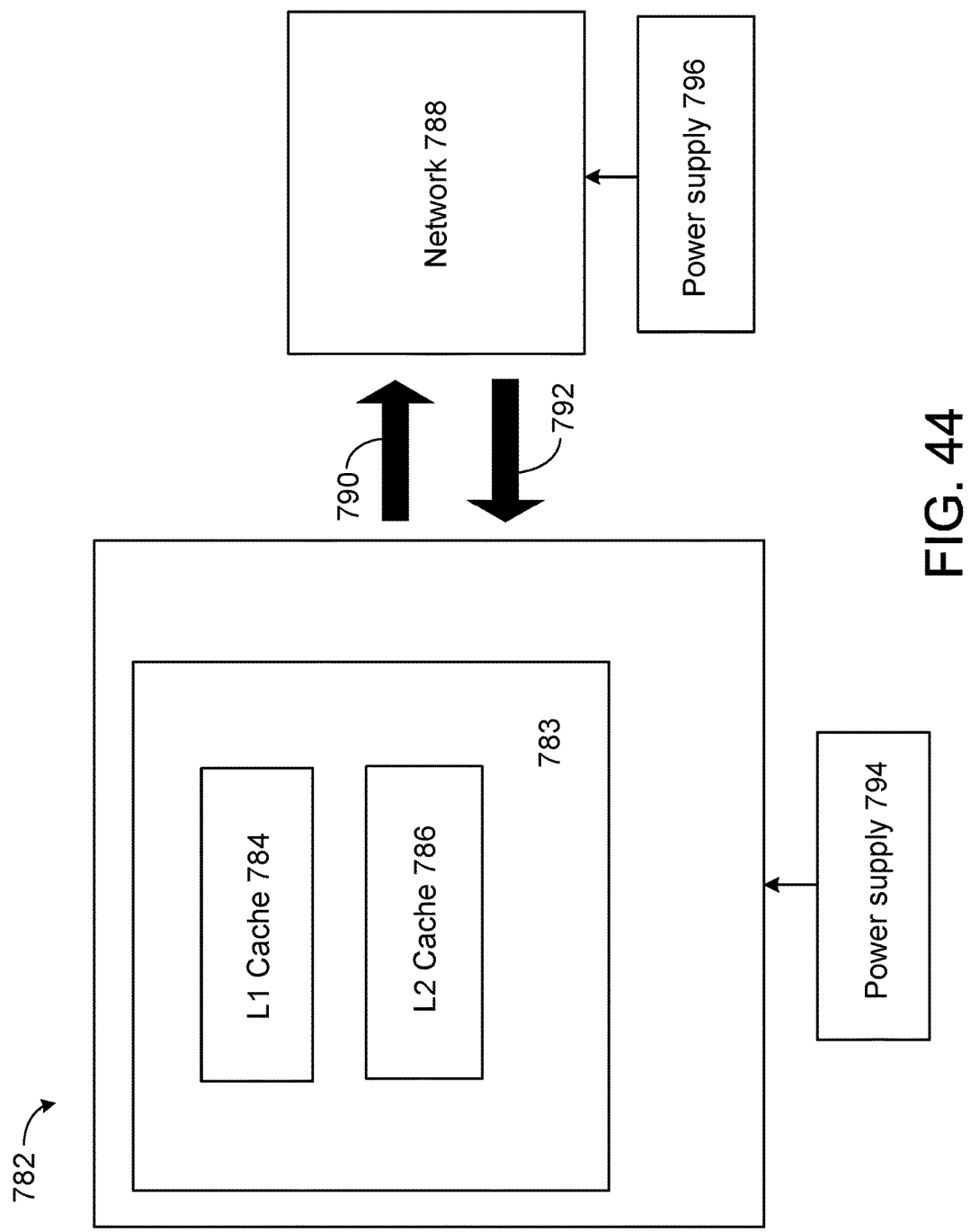
FIG. 44 is a block diagram of a core.

Managing the power down can depend on which portion or portions of the core are powered down. Some examples are discussed below with reference to FIG. 44 that shows an example of a core 782, at least a portion of which, can be powered down. The core 782 is substantially similar to the core or tile 3 described with reference to FIG. 1A. The processor 783 within the core 782 can also be substantially similar to the processor 10 described with reference to FIG. 1B.

In one example, in those situations where only the processor 782 (and possibly the corresponding L1 caches 784, for example the caches that reside in data memory 16 and 18 referred to in FIG. 1B) is being powered down, the active or "dirty" caches (L1 instruction and L1 data cache) can be written back to memory or other available caches (for example, either to the L2 cache 786 on the same tile, or to another cache on another tile, or to memory). If the processor has a write-through cache policy, no action is required, because the data is updated earlier through a write operation. In some implementations, the processor or cache subsystem can still acknowledge invalidates for the processor if the cache-coherence protocol requires such acknowledgements.

In another example, the distributed cache (e.g. the L2 cache 786) can also be powered down. The powering down of the distributed cache on a tile or core can be managed with additional processing. In some implementations, if the distributed cache is not write-through, the dirty or active data can be flushed back to memory or a different distributed cache location (or different home location). If the distributed cache is in fact write-through, additional operations may not be needed. In some implementations, the distributed cache may include data that is marked as shared in the directory entry at some other home location. In a directory based protocol, other directories may record the powered-down cache as being a sharer of some data. In some implementations, this may cause invalidates to be sent to this cache from the home tile or home location if a new update of that cache line occurs. This can be handled in several ways. In one approach, for example, when a particular cache is powered down, a message can be sent to every directory that the particular cache should be removed from the sharer set of all caches. In another approach, the network or a logic block can remain powered up to process the invalidate messages for the powered down subsystem or cache. In some protocols, there is no processing required and the invalidate message can be just discarded. In other protocols, acknowledgement signals are sent in response to the invalidates. In some implementations, the powered down cache is the home location for the directory entries for some cache lines. If the distributed cache subsystem is implemented using a directory protocol, the directory elements allocated to the powered down cache is moved to a different directory.

The directory elements are usually used to keep track of the sharers for the cache lines. Also, if the directory is stored in a given cache, then that cache is the home location for the directory. Moving the directory elements allocated to the powered down cache can be done, for example, by the powered-down cache subsystem sending messages to other elements of the distributed cache, or by a software-mediated process. Examples of hardware and software used for this are discussed below.

In some implementations, the powering-down of a core (for example, the core 782) and/or the associated caches are initiated by software (e.g., in the operating system (OS) or the hypervisor). The software can be configured to make sure that all the entries that are homed on the powered down cache on the core 4?882, are rehomed or reassigned to other cores. As an example, consider that the home locations are established by the software (e.g., by the OS) for pages by entering the home locations in the TLB and page tables. In this case, for each page homed in the core 782, the OS invalidates the corresponding page entry in all the TLBs of all the other cores, for example, cores that are connected to the network 788. Therefore, if another core tries to access a cache line on a page homed in the core 782, a fault will occur and the home may have to be checked and updated.

If needed, the page table entry is updated with a new home location for that page. In some implementations, the OS can lock the page table entry during or before the update, to make sure that no other core can access the old page table entry while the entry is being updated. The OS can also invalidate each of the cache lines contained in the core 782, so that as each line is invalidated, the corresponding shared lines in other caches (pointed to by the directories in the cache in core 782) are also invalidated. Then, the OS can release the lock on the page table entry.

The rehoming is discussed below in additional detail in the section titled "Software rehoming details".

Hardware:

In some implementations, the homing locations are specified in hardware, for example, by a hash function on the memory address, or by a hardware hash for the home table which maps addresses to home locations. This hardware hash for the home table can be maintained in every core, such that when the core 782 is about to power down, a set of operations are performed in all the cores to transition each of the tables in each of the cores to rehome references to core X. The set of operations can include a set of operations performed in the core 782, as well as operations in one or more of all the other cores connected to the network 788. In some implementations, the core 782 can initiate this set of operations, for example, by sending a message to one or more of the other cores, or by requesting the software to do so. As part of the request, information such as the core id (or home location id) of the core 782 to be powered down is sent to the other cores over the network 788 such that all the cores know which home location would be remapped.

Figure 45A:
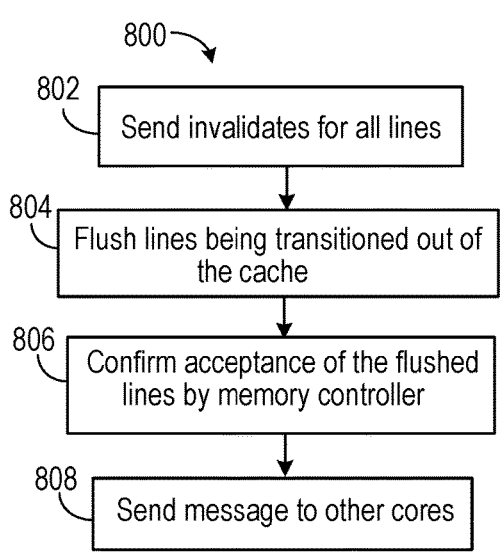
FIGS. 45A-45C are flowcharts of cache management procedures.

FIG. 45A illustrates an example sequence of operations 800 performed at the core 782, at least a part of which is powered down. Operations include sending invalidates for all lines in the cache/page/line (unit of rehoming) (802) to all of the lines in the sharer lists contained in the directories on the core 782. Operations also include flushing all of cache lines being transitioned out of the cache (804) of the core 782. After the cache lines are flushed out, operations can also include confirming that all of the flushed cache lines are accepted by the memory controller (806), for example, by using a "memory fence." A memory fence is a processor instruction. In other implementations the memory fence can be provided by a hardware mechanism. With either approach when a processor executes a memory fence instruction or the hardware mechanism the memory system or cache system will stall the processor (from executing instructions or at the very least memory reference instructions) until all outstanding memory operations have been completed Operations also include sending a message to all the cores (808), for example, to take core-specific actions. In some implementations, the message can include the address of a new home location. For example, a function applied to the old home location address (e.g., old home location address plus 1 address unit).

Figure 45B:
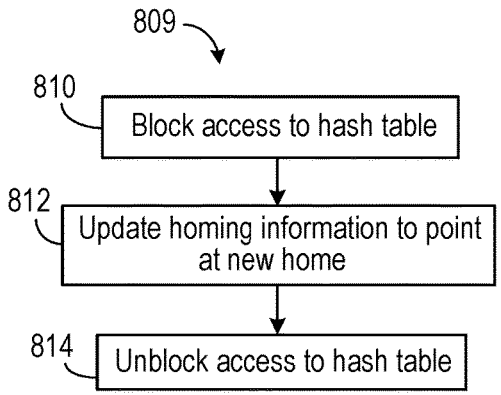

FIG. 45B illustrates an example sequence of operations 809 performed at one or more of the other cores to transition the homing location on a particular core or tile to a different core or tile. In some implementations, the following steps can also be applied when the home location is specified per page as well. Operations include blocking access to the hash-for-home table (810) by setting, for example, the hash-for-home table to stall (busy) on accesses to the old home location. Operations also include updating homing information to point at the new home location (812), for example, by updating in all the cores the coherence domain's homing information (hash-for-home table) to point at the new home. Operations also include unblocking access to the hash-for-home table (814) by unmarking the hash-for-home table entry as being busy such that memory requests can restart being processed by the new home.

In some implementations, the homing information is stored in the TLB, and it may not be possible to change the home information without notifying the software, because the processor(s) need to change the home information in the persistent page table. The reason for this is that the processor(s) may remove a page out of the TLB, but then later have to remap the removed page. When the remap operation is performed, if the page table is not updated, the processor(s) would end up setting the incorrect home for the removed page. Also, for a COMA (cache only memory architecture) system, the home location of a page/line/homing chunk can be changed all in the hardware.

Figure 45C:
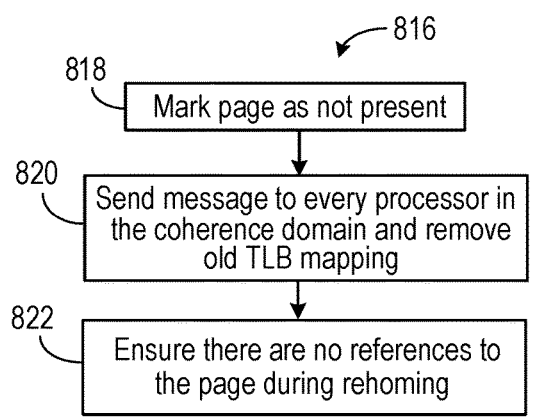

Software Rehoming Details:

FIG. 45C illustrates an example sequence of operations 816 performed by the software to rehome a page P. Operations include, marking a page table entry (PTE) (i.e., the page that is to be rehomed is marked as not present) for the page P as not present (818). In some cases, the page P gets marked with a "Poison Bit" in PTE (also referred to as the "Migrating Bit"). Operations further include sending a IPI (inter processor interrupt) to instruct another processor to perform some task) to every processor in the coherence domain and removing old TLB mapping for P (820), from both instruction TLB (ITLB) and data TLB (DTLB). Operations further include ensuring that there are no references inflight (i.e. during the rehoming) to page P (822). This includes ensuring that no additional references to page P are generated. In case a reference is generated, the reference can be handled, for example, as follows:

a. Data references

An MF (memory fence) instruction can be executed on each tile. This can ensure that all prior loads and stores issued from the tile are made visible. Any new data references to page P can cause the page fault handler to block the reference based on the poison bit.

b. Instruction references

All prior outstanding instruction pre-fetches and demands can be forcibly made visible. This can happen, for example, through a ICOH; DRAIN; sequence. Any new demand instruction references to page P can cause the page fault handler to block on the poison bit. In some implementations, the processor(s) can rely on the microarchitecture of the instruction pre-fetcher to not issue additional pre-fetches to page P.

c. DMA references

All prior outstanding DMA load and stores are forcibly made visible. This can be done, for example, using software to set the "DMA. Suspend" bit and poll on the "DMA.Busy" bit. When DMA.Busy=0, the hardware can guarantee that all DMA operations to the page being transitioned are complete. Any new DMA references to page P can cause the page fault handler to block on the poison bit.

d. Victims

In some implementations, there could still be victims to page P inflight (i.e. during the rehoming). This can be addressed, for example, using the following sequence of operations.

A cacheable translation is inserted into the TLB on one tile (824) with the routine given below:

For every line x on page P, do:
 a. {Finv [x]} This refers to flushing and invalidating the cache line; if there is dirty data in the cache line, the date is written back to main memory]
 b. issue a memory fence (MF) instruction or mechanism to make sure that the operation completes before execution of the next instruction
 c. Sequence of loads (see below)
 d. Sequence of INVs
 e. MF
 f. The Finv/MF can ensure that all lines have been removed from all levels in the dstream cache hierarchy.

The sequence of load words (LWs) ensures any victim to line x (displaced or flushed) has been sunk by the MSHIM before the LW is satisfied. MSHIM stands for memory shim, or memory controller; this is the memory controller on the periphery of the chip which communicates with the off-chip DRAM memory. In some implementations, there can be two, four or more of MSHIMs. Four loads to each home tile may need to be issued. These four loads can be chosen such that each one of the four goes to each one of the MSHIM.

This ensures that any inflight victims from that core to any of the MSHIMs have drained. The inv can remove the just-fetched line from the cache.

The cacheable translation is removed from the TLB and the new translation inserted for page P.

In some cases, the above sequence may not work for non-inclusive pages, (that is, pages that have been marked with the non-inclusive attributes) or pages that are locally homed or pages that have multiple homes. For such pages, a per-tile cache flush sequence is executed to flush every core's L2 cache.

24 Mechanism for Tracing in Multicore Processors

In a multi-core processor, data can be traced, for example, for debugging and profiling. Multi-core processors or tiled processors or multiprocessors provide limited access to their internal operations, for example the current execution status of each core, or the status of caches or other internal structures. Access is important during initial hardware debug as well as in performance profiling or program debugging for software development. On the other hand, hardware infrastructure for debugging and profiling ("tracing") is a trade-off against chip size, in regards to increased gate count (which impacts die area as well as power), and important timing paths (e.g., so called "critical timing paths").

Tracing capability is provided without significant additional cost by re-using existing processor infrastructure.

Figure 46:
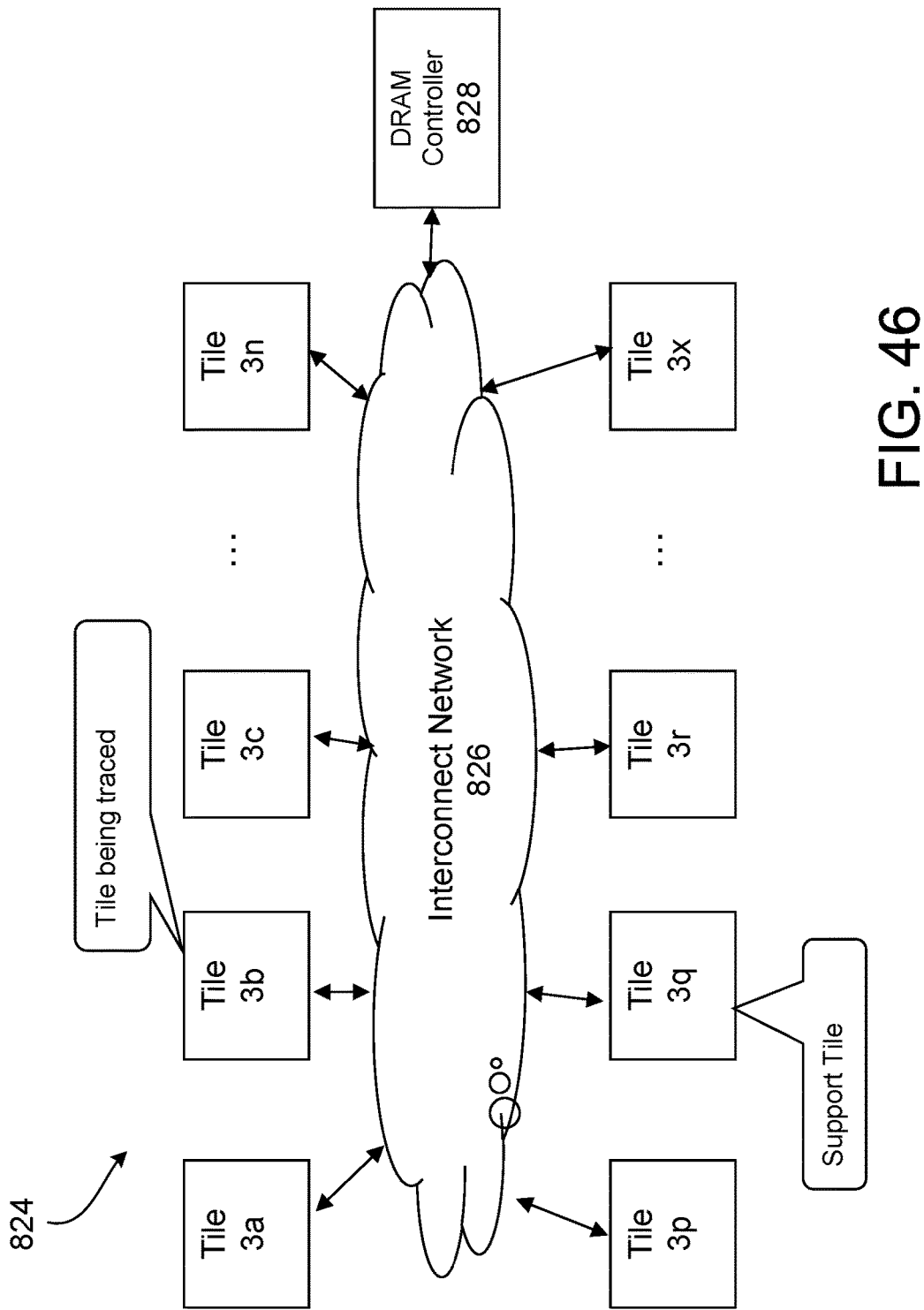
FIG. 46 is a schematic diagram of a multicore system.

FIG. 46 shows a block diagram of an example of a system 824 that can be used for tracing in a multi-core processor. The system 824 includes a plurality of cores or tiles $3a$, $3b$, ..., $3n$ and $3p$, $3q$, ..., $3x$, (3, in general) connected with each other over an interconnect network 826. In some implementations a DRAM controller 828 is connected to the network 826.

The tracing capabilities are provided in the system 824 using one (or more) cores or tiles (e.g. the tile $3q$) in the multi-core processor to receive and process information for a different core or tile (e.g. the tile $3b$) in the processor. Another teaching uses the interconnect network 826 to transfer samples of data from the core $3b$ being traced to the support core(s) $3q$. The network 826 could be either a dedicated network or implemented-based on re-use of an existing network.

The architecture, e.g., as represented by the system 824 provides many cores or tiles 3 and a high bandwidth mesh interconnect network 826 that is used to pass data from one core or tile to another. For example, the interconnect network 826 includes two networks, such as a user dynamic network (UDN) and input/output dynamic network IDN, that are available for applications to use for communication between processes on different tiles 3. The technique can be generalized to any number of networks. Typically, data is produced by an application program running on one tile (e.g. the tile $3c$) and is sent to another application program running on another tile (e.g. the tile $3r$) over the network 826. In some implementations, the UDN and IDN appear as a register mapped destination operand on the producing tile and as a register mapped source operand on the receiving tile.

For the trace function, the present example assumes that the tile $3b$ is being traced. The tile $3b$ can be designated as the "traced tile" (TT). Another tile $3q$ is used for data management and can be designated as the "support tile" (ST). Because there are many tiles 3 in the processor, a tile can usually be used as the support tile without significant disruption to the system being observed. There can be multiple TT/ST pairs designated at a time; depending on how many tiles can be temporarily removed from the application. In some implementations, one or more of the following hardware used for tracing can be included in each tile, and can be implemented using a small number of gates.

A set of multiplexors are configured to select internal information to be traced. For example, items such as the current program counter, trap address, L2 cache miss address, etc. are traced for debugging and/or profiling. The select control for the trace information multiplexor can be provided, for example, in a Special Purpose Register (SPR). A set of multiplexors are configured to select internal events which determine when the state being traced is sampled. For example, items such as conditional branches taken, L1 cache misses, and program stalls can be events of interest. The value of the trace information when such events occur can be useful to determine during debugging program errors or performance issues because the trace information can help pinpoint what caused the stall or the cache miss or the branch outcome. In some implementations, the select control for the event multiplexor can be provided in a Special Purpose Register (SPR). Many of the events can also be interesting for use with conventional performance counters. Performance counters can keep track of the frequency of various events and can be useful for performance tuning and understanding application behavior. In such cases, the frequency of a given event rather than a value of a traced item is captured, and the event selection multiplexors already present for performance counter purposes can be shared for tracing. Hardware samples the selected trace information when the event of interest occurs. Several modes are provided, for example, when any of the selected events occurs (logical OR of events) or when selected events occur simultaneously (logical AND of events). A state machine drives the sampled trace information over the IDN network. In some implementations, the state machine packetizes the information in such a way that the information appears on the network as if produced by an application program.

Figure 47:
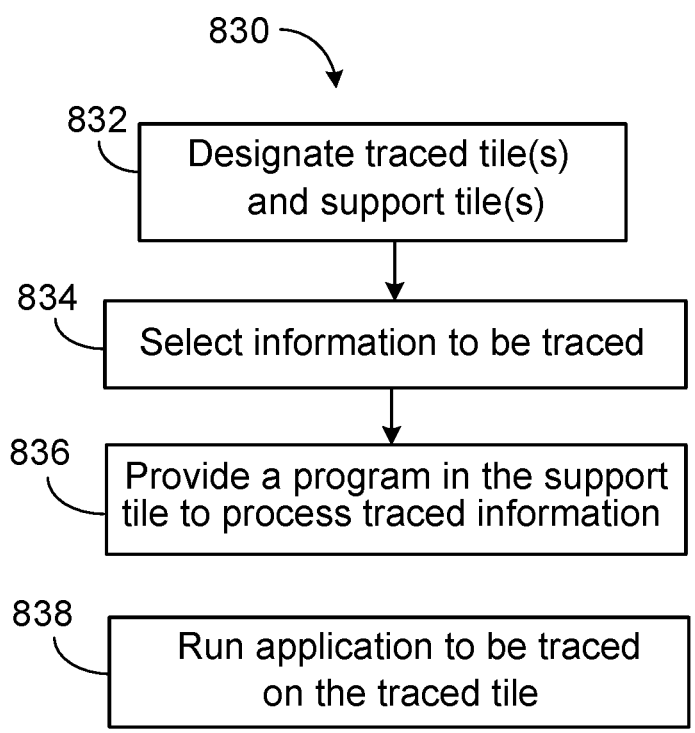
FIG. 47 is a flowchart of a method for tracing.

FIG. 47 an example sequence of operations 830 for implementing tracing. Operations include designating the traced tile(s) and support tile(s) (832). Operations also include selecting the information to be traced in the traced tile (834). Such selection includes, for example, selecting the events used to sample the information, and writing or configuring the associated special purpose registers SPRs to select the events. In some implementations, the tile ID of the support tile is also written to the SPR provided for that purpose. Operations also include providing a program in the support tile to gather and process the traced information (836). In some implementations, the program reads data from the network 826 in the same way as a normal application program reads such data. The read operation from the network can be relatively short (for example, the amount of data read from the network is short enough to fit completely within the Icache of the support tile) and can be configured to perform several operations as described below. The information in the buffer can include, for example, the traced information such as program counter, trap address, L2 cache miss address etc.

In some implementations, the information is stored for later post-processing. In this case the information is stored into memory in a circular buffer. The size of the buffer depends on how much history is needed for the analysis. Typically, history refers to how far back in time the data analysis reaches back. Therefore, for a longer history, a larger buffer is needed. The storage location can in turn depend on the buffer size. For example, if the buffer size is relatively small (e.g. 256 KB), the buffer can fit into, for example, the L2 cache of the support tile and therefore does not impact the external DRAM bandwidth used by the application being traced. If the buffer size is larger than that supported by the L2 cache, additional capacity in the DRAM can be used. The amount of DRAM bandwidth used can depend on how often the trace samples are taken.

In some implementations, the trace information is processed on the fly (i.e. in real time or near real time). Because the processing is done on a tile, complex computations can be performed relatively quickly. For example, such computations can include looking for specific values or sequences in the traced information. The support tile can also be configured to interact with the application being traced by sending messages or IPIs to the traced tile $3q$. The amount of processing that can be done is dependent on how often trace samples are taken.

Operations also include running the application being traced (838). If data are recorded for post-processing, typically a "global" event occurs that stops the trace. At that point, the circular buffer is dumped out for post-processing. If the data are analyzed on the fly, the analysis program running on the support tile is configured to signal when the information (e.g. a value or a sequence) of interest is found, along with other relevant information that is collected.

25 Mechanisms for Accelerating Floating Point Operation

Implementation of floating-point acceleration instructions with low overhead hardware costs are provided using the methods and systems described herein. Floating-point support is typically implemented using specialized floating-point instructions and separate data paths, registers and operation sequencers. This approach, while yielding high performance, can also have high implementation costs terms of the power and/or die area. For processors that require low floating-point performance, a software solution may suffice, but would typically such software solutions perform at a very small fraction (e.g., about 5%) of the performance of a high-performance hardware implementation.

Many applications would benefit from a moderate level of performance with a low cost of implementation. The methods and systems described herein can facilitate floating-point operations at approximately 50% of the performance of a dedicated unit, but with very little additional costs. The low cost is achieved by implementing instructions that have the additional functionality required for floating-point and reusing integer data paths to perform core functions such as core component functions of floating point operations. For example, a floating point operation may need the core functions of addition and multiplication of 32-bit or 64-bit integer values. In an implementation, the main processor instruction issue logic is used to sequence the floating-point operations.

Figure 48:
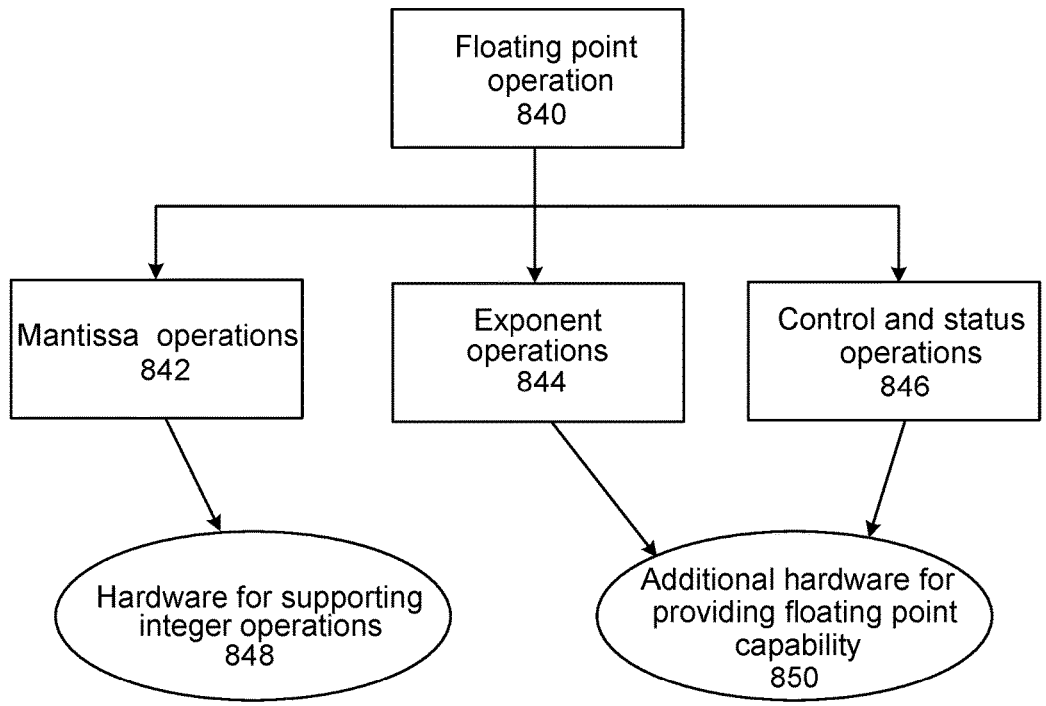
FIG. 48 is a schematic diagram of floating point functionalities.

FIG. 48 illustrates how the floating point functionalities are implemented. The floating-point operations 840 are decomposed into three sub-operations: mantissa operations 842, exponent operations 844, and control and status operations 846. In some implementations, the mantissa has a large number of bits, while the exponent width is fairly modest, and the control functions use only a few bits of state.

By using hardware 848 that supports integer operations, for example the main data paths, for processing the mantissas, a small amount of additional hardware 850, for example an exponent/control/status unit, can provide floating-point capability at very low cost. The sequencing of the control and data path functions can be combined into the main processor issue pipeline by tailoring the pipeline depth of the instructions to the pipeline depth of the existing processor. For example, if the main processor pipeline is two cycles long, then decomposing the floating-point operations into two cycle instructions gives a fully-pipelined implementation without additional intermediate pipeline storage.

In a very long instruction word (VLIW) or other statically scheduled processors, there are additional benefits of breaking up the floating-point instruction into multiple sub-operations. As the main data paths are being reused for the floating-point operations, the scheduling of other operations on those data paths may be impacted. By allowing the compiler to do resource allocation, rather than blocking all other use of the pipeline until the completion of the floating-point operation, better overall performance can be obtained.

Figure 49:
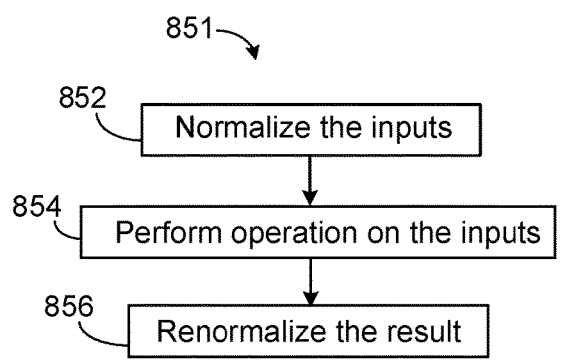
FIG. 49 is a flowchart of a floating point procedure.

In some implementations, floating point addition and subtraction are decomposed into a normalization step, an operation step, and a re-normalization step. FIG. 49 shows a flowchart 851 that illustrates an example sequence of operations for performing floating point computations such as additions and subtractions. Operations include normalizing the inputs (852). The normalization step shifts the mantissa of the smaller magnitude number to the right to align with the mantissa of the larger magnitude number. The operation such as add or subtract can then be performed on the inputs (854). Operations also include renormalizing the result (856).

In order to re-normalize the number, the result of the add or subtract is scanned to find the most significant result mantissa bit. The result is then left shifted for proper alignment along with adjusting the result exponent to compensate for the left shift.

Floating point multiplication can be decomposed into the operation on the mantissa, plus a renormalization step. For normalized inputs, the renormalization step is a simple single-bit shift, but if denormalized floating-point is supported, a full normalization operation maybe required.

On a 64-bit processor, status information and results for single-precision floating-point can be combined into a single 64-bit result. Thus, additional instructions to process the control/status and exponents are not required. However for double-precision floating-point or single-precision floating-point on a 32-bit processor, additional instructions can be used to process the exponents and control/status. The following description is of an implementation on a 2-stage 64-bit processor, However the same implementation can be adapted to different pipeline depths, and processor widths.

The single-precision floating-point addition/subtraction implementation uses two initial instructions, one for addition, and a different one for subtraction. These instructions unpack one operand, extract both exponents, compute the expected result exponent, and status bits for the operation. The second instruction aligns the mantissas and performs the desired operation. The result is processed by two additional instructions that are shared with the multiplication operation. The first of these instructions determines the required normalization shift and rounding operations. The final instruction performs the normalization shift, computes the final rounded result, and packs the result into a single output register.

The single-precision floating-point multiplication uses two similar initial instructions, but since no pre-normalization shift is required, the second instruction performs the actual multiplication. These instructions are followed by two final instructions that are substantially same as those used for addition and subtraction.

For double-precision addition/subtraction, three initial instructions are used. The first two instructions unpack the operands, and the third instruction computes the exponents and status/control. The fourth instruction aligns the smaller operand, and performs the addition or subtraction. The final two instructions, similar to the single-precision instructions, can be used to normalize and pack the final result. For double-precision multiplication, the operation is similar except a 128-bit multiplication result is obtained. If the processor has native support for multiplying two 64-bit operands and obtaining a 128-bit result, then that instruction can be used. If not, the 128-bit result may be obtained by composing existing instructions. The 128-bit result is then packed using the two instructions substantially same as those used for the addition and subtraction results.

26 Speculation-Based and Neighborhood Distributed Instruction-Level Parallelism

Distributed instruction level parallelism (DILP) uses speculative instruction execution, an on-chip interconnect and scalar operand networks. =DILP is a technique of using a compiler to distribute instructions within a sequential program among multiple cores for parallel execution. DILP execution often requires that cores that execute the instruction sequence send data values to each other. Various aspects related to DILP are discussed below.

One such aspect is efficient Scalar Operand Network Implementations for DILP. In some implementations, instructions of a sequential program, for example a program written in C or Java or C++ are distributed (for example by a compiler) onto multiple cores such that the speed of execution of the program is increased. Another aspect involves speculative transactional blocks for memory speculation: In some implementations, DILP compilation features memory sequencing (i.e. how load and store instructions are placed and scheduled). Another such aspect is efficient Scalar Operand Network Implementations for DILP. Automatic partitioning of a sequential program across multiple cores can be implemented using an efficient scalar operand network to transfer values (e.g. data) between different cores. To avoid a bottleneck, the network needs both low latency and high bandwidth. Typically, the network also needs low "occupancy," meaning that a small number of instructions are used in transmitting values back and forth.

In some implementations, the scalar operand network is configured such that the compiler schedules writing a packet or data to a queue for transmission on a network. The network writes are configured in such a way that a corresponding read on the destination core reads that value and not some value transmitted by another core. In some implementations, the ambiguity can be removed by providing a static scalar operand network and having it to be logically equivalent to an all-to-all network of first-in-first-out connections (FIFOs) between all pairs different cores. A static scalar operand network can be a network that can route scalar values and manage the values using compiler information. Such managing can include, for example, scheduling during routing, or determining the destination and path followed by the values from the source to the destination. For example, if a core A wants to send a value to core B, the value is written into a dedicated "A to B" FIFO connection, and when the core B reads that FIFO connection, the core B knows that the next value from core A is being received.

The following are two examples of techniques that can be used for providing something logically equivalent to a FIFO network:

1) Static Router technique: In this technique, a dedicated hardware router is programmed by the compiler in conjunction with the code that executes in parallel. The hardware router is programmed to "know" the destination core for each value written into the router by a source core. In some implementations, the router also "knows" in which order values should be fed from other cores to the own core of the router. In some implementations, a register-mapped I/O on a single register is used to control all reads and writes to the scalar operand network. Using the register-mapped I/O register allows scalar operand network values to feed directly to and from arbitrary instructions, and remove the occupancy required by special "move to network" and "move from network" instructions.

In some implementations, a custom routing processor is configured to use both hardware area and some occupancy to "stay in sync" with whatever the core is doing. For example, if the core indirectly jumps to a subroutine, the routing processor is instructed to jump to a matched routing subroutine.

2) Source routing technique: In this technique, the source core indicates what the destination core (or cores) are for each scalar operand value. Routing hardware then transmits the value to the destination core(s).

The source routing technique has the advantage of not requiring a separate routing processor, but can result in an increased occupancy such as increased traffic in the network, because the source core has to specify where each value should go. In addition, ambiguity may increase at the receiving end because the receiving core can no longer use a single I/O register for all scalar operand traffic, as values sent from other cores can show up in any order.

Speculative Transactional Blocks for Memory Speculation

Memory sequencing, i.e., how load and store instructions are placed and scheduled with DILP involves two separate problems coherency and load/store ordering.

Addressing the coherency problem involves finding a placement for memory operations and/or inserting the appropriate memory management operations to ensure that the memory is coherent across cores. The coherency problem can also be solved with hardware support (for example, by writing directly into the caches of other cores)]

The ordering problem relates to the situation where memory operations appear to execute in a fashion that is sequentially consistent with the original, sequential version of the program. For example, if "store A" is followed by "load B" in the sequential version of the program, then upon completion of "store A" and "load B", the memory (and the register file) presents the appearance that "store A" executed before "load B". This is often called the "load/store ordering" problem. The difficulty with the load/store ordering problem is that it limits memory level parallelism. This section addresses the load/store ordering issue assuming that the coherency problem is somehow solved.

For example, consider the following sequential code:
(1) addli $5, $5, 4
(2) sw $5, $6
(3) lw $7, $4
(4) addli $7, $7, 4

If the compiler is unable to determine that instructions (2) and (3) are independent memory ops (i.e. they will never access the same address), then the two instructions execute sequentially. This can be accomplished by, for example, scheduling the two operations on the same tile sequentially, or placing the operations on different tiles and sending an explicit synchronization word to ensure that the load (instruction (3)) executes after the store (instruction (2)). However, if the memory operations are disambiguated, the instructions (3) and (4) could execute on a separate tile from instructions 1 and 2, possibly simultaneously, thus improving performance.

Efficient Scalar Operand Network Implementations for Distributed ILP

In this technique, a set of cores, e.g., N cores, is used for distributing ILP among themselves. This set of cores can be referred to as a DILP neighborhood.

Figure 50:
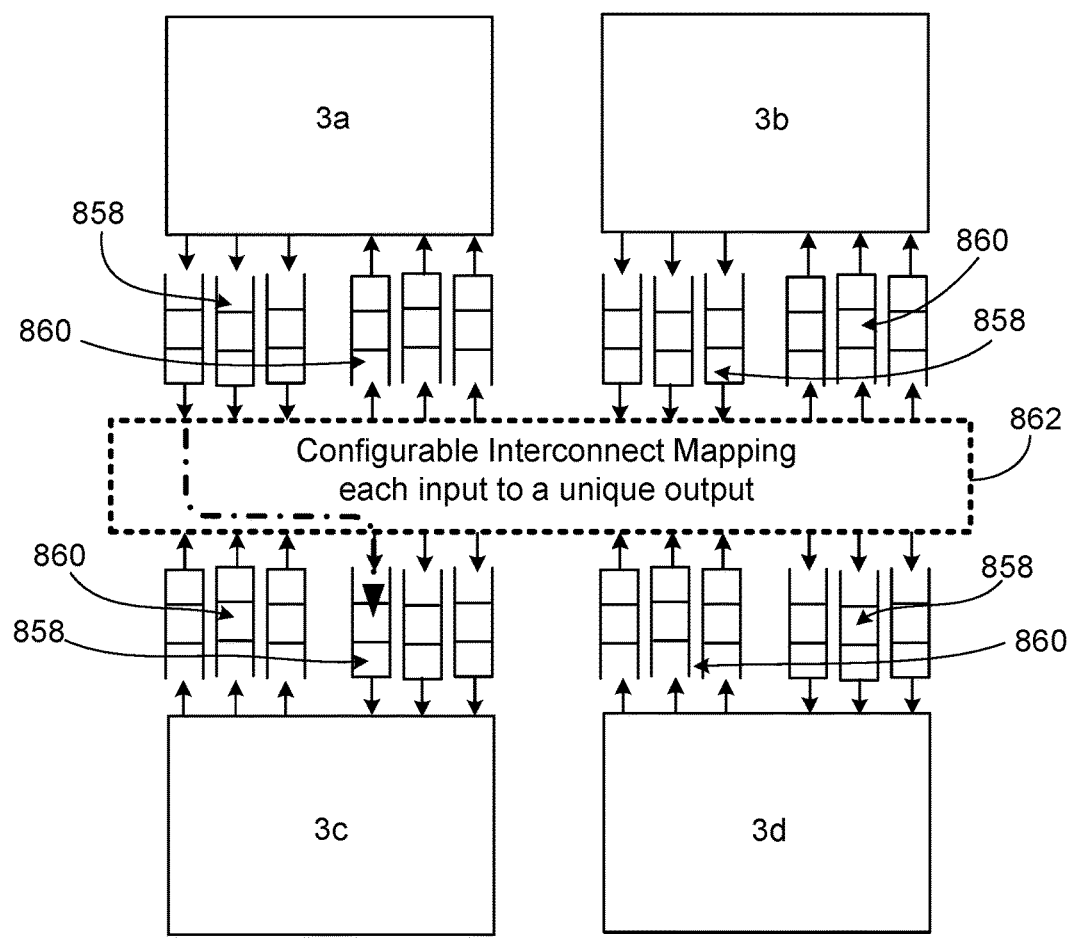
FIG. 50 is a schematic diagram of a DLP neighborhood.

FIG. 50 shows an example of such a DILP neighborhood. In this example, there are four cores 3a-3d (3, in general). With N cores in the DILP neighborhood, each core can have N−1 outgoing registers 860 for sending values to, and N−1 incoming registers 858 for receiving values. Each of the N−1 outgoing registers 860 is viewed as the source of a FIFO connection going to one of the other N−1 cores. Similarly, each of the N−1 incoming registers 858 can be viewed as a destination of a FIFO connection coming from one of the other N−1 cores. Each of the N−1 outgoing registers of a given core is connected to one of the incoming registers on each of the N−1 receiving cores via configurable interconnect mapping network 862. Therefore, for N different cores or tiles, there are a total of (N−1)*(N−1) unique registers (and FIFO connections). A compiler can statically schedule the outgoing values and receive incoming values from the FIFO connections in a way that maintains a program order. The FIFO connection or register to be used for sending or receiving (i.e. a register specifier) can be encoded by the compiler into the instructions being executed.

The occupancy problem in the source routing technique for DILP is addressed by reserving several registers (for example, three registers when four cores are used for the DILP) for the network I/O. For example, the processor(s) can support parallelizing over groups of four cores by having each core to be able to address three others, so it could dedicate one of three network registers to each of those neighbors during a register configuration step at program startup.

In some implementations, the receiving ambiguity problem in the source routing technique for DILP can be addressed by mapping each of the N-1 (three, in the example of FIG. 50) network registers to read only values sent by one of the N-1 (three, in the present example) neighbors. In such cases, each of the network registers is at the "other end" of a dedicated FIFO connection from another core. For example, the hardware could be configured such that the core 3a writing to a corresponding outgoing register 860 would send a value that shows up on a particular corresponding incoming register 858 of core 3b.

A multicore processor can include a large number of cores (e.g., 4, 8, 64, 100, or 1000 cores). In some implementations, clusters of a smaller number of cores (e.g., 4 cores in this example) are connected to each other by FIFO connection structures. In some implementations, there is one FIFO connection from every core to each of the other cores. A compiler partition the sequential program into a number of streams as supported by the FIFO connections. In the current example, the compiler partitions the sequential stream into up to 4 streams of instructions and allocates the instructions to in some combination to the 4 cores. The compiler inserts explicit information into the instructions which tells a core to send a value to another core over one of the FIFOs. Similarly, the compiler can insert information into the receiving core's instruction to obtain a value from a particular FIFO connection.

Speculative Transactional Blocks for Memory Speculation

In some implementations, a software based scheme is used to allow for greater parallelism, yet still provide the proper semantics of sequential ordering of memory references. Such a scheme=optimistically assumes memory independence (i.e. independence of the addresses in various memory references).

Figure 51:
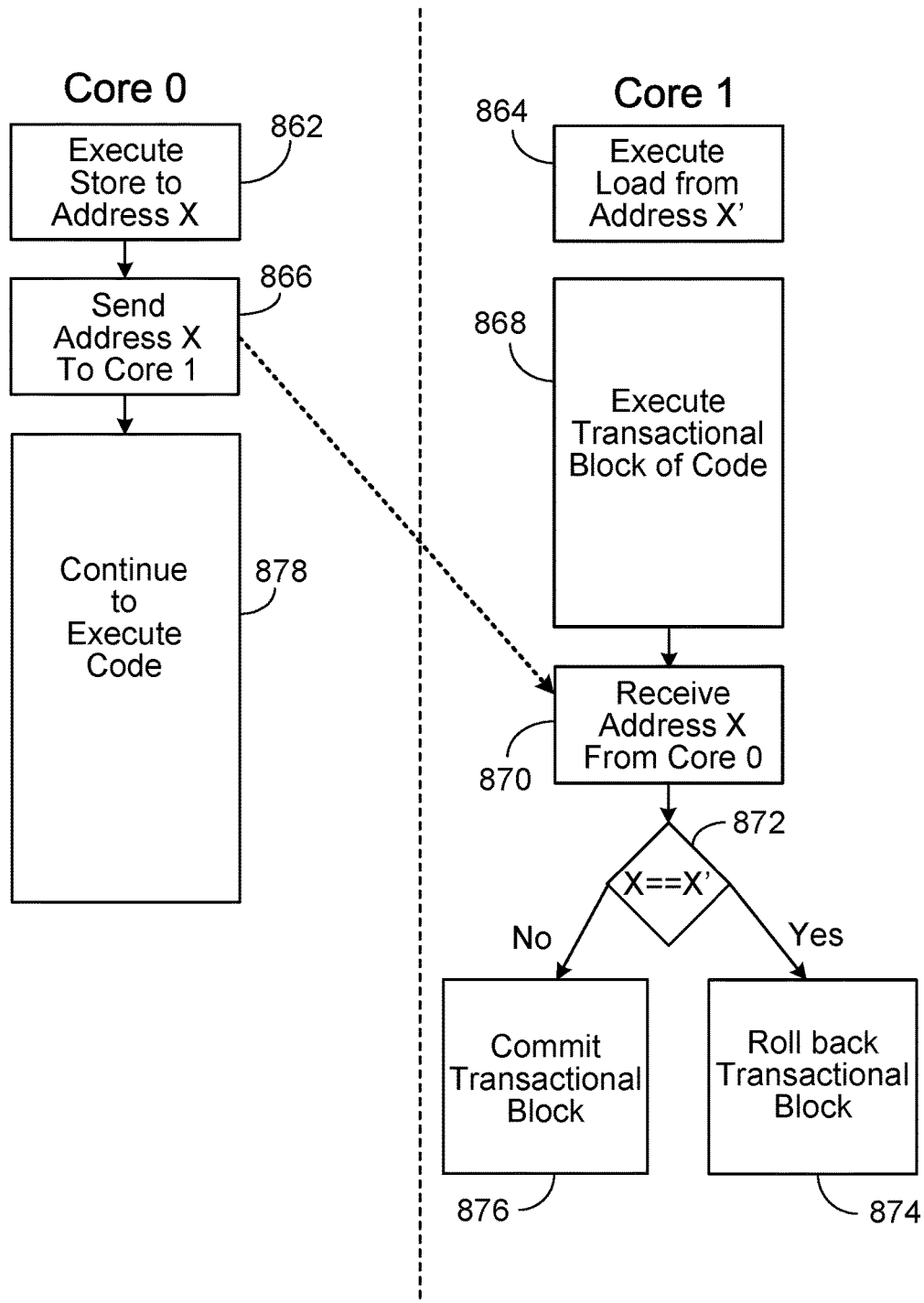
FIG. 51 is a diagram of speculative translation operations.

FIG. 51 shows an example sequence of operations related to speculative transactional blocks. In this example, the sequential code shown above is parallelized and assigned to two different tiles (core 0 and core 1), as follows:

| TILE 0 | Tile 1 |
| --- | --- |
| (1) addli $5, $5, 4 | (3) lw $7, $4 |
| (2) sw $5, $6; send $5 to Tile 1 | (4) addli $7, $7, 4 |
| | compare $5 and $4, if they conflict, jump to patch-up code |

In many ways, the above is a "transactional" approach, where an assumption is made and code is speculatively executed and rolled back if the assumption is incorrect (ideally the uncommon case). For the above example, the code on core 1 is the "transactional" code. Note that the code on core 1 may not contain any store instructions, because the store instructions cannot be rolled back without hardware support. However, the code on Tile 1 may contain reads/writes from the static network or FIFOs used for DILP operand delivery. The above technique generalizes for arbitrary numbers of stores and allows for speculative reading/writing from the static network.

This example further assumes that two memory operations "store" and "load" within some block of code are independent and are scheduled to different tiles core 0 and core 1, respectively. Operations include core 0 executing the "store" instruction (862) and the core 1 executing the "load" instruction (864). To ensure sequential ordering, the address of the "store" instruction is sent (866) from the tile executing the "store" instruction (core 0, in this example) to the tile executing the "load" instruction (core 1 in this example). In some implementations, the address may be received (870) at the core 1 after the "load" instruction has executed. Typically, in these cases, core 1 would execute a transactional block of code (868), and, at the bottom of the block, compares the address of the "load" to the "store" address (872) received from core 0. If the addresses conflict (for example, if they are the same address), the transactional block is rolled back (874) and control jumps to a segment of code that executes (or replays) the block sequentially. Because of the sequential execution, the "load" is now guaranteed to occur after the "store." In some implementations, this segment of code can also include patch up instructions that undo the effects of some of the previously executed instructions. If on the other hand, there is no address conflict, the already executed transactional block of code is committed (876) and execution of subsequent instructions continue. In some implementations, the core 0 may continue to execute another code segment (878) after sending the address of the "store" to core 1.

In this method, when a block of code is distributed to multiple tiles, the address of a store in one tile is sent to the tiles in which there are loads. The stores and loads are executed as usual. However, at the end of execution of the block in each of the tiles containing loads, the store addresses are explicitly compared to the load addresses, and if a match is found, the processor(s) have one tile re-execute a patch up block of code that has the same overall effect as executing the original block of code sequentially.

Efficient Scalar Operand Network Implementations for DILP

In some implementations, the ambiguity problem with source routing methods for distributing instructions can be addressed by using instructions to move scalar values to and from the logical FIFO connections connecting the different cores. These instructions can easily be encoded to address any number of other cores.

The occupancy problem with source routing can also be addressed for example, using a superscalar processor. In some implementations, a superscalar processor can be optimized to make the network copies "free", or nearly so, by processing them on dedicated hardware separate from the usual ALU and memory pipelines. For example, the regular ALU and memory logic blocks need not be used for creating source routing information, rather using special dedicated hardware to do so. Because it is a superscalar processor, multiple operations can be performed in one cycle, so the operation in the dedicated logic can be performed in the same cycle as other operations, without increasing the cycle count]

In some implementations, the occupancy problem can be addressed by reserving several registers for the network I/O. For example, supporting parallelization over groups of four cores only requires each core to be able to address three others, so it could dedicate one of three network registers to each of those neighbors during a register configuration step at program startup.

The receiving ambiguity problem can be addressed, for example, as described above.

In the above example, a fourth network register on each core can be configured to simultaneously "multicast" to all three neighbors. This can be useful, for example, to broadcast a branch condition that affects the behavior of all of the cores.

The actual hardware implementation of these FIFO connections could be a traditional wormhole-routed network, where the choice of written network register implicitly selects a route header. Alternatively, the network can be a dedicated network only capable of addressing adjacent (including diagonally adjacent) cores, either using a hardwired path to each neighbor or using a simple "one-turn" scheme where a few routing bits suffice to spell out the destination core.

In some cases, using register-mapped networks can limit the number of addressable cores (and hence, the amount of possible parallelization). This may not be a big problem in practice, particularly because the amount of instruction-level parallelism is often limited, and many parallel applications have relatively low communication requirements. In some cases, a high-level message-passing implementation may be well suited. With enough registers to address at least physically adjacent cores, cores can be configured to communicate with other cores by routing words that are explicitly forwarded by intermediate cores. This of course increases occupancy but would suffice for infrequent communication.

In some implementations, a hybrid strategy between a full-fledged routing processor and source routing by each instruction can be used. Typically, most performance-affecting code segments are in loops that have predictable and repetitive communication patterns. Rather than running a full-fledged program on a separate routing processor, in some implementations, the core can be configured to "load up" a small router finite state machine (FSM) with a sequence of route commands encoded as bit fields in a register, and let that FSM run for several cycles before reloading the FSM.

In general, this is a simpler approach than a separate routing processor because there is no cache, no TLB, no PC, etc. For example, suppose that each time the core executes an instruction, the router processes the next 3-bit opcode and "shifts out" to move on to the next opcode. In such cases, some sample opcodes for the router can include:

000: do nothing
001: load r10 into router command register
010: load r11 into router command register
011: load r12 into router command register
100: route register destination of current instruction to core A
101: route register destination of current instruction to core B
110: route register destination of current instruction to core C
111: route register destination of current instruction to cores A, B, C On a 64-bit processor, a single move to a special-purpose register could load up twenty-one (i.e. 64/3) opcodes. The ability for the router to reload the command register facilitates the looping.

In some implementations, the opcodes can be made to hold more information, so that they can, for example, specify to conditionally load the command register with a different value if the core ends up taking a conditional branch. This can allow zero occupancy even in loops with a branch.

This approach can have one or more of the following advantages:

The core can be allowed to both compute a value for its own use (i.e. storing in a local register) and route it to another tile, without requiring any additional instruction encoding space.
Zero-occupancy routing can be performed inside loops, and occupancy can be kept low for straight-line code.
The route opcodes can be made to "run ahead" of the main processor by a cycle or two and set up routes early, thereby reducing route latency.
By extending the example opcodes above to specify routes *to* the core, in addition to the routes from the core already shown, a single network register can be used to communicate with many other cores, as in the case where a dedicated routing processor is present. This means that fewer useful registers are removed from the instruction set. The router opcodes can also be used to conditionally replace any register (such as a dedicated 'zero' register, or a normal register) with a network value on a cycle-by-cycle basis. In this way, a non-parallel code (or a code with low degree of potential parallelization) does not pay the price of network registers that are not needed, and legacy instruction sets can gain the benefits of register-mapped I/O by loading up the router command register while still maintaining backward compatibility in other cases. Further, the router opcodes can be implemented to be variable-sized, to effectively Huffman-encode router programs.

In this neighborhood DILP technique, other techniques of solving the memory sequencing problem are also possible. For example, one approach is to issue all memory operations (loads and stores, for example) from only one core. This way, the loads and stores are ordered. Another approach is to use compiler analysis to disambiguate the memory operations into classes which do not interfere with each other. In such cases, all loads/stores within a class are issued from a given core. But different cores can be used for different classes. In some cases, a speculative transactional block approach, as described above, can also be used.

27 Mechanism for Race-Free Interrupts in Multi-Chip Systems

Systems for Inter-Processor communication can be built via transaction I/O links such as PCI and PCI-Express (PCIE). Packets traveling across such links can have, for example, a header that includes one or more of a command type (such as read or write), an address, and a body that includes zero, one or more data words. Systems can handle such packets, for example, by mapping incoming read and write packets into their memory space, potentially translating the address according to an input-output translation lookaside buffer (IOTLB) or an offset, and then turning the read or write packet into a memory request within the processor's memory subsystem.

Software and hardware systems can construct inter-processor communication primitives, for example ring buffers or packet pools, using these memory mapping techniques. In some implementations, these techniques involve the use of flag bits or counters to indicate when certain conditions have occurred, for instance when more data are available in a ring buffer. Such techniques often achieve lower latency and overhead by providing a mechanism for generating interrupts when a flag bit or counter changes state or reaches a particular value. This allows software to immediately handle such conditions rather than occasionally poll memory or a hardware register to see whether condition of interest has occurred.

In order to keep track of interrupt conditions, for instance when data is available in a ring buffer, systems often use flag bits to indicate the presence or absence of a condition of interest. Systems often have many such flag bits so that they can support multiple data structures, multiple communication clients, or provide multiple protection domains for communication states. In some implementations, systems store their flag bits in memory and rely on read and write transactions to modify the flag bits. This can present one or more of the following two issues:

First, such systems do not provide atomic mechanisms for accessing flag bits mapped in memory. If a remote CPU wants to read the current value of a flag and set it to zero, a read operation is followed by a write. This introduces the possibility of another processor accessing the flag's memory location at the same time and modifying the value in a non-atomic fashion.

Second, systems may want to trigger interrupts when a flag value makes certain types of transitions (e.g. low to high, or high to low) or reaches certain states (e.g., when a particular bit is set as 1). Some systems allow processors to trigger interrupts by sending specially formatted write packets (for instance a Peripheral Component Interconnect Express (PCIE) MSI). PCIE is a type of I/O bus and MSI stands for message signaled interrupt and is a type of operation supported by PCIE buses. Efficiency can be improved further by providing a mechanism in which interrupts are only triggered based on the result of an atomic operation. Such mechanisms can include one or more of the following.

1. A mechanism by which multiple processors, communicating via transactional I/O links, can perform atomic operations on a state that is accessible to all the processors, and in which the type of operation to be performed is determined by a packet's target address. Possible operations include (but are not limited to) normal reads and writes, as well as read-to-clear, write-to-clear, write-one-to-set, and set-bit-number.

2. A mechanism by which an atomic operation is implemented by a read-modify-write operation to a RAM or a set of registers in the I/O controller, such that simultaneous requests from the CPU or other devices happen either before or after the read-modify-write, but never between the read and write.

3. A mechanism by which an atomic operation is implemented via atomic operations to the shared memory subsystem that is shared between the I/O controller and CPUs.

4. A mechanism by which interrupts can be triggered when an atomic operation occurs.

5. A mechanism by which an interrupt mechanism can be configured to trigger interrupts only when certain data values or transitions occur. For instance, the interrupt mechanism could be configured to trigger when a flag has a certain value, or when a flag changes to a particular value (for instance transitions from 0 to 1, or 1 to 0), or when a combination of these conditions occurs.

6. A mechanism by which the interrupt mechanisms can be configured to trigger interrupts on different processors, different cores within a processor, or different interrupt numbers within a core or processor.

In some implementations, a set of "mapping regions" is configured to perform different actions when traffic arrives on an input line such as a PCIE or StreamIO link. The set of actions to be performed can be determined based on an address included in the incoming packet. Each mapping region can be configured to take effect for a different range of addresses and to either map incoming transactions into memory space (for example, by converting reads into memory loads and writes into memory stores), or to activate interrupt bits. A region can also be configured to activate interrupt bits for a portion of the address range and map into memory space for the rest of the address range.

Figure 52:
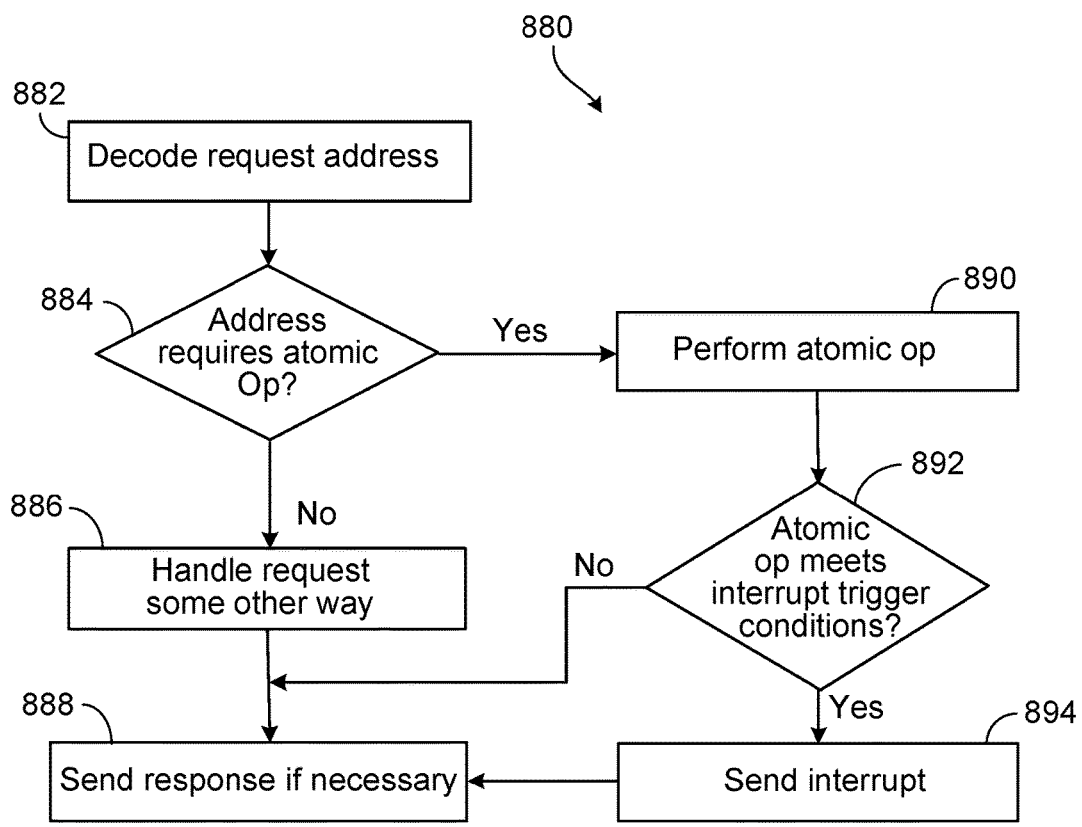
FIG. 52 is a flowchart of a packet processing procedure.

FIG. 52 shows an example sequence of operations 880 for processing incoming packets. Operations include decoding a request address (882) from an incoming packet and determining whether the decoded address requires an atomic operation (884). If an atomic operation is not needed, the incoming request can be handled in another way (886) that does not use atomic operations and a response is sent (888) (if required). However, when the decoded address warrants an atomic operation, the corresponding atomic operation is performed (890). As described above, the operation or set of operations performed can be determined based on the decoded address. If the atomic operation performed meets interrupt trigger conditions (892), an appropriate interrupt is triggered (894). If interrupt trigger conditions are not met, a response is sent (888) as needed.

Figure 53:
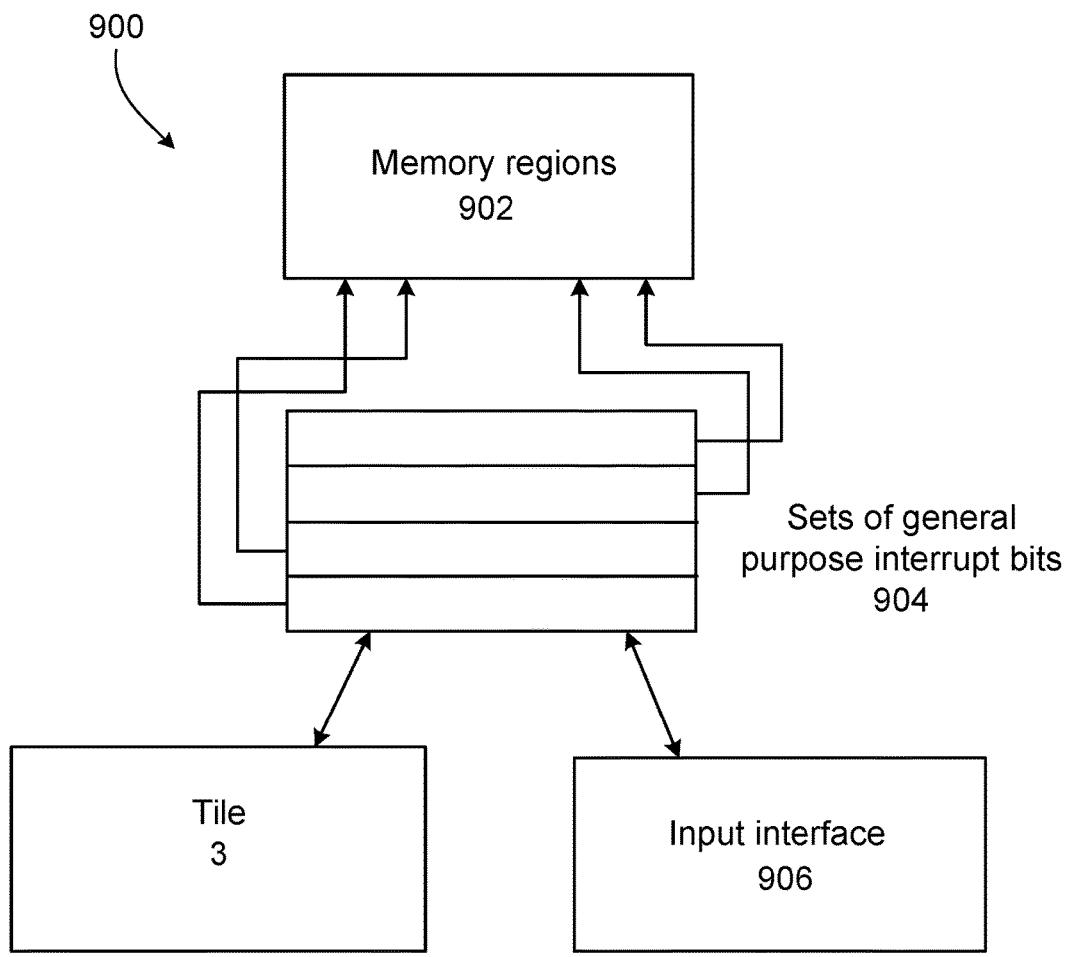
FIG. 53 is a schematic diagram of a race-free interrupt system.

FIG. 53 is an example system 900 for implementing race free interrupts. The system 900 includes several memory regions 902 that are mapped to different registers 904 of general purpose interrupt bits. In some implementations, each map-memory region 902 has a set 904 of (for example a set of 16) general-purpose interrupt bits. Fewer or more bits are also possible. These sets of bits or registers 904 are accessible both from the tile side and from an input interface 906 such as the PCI Express or StreamIO interface. The tile can be substantially similar to the tile 3 described with reference to FIG. 1A. In some implementations, the bits can be configured to trigger tile-side interrupts. Each map-memory region allows the corresponding interrupt vector to be configured to dispatch the associated tile-side interrupt based on level or edge semantics.

The interrupt bits or registers 904 can be accessed from the input interface 906 (e.g. PCI Express or Tile memory mapped input-output (MMIO) interfaces), for example, via one of four different registers. Each register has unique access semantics as described below as an example:

| Register Number | Read Behavior | Write Behavior |
| --- | --- | --- |
| 0 (R/W) | Returns current value | Returns current value. |
| 1 (RC/WITC) | Returns current value, clear all bits. | Clears bits whose write value is 1. Leaves intact bits whose write value is zero. |
| 2 (R/WITS) | Returns current value. | Sets bits whose write value is 1. Leaves intact bits whose write value is zero. |
| 3 (R/SetBit) | Returns current value | Sets the bit indexed by the data value (i.e. set the bit indicated by (1 << write_value)). |

From the tile side, these registers 904 are accessible via the mapped region within the MIMIO space. For example, from PCI Express, these registers appear as the first 64 bytes of the associated map-memory region. In this example, each register occupies 8-bytes of address space.

In some implementations, the hardware can also provide an additional set of registers (e.g. registers 4-7) that provide the same read and write behavior (e.g. register 4 behaves like register 0, register 5 like register 1, etc.) but do not trigger interrupts if an interrupt condition occurs.

28 Mechanisms for Congestion Reduction in on Chip Networks

On chip mesh networks provide a large amount of bandwidth for intra-chip communication. However, it is still possible to reach the bandwidth saturation point on the mesh links. As the utilization increases, the latency through the network can increase significantly. In some implementations, the increase in latency with utilization can be exponential. This exponential increase in latency can also be accompanied by exponential unfairness as nodes close to the congestion point receive a much greater portion of the congested link's bandwidth.

Congestion on the network's response channel can be greatly reduced if requesting agents limit the amount of request bandwidth to be less than the bandwidth provided on the response channel. Metering the amount of response bandwidth can be done, for example, by using a request-bandwidth monitoring scheme. In this scheme, each request that is sent consumes bandwidth credits related to the size of the expected response, rather than the size of the request itself. New requests have sufficient bandwidth credits to be sent. Thus requests injected into the mesh do not attempt to generate responses with more bandwidth than what the response channel can provide. There is no impact on the requester's observed response bandwidth. However, under this scheme, other requesting agents in the mesh do not see a congested response channel.

Figure 54A:
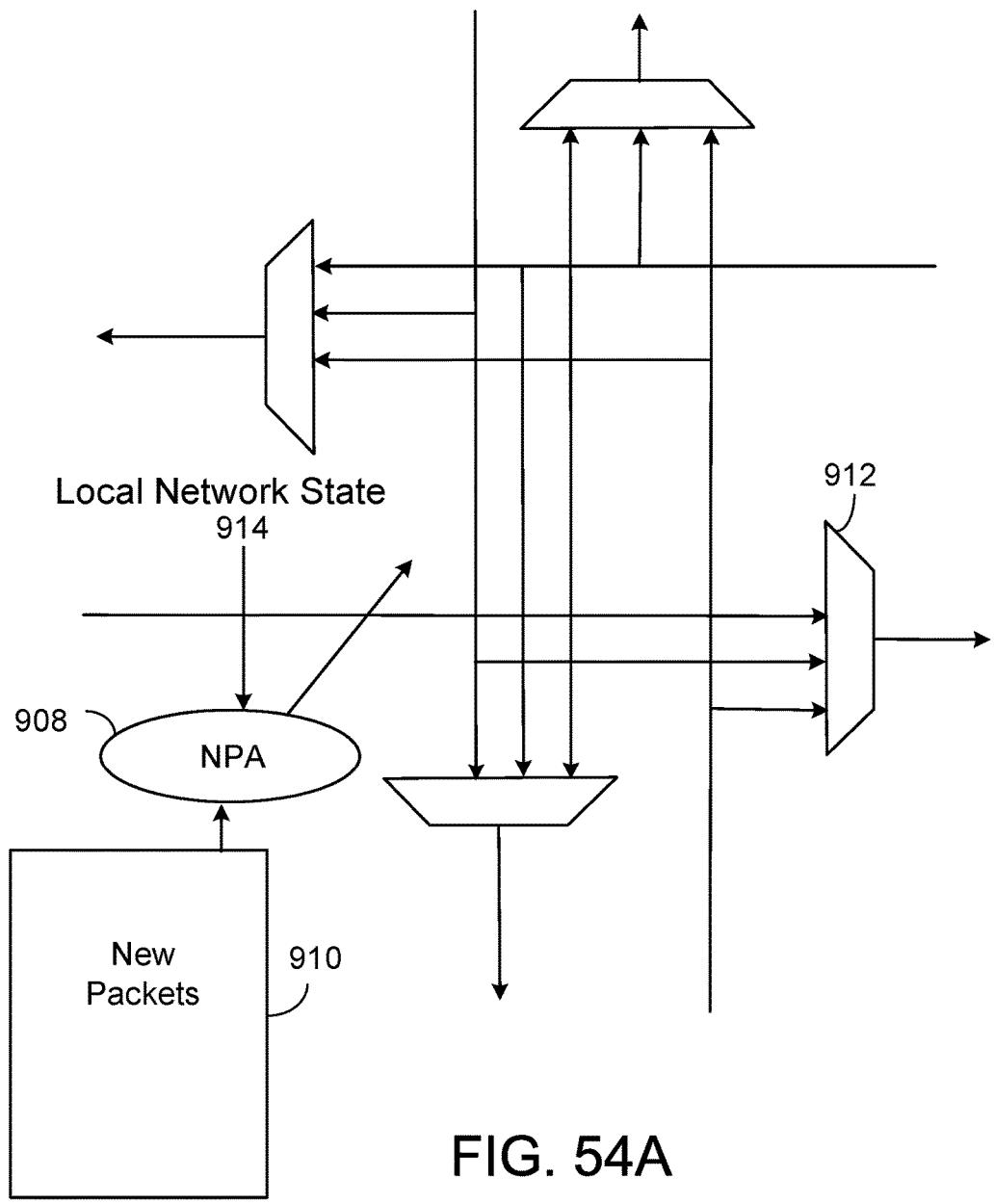
FIG. 54A is a schematic diagram of a network priority arbitrator.

In some implementations, the request bandwidth metering hardware is shared across multiple requesters that share the response channel, thus allowing global management of the available response bandwidth resources. Unfairness in resource allocation and congestion is also reduced further by allowing packets already in the mesh network to take priority over packets that are yet to enter the mesh. FIG. 54A is a schematic diagram that shows a network priority arbitrator (NPA) 908 controlling new packets 910 in accessing a network 912. This NPA based routing can increase fairness by preventing new request packets 910 from entering an already congested network 912. If the network 912 is uncongested, the new packets 910 enter freely. This approach can provide a negative feedback loop to maintain bandwidth stability below the point of congestion. The feedback loop can include a line 914 that provides the NPA 908 with information on the network state.

In some implementations, network priority arbitration can potentially starve local requests when congestion is caused purely by remote requesters that are unaware of the local congestion. This can be overcome, for example, by providing a timeout on the priority arbitration such that a starved request may make forward progress.

Metering of request bandwidth can be accomplished by monitoring network response bandwidth credits. For example, each time a request is sent over an interconnection network (for example, by a core or a tile or an I/O device), the credit available to the requester is decremented by an amount proportional to the amount of credit required for a response to the sent request. Also, at each clock edge, the credit count is incremented by an amount proportional to the bandwidth provided in one clock cycle on the response network. New requests from a requester are sent only if the requester has sufficient bandwidth credit available. By adjusting the credit increment and decrement scaling factors, an optimal response bandwidth can be achieved.

Figure 54B:
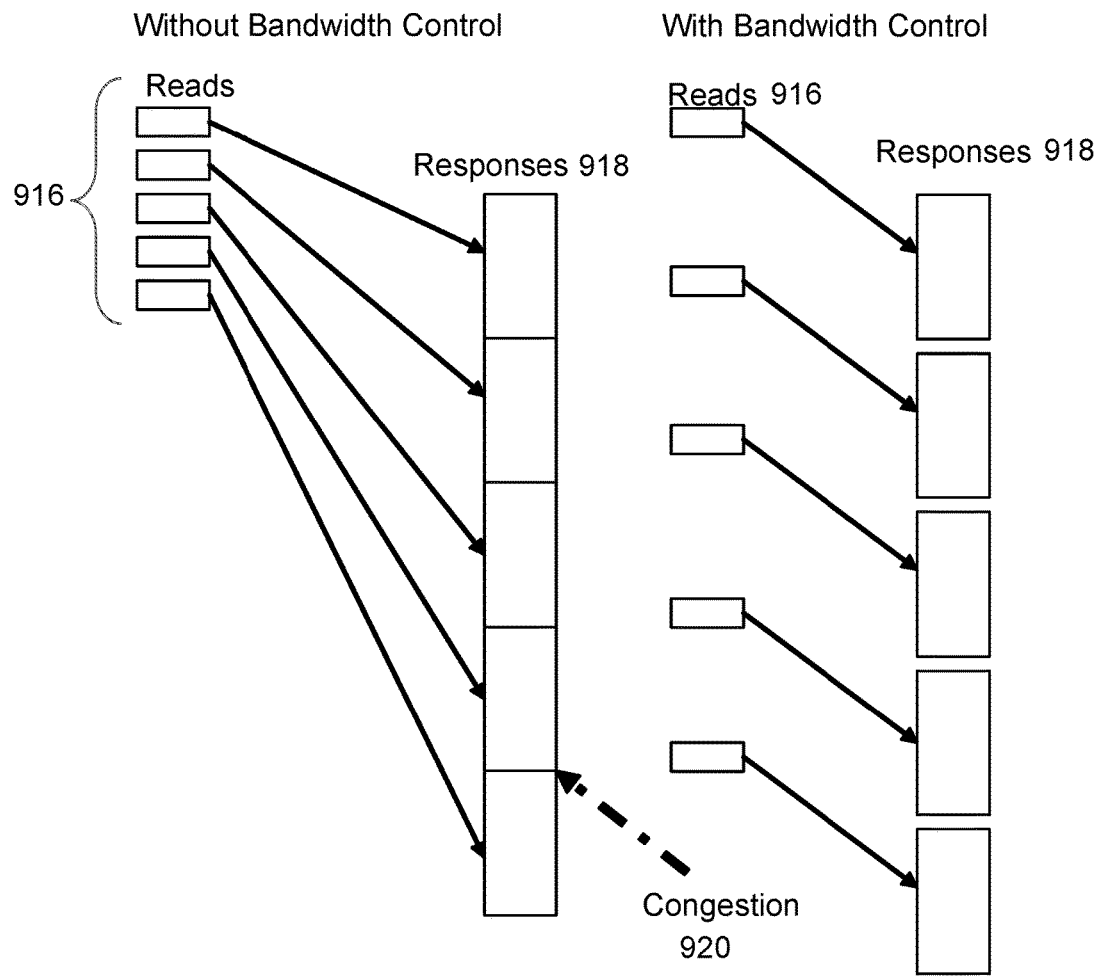
FIG. 54B is a schematic diagram of read request and response relationships.

FIG. 54B compares the relationships between the requests (or reads) 916 and responses 918. Without bandwidth control, a large number of requests or reads 916 enter the network within a short span of time and can lead to a congestion condition 920 soon after. With bandwidth control, the requests or reads 916 are spaced in time and congestions can be avoided.

Figure 55:
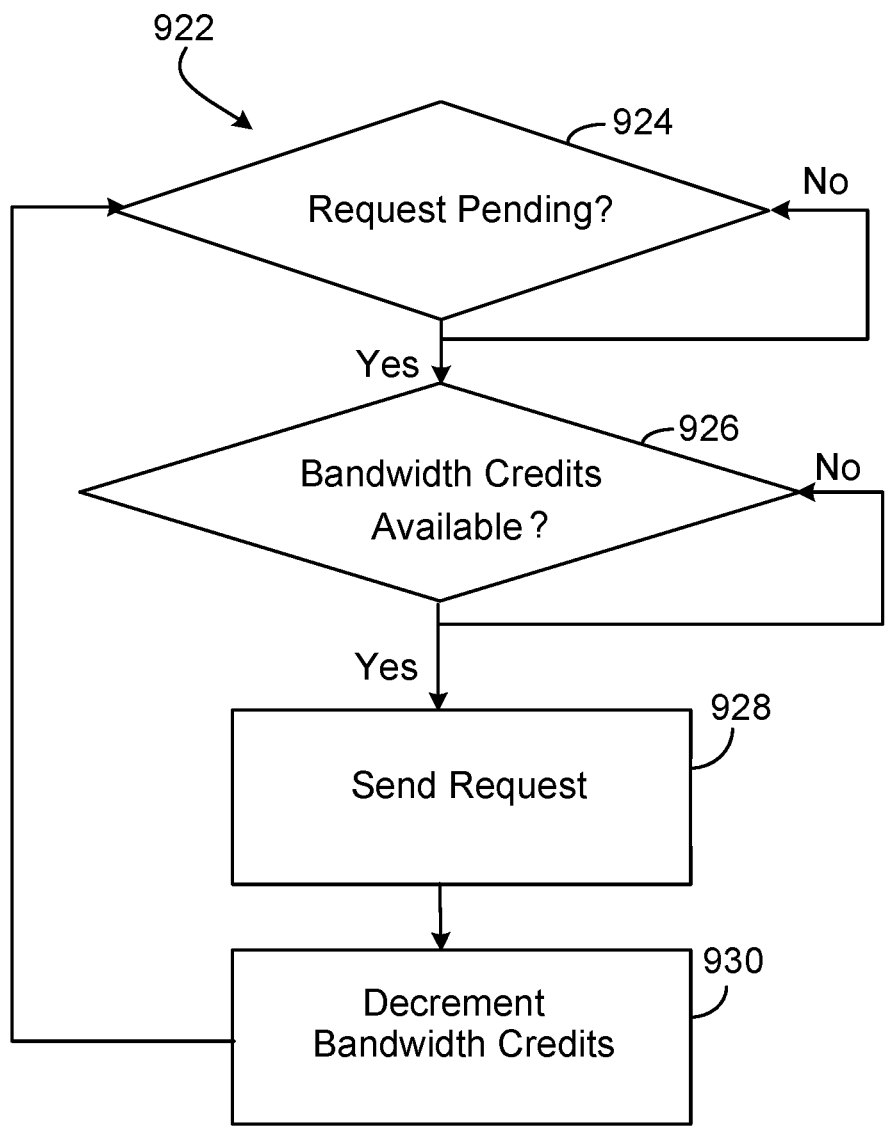
FIG. 55 is a flowchart of a bandwidth control procedure.

FIG. 55 shows a flowchart 922 depicting an example sequence of operations for bandwidth control. Operations include checking if a request is pending (924) at a requester. The checking can be done either periodically or on being triggered by another incident. If a request is pending, operations include checking if adequate bandwidth credit is available for the request (926). If enough bandwidth credit is not available, sending of the request can be held off until enough bandwidth credit is accumulated. Bandwidth credits can be accumulated by waiting for a period of time because bandwidth is usually incremented periodically (e.g. in every cycle) by the amount of bandwidth available in a given period on the response network. If and/or when sufficient bandwidth credit is available for the requester, operations include sending the request (928) in the network. Operations also include decrementing bandwidth credits (930) after the request is sent. The credit available to the requester can be decremented, for example, by an amount proportional to the amount of credit required or estimated for a response to the sent request.

Implementation of network priority order in the mesh (or any other interconnection network such as a ring or a bus or a crossbar or an express mesh) involves temporarily blocking new requests from entering the fabric if the mesh is reaching a programmable or predetermined congestion point, either on a local or global basis.

29 Method for High Performance Scalable Packet Classification

This section describes high performance, scalable layer-⅔ packet classification through optimized multicore processing arrays. In some implementations, packet classification includes customization (programmability), while maintaining line rate performance under various conditions. However, the ability to update the program instructions or states dynamically generally should not come at the cost of dropping packets. Packets should generally be delivered to the application in the order received, thus maintaining order across multiple classifier elements. The classifier should be both power and area efficient and perform at the line rate.

By taking advantage of the stateless nature of layer-⅔ packet classification, multiple processing elements (implemented for example in hardware) can work in parallel on an incoming packet stream. In some implementations, the performance of such a configuration can be directly proportional to the number of processing elements. Therefore, in some implementations, when a single processing element cannot keep up with the incoming packet stream, an array can include multiple processing elements such that the overall system meets the performance requirements. The user's view of such a processor array is that of a single monolithic high performance processor while the implementation allows for lower clock speed and a smaller overall area and power footprint.

A multi-processor approach is configured to maintain packet order. Because packet sizes vary, better performance is achieved if more time is given to packets that are larger (since these packets typically may require more classification). In some implementations, a multi-processor classification system is configured to put the packets back into order if such packets are classified out-of-order by using a reorder buffer that is sized proportionally to the number of classification elements. With this approach the area/performance scaling is linear.

In some implementations, the packet classification processor can be optimized to reduce the number of instructions required to process each packet header. For example, any instruction can be allowed to directly access any byte in the header. Similarly, any instruction can also be allowed to write to the packet descriptor (the output of the packet classifier). This can reduce or altogether eliminate the "load and store" operations associated with classification programs written for general purpose processors.

Other possible optimizations in the classifier can include one or more of the following:
A CAM (content addressable memory) that can be used for media access control (MAC) address matching (MAC address is the address in the packet)
A lookup table that can provide constant time resolution of switch targets using an optimizing compiler.
Dedicated hash units for packet distribution In some implementations, the classification processor's state is updated at any time, for example, even when packets are flowing in the system. A flash-update is provided that allows the classifier's instructions, registers, and memory states to be updated between processing packets. While the classifier is being reprogrammed, the incoming packets are accumulated in a buffer. This buffer is sized to allow periodic reprogramming of the classifier state without a resulting buffer overflow. Multiple classifiers can be reprogrammed simultaneously and a fence mechanism provided to allow an application software to determine whether a given packet is to be classified using the "old" state or the "new" state.

Some classification techniques can require a fixed cycle budget across all packets. This prevents optimizations that allow more cycles to be taken for a longer packet. This also prevents some packets from exceeding the allotted classification time as long as sufficient system resources and buffer space are available. A configurable cycle budget can allow packets to consume more than their allowed classification time without being dropped as long as the average classification time remains within the limit of line rate processing.

Each classification processor can include a small reduced instruction set (RISC) core optimized for packet processing. In some implementations, a plurality of such classifier processors are implemented, preferably in hardware. Header (input) and descriptor (output) values can be directly readable and/or writable from any instruction.

Figure 56:
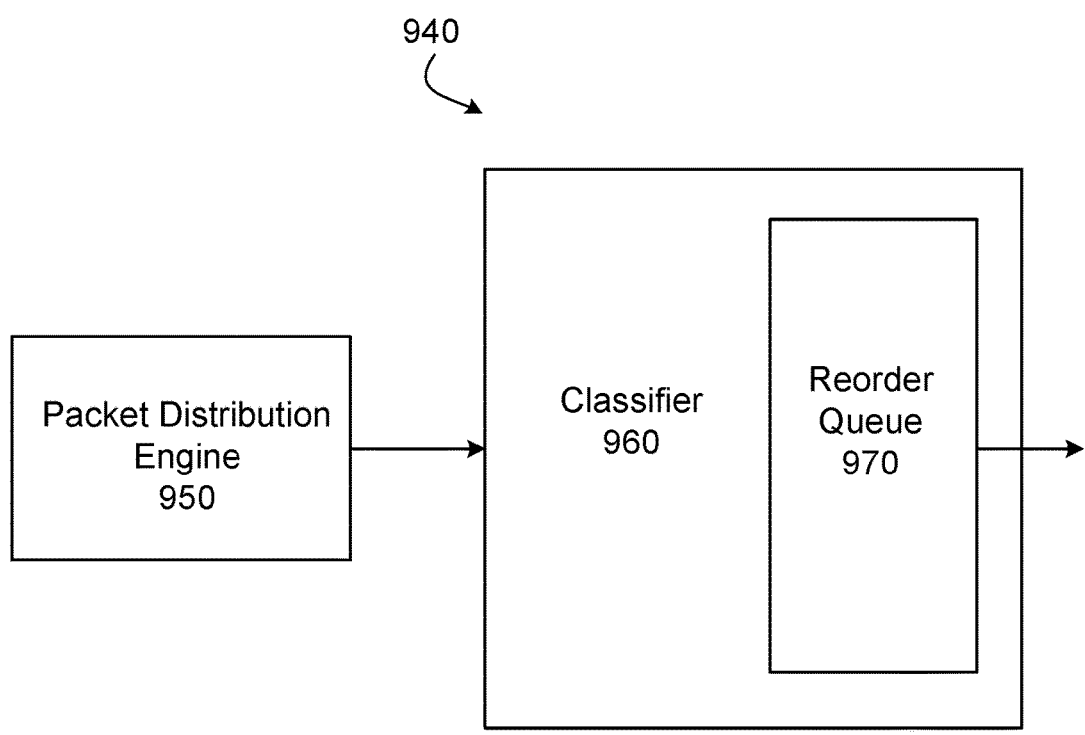
FIG. 56 is a block diagram of a classification system.

FIG. 56 shows an example of a classification system 940. In some implementations, a centralized packet distribution engine 950 can provide packet headers to a classifier 960. A tag can be associated with each of the packet headers so that the resulting descriptors can be placed in the correct slot in the reorder queue 970. Packets can be read out of the reorder queue 970 in the original arrival order.

Figure 57:
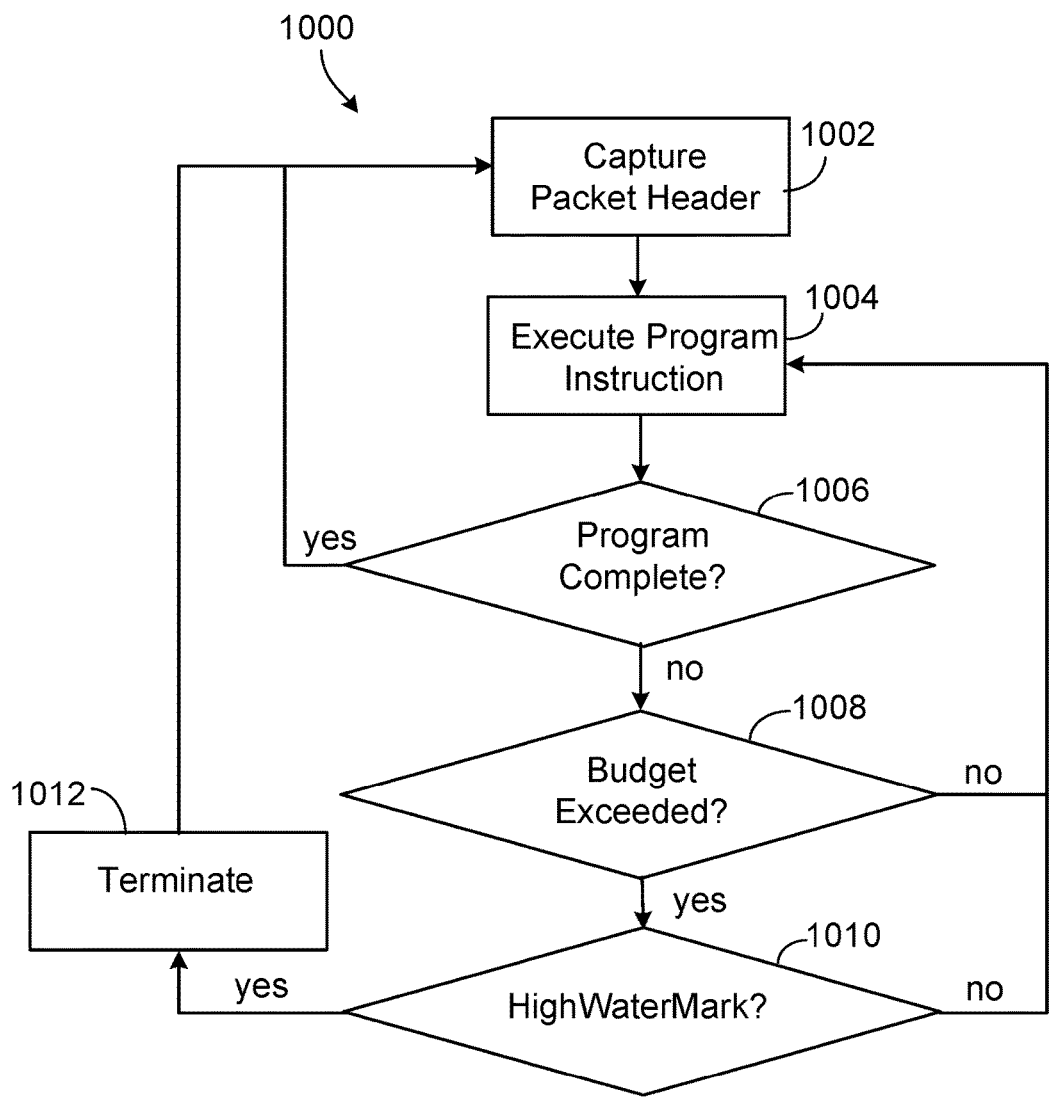
FIG. 57 is a flowchart of a method for classifying packets.

FIG. 57 illustrates an example sequence of operations 1000 for classifying packets based on a budget. Operations can include capturing the packet header (1002) from an incoming packet. Operations also include executing the program instruction (1004) and checking if the program has been completed (1004). If the program is not complete, operations include checking if the budget has been exceeded (1008). The cycle budget for each packet is calculated based on one or more factors, for example, on the packet size and the amount of fixed overhead associated with each packet. As a packet is classified, the cycle budget counter is decremented at each cycle. In some implementations, a non-zero value in the counter indicates that the budget has not been exceeded. If a portion of the budget is available, the program instructions continue to execute until the budget expires or the program is completed. When the counter expires, operations can also include if a pre-classification header queue has reached a predetermined threshold (often referred to as a high-water-mark) (1010). In some implementations, the classification processing is terminated (7?/12) when the pre-classification header queue exceeds a programmable threshold or high-water-mark. If classification is terminated, the packet is dropped or sent to a special queue for handling by software. By maintaining a processing time budget, latency constraints can be met for packet processing.

In some implementations, the packets can be encrypted or compressed such that their contents cannot be completely decoded by the packet classifier. In this case, the packet can be distributed to a decryption or decompression engine (or both). Once decrypted, the header can be sent back to the classifier, for example, by using an egress queue that loops back to the classifier. During the second pass through the classifier, the packet header can be fully examined for final load balancing and distribution. By passing pointers to the packet data along with the header, a zero-copy system architecture is maintained. The decrypted packet data that is not part of the header does not need to be re-circulated. This can decrease power consumption, memory utilization, and memory bandwidth.

30 Load Balancing in Multicore Packet Delivery Systems

Multicore processors can be used for packet processing. Multicore processors can use high quality load balancing to maintain line rate because any one processor (or core or tile) may not be able to keep up with the incoming packet stream. Typically the more processors required to meet the line rate requirements in the system, the better the load balancing needs to be.

In some implementations, per-flow packet ordering is maintained while still allowing distributed parallel processing of independent flows and redistribution of flows. A flow can correspond to a connection, and can have a stream of packets. However, for multicore processors, statically affinitizing (or fixing) flows, as often done for single processors, may not work.

In some implementations, load balancers can be used to account for both short term and long term trends in packet flow distribution and operative element or process efficiency. A small surge in packets for a single flow or a small degradation in performance on a single operative element does not usually impact the overall system performance. In some cases, poorly balanced systems may reach a steady state that does not provide an optimal packet processing performance. This can happen, for example, due to a positive feedback scheme in which poor operative element performance results in more packets being sent to that operative element. Such poor performance occurs for example, in an internet flow control protocol such as the transmission control protocol (TCP) where TCP retries are sent to an operative element that is unable to keep up in the first place. Similarly, in another example, end-to-end flow control can cause a sender to reduce the bandwidth (or transmission rate of packets) of the sender to a slow operative element. A slow operative element is an element that is unable to accept the packets from the sender at the sender's transmission rate. Hence the use of queue fullness as a measure of operative element performance is not always accurate. For example, if the sender has reduced the rate of sending, then the queue at the slow receiver may become less than full, thereby falsely indicating that the receiver is not backed up.

In some implementations, a load balancer can provide a mode that utilizes dynamic flow affinity that allows flows to be assigned to less busy cores when possible. Each operative element may have a queue of packets to be processed. In some cases, this queue of packets is also called a NotifRing. Therefore, as used in this document, an operative element can include, a core, a queue of packets to be processed by an operative element, and a NotifRing as appropriate in the context.

Figure 58:
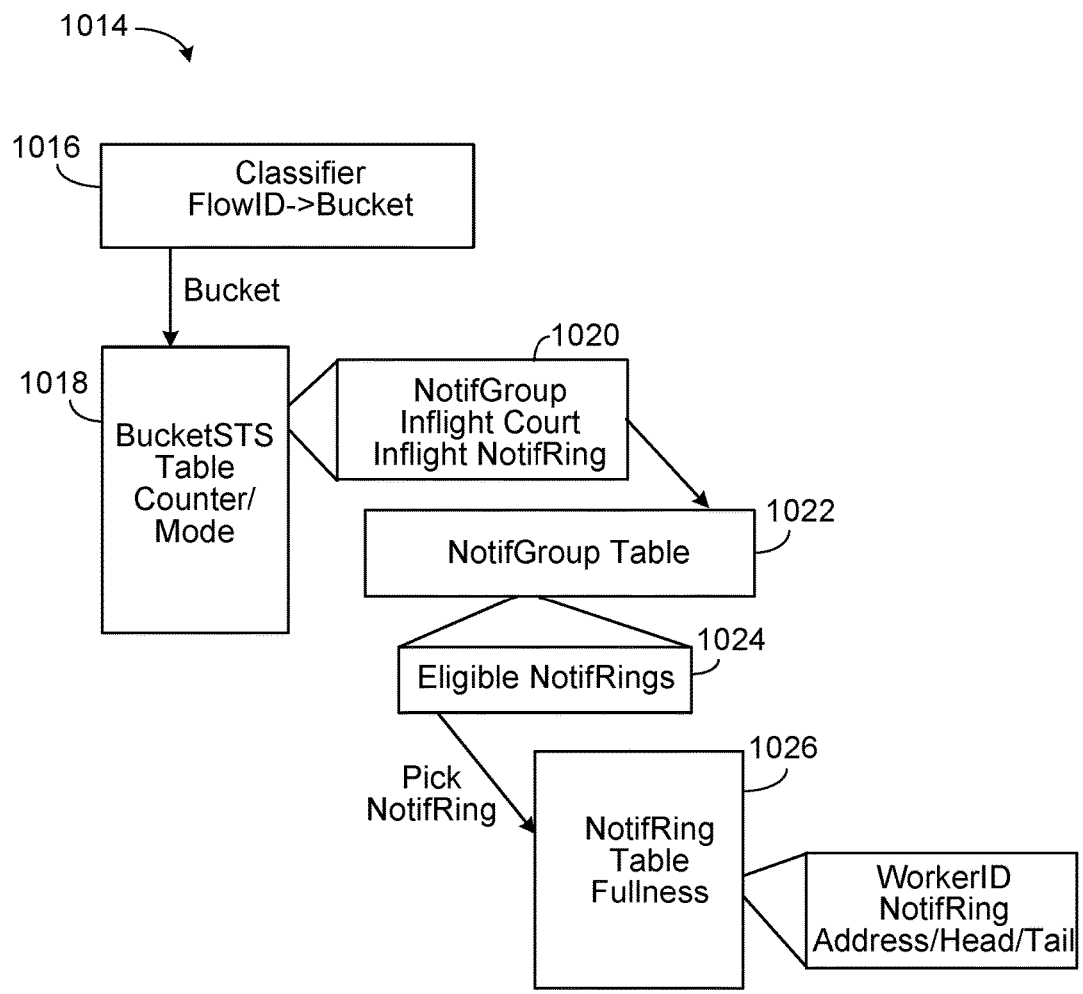
FIG. 58 is a block diagram of a load balancing system.

FIG. 58 shows a system 1014 for load balancing. In some implementations, the system 1014 includes a classifier 1016. One or more parts or modules of the system 1014 can be implemented on one or more cores of a multicore processor. To facilitate load balancing the classifier 1016 can first hash the flow-IDs (which may number in the millions) into a smaller number of buckets (the number of buckets may be 1000's for example). In general, a bucket is defined as a hash-reduced flow ID (thus multiple flows may hash to a single bucket if the hash function results in the same bucket-ID). The number of cores (or number of NotifRings) may be in the order of 10's.

The system 1014 includes a counter 1018 that maintains a reference count (or just count as depicted in the figure below) on a per bucket basis. The reference count can be used to determine if any packets are being processed for the associated bucket-ID. If so, the packet is delivered to the corresponding NotifRing (queue of packets to be processed by an operative element) 1020. If not, a new NotifRing may be chosen from the pool or table 1022 of available NotifRings or operative elements.

Some implementations support a particular mode (often referred to as the "sticky" mode) where a NotifRing is automatically rebalanced (e.g. a new NotifRing is chosen) if the NotifRing becomes full. A new NotifRing can be chosen, for example, from a set of eligible NotifRings 1024 that are stored as a part of the table 1022. Rebalancing NotifRings can ensure that no packets are dropped until all NotifRings are full. In some cases, the "sticky" mode has an optional sub-mode in which a NotifRing is randomly or periodically rebalanced. This prevents the system from settling into a non-optimal steady state in the end-to-end flow control example above. This sticky-random mode also provides performance improvement in systems where individual flow-ID slowdowns do not result in local NotifRings becoming full.

User software can also have access to each NotifRing's fullness state that can be stored, for example, in a NotifRing fullness table 1026. In some implementations, the table 1026 stores the fullness information in compressed form to allow software rebalancing or drop decisions to be made with global system state information in hand. This information can also be used by software to make processing decisions based on NotifRing fullness without having to read and compare many different NotifRings' occupancy counters. Because there can be more NotifRings than operative element s, a single operative element may be servicing several NotifRings.

Figure 59:
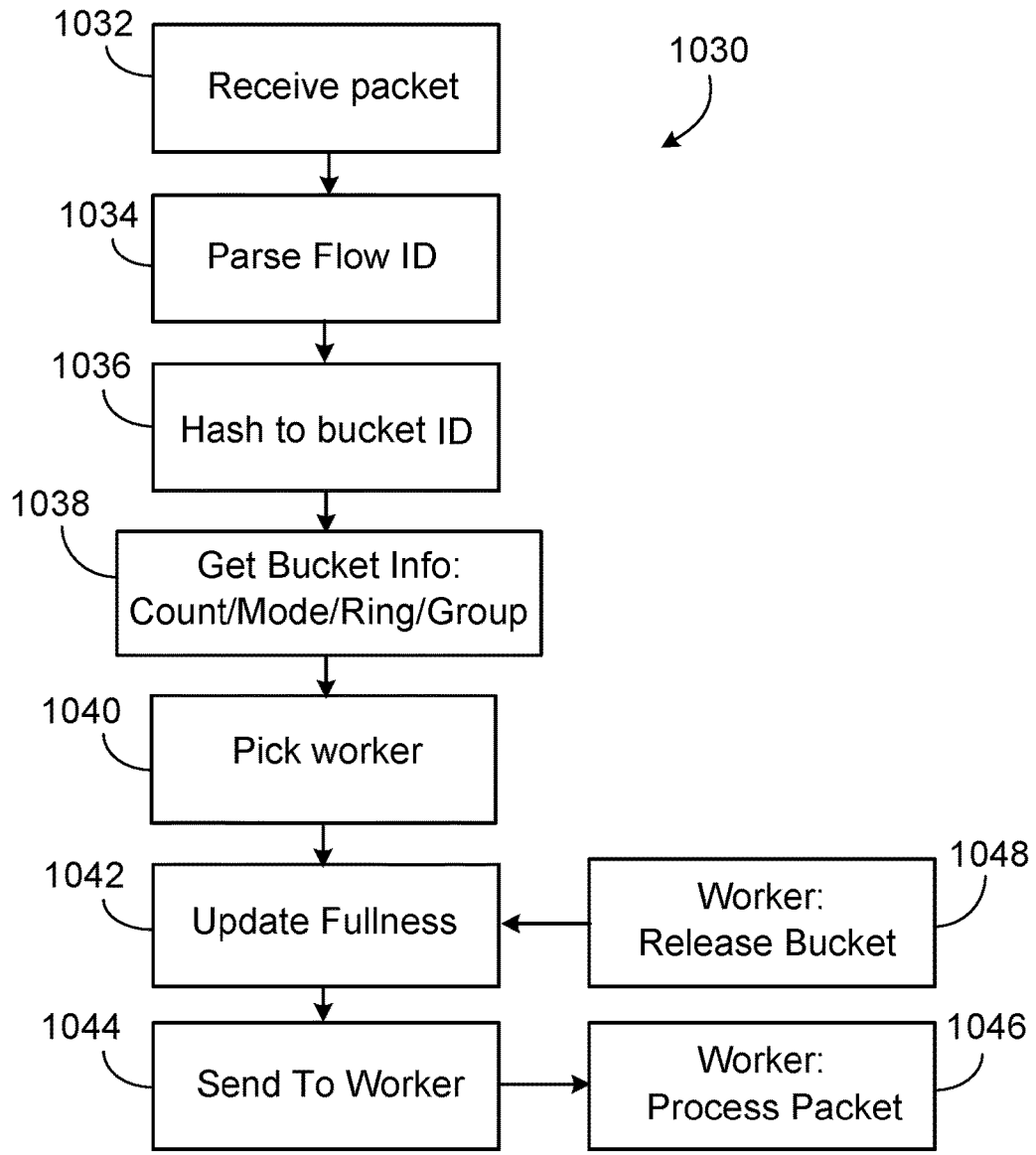
FIG. 59 is a flowchart of a method for load balancing.

FIG. 59 shows a flowchart that illustrates an example sequence of operations for load balancing. Operations include receiving an arriving packet (1032). Arriving packets can be assigned to the current operative element or NotifRing or load balanced to the least full operative element or NotifRing. Operations also include parsing the flow ID of the arriving packet (1034) and hashing the flow ID to a bucket. The number of buckets are smaller compared to the number of flow IDs. Operations also include getting information about the bucket a flow ID is hashed into (1038). In some implementations, buckets are physical hardware resources that include, for example, a counter, a mode, and a current-NotifRing indicator. The decision to load balance can be based on the counter, mode, a random number generator, and the NotifRing fullness state. Operations can also include picking another operative element or NotifRing (1040) if rebalancing is needed. Picking another operative element or NotifRing can also include checking the fullness table 1026 to select an eligible candidate. Each NotifRing's fullness can be represented, for example, by a 3-bit number where 0 indicates empty and 7 (binary 111) indicates full. The binary values in between represent a quantized fullness value relative to programmable thresholds. This set of 3-bit numbers can be used for load balancing and can be made directly readable by an application software. Thus many NotifRings' values can be packed into a single machine word for very fast comparisons. Higher or lower number of bits can also be used as an indicator of a NotifRing's fullness. In sticky mode, the load balancer is only used when the associated NotifRing is full. In sticky-random mode, the load balancer is used when the associated NotifRing is full or when the random number generator exceeds a programmable threshold.

Operations also include updating the fullness table (1042) after a new operative element is selected or if the packet is assigned to an existing operative element. The packet is then sent to the operative element assigned to the packet (1044). The operative element processes the packet (1046) and releases the bucket (1048). Operations also include updating the fullness table (1042) after the packet is processed. In some implementations, the fullness table can be updated randomly or after predetermined periods of time.

In some implementations, another mode (referred to as a dynamic flow affinity mode (DFA)) is also supported. In the DFA mode, the load balancer is used when a count of packets for a bucket is zero. In the DFA mode, the count is incremented on each new packet and decremented, for example by software, when processing is complete on a packet in that bucket.

31 Method of Buffer Management for Packet Processing Systems

Packet processing systems typically store incoming packets in buffers (commonly in hardware in an packet I/O device, for example, or in shared memory). Pointers to these buffers are passed to packet processing software that typically runs on the cores of a multicore chip. A hardware or software based list of available buffers (freelist) is maintained. Storing packets in a ring structure or using a FIFO as the freelist of buffers can cause buffer management to use memory, cache, interconnect bandwidth, and lock contention, thus limiting system performance.

Buffer management is performed by storing buffer pointers in a hardware managed stack and storing the top of that stack in a hardware storage location.

Figure 60:
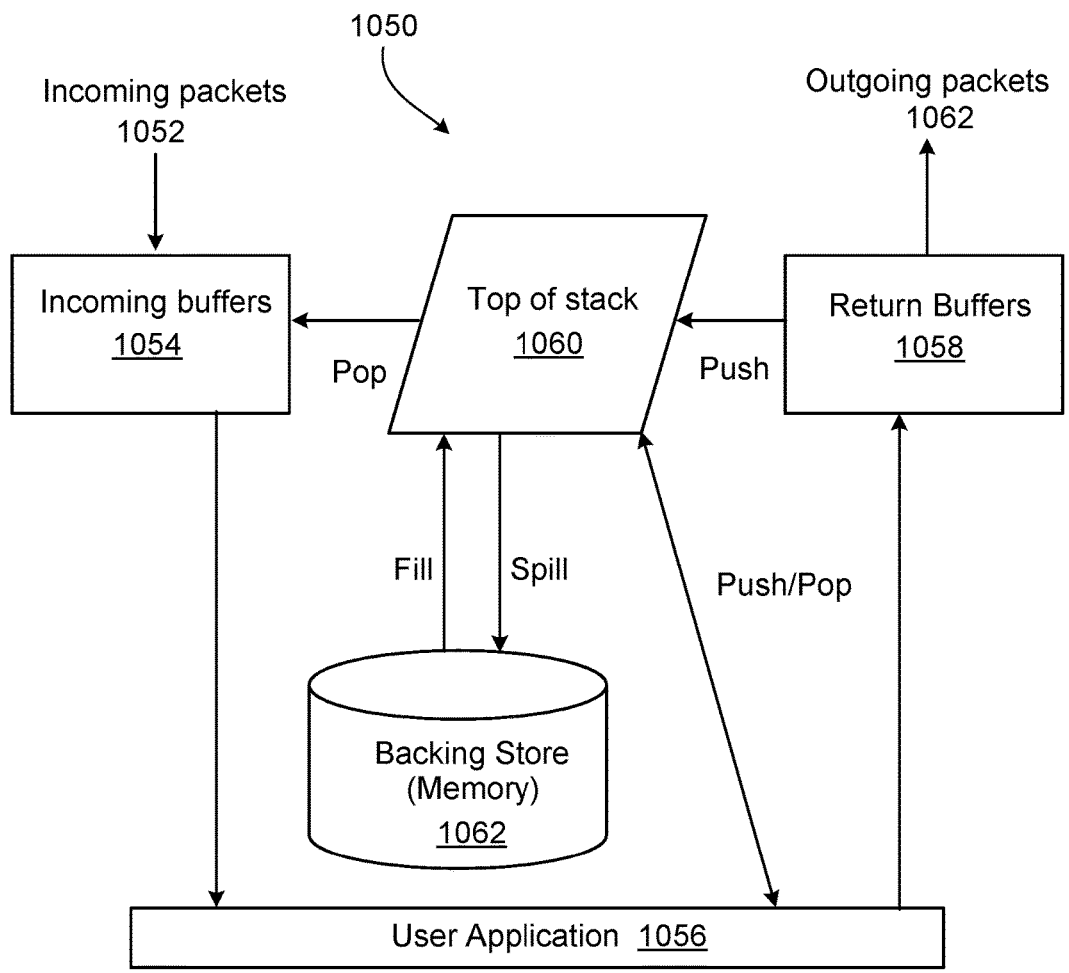
FIG. 60 is a block diagram of a buffer management system.

FIG. 60 shows an example of a system 1050 used for buffer management. The system includes incoming buffers 1054 and return buffers 1058 that are accessed by a user application 1056. The buffer pointers to these buffers are stored in a stack and the top of the stack 1060 is also stored in hardware. This configuration allows recently used buffers to be more likely re-used and thus reduces bandwidth demand for accessing backing store (i.e., main memory) 1062 by increasing cache usage. For example, this allows hardware to store recently freed buffers onto the top of the stack 1060 and reuse those buffers first. In a steady state, the required buffer management traffic to and from the backing store 1062 can be reduced to zero. Thus, instead of one buffer "consume" (read) and one buffer "free" (write) per packet, these are offset and there are no reads and writes to the external memory system (for example, expensive off chip DRAM) 1062 even when the system is running at peak capacity.

The system 1050 features a hardware managed free buffer pool 1054, 1058 organized as a stack with the top of the stack 1060 stored in hardware. Incoming packets 1052 consume incoming buffers 1054 from the top of the stack 1060 and outgoing packets 1062 or software services return buffers to the top of the stack 1060 when they are done with the buffer. Thus, a most recently returned buffer (present at the top of the stack 1060) is assigned first to the next incoming packet 1052 that requests a buffer. With this configuration buffers are reused quickly and thus there is an increased likelihood that the buffer is still available in the on-chip caches. When the network packet data is filled into the buffer, the coherent cache system ensures that the fresh packet data replaces the older packet data that might be present in the reused buffer.

In some implementations, a hardware engine spills and fills the stack(s) as needed to on-chip (e.g., on chip coherent distributed cache) or off-chip backing store (e.g., external DRAM memory) 1062. In steady state, no access to the backing store 1062 is needed because all push and pop operations to the stack take place in the locally stored top of stack 1060.

Figure 61:
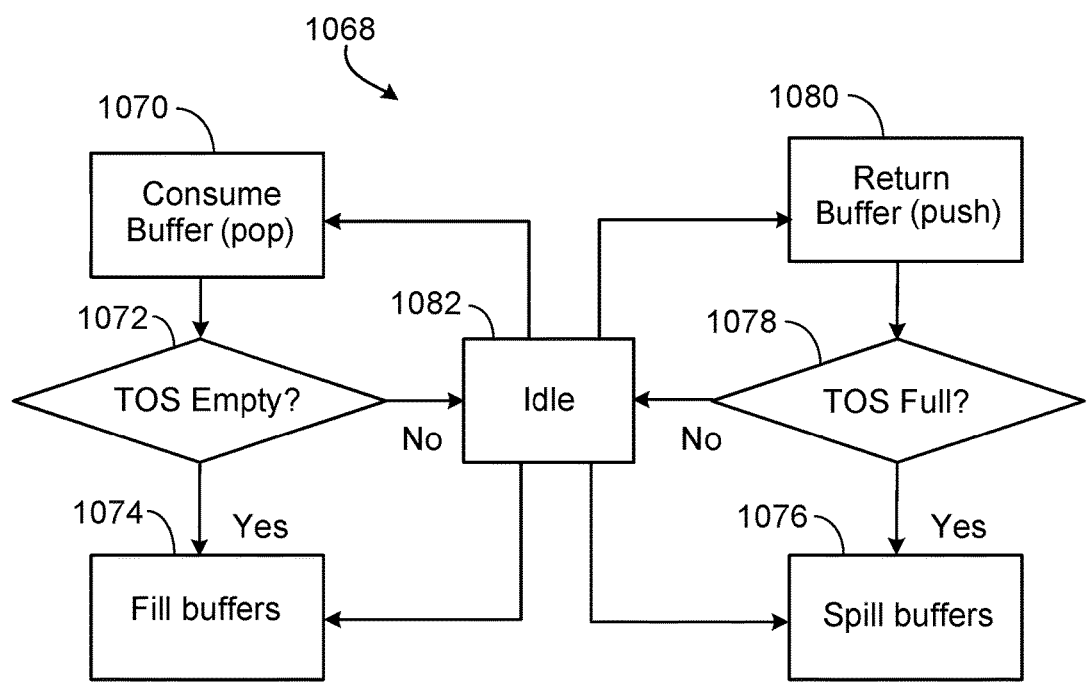
FIG. 61 is a flowchart of a method for buffer management.

FIG. 61 depicts an example sequence of operations for buffer management. Operations include consuming an incoming buffer (e.g. a buffer 1054) by an incoming packet (1070). Each time a buffer is consumed, the top of stack pointer is decremented (i.e. a buffer is popped from the stack) and operations include checking whether the top of the stack (TOS) is empty (1072). If the TOS is empty, or if a low threshold is reached within the locally stored buffer stack, operations include filling (1074) or fetching more buffer pointers, for example, from the backing store 1062. Operations can also include returning (or pushing) a buffer back on the stack when an outgoing packet is read out from a return buffer (1080). In some implementations, after an outgoing packet is transmitted, the corresponding buffer can be directly released to the hardware buffer manager thus eliminating any software buffer management requirements and the associated communication bandwidth. Buffers may be released, for example, by setting an indicator in the transmitted packet descriptor or by sending a buffer-release message to the hardware buffer manager. Once a buffer is returned to the stack, operations include checking if the TOS is full or if a high threshold has been reached (1078). If the TOS is full or if the high threshold is reached, the engine writes or spills a number of the locally stored buffers to the backing store (1076). After the buffers or filled (1074) or spilled (1076) or if the checks (1072 or 1078) indicates that a threshold condition has not been reached, an idle state is entered (1082) until the next buffer pop (1070) or buffer push (1080) occurs. All the while, the stack nature of the buffers is maintained allowing the positive characteristics of buffer-reuse. In other words, most recently used buffers (those at the top of the stack) are reused first.

Multiple simultaneous stacks may be managed by the same hardware buffer manager to allow virtualized environments with many individual contexts. Software running on different processors can consume or release buffers through a virtualizable interface that allows direct user access to buffers with the same high performance characteristics that hardware DMA engines provide. The hardware buffer manager provides a high performance, low cost synchronization point to allow many client processes to push to and pop from the buffer stack substantially simultaneously. In some implementations, at least a portion of the total stack is stored locally to the hardware engine, for example in a SRAM structure, or a cache structure, or a register structure. The software and hardware interfaces are serialized to maintain a coherent top-of-stack pointer while still providing a lockless push/pop interface to software clients.

If more than one buffer stack manager exist in a system, for example if there are multiple independent groups of network ports, a common buffer pool may be shared. This allows software to consume from and feed buffers to a single pool. The buffer stack managers may communicate with each other through a private network or shared network channel in order to consume and free buffers from the shared pool. Each manager may still maintain a separate top of stack in hardware. However, spills and fills may be coordinated amongst multiple buffer stack managers.

32 Variable Length Instruction Pipeline for Processor

This section describes a microprocessor instruction pipeline where one (or more) pipeline stages can be bypassed for performance reasons. In some processors, branch prediction is performed using a branch taken/not taken hint that is encoded in the branch type field of the instruction. The branch taken hint is used to redirect the pipeline to the branch target instruction early in the pipeline. Redirection of the pipeline reduces lost instruction slots relative to an approach that waits for the branch resolution (which is known only later in the pipeline) before redirecting it. In some implementations, the cost for a correctly predicted taken branch is 0 cycles, whereas the cost for an incorrect prediction (either taken or not taken) can be higher, e.g. 2 cycles or more. This cost can be achieved by redirecting the pipeline in the instruction fetch stage. However, with this approach, a critical path can access the Icache RAM, to determine that the instruction is a predicted taken branch, and then using that information to select the branch target as the Icache RAM new address all in one cycle.

It is desirable to maintain the 0 cycle cost of a correctly predicted taken branch, while improving the critical path timing. Such a goal can be met, for example, by using a new pipeline stage. Table 32.1 shows an example of the states of a pipeline for a sequential code (the rows represent instruction addresses A0 through A5, and the columns 0-10 represent time in cycles).

| Address | 0 | 1 | 2 | 3 | 4 | 5 | 6 | 7 | 8 | 9 | 10 |
|---|---|---|---|---|---|---|---|---|---|---|---|
| A0 | FT | BP | DC | E0 | E1 | WB | | | | | |
| A1 | | FT | BP | DC | E0 | E1 | WB | | | | |
| A2 | | | FT | BP | DC | E0 | E1 | WB | | | |
| A3 | | | | FT | BP | DC | E0 | E1 | WB | | |
| A4 | | | | | FT | BP | DC | E0 | E1 | WB | |
| A5 | | | | | | FT | BP | DC | E0 | E1 | WB |

The pipeline stage definitions (i.e. the content of the cells in table 32.1) are given in the table 32.2. The fetch and bypass (FB) stage does not appear in table 32.1 because that pipeline stage is only used for non-sequential cases. As noted above, the example in table 32.1 illustrates sequential instructions.

TABLE 32.2

Definitions of pipeline stages

| Name | Function |
|---|---|
| Fetch (FT) | Read Icache at PC plus 1, Next PC calculation, lookup ITLB. |
| Fetch and Bypass (FB) | Read Icache at PC. Only occurs on non-sequential cases. |
| Branch Predict (BP) | Branch decode and predict, branch offset add. |
| Decode (DC) | Read register file; decode instruction; read PFB; Icache tag check. |

TABLE 32.2-continued

Definitions of pipeline stages

| Name | Function |
|---|---|
| Execute 0 (EX0) | Branch resolution; ALU operations. |
| Execute 1 (EX1) | Complete long ALU operations, determine if interrupt should be taken (and if so, select the proper vector). The end of this stage is the latest point an instruction may be discarded. |
| Writeback (WB) | Write result to register file. |

Figure 62:
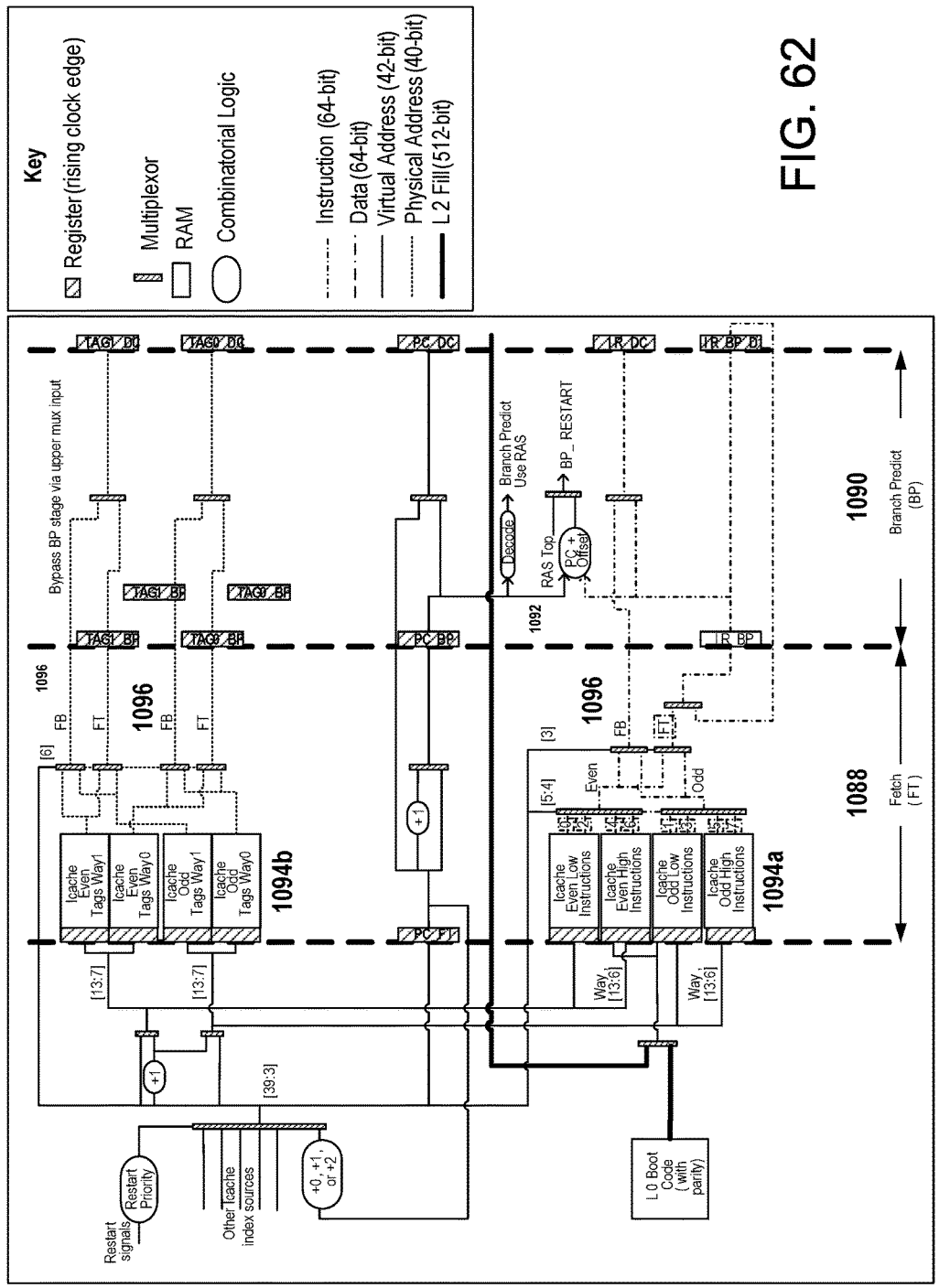
FIG. 62 is a circuit diagram of a pipeline system.

FIG. 62 shows a circuit diagram of the fetch (FT) 1088 and branch predict (BP) 1090 stages of an example of a pipeline system, 1086.

In some implementations, the BP pipeline stage 1090 decodes (e.g. using a decoder 1092) an instruction to determine that it is a predicted taken branch. The predicted taken branch decode is used in controlling a multiplexor associated with the Icache to select the Icache address for the instruction corresponding to the taken branch. In such cases, the critical timing path is split—and the FT stage 1088 only accesses the Icache 1094a or 1094b (1094 in general). In some cases, adding a pipeline stage can make the cost of a correctly predicted taken branch 1 cycle instead of the desired 0 cycles. One solution to address this issue is to perform two actions whenever a taken branch (or any type of non-sequential instruction) is fetched: 1) bypass the BP stage, and 2) fetch two instructions. This is referred to as the fetch and bypass stage (FB) 1096. Bypassing the BP stage can keep the pipeline full from the decode stage DC stage forward (e.g. do not form a void or bubble in the DC stage). However, simply bypassing the BP stage 1090 alone would form a bubble in BP stage 1090, which would become a bubble in the DC stage one cycle later. Fetching two instructions can allow the bubble to be collapsed. The purpose of the FB stage 1096 is to allow for two instructions to be read at the same time, one in FT 1088 and one in FB 1096. As shown in Table 32.3, if A0 is the predicted taken branch, the FB stage fetches B0 (the branch target) and the FT stage fetches B1. Therefore B0 bypasses the BP stage, and loads directly into the DC, whereas B1 loads into the BP stage.

TABLE 32.3

Example illustrating stages in a pipeline when FB is used

|    | 0  | 1   | 2  | 3  | 4  | 5  | 6  | 7  | 8  | 9  | 10 |
|----|----|-----|----|----|----|----|----|----|----|----|----|
| A0 | FT | BP↓ | DC | E0 | E1 | WB |    |    |    |    |    |
| A1 |    | FT  | BP |    |    |    |    |    |    |    |    |
| B0 |    |     | FB | DC | E0 | E1 | WB |    |    |    |    |
| B1 |    |     | FT | BP | DC | E0 | E1 | WB |    |    |    |
| B2 |    |     |    | FT | BP | DC | E0 | E1 | WB |    |    |
| B3 |    |     |    |    | FT | BP | DC | E0 | E1 | WB |    |

In some implementations, two banks are provided in the Icache 1094 to allow for two instructions to be fetched in one cycle. In some implementations, the Icache 1094 is split into even and odd banks. Whenever the instruction flow is redirected (for example by a branch), the target instruction and its successor are fetched. The fetched instructions are guaranteed to be either even/odd or odd/even (because the addresses of any two sequential instructions will differ by one). In some implementations, the Icache is two-way associative. The technique can also work with other degrees of associativity (including one, e.g. direct map).

FIG. 63 shows a flowchart 1100 illustrating an example sequence of operations for fetching instructions. Operations include accessing a cache such as the Icache (1102). In some implementations, the Icache is split into even and odd banks and when executing sequential code, only the even bank or the odd bank needs to be accessed. This can save power because only one Icache RAM bank is activated. The banking is sometimes used solely as a power saving technique, and therefore the need to do banking for this technique is typically not a major burden.

Operations also include bypassing one or more pipeline stages (1104). In some implementations, bypassing a pipeline stage can be extended to other places in the pipeline. In some implementations, the stage being bypassed can be optional. This because, typically usage branch prediction is only provides a hint, and the branch direction is can be reconfirmed later. If the prediction turns out to be incorrect, the pipeline can be restarted.

In some implementations, the stage being bypassed can be reloaded. Otherwise the effect can be a bubble, just in a different place, which would negate the benefit. The method could also be extended to bypass multiple pipeline stages. The number of stages loaded in parallel can equal the number bypassed plus one (e.g. one stage (BP) is bypassed and two instructions are fetched).

33 Common Buffer Format for Packet I/O and Packet Processing

In devices configured for performing packet processing, packets ingress from a network (e.g. Ethernet) to the device, are processed, and egress from memory back to the network. The packet data can be held in memory (either on-chip or off-chip) until the packet has been safely egressed. At high line rates, the amount of memory required to hold all the in-flight (or in-process) packets can be more than that can be fit on-chip. In such cases, some packets can be buffered in the DRAM. However, to operate within the bandwidth capability of the memory subsystems (both on-chip and off-chip) copying of packet data from/to memory should be avoided as often as possible.

When packets ingress from the network, buffers are allocated to hold the incoming packets. The total size of the packet is typically not known up front, and so a common technique is to allocate small buffers, and chain the allocated buffers in a linked list until the entire packet is available. If downstream processing stages are not configured to handle the chained buffer format, the software can copy the packet from the buffers into contiguous memory space. However, the copy operation consumes memory bandwidth, and also adds latency to the packet processing.

In some implementations, packets received by a network packet processing acceleration hardware can be placed into chained buffers.

FIG. 64 illustrates an example sequence of operations 1110 for packet processing. Operations include receiving network packets and placing the packets into chained buffers (1114). Some packets may need to be decrypted and/or decompressed as part of the processing by other hardware accelerators. The co-processors can be configured to read the chained buffers directly. In such cases, the tile software that performs the ingress processing can be given a pointer to a packet by the ingress hardware. Operations can include processing the packet header (e.g. using suitable software) to determine (1116) if decryption and/or decompression are required. If at least one of decryption or decompression is required, an operation can be initiated at the co-processor to pass the pointer to the beginning of the packet chain as one of the operation parameters. Because the co-processor can then follow the chain, the need to have the software copy the packet to contiguous memory is eliminated. The chain buffers can therefore be read by one or more co-processors (1118).

In some implementations, packets are received by the network packet processing acceleration engine (e.g. the acceleration engine called mPIPE) into chained buffers. Some packets may need to be decrypted and/or decompressed as part of the processing. Because those operations are computation intensive, specialized co-processors (e.g. MICA) can be provided to perform the decryption or decompression functions. The co-processors can typically read the packet from memory (1118) perform the decryption/decompression (1120) and write the result into memory (8?/22).

Figure 65:
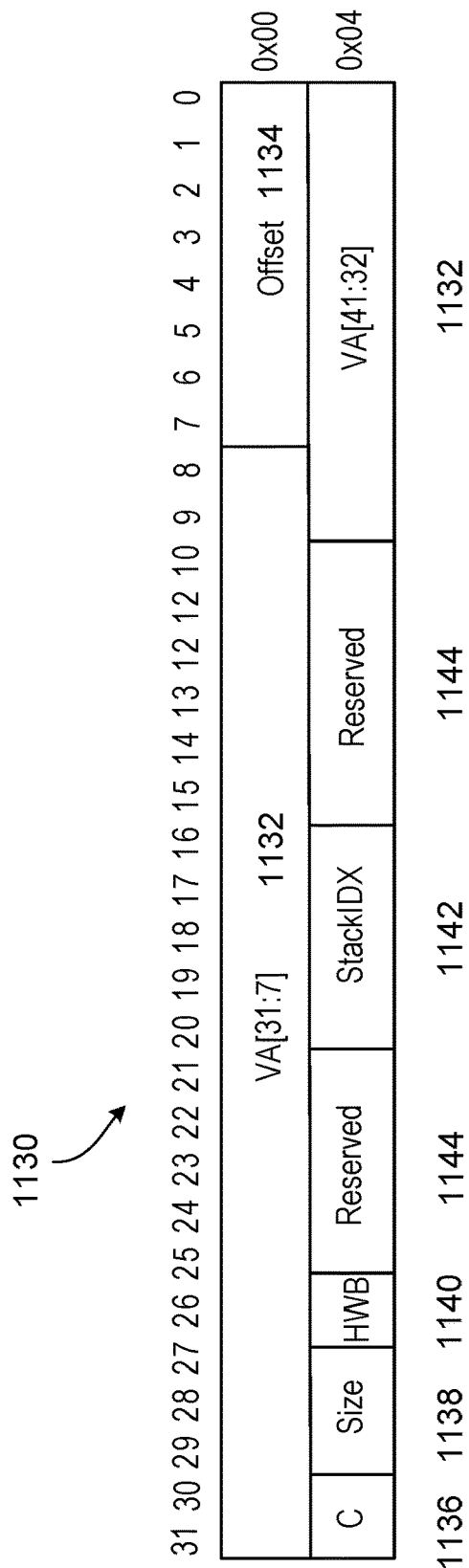
FIG. 65 is a diagram of a chained buffer format.

FIG. 65 shows an example of a chained buffer format. The format 1130 include, for example, a virtual address 1132 of the data. The format 1130 can also include an offset field 1134 that indicates how far into the packet the co-processor should begin operation. This can be used, for example, to skip over header fields and access the packet payload during decompression. The tile software can determine how many bytes of header exist, based on its parsing of the header, and then adjust the offset field when passing the chain pointer to the co-processor. The format 1130 also include bits or sets of bits that represent one or more of the following parameters: a chaining designation (C) 1136, a size of buffer (Size) 1138, hardware release (HWB) 1140, and an identification of the buffer stack (StackIDX) 1142. In addition, some parts 1144 of the format can be kept reserved, for example for configurable operations. Table 33.1 lists some example configurations for the parameters described above

| Bits | Description |
|---|---|
| C | Chaining designation. Set by iDMA hardware and application SW prior to eDMA<br>0 Unchained buffer pointer<br>1 Chained buffer pointer. Next descriptor stored in 1$^{st}$ 8-bytes in buffer.<br>3 Invalid Descriptor. Could not allocate buffer for this stack (iDMA) o end of chain (i/eDMA). |
| HWB | Hardware release (for eDMA)<br>1 When 1, the buffer will be released the buffer stack manager.<br>0 When 0, the ReleaseDest field contains the target Tile for the buffer release message. |
| StackIDX | Buffer stack to which this buffer belongs. |
| Size | Size of buffer. Encoded as follows:<br>0    128 bytes<br>1    256 bytes<br>2    512 bytes<br>3    1024 bytes<br>4    1664 bytes<br>5    4096 bytes<br>6    10368 bytes<br>7    16384 bytes |
| Offset | Start byte of data within the 128-byte aligned buffer. |
| VA | Virtual address. Must be sign extended by consumer. Buffers must be aligned to 128-bytes. |

The co-processors can also be configured to handle unchained, contiguous memory for packet data. This can be used, for example, when the data is not received from the network, but rather (for example) generated internally by an application running on the tile, and needs to be encrypted/decrypted and/or compressed/decompressed.

The result of the co-processor application can be written to either contiguous memory or a chain buffer. In the case of a chain buffer, in some implementations, the same buffer that the source data was taken from, can be used.

34 Additional Systems

Various features of the techniques described herein can be implemented on the multi-core processor based systems as described in U.S. Pat. Nos. 7,577,820, and 7,805,575, and commonly-owned U.S. patent application Ser. Nos. 12/028, 002, 12/582,443, and 12/885,957, each of which is incorporated herein by reference in its entirety.

Various techniques described herein can be implemented in additional types of integrated circuit architectures. For example, some techniques can be used in an integrated circuit with a single processor core, or an integrated circuit in which multiple processor cores include respective computation units interconnected by a shared interconnection network such as a bus, or a pipelined bus, in addition to a tiled integrated circuit architecture in which multiple processor cores are interconnected by a network of switches connected to respective computation units. Some techniques can be used in parallel processing environments that include multiple processes executing on a single processor, or multiple single-core and/or multi-core processors.

It is to be understood that the foregoing description is intended to illustrate and not to limit the scope of the invention, which is defined by the scope of the appended claims. Other embodiments are within the scope of the following claims.

What is claimed is:

1. A method to acquire a read lock on a memory location, the method executed by a multicore processor device of a computing system, the method comprising:
   receiving from a reader process, an instruction to perform an operation associated with an original value stored at a memory address location of a memory of the computing system, the operation adds a value to the original value and checks a result of adding the value; and
   performing the operation in circuitry coupled to the memory of the computing system, by:
      reading the original value stored at the memory address location and atomically performing the addition of the value with reading the original value, with at least one of one or more additional operations conditionally performed based at least in part on checking the result of performing the one or more additional operations on the original value read from the memory address location to determine whether a writer process currently has a lock on the memory address location.

2. The method of claim 1, the method further comprises: determining whether to send a message invalidating cached copies of the original value based on the result.

3. The method of claim 2 wherein the read lock is initialized to zero, and the value stored at the memory location is a signed value, having a sign bit and the instruction adds a value +1 to the original value and with the result being a negative result indicating that the sign bit is set, which indicates that the writer process currently has the lock, and the reader process waits for the writer process to complete.

4. The method of claim 3 wherein the reader process executes in a loop in which the reader process repeatedly issues the instruction until the instruction returns a true value.

5. The method of claim 2 wherein the instruction is a fetch and add if greater than or equal to zero (fetchaddgez) instruction to implement the read lock.

6. The method of claim 5 wherein a cache controller comprises the circuitry to execute the fetchaddgez instruction.

7. The method of claim 5 wherein the read lock is implemented by:
  executing an instruction that adds an integer value to the original value in memory;
  checking for a particular bit to become one; and if the particular bit is one, the read lock fails.

8. The method of claim 5 wherein the multicore processor comprises plural tiles, each tile including a processor and switch, and the method further comprises:
  forwarding the operation from a requesting processor to a cache controller at a home tile, where the home tile for a given block of data is the tile that maintains coherence information for that block of data;
  executing the additional operation without updating the data or invalidating all shared copies of the data;
  using a result of the operation to make a subsequent hardware operation decision.

9. The method of claim 8 wherein the subsequent hardware operation decision is
  obtain the exclusive data ownership and invalidate shared copies of the data, when the data are required to be updated and when there are any shared copies of that data in any of the other processors that are required to be invalidated.

10. The method of claim 8 wherein the subsequent hardware operation decision is if the data are not required to be updated, no further coherency operation is needed.

11. The method of claim 2 wherein the original value stored at the memory location is a signed value, having a sign bit and the method further comprises:
  executing by a writer process an atomic "fetch-and-or" instruction to set the sign bit of the value stored at the memory address location to acquire a lock for writing.

12. The method of claim 2 wherein the original value stored at the memory location is a signed value, having a sign bit and the method further comprises:
  executing by a writer process a compare-and-exchange instruction that atomically sets the sign bit of the value stored at the memory address location to acquire a lock for writing.

13. A device comprises:
  a multicore processor device that comprises a plurality of processor cores, with multiple ones of the plurality of processor cores each comprising
    a processor; and
    switching circuitry configured to couple the processor to a network among the plurality of cores, with the multicore processor device configured to:
  receive from a reader process a request to acquire a read lock with, an instruction to perform an operation associated with an original value stored at a memory address location of a memory of a computing system, the operation adds a value to the original value and checks a result of adding the value; and
  configure circuitry to perform the operation associated with the original value stored at the memory address location of the memory; and
  read the original value stored at the memory address location and atomically perform the addition of the value with reading the original value, with at least one of one or more additional operations conditionally performed based at least in part on checking the result of performing the one more additional operations on the original value read from the memory address location to determine whether a writer process currently has a lock on the memory address location.

14. The device of claim 13, further configured to:
  determine whether to send a message invalidating cached copies of the original value based on the result.

15. The device of claim 14 wherein the instruction is a fetchaddgez instruction in which a sign bit of the value indicates whether the one or more additional operations succeeded.

16. The device of claim 14 wherein the read lock initialized to zero, and the value stored at the memory location is a signed value, having a sign bit and the device is further configured to:
  add a value +1 to the original value stored and with the result being a negative result indicating that the sign bit is set, which indicates that the writer process currently has the read lock, and the reader process waits for the writer process to complete.

17. The device of claim 16 wherein the reader process executes in a loop in which the reader process repeatedly issues the instruction until the instruction returns a true value.

18. The device of claim 14 wherein the original value stored at the memory location is a signed value, having a sign bit and the device is further configured to:
  execute by a writer process an atomic "fetch-and-or" instruction to set the sign bit of the original value stored at the memory address location to acquire a lock for writing.

19. The device of claim 14 wherein the original value stored at the memory location is a signed value, having a sign bit, and the device is further configured to:
  execute by a writer process a compare-and-exchange or instruction that atomically sets the sign bit to acquire a lock for writing.

20. The device of claim 13 further comprises a cache controller that comprises circuitry to perform the operation.

21. The device of claim 20 wherein the multicore processor device is further configured to:
  forward the operation from a requesting processor to the cache controller at a home tile, where the home tile for a given block of data is the tile that maintains coherence information for the given block of data;
  execute the additional operation without updating the data or invalidating all share copies of the data; and
  use a result of the operation to make a subsequent hardware operation decision.

22. The device of claim 21 wherein the subsequent hardware operation decision is to obtain exclusive data ownership of the data and invalidate any shared copies of the data, when the data are required to be updated and when there are any shared copies of that data in any of the other processors that are required to be invalidated.

23. The device of claim 21 wherein the subsequent hardware operation decision is if the data are not required to be updated, no further coherency operation is needed.

24. A computer program product tangibly stored on a non-transitory computer readable medium for acquiring a read lock, for reading a memory of a computing system, the computer program product comprises instructions to cause a multicore processor device that comprises a plurality of processor cores, with multiple ones of the plurality of processor cores each comprising a processor and switching circuitry configured to couple the processor to a network among the plurality of cores, to:
  receive from a reader process, an instruction to perform an operation associated with an original value stored at a memory address location of a memory of the computing system, the operation adds a value to the original value and checks a result of adding the value; and configure circuitry to perform the operation associated with the original value stored at the memory address location of the memory; and read the original value stored at the memory address location and atomically perform the addition of the value with reading the original value, with at least one of one or more additional operations conditionally performed based at least in part on checking the result of performing the one more additional operations on the original value read from the memory address location to determine whether a writer process currently has a lock on the memory address location.

25. The computer program product of claim 24, further comprising instructions to:

determine whether to send a message invalidating cached copies of the original value based on the result.

26. The computer program product of claim 24, wherein the instructions include a fetchaddgez instruction in which a sign bit of the value indicates whether the one or more additional operations succeeded.

27. The computer program product of claim 24 wherein the read lock is initialized to zero, and the value stored at the memory location is a signed value, having a sign bit, the instructions further comprise instructions to:

add a value +1 to the original value stored and with the result being a negative result indicating that the sign bit is set, which indicates that the writer process currently has the read lock, and the reader process waits for the writer to complete.

28. The computer program product of claim 27 wherein the reader process executes in a loop in which the reader process repeatedly issues the instruction until the instruction returns a true value.

29. The computer program product of claim 24 wherein the original value stored at the memory location is a signed value, having a sign bit and the instructions further comprise instructions to:

execute by a writer process an atomic "fetch-and-or" instruction to set a sign bit of the original value stored at the memory address location to acquire a lock for writing.

30. The computer program product of claim 24 wherein the original value stored at the memory location is a signed value, having a sign bit and the instructions further comprise instructions to:

execute by the writer process a compare-and-exchange or instruction that atomically sets the sign bit to acquire a lock for writing.

31. The computer program product of claim 24 further comprise instructions to:

forward the operation from a requesting processor to a cache controller at a home tile, where the home tile for a given block of data is the tile that maintains coherence information for the given block of data;

execute the additional operation without updating the data or invalidating all share copies of the data;

use a result of the operation to make a subsequent hardware operation decision.

32. The computer program product of claim 31 wherein the subsequent hardware operation decision is to obtain exclusive data ownership of the data and invalidate any shared copies of the data, when the data are required to be updated and when there are any shared copies of that data in any of the other processors that are required to be invalidated.

33. The computer program product of claim 31 wherein the subsequent hardware operation decision is if the data are not required to be updated, no further coherency operation is needed.

* * * * *